United States Patent
Yamada et al.

(12) 
(10) Patent No.: US 6,178,009 B1
(45) Date of Patent: Jan. 23, 2001

(54) PRINTING WITH MULTIPLE DIFFERENT BLACK INKS

(75) Inventors: Akitoshi Yamada; Hiromitsu Hirabayashi, both of Irvine, CA (US)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/972,308

(22) Filed: Nov. 17, 1997

(51) Int. Cl.[7] .............. B41B 15/00; G06K 9/36; B41J 2/205; B41J 2/165
(52) U.S. Cl. ............. 358/1.9; 368/1.8; 368/458; 382/237; 347/15; 347/43
(58) Field of Search ........... 358/1.9, 1.8; 347/43, 347/14, 40, 9, 15

(56) References Cited

U.S. PATENT DOCUMENTS

| | | | |
|---|---|---|---|
| 4,692,778 | 9/1987 | Yoshimura et al. | 346/145 |
| 4,962,390 | 10/1990 | Yoshimura et al. | 346/140 R |
| 5,142,374 | 8/1992 | Tajika et al. | 358/298 |
| 5,151,716 | 9/1992 | Kanemitsu | 346/140 R |
| 5,172,140 | 12/1992 | Hirabayashi et al. | 346/140 R |
| 5,179,389 | 1/1993 | Arai et al. | 346/1.1 |
| 5,266,974 | 11/1993 | Koitabashi et al. | 346/140 R |
| 5,341,163 | 8/1994 | Hanabusa | 347/23 |
| 5,477,248 | 12/1995 | Sugimoto et al. | 347/43 |
| 5,495,271 | 2/1996 | Koitabashi et al. | 347/23 |
| 5,512,926 | 4/1996 | Uchikata et al. | 347/86 |
| 5,530,792 | 6/1996 | Ikeda et al. | 395/115 |
| 5,534,899 | 7/1996 | Uchikata et al. | 347/49 |
| 5,592,200 | 1/1997 | Kaneko | 347/30 |
| 5,670,997 | 9/1997 | Sugimoto et al. | 347/30 |
| 5,742,306 | * 4/1998 | Gompertz et al. | 347/43 |
| 5,911,009 | * 6/1999 | Ikuta | 382/237 |
| 5,923,349 | * 7/1999 | Meyer | 347/43 |

FOREIGN PATENT DOCUMENTS

| | | | | |
|---|---|---|---|---|
| 879857 A2 | * 12/1998 | (EP) | | B41J/2/01 |
| 7-125406 | * 5/1995 | (JP) | | B41M/5/00 |
| 8156288 | * 6/1996 | (JP) . | | |
| 10202920 | * 8/1998 | (JP) | | B41J/2/05 |

* cited by examiner

Primary Examiner—Edward L. Coles
Assistant Examiner—Twyler Lamb
(74) Attorney, Agent, or Firm—Fitzpatrick, Cella, Harper & Scinto

(57) ABSTRACT

A method for controlling printing of pixels corresponding to multi-level image data includes determining, based on multi-level image data for a target pixel and multi-level image data for pixels adjacent to the target pixel, whether the target pixel should be printed using a dye-based ink or whether the target pixel should be printed using a pigment-based ink. In a case that it is determined that the target pixel should be printed using the dye-based ink, a printer is instructed to print the target pixel using the dye-based ink. On the other hand, in a case that it is determined that the target pixel should be printed using the pigment-based ink, the printer is instructed to print the target pixel using the pigment-based ink.

56 Claims, 90 Drawing Sheets

TABLE A

THE SAMPLE COMMAND FLOW IN CASE OF BC-21 x 2, COLOR MODE, 360dpi AND 8.5" OF PRINT BUFFER IS MENTIONED BELOW.

| | |
|---|---|
| [UCT] | UNIVERSAL COORDINATED TIME (SET CURRENT TIME) |
| [RESET] | PRINTER RESET (SOFTWARE RESET) |
| [COMPRESS] | SELECT DATA COMPRESSION (BYTE PACKING MODE) |
| [DEFINE_BUF] | DEFINE PRINT BUFFER A |
| [DEFINE_BUF] | DEFINE PRINT BUFFER B |
| [DEFINE_PULSE] | DEFINE HEAT PULSE TABLE |
| [DEFINE_CONTROL] | DEFINE BUFFER CONTROL TABLE |
| | |
| [LOAD] | PAPER LOAD |
| [SKIP] | RASTER SKIP TO THE PRINT POSITION FOR THE 1ST SCAN |
| | |
| [DIRECTION] | SET PRINT DIRECTION FOR THE 1ST SCAN |
| [EDGE] | SET LEFT AND RIGHT EDGE OF HEAD A FOR THE 1ST SCAN |
| [EDGE] | SET LEFT AND RIGHT EDGE OF HEAD B FOR THE 1ST SCAN |

LOOP1: BEGIN   REPEAT UNTIL [EJECT] COMMAND
   [SPEED]                                        SELECT PRINT SPEED FOR THE 1ST SCAN
   [SIZE]                                          SELECT DROPLET SIZE OF HEAD A FOR THE 1ST SCAN
   [SIZE]                                          SELECT DROPLET SIZE OF HEAD B FOR THE 1ST SCAN
   [SELECT_PULSE]                     SELECT HEAT PULSE TABLE xx FOR NEXT SCAN
   [SELECT_CONTROL]                 SELECT BUFFER CONTROL TABLE xx OF HEAD A FOR THE 1ST SCAN
   [SELECT_CONTROL]                 SELECT BUFFER CONTROL TABLE xx OF HEAD B FOR THE 1ST SCAN

LOOP2: BEGIN   REPEAT 18 TIMES FOR 9 BLOCK (4.5INCH/0.5INCH) x 2 HEAD (HEAD A AND HEAD B)
         [BLOCK]                                 SELECT PRINT BLOCK

LOOP3: BEGIN   REPEAT 4 TIMES FOR 4 COLOR (YELLOW, MAGENTA, CYAN, BLACK)
            [COLOR]                               SELECT PRINT COLOR
            [DATA]                                IMAGE DATA TRANSMISSION
         LOOP3: END

LOOP2: END

[DIRECTION]                        SET PRINT DIRECTION FOR THE 2ND SCAN
      [EDGE]                                    SET LEFT AND RIGHT EDGE OF HEAD A FOR THE 2ND SCAN
      [EDGE]                                    SET LEFT AND RIGHT EDGE OF HEAD B FOR THE 2ND SCAN

[PRINT]                                  PRINT EXECUTION FOR THE 1ST SCAN
      [SKIP]                                     RASTER SKIP TO THE PRINT POSITION FOR THE 2ND SCAN
LOOP:1 END

[EJECT]                                             PAPER EJECT (EJECT ONLY)

FIG. 18

[BC-21(e) OR BC-22(e) 24 NOZZLE OF COLOR, 360dpi, FORWARD AND BACKWARD] (LOWER 3 BYTE IS USED FOR BLACK)
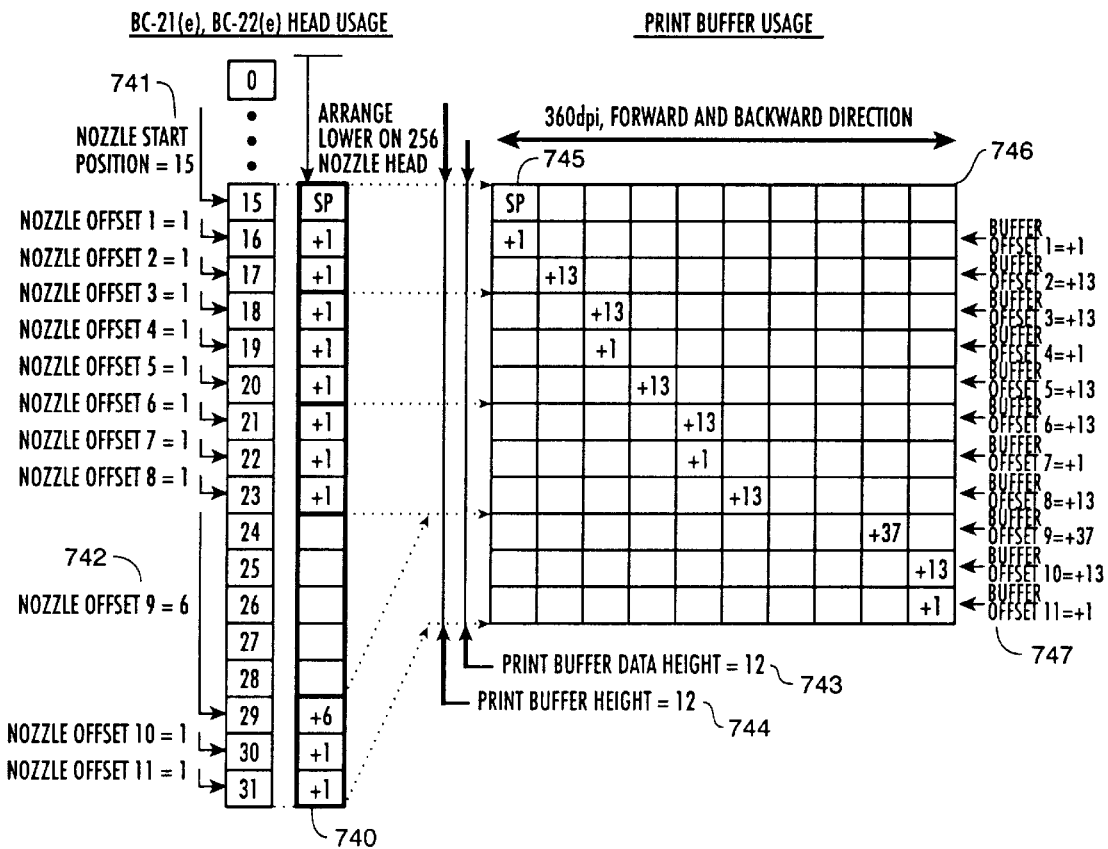
[BC-21(e) OR BC-22(e) 24 NOZZLE OF COLOR, 720dpi, FORWARD AND BACKWARD] (LOWER 3 BYTE IS USED FOR BLACK)
PRINT BUFFER USAGE
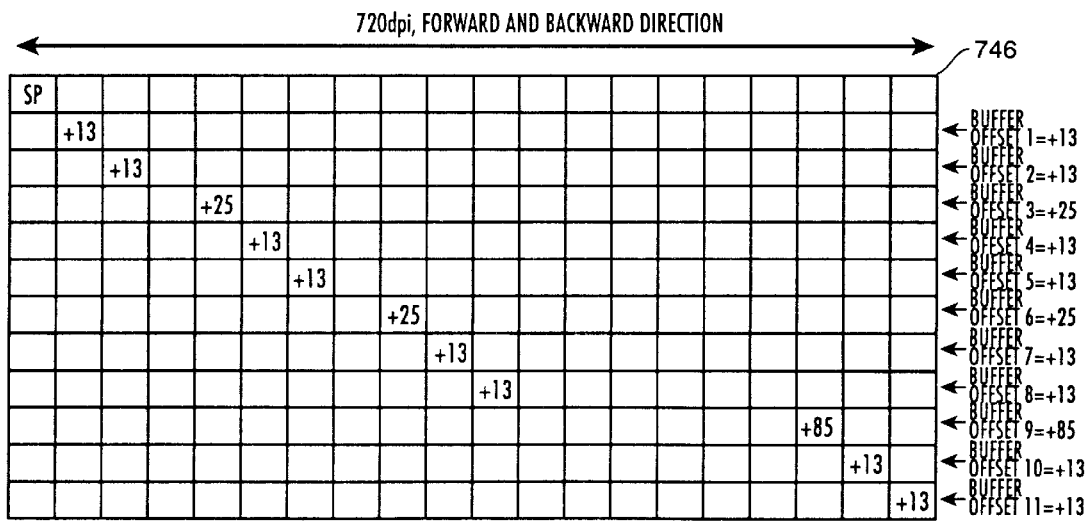
FIG. 43D

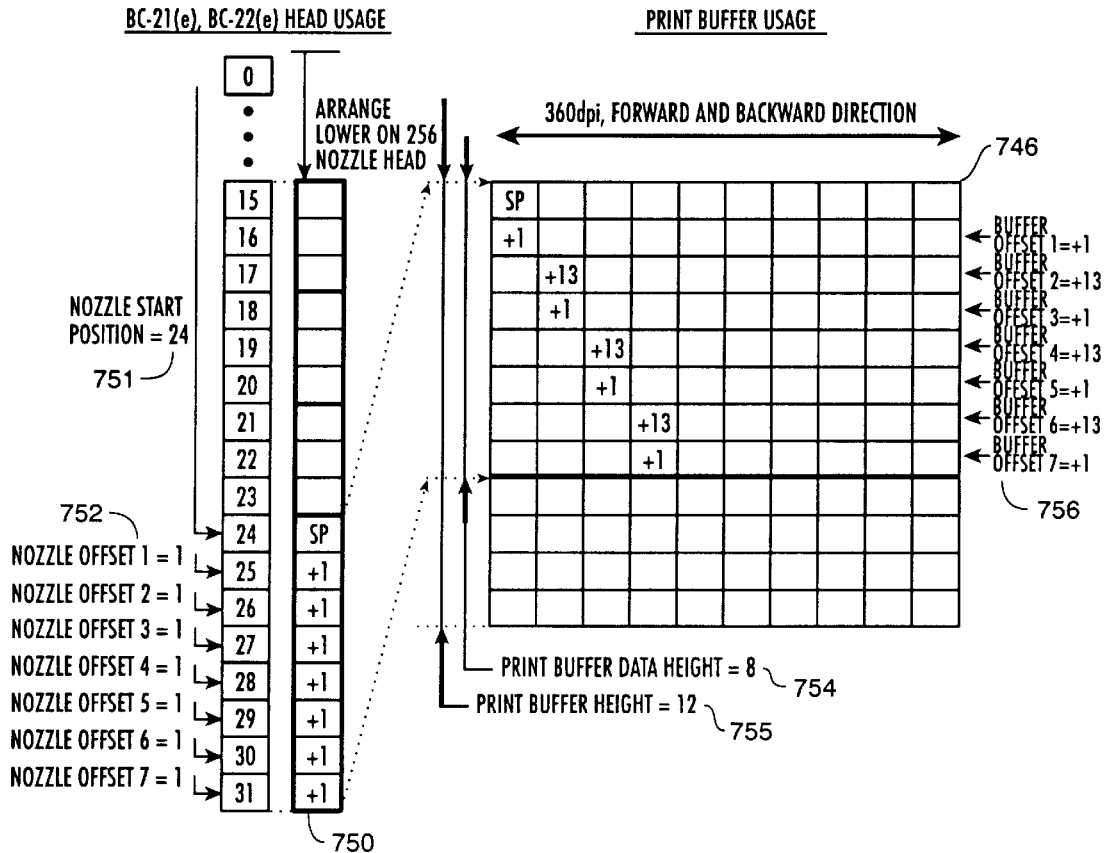
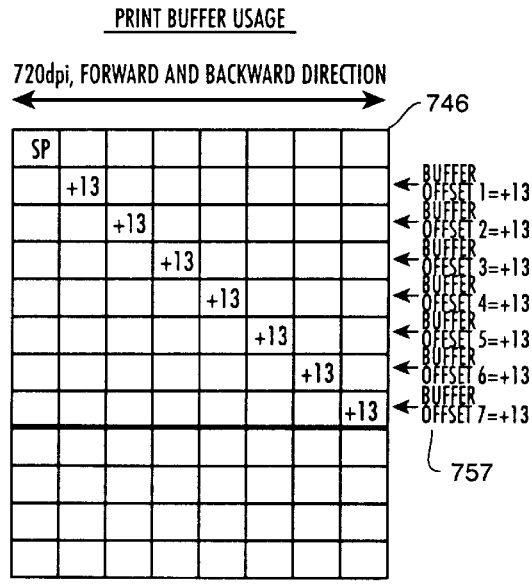
FIG. 43E

SEQUENCE FOR NOZZLE HEATING

| PRINT CONDITIONS | NOZZLE NUMBER | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 360dpi FORWARD | 1 | 2 | 3 | 4 | 5 | 6 | 7 | 8 | 9 | 10 | 11 | 12 | 13 | 14 | 15 | 16 |
| 360dpi REVERSE | 16 | 15 | 14 | 13 | 12 | 11 | 10 | 9 | 8 | 7 | 6 | 5 | 4 | 3 | 2 | 1 |
| 720dpi FORWARD | 1 | 9 | 2 | 10 | 3 | 11 | 4 | 12 | 5 | 13 | 6 | 14 | 7 | 15 | 8 | 16 |
| 720dpi REVERSE | 16 | 8 | 15 | 7 | 14 | 6 | 13 | 5 | 12 | 4 | 11 | 3 | 10 | 2 | 9 | 1 |

FIG. 43G

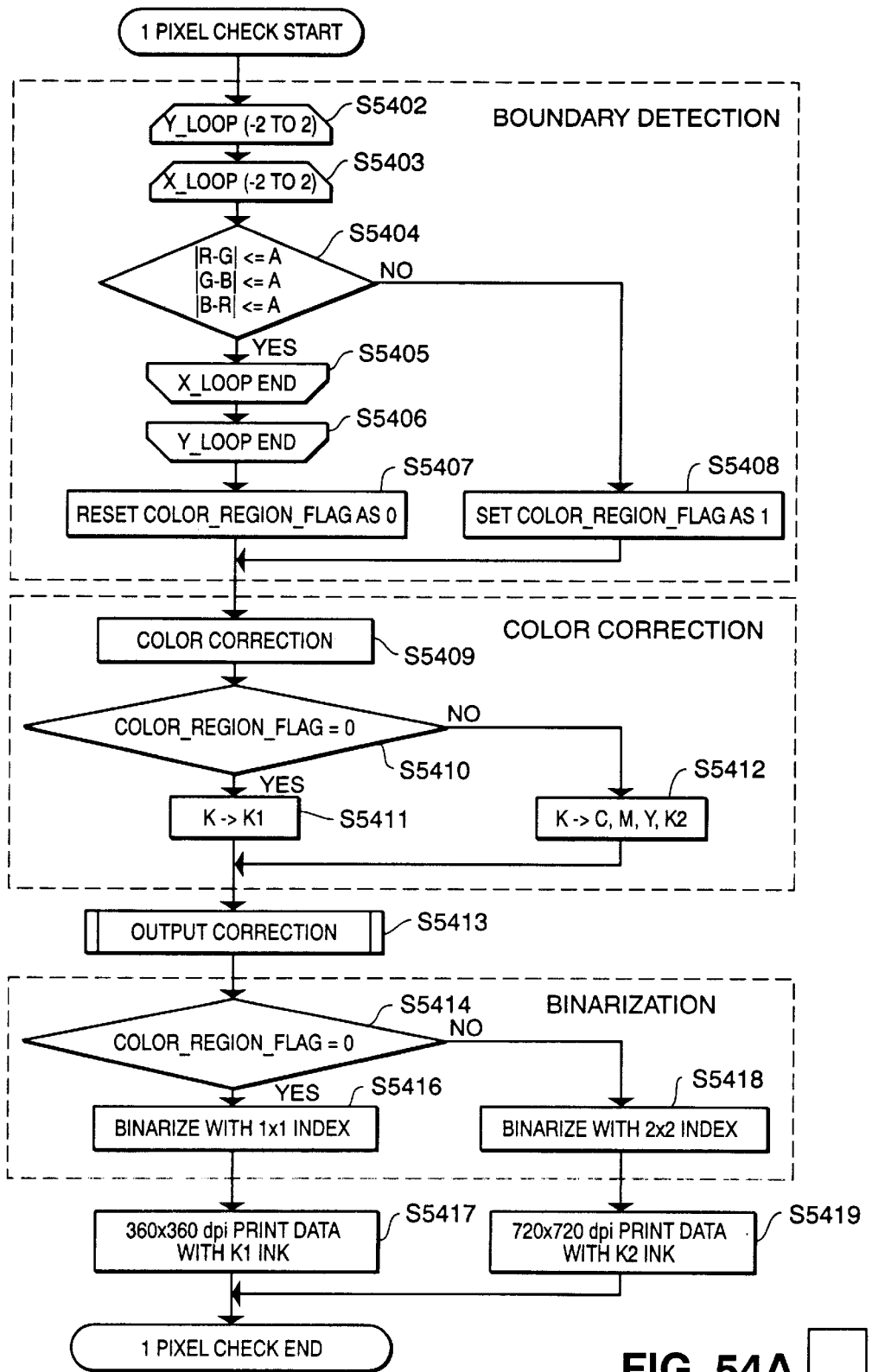
FIG. 54

PRINTING WITH MULTIPLE DIFFERENT BLACK INKS

BACKGROUND OF THE INVENTION

1. Field of the Invention

The present invention relates to printing systems which provide several alternative inks for printing. More specifically, the present invention concerns a printing system in which low-penetration black ink and high-penetration black ink are selectably used to print black pixels upon a recording medium.

2. Description of the Related Art

Conventional ink jet printing systems have heretofore employed several different methods to print black ink upon a recording medium. Particularly, black color may be printed using either low-penetration black ink, high-penetration black ink, or so-called process black (hereafter PCBk). It should be understood that, throughout the present specification, the terms "high-penetration" and "low-penetration" are not intended to describe absolute amounts of ink penetration into a recording medium. Rather, the term "high-penetration ink", as used herein, merely indicates an ink such as dye-based ink having a relatively greater penetration into a recording medium, whereas those inks described herein as "low-penetration" are inks such as pigment-based or evaporation inks having a relatively lower penetration.

Low-penetration black ink is often used to print black color in situations where a user desires high contrast between a printed black region and a lighter-colored surrounding region. This situation most commonly arises during text printing. Accordingly, most monochrome ink jet printers utilize low-penetration black ink.

High-penetration black ink is conventionally used in conjunction with differently-colored inks in order to produce color images. In this regard, a color printer usually provides for high-penetration inks corresponding to the subtractive color components, cyan, magenta, and yellow, as well as for black ink, which is used for under color removal. Variously-colored pixels are produced by printing none or some or all of the four inks at a single location upon a recording medium. Mixing of the printed inks generally produces muddy colors so high-penetration inks, which do not mix thoroughly, are generally preferred for color printing. Since high-penetration color inks are used for color printing, high-penetration black ink, which produces images having an optical density near to that of the color inks, is preferred for printing black pixels within a differently-colored region.

PCBk is produced by combining equal amounts of full-intensity cyan, magenta and yellow inks. In practice, PCBk does not provide as satisfactory a black color as low-penetration black ink or high-penetration black ink. However, PCBk, which shares penetration characteristics similar to its component colored inks, provides an output density similar to that of differently-colored pixels and is therefore useful for printing black color where uniform density between a black region and a color region is desired.

Therefore, whether a black pixel within an image should be printed using low-penetration black ink, high-penetration black ink, or PCBk is influenced by the content of the image data proximate to the black pixel. In this regard, current printing systems analyze binarized image data adjacent to a black pixel in order to determine a method for printing the black pixel. Unfortunately, in a case where the binarized data is based on multi-level original image data, the binarized data may not accurately reflect the original image data. As a result, a determined method for printing the black pixel may be inappropriate.

Moreover, as can be understood from the foregoing, optical characteristics of printed ink depend substantially upon an amount of penetration of the ink into a recording medium. However, conventional ink jet printing systems do not provide for selectable printing of low-penetration black ink and high-penetration black ink based upon absorption or other characteristics of a recording medium.

Therefore, what is needed is a printing system which selectably provides high-penetration black ink and low-penetration black ink for printing black pixels upon a recording medium based upon multi-level image data and/or characteristics of a recording medium.

On a related note, due to bleeding that occurs at a boundary between high and low-penetration inks, PCBk is sometimes used in order to provide a transition between a black region printed using black ink and a differently-colored region. Such a technique is disclosed in commonly-assigned co-pending application Ser. No. 08/901,719, entitled "PRINT DRIVER FOR A COLOR PRINTER", filed Jul. 28, 1997.

However, in a case that PCBk is used at a boundary between a black region printed using low-penetration ink and a differently-colored region, the boundary is distracting to the eye. This distraction is caused by differences between the optical density of the differently-colored region, printed using high-penetration ink, and the optical density of the black region, printed using low-penetration ink.

On the other hand, in a case that PCBk is used at a boundary between a black region printed using high-penetration ink and a differently-colored region, the printed black region consists of a low-contrast, dull black color. Accordingly, each of the foregoing methods for printing a boundary region between black regions and differently-colored regions are unsatisfactory.

SUMMARY OF THE INVENTION

The present invention addresses the foregoing by providing selection, based on multi-level image data, of either a pigment-based black ink or a dye-based black ink for printing within a single printing system. As a result, both a pigment-based black ink and a dye-based black ink can be used to print appropriate portions of a single image so as to provide improved image quality.

The present invention also addresses the foregoing by selectably providing a first ink or a second ink for printing on a recording medium based on a detected material type of the recording medium.

In addition, the present invention selectably provides, for printing black pixels, either a pigment-based black ink or a combination of a dye-based black ink and dye-based inks of each of subtractive primary colors.

Moreover, the present invention provides a system to print a boundary region between a black region and a differently-colored region using, in turn, low-penetration black ink, high-penetration black ink, and PCBk.

In particular, the present invention relates to a system to control printing of pixels corresponding to multi-level image data in which it is determined, based on multi-level image data for a target pixel and multi-level image data for pixels adjacent to the target pixel, whether the target pixel should be printed using a dye-based ink or whether the target pixel should be printed using a pigment-based ink. In a case that it is determined that the target pixel should be printed using the dye-based ink, a printer is instructed to print the target pixel using the dye-based ink. On the other hand, in a case that it is determined that the target pixel should be printed using the pigment-based ink, the printer is instructed to print the target pixel using the pigment-based ink.

Due to the foregoing, the present invention provides improved output image quality. For example, a multi-level image to be printed may contain small isolated black regions within a larger color region, as well as solid black regions. Small isolated black regions within a larger color region are preferably printed using a dye-based black ink so as to reduce contrast between the small isolated regions and the differently-colored portions of the color region, which are printed using dye-based ink. By doing so, the output density of the larger color region appears uniform. In contrast, a pigment-based ink is preferred for printing a solid black region such as a border region because the quality of black color thusly obtained is superior to that of a dye-based ink or PCBk.

Moreover, because the determination of whether the dye-based ink or the pigment-based ink should be used is based on multi-level data, such small isolated black regions and solid black regions of original image data can be properly identified and distinguished from one another.

In another aspect, the present invention provides a system for determining whether to print a first ink or a second ink based on characteristics of a print job. More specifically, the present invention provides a system in which a material type of a recording medium is detected. Based on the detected material type, it is determined whether the pixel should be printed using the first ink or whether the pixel should be printed using the second ink. As a result, the present invention outputs a type of ink most appropriate for a particular print job.

In a related aspect, the present invention concerns a system to control an ink jet printer to print pixels corresponding to multi-level image data upon a recording medium using either a first ink or a second ink in which it is determined whether the recording medium is plain paper or specially-coated paper. In a case that the recording medium is determined to be specially-coated paper, the printer is instructed to print a target pixel using the first ink. In a case that the recording medium is determined to be plain paper, it is determined whether or not the target pixel corresponds to a differently-colored region. In a case that it is determined that the target pixel corresponds to a differently-colored region, the printer is instructed to print the target pixel using the first ink. In addition, in a case that it is determined that the target pixel does not correspond to a differently-colored region, the printer is instructed to print the target pixel using the second ink.

In a preferred embodiment of the above aspect, it is determined whether or not the target pixel corresponds to a differently-colored region by calculating, for each pixel in a region adjacent to the target pixel, a relationship between primary color values assigned to the pixel in the region adjacent to the target pixel, and by determining whether each of the calculated relationships satisfies a predetermined relationship.

In another aspect, the present invention provides a system to control printing of black pixels in which it is determined whether a black target pixel corresponds to a differently-colored region and, in a case that it is determined that the black target pixel does not correspond to a differently-colored region, a printer is instructed to print the black target pixel using a pigment-based black ink. In a case that it is determined that the black target pixel corresponds to a differently-colored region, the printer is instructed to print the black target pixel using a dye-based black ink and dye-based ink of each of subtractive primary colors.

According to a further aspect, the present invention provides a system to print an image using an ink jet printer comprising a reservoir of a high-penetration black ink, a reservoir of ink of a low-penetration black ink, and a reservoir of ink to create process black. First, a boundary between a black region of the image and a differently-colored region of the image is detected. Next, the printer is instructed to print a first region of black pixels within the black region and adjacent to the boundary using process black. The printer is also instructed to print a second region of black pixels within the black region and adjacent to the first region using the high-penetration black ink, and to print a third region of black pixels within the black region and adjacent to the second region using the low-penetration black ink.

These features interoperate to produce an image having high-quality transitions between black regions and differently-colored regions. In particular, these transitions consist of a progression from low-penetration black ink, to high-penetration black ink, to PCBk, and to color ink. As a result, a high-quality black region is obtained and bleeding into differently-colored regions is reduced.

Along similar lines, the present invention provides a system to print pixels corresponding to raster data using an ink jet printer including a reservoir of a high-penetration black ink, a reservoir of a low-penetration black ink, and a reservoir of ink to create process black. According to the system, it is determined, based on the raster data, whether or not a first region of a first predetermined size adjacent to a target pixel includes a differently-colored region. In a case that it is determined that the first region includes a differently-colored region, the printer is instructed to print the target pixel using process black. In a case that it is determined that the first region does not include a differently-colored region, it is determined, based on the raster data, whether or not a second region of a second predetermined size adjacent to the target pixel includes a differently-colored region, the second region being larger than the first region. In a case that it is determined that the second region includes a differently-colored region, the printer is instructed to print the target pixel using the high-penetration black ink. Conversely, in a case that it is determined that the second region does not include a differently-colored region, the printer is instructed to print the target pixel using the low-penetration black ink.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 18 depicts a table showing command flow during a printing sequence.

FIGS. 43D to 43F illustrate correlations between head usage and print buffer usage for various printing conditions.

FIG. 43G illustrates nozzle heating sequences for various print conditions.

FIGS. 43-1A to 43-1E show transfer of data from a host processor to a print buffer in a printer.

FIGS. 43-2A to 43-2E show print data transfer in drawing a backward scan following a forward scan.

FIGS. 43-3A to 43-3F show transfer of print data during forward scan of a single print head across a print medium.

FIGS. 43-4A to 43-4F show print data transfer during a forward scan in an alternative embodiment of the invention.

FIGS. 43-5A to 43-5F show print data transfer during a backward scan after a forward scan has been performed.

FIGS. 43-6A to 43-6F show print data transfer during a forward scan of a single print head.

FIGS. 43-7A to 43-7L show print data transfer in a forward direction for a pair of print heads.

FIG. 54 shows color processing according to one embodiment of the invention.

FIGS. 54A and 54B show binarization of pixels in accordance with one embodiment of the invention.

DETAILED DESCRIPTION OF THE PREFERRED EMBODIMENT

This detailed description of the preferred embodiment is organized into sections, as follows:
1.0 Mechanical
  1.1 Structure
  1.2 Functions
    1.2.1 Manual Cleaning
    1.2.2 Cartridge Replacement
  1.3 Ink Cartridge
  1.4 Print Head Structure
  1.5 Print Modes
2.0 Electrical
  2.1 System Architecture
  2.2 System Function
  2.3 Control Logic
  2.4 General Operation
3.0 Architecture of Printer Software
  3.1 Operating System
  3.2 Initialization
  3.3 Tasks
  3.4 Interrupt Handlers
  3.5 Cyclic Handlers
  3.6 Commands To And From The Host Processor
    3.6.1 Control Commands
    3.6.2 Setting Commands
    3.6.3 Maintenance Commands
  3.7 Commands To And From The Printer Engine
4.0 Paper Ejection Tray
  4.1 First Embodiment
  4.2 Second Embodiment
5.0 Ink Cleaning Mechanism
6.0 Storing Printer Profile Parameters
7.0 Scheduling Cleaning Of Print Heads
  7.1 Cleaning Schedule Process
  7.2 Automatic Cleaning Process
  7.3 Cleaning Of A Print Head
8.0 Setting And Modifying Print Head Driving Parameters
9.0 Print Buffer Operation
  9.1 Single Print Buffer
  9.2 General Description Of Buffer Control
10.0 Multi-Head Printing With Differing Resolutions
11.0 Selection of Alternative Inks
  11.1 Selection of CMYK Black or Pigment Black
  11.2 Boundary Region Printing
  11.3 Printing With Different Inks at Different Resolutions

1.0 Mechanical

This section describes the mechanical layout and functionality of a printer which includes the inventions described herein.

1.1 Structure

Figure 1:
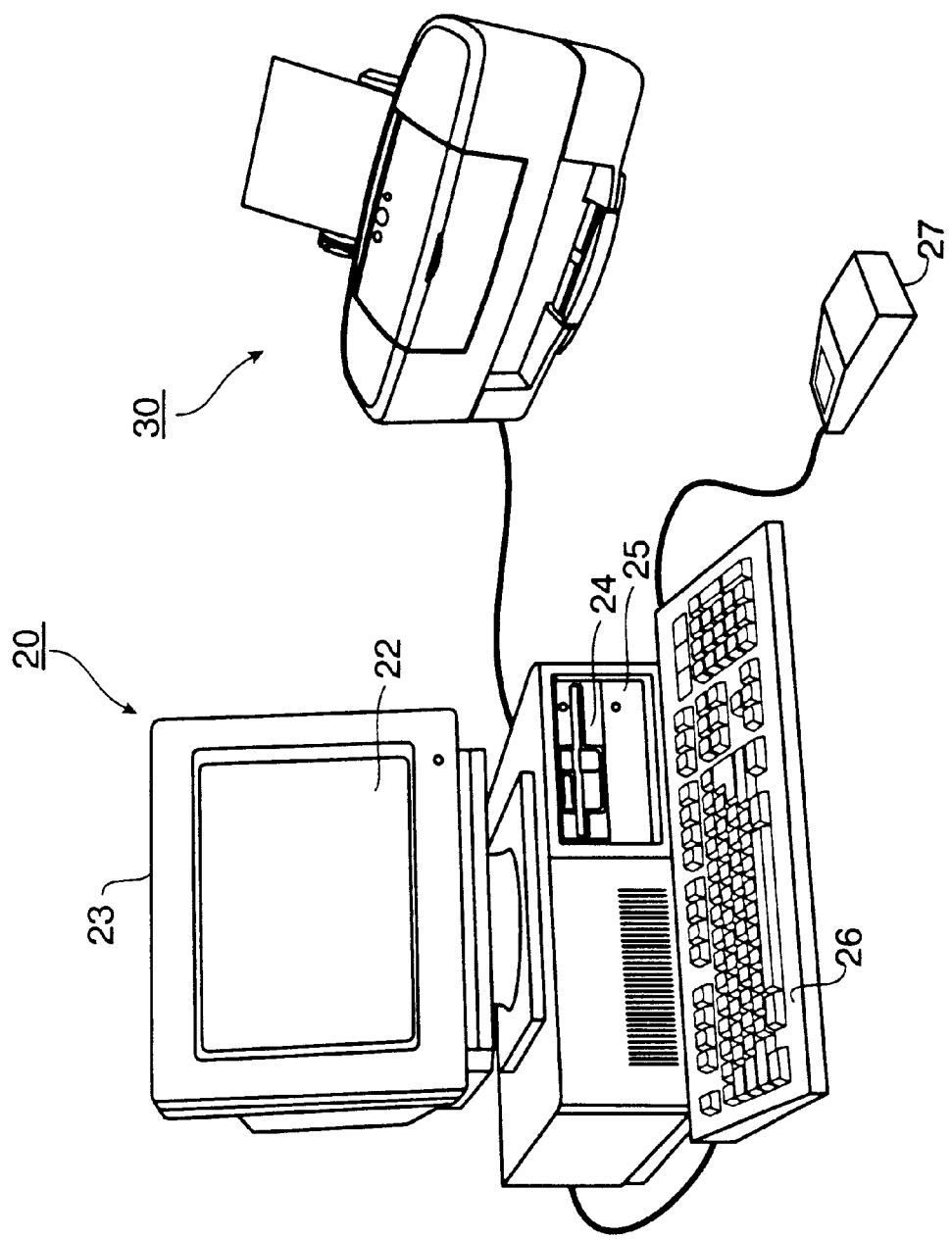
FIG. 1 shows a perspective view of computing equipment used in connection with the printer of the present invention.

FIG. 1 is a view showing the outward appearance of computing equipment used in connection with the inventions described herein. Computing equipment 20 includes host processor 23. Host processor 23 comprises a personal computer (hereinafter "PC"), preferably an IBM PC-compatible computer having a windowing environment, such as Microsoft® Windows95. Provided with computing equipment 20 are display screen 22 comprising a color monitor or the like, keyboard 26 for entering text data and user commands, and pointing device 27. Pointing device 27 preferably comprises a mouse for pointing and for manipulating objects displayed on display screen 22.

Computing equipment 20 includes a computer-readable memory medium, such as fixed computer disk 25, and floppy disk interface 24. Floppy disk interface 24 provides a means whereby computing equipment 20 can access information, such as data, application programs, etc., stored on floppy disks. A similar CD-ROM interface (not shown) may be provided with computing equipment 20, through which computing equipment 20 can access information stored on CD-ROMs.

Disk 25 stores, among other things, application programs by which host processor 23 generates files, manipulates and stores those files on disk 25, presents data in those files to an operator via display screen 22, and prints data in those files via printer 30. Disk 25 also stores an operating system which, as noted above, is preferably a windowing operating system such as Windows95. Device drivers are also stored in disk 25. At least one of the device drivers comprises a printer driver which provides a software interface to firmware in printer 30. Data exchange between host processor 23 and printer 30 is described in more detail below.

In preferred embodiments of the invention, printer 30 is a multi-head serial printer. Accordingly, although the inventions described herein are not limited to use with such a printer, the inventions will be described in the context of a such a printer.

Figure 2:
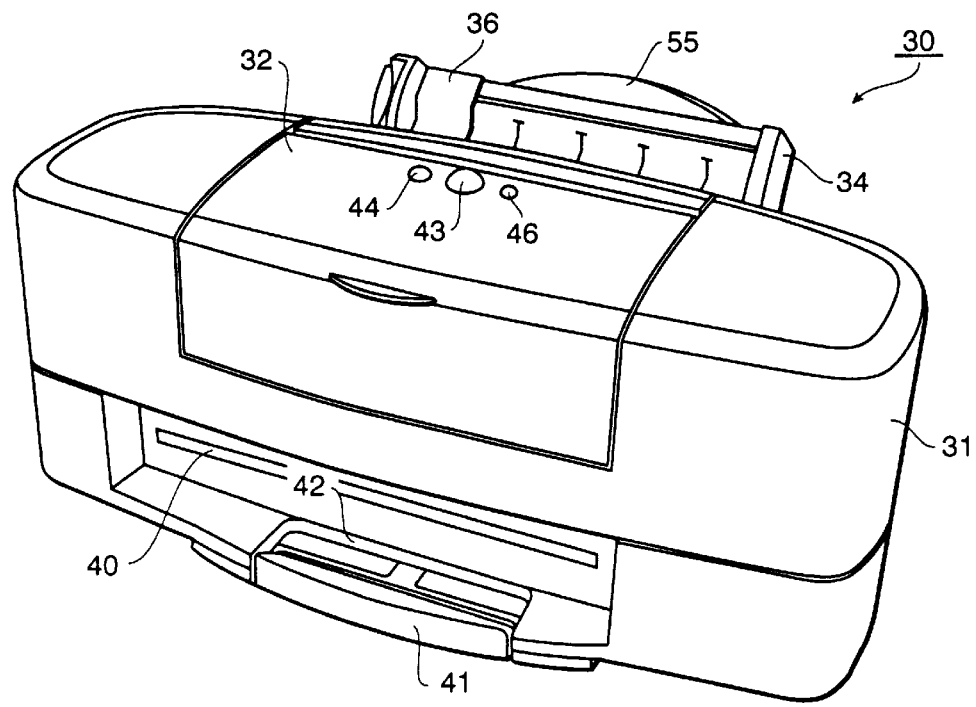
FIG. 2 is a front perspective view of the printer shown in FIG. 1.
Figure 3:
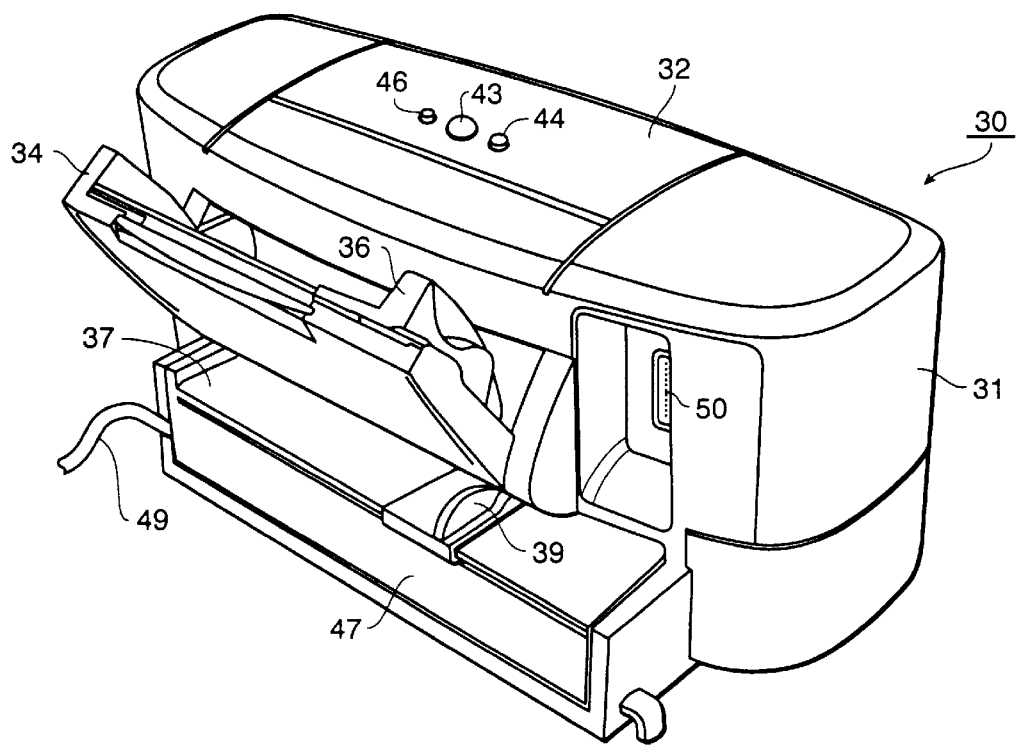
FIG. 3 is a back perspective view of the printer shown in FIG. 1.

In this regard, FIGS. 2 and 3 show close-up perspective front and back views, respectively, of printer 30. As shown in these figures, printer 30 includes housing 31, access door 32, automatic feeder 34, automatic feed adjuster 36, manual feeder 37, manual feed adjuster 39, media eject port 40, ejection tray 41, tray receptacle 42, indicator light 43, power button 44, resume button 46, power supply 47, power cord 49, and parallel port connector 50.

Housing 31 is approximately 498 mm in width by 271 mm in depth by 219 mm in height, and houses the internal workings of printer 30, including the print engine described below which prints images onto recording media. Included on housing 31 is access door 32. Access door 32 is manually openable and closeable so as to permit a user to access the internal workings of printer 30 and, in particular, to access print cartridges installed in printer 30. To this end, printer 30 also includes a sensor (not shown) which senses when access door 32 has been opened and closed. Once it is sensed that access door 32 has been opened, cartridge receptacles which releasably hold the cartridges within printer 30 are moved to a position which corresponds to open access door 32. Details of this feature are provided below.

Disposed on the top of access door 32 is a front panel comprising indicator light 43, power button 44, and resume button 46. Power button 44 is a control by which a user can turn printer 30 on and off. Additional functions, however, are also available through power button 44. For example, a test print function can be selected by holding down power button 44 until a speaker (not shown) in printer 30 emits a sound, such as one beep. In response to this test print function, printer 30 prints a test pattern.

Resume button 46 provides control by which an operator can resume printing after an error condition has occurred. In addition, resume button 46 can be used to activate other functions. For example, a print head cleaning function can be activated by holding down resume button 46 until the speaker in printer 30 produces a beep.

In this regard, printer 30 is able to provide a variety of consecutive beeping sounds. Each of these sounds indicates a different type of error, such as paper empty, paper jam, etc.

Indicator light 43 is comprised of a single light pipe, a green light emitting diode (hereinafter "LED"), and an orange LED. Indicator light 43 provides a user with an indication of the operational state of printer 30. Specifically, when indicator light 43 is off, this indicates that printer 30 is powered off. When indicator light 43 is illuminated green (i.e., the green LED is activated), this indicates that printer 30 is powered on and is ready for printing. When indicator light 43 is green and blinking, this indicates an operational state of the printer, such as that the printer is currently powering on.

Indicator light 43 can also be illuminated orange by the orange LED. When indicator light 43 is illuminated orange, this indicates that a recoverable error, i.e., an operator call error, has occurred in printer 30. Recoverable errors comprise paper empty, paper jam, defective cartridge installed in printer 30, cartridge replacement in process, etc. It is possible to distinguish the type of recoverable error based on a number of beeps from printer 30's speaker. By counting these beeps when indicator LED is continuously orange, a user can determine which error has occurred and act accordingly.

When indicator light 43 is orange and blinking, this indicates that a fatal error, i.e., a service call error, has occurred in printer 30. It is possible to distinguish the type of fatal error that has occurred merely by counting how many times the orange light has blinked.

As shown in FIGS. 2 and 3, automatic feeder 34 is also included on housing 31 of printer 30. Automatic feeder 34 defines a media feed portion of printer 30. That is, automatic feeder 34 stores recording media onto which printer 30 prints images. In this regard, printer 30 is able to print images on a variety of types of recording media. These types include, but are not limited to, plain paper, high resolution paper, transparencies, glossy paper, glossy film, back print film, fabric sheets, T-shirt transfers, bubble jet paper, greeting cards, brochure paper, banner paper, thick paper, etc.

Automatic feeder 34 is able to accommodate a recording media stack which is approximately 13 mm thick. This means that automatic feeder 34 can hold, e.g., approximately 130 sheets of paper having a density of 64 $g/m^2$ or approximately 15 envelopes. During printing, individual sheets which are stacked within automatic feeder 34 are fed from automatic feeder 34 through printer 30. Specifically, rollers (described below) in printer 30 draw individual media from automatic feeder 34 into printer 30. These individual media are then fed in a "J" type path through the rollers to eject port 40 shown in FIG. 2.

Figure 24:
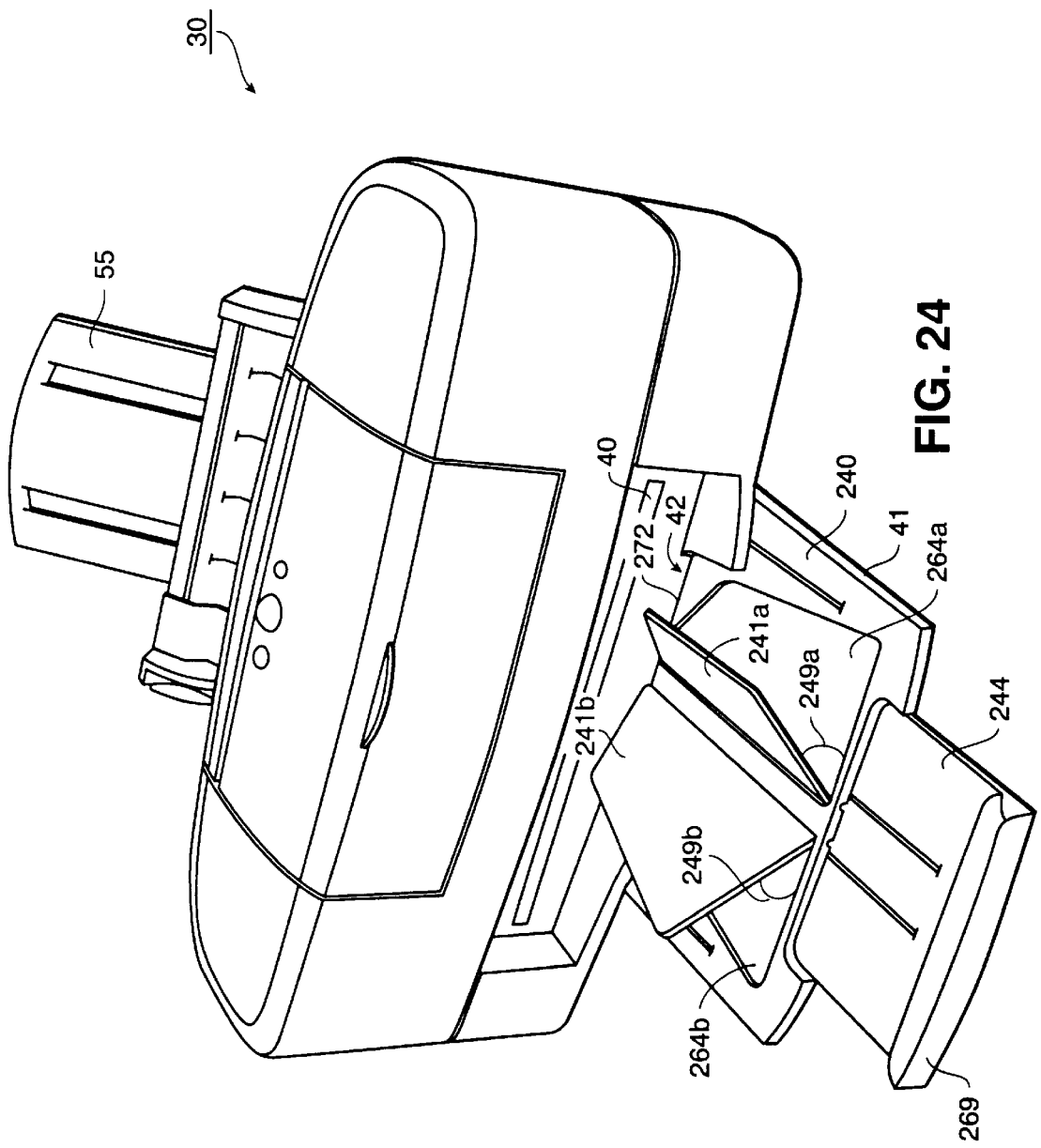
FIG. 24 shows a detailed perspective view of the printer shown in FIG. 1, in which the printer has its ejection tray set up for operation.

Automatic feeder 34 includes automatic feed adjuster 36. Automatic feed adjuster 36 is laterally movable to accommodate different media sizes within automatic feeder 34. Automatic feeder 34 also includes backing 55, which is extendible to support recording media held in automatic feeder 34. When not in use, backing 55 is stored within a slot in automatic feeder 34, as shown in FIG. 2. An example of backing 55 extended is shown in FIG. 24 below.

Individual sheets also can be fed through printer 30 via manual feeder 37 shown in FIG. 3, which also defines a media feed portion of printer 30. In preferred embodiments, manual feeder 37 can accommodate media having a density of at least between 64 $g/m^2$ and 550 $g/m^2$, and having a thickness of 0.8 mm. Sheets fed through manual feeder 37 are fed straight through the rollers in printer 30 to eject port 40. As was the case with automatic feeder 34, manual feeder 37 includes manual feed adjuster 39. By sliding manual feed adjuster 39 laterally, a user can vary the media which manual feeder 37 can accommodate.

Using manual feeder 37 and automatic feeder 34, printer 30 can print images on media having a variety of different sizes. These sizes include, but are not limited to, letter, legal, A4, A3, A5, B4, B5, tabloid, #10 envelope, DL envelope, banner, wide banner, and LTR full bleed. Custom-sized recording media can also be used with printer 30.

As noted above, media are fed through printer 30 and ejected from eject port 40 into ejection tray 41. As described in greater detail below in section 4.0, ejection tray 41 includes spring-biased flaps which support media ejected from printer 30, and which move downwardly as more media are piled thereon. When not in use, ejection tray 41 is stored within tray receptacle 42 of printer 30, as shown in FIG. 2.

Power cord 49 connects printer 30 to an external AC power source. Power supply 47 is used to convert AC power from the external power source, and to supply the converted power to printer 30. Parallel port 50 connects printer 30 to host processor 23. Parallel port 50 preferably comprises an IEEE-1284 bi-directional port, over which data and commands, such as those described below in section 3.0, are transmitted between printer 30 and host processor 23.

Figure 4:
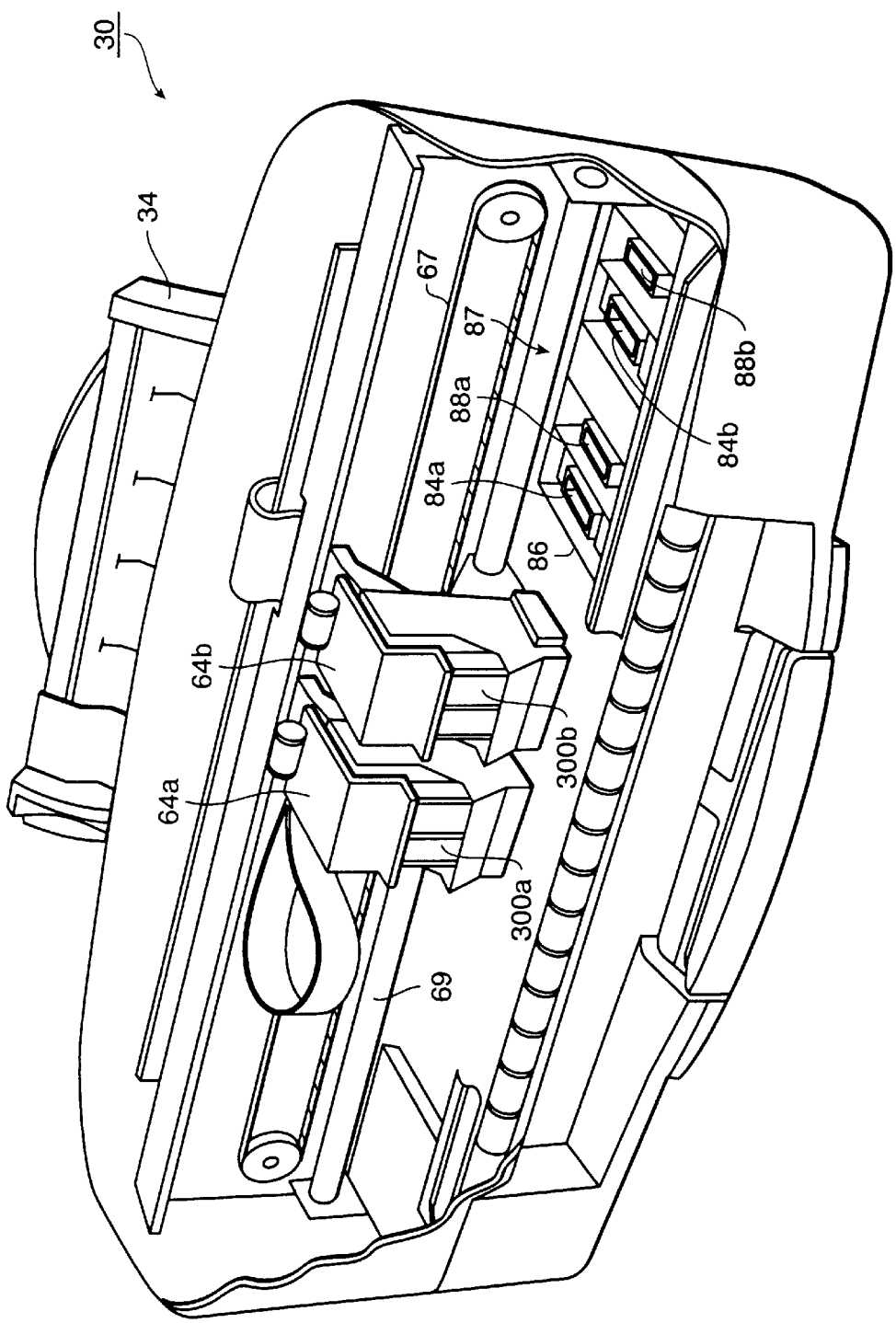
FIG. 4 is a front, cut-away perspective view of the printer shown in FIG. 1.
Figure 5:
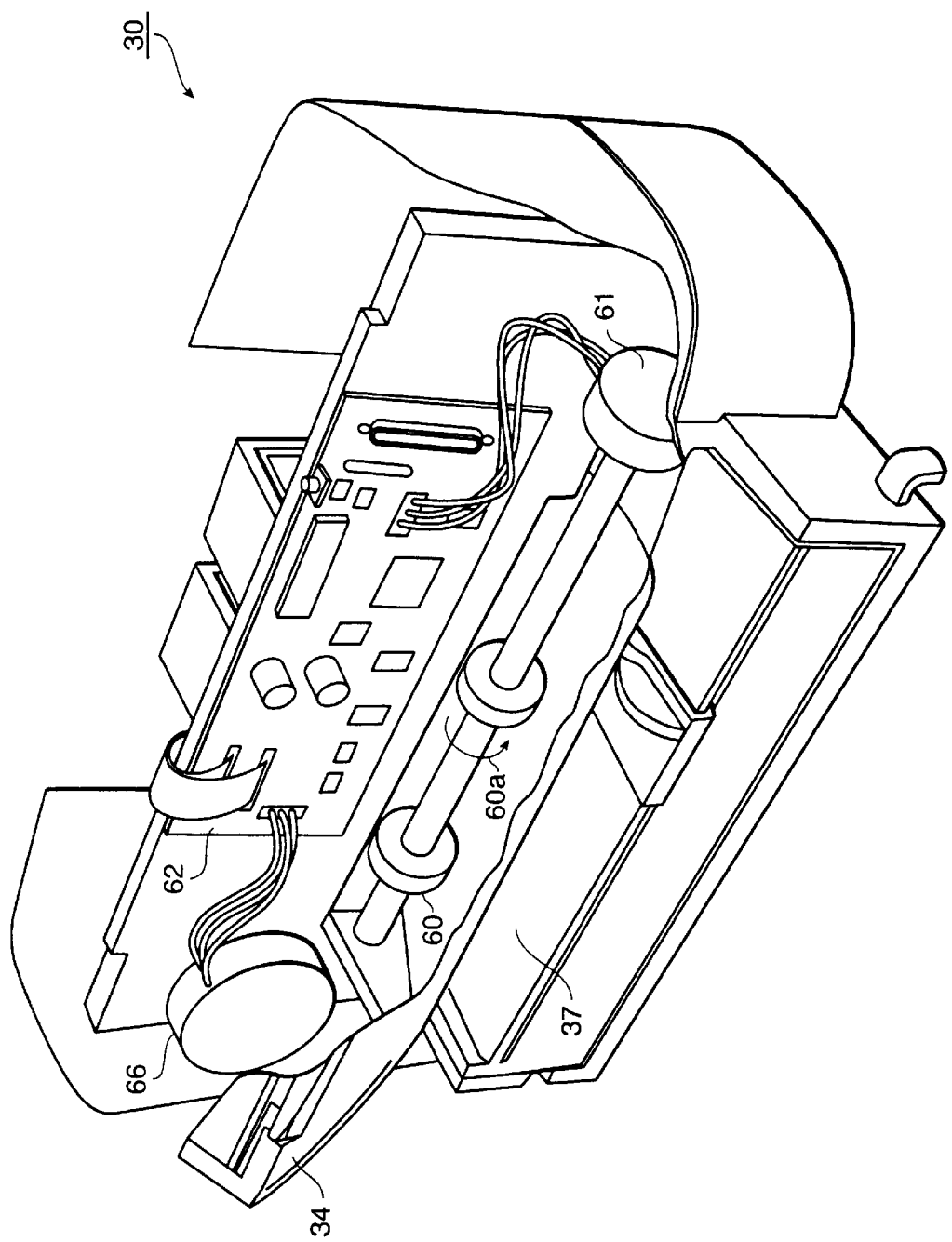
FIG. 5 is a back, cut-away perspective view of the printer shown in FIG. 1.

FIGS. 4 and 5 show back and front cut-away perspective views, respectively, of printer 30. As shown in FIG. 5, printer 30 includes rollers 60, noted above, for transporting media from either automatic feeder 34 or manual feeder 37 through printer 30 to media eject port 40. Rollers 60 rotate in a counterclockwise direction during media transport, as indicated by arrow 60a shown in FIG. 5.

Line feed motor 61 controls the rotation of rollers 60. Line feed motor 61 comprises a 96-step, 2-2 phase pulse motor and is controlled in response to commands received from circuit board 62. Line feed motor 61 is driven by a motor driver having four level current control.

In preferred embodiments, line feed motor 61 is able to cause rollers 60 to rotate so that a recording medium is fed through printer 30 at 120 mm/sec. In a primary mode of operation for printer 30, line feed resolution is (1/720)inches/pulse (2-2 phase), and in a 1440 dpi mode, line resolution is (1/1440)inches/pulse (1-2 phase). Print modes are described in more detail below.

As shown in FIG. 4, printer 30 is a dual-cartridge printer which prints images using two print heads (i.e., one head per cartridge). Specifically, these cartridges are held side-by-side by cartridge receptacles 64a and 64b such that respective print heads on the cartridges are offset horizontally from each other. Carriage motor 66, shown in FIG. 5, controls the motion of cartridge receptacles 64a and 64b in response to commands received from circuit board 62. Specifically, carriage motor 66 controls the motion of belt 67, which in turn controls the movement of cartridge receptacles 64a and 64b along carriage 69. In this regard, carriage motor 66 provides for bi-directional motion of belt 67, and thus of cartridge receptacles 64a and 64b. By virtue of this feature, printer 30 is able to print images from both left to right and right to left.

Carriage motor 66 comprises a 96-step, 2-2 phase pulse motor having a carriage resolution of (9/360)inches/pulse. Carriage motor 66 is driven by a motor driver having four level current control. When printer 30 is printing in a 360 dpi mode, carriage motor 66 is driven to cause cartridge receptacles 64a and 64b to move along carriage 69 at a default speed of 459.32 mm/sec (10 Khz). In contrast, when printer 30 is printing in a 720 dpi mode, carriage motor 66 is driven to cause cartridge receptacles 64a and 64b to move along carriage 69 at a default speed of 229.66 mm/sec (5.0 Khz). Printing speed can also be decreased to 3.26 Khz, as described below in section 3.6.2.

Figure 6A:
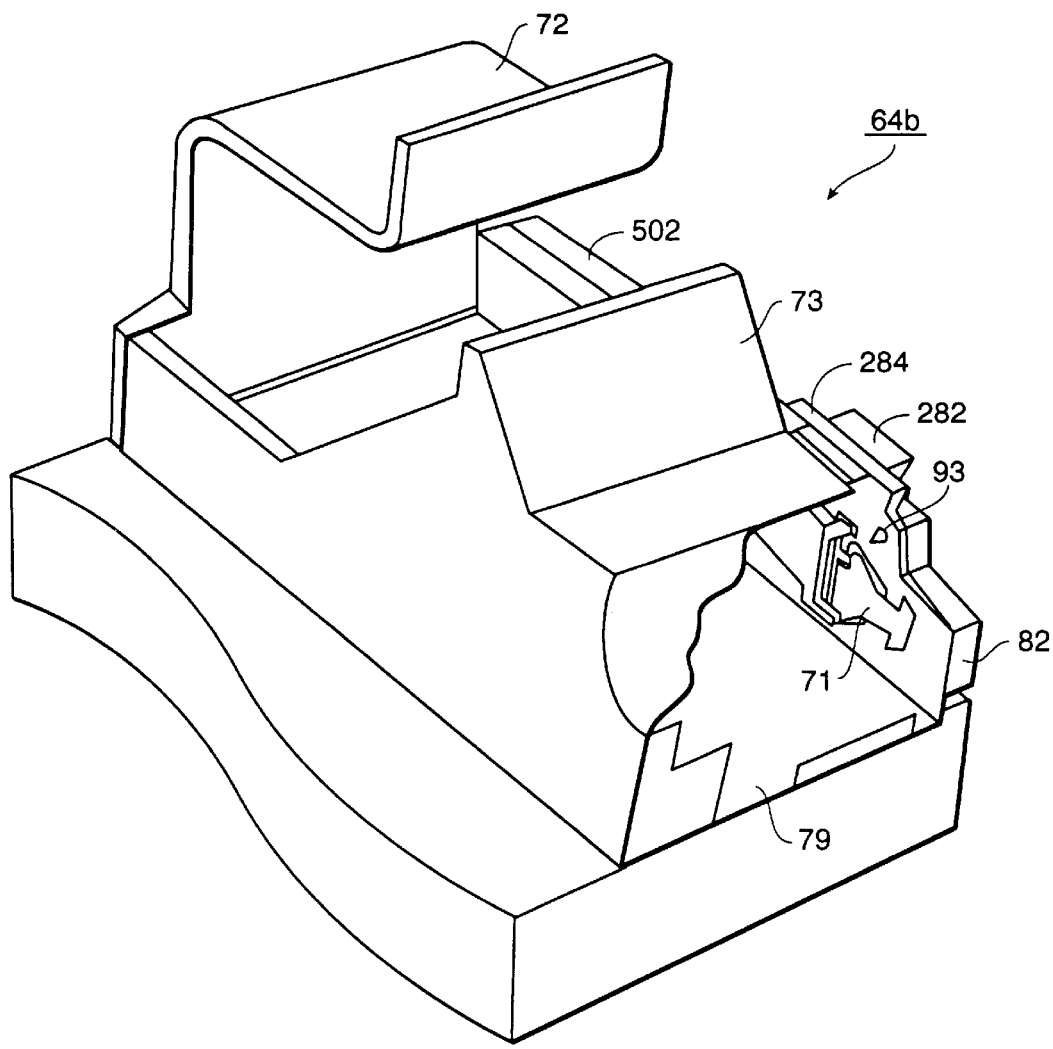
FIGS. 6A and 6B show front and back views, respectively, of a cartridge receptacle used in connection with the present invention.

FIG. 6A is a detailed perspective view of cartridge receptacle 64b from FIG. 4. Both of cartridge receptacles 64a and 64b are identical in structure, except for the presence of an auto-alignment ("AA") sensor, which is only included on cartridge receptacle 64b. Accordingly, for the sake of brevity, only cartridge receptacle 64b is described in detail herein.

Figure 7:
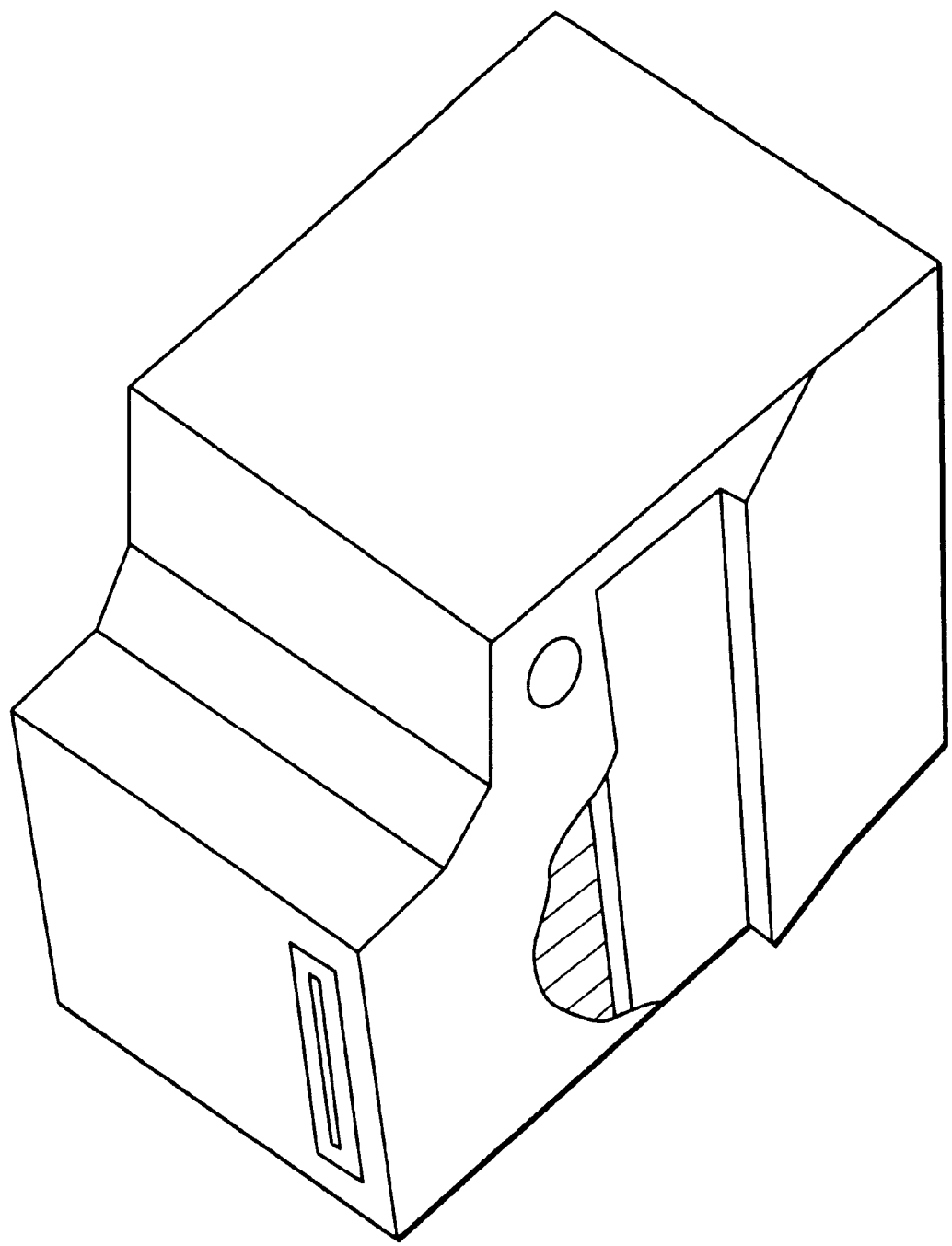
FIG. 7 shows an example of a disposable ink cartridge used with the present invention.
Figure 7A:
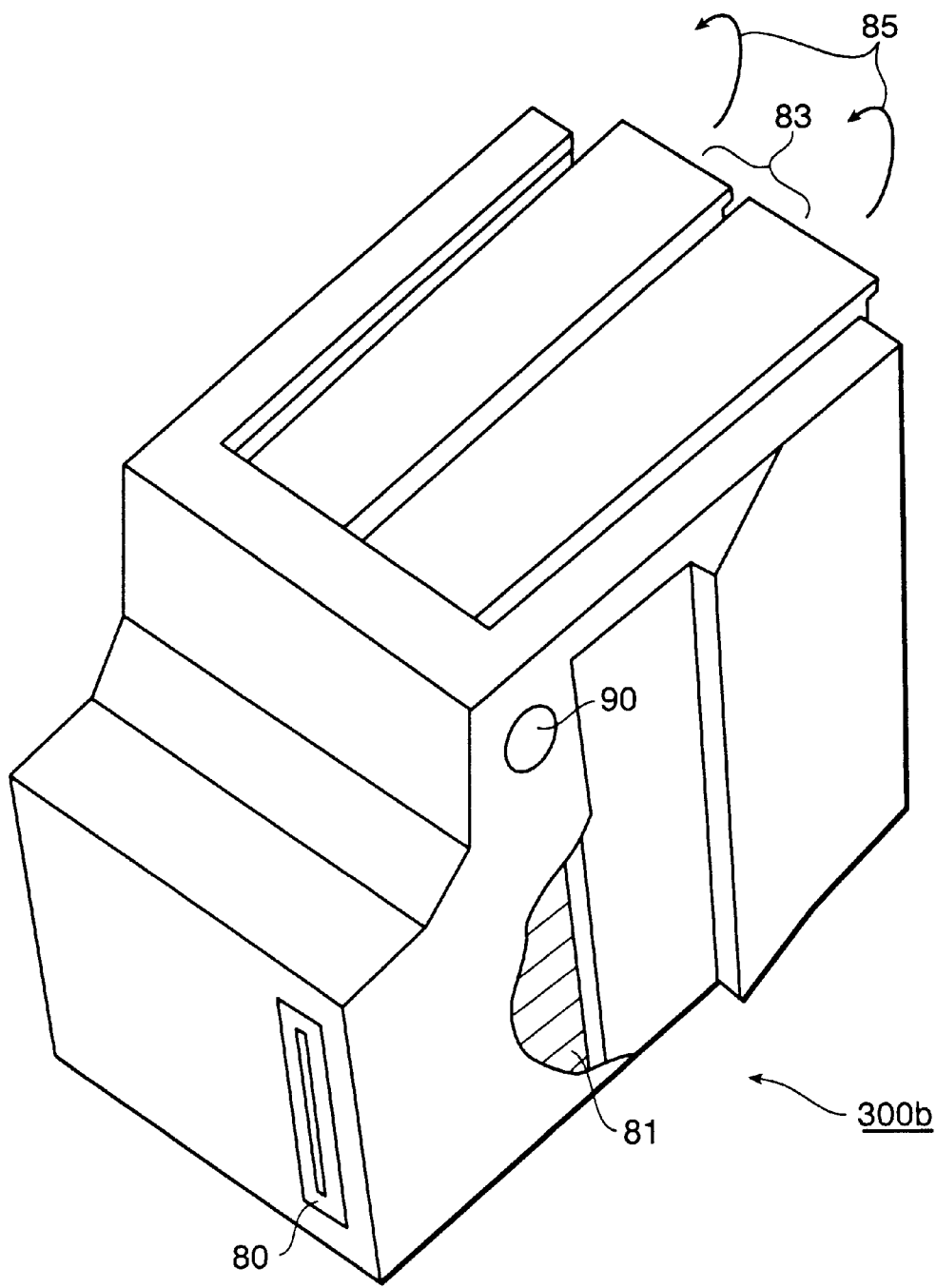
FIGS. 7A and 7B shows views of an example of a second type of ink cartridge that is used with the present invention.
Figure 7B:
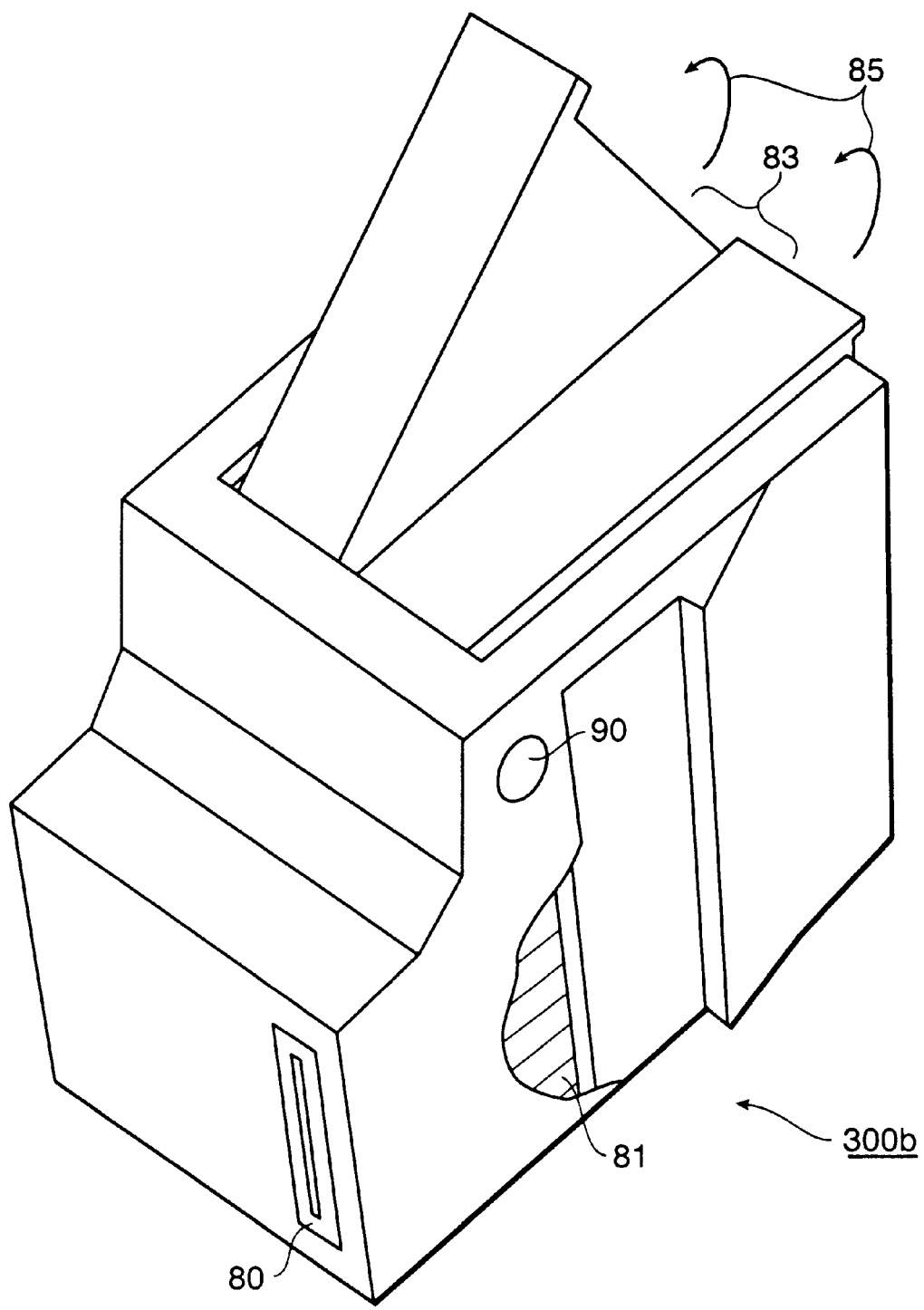

Cartridge receptacle 64b is used to hold an ink cartridge (which includes a print head and can include one or more removable ink reservoirs for storing ink) in printer 30. In this regard, FIGS. 7A and 7B show the configuration of ink cartridge 300b which may be installed within cartridge receptacle 64b (see FIG. 4). As shown in FIGS. 7A and 7B, ink cartridge 300b comprises print head 80, ink reservoirs 83, cartridge circuit contact 81, and hole 90. At this point, it is noted that the present invention can also be used with ink cartridges that do not contain removable ink reservoirs, but instead store all ink internally.

Ink reservoirs 83 are removable from ink cartridge 300b and store ink used by printer 30 to print images. Specifically, ink reservoirs 83 are inserted within cartridge 300b and can be removed by pulling along the direction of arrow 85, as shown in FIG. 7B. Reservoirs 83 can store color (e.g., cyan, magenta and yellow) ink and/or black ink, as described in more detail below. Print head 80 includes a plurality of nozzles (not shown) which eject ink from ink reservoirs 83 during printing. Cartridge circuit contact 81 is used by printer 30 to trigger ink cartridge cleaning, as described below. Cartridge hole 90 mates to pin 93 on cartridge receptacle 64b so as to hold ink cartridge 300b in place.

Returning to FIG. 6A, cartridge receptacle 64b includes opening 79 at a bottom thereof. A print head, such as print head 80, of an installed cartridge protrudes through opening 79. By virtue of this configuration, the cartridge's print head is able to contact a recording medium in printer 30. Cartridge receptacle 64b also includes lever 72 and capsule 73. As described in more detail in section 5.0 below, lever 72 pivots relative to ink reservoirs of an ink cartridge stored in cartridge receptacle 64b such that lever 72 extends over at least a portion of the ink reservoirs, and pivots away from the ink reservoirs so as to permit user access to the ink reservoirs.

Capsule 73 holds the ink cartridge (including the print head and ink reservoirs) within cartridge receptacle 64b and is laterally movable within cartridge receptacle 64b in response to pivoting of lever 72. During this lateral motion, finger 282 on capsule 73 slidably engages sleeve 284 on stationary section 502. By virtue of this lateral motion, a cartridge circuit contact, such as cartridge circuit contact 81 on ink cartridge 300b, engages and disengages a circuit contact on cartridge receptacle 64b, namely device circuit contact 71. This process is used to output a signal which prompts cleaning of a print head, and is described in more detail below.

Figure 6B:
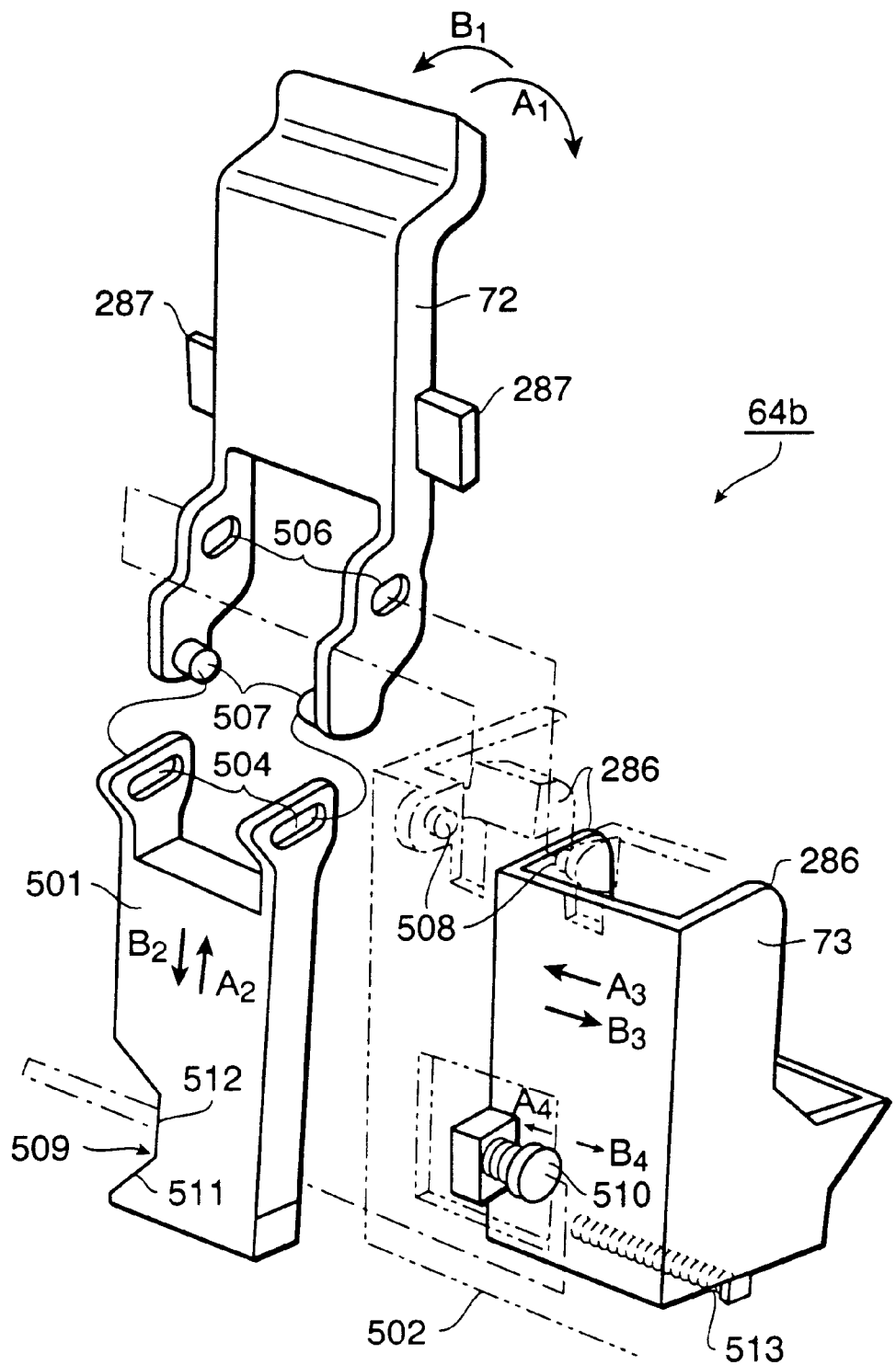

FIG. 6B shows a back view of the construction of cartridge receptacle 64b. Specifically, FIG. 6B shows the interconnection of capsule 73, lever 72, back piece 501, and stationary section 502 (shown in two dotted/dashed lines). In this regard, lever 72 includes fingers 507 which connect to corresponding holes 504 in back piece 501. By virtue of this arrangement, when lever 72 is pivoted downward in the direction of arrow $A_1$ shown in FIG. 6B, back piece 501 moves upward in the direction of arrow $A_2$ also shown in FIG. 6B. Conversely, when lever 72 is pivoted upward in the direction of arrow $B_1$, back piece 501 moves downward in the direction of arrow $B_2$. This upward and downward movement of back piece 501 controls the lateral movement of capsule 73 described above.

To this end, back piece 501 includes cam surface 509 which interacts with spring-loaded push rod 510 when the lever/back piece assembly is installed in stationary section 502. Specifically, the lever/back piece assembly is connected to stationary section 502 via fingers 508 and corresponding holes 506. When connected in this manner, cam surface 509 of back piece 501 contacts spring-loaded push rod 510 on the back of capsule 73. This connection causes capsule 73 to move laterally when lever 72 is pivoted.

More specifically, because cam surface 509 includes angled side 511 and straight side 512, when cam surface 509 moves upwards (i.e., when lever 72 is pivoted toward capsule 73 in the direction of arrow $A_1$, causing back piece 501 and thus cam surface 509 to move upward in the direction of arrow $A_2$), push rod 510 is pushed in the direction of arrow $A_4$ by angled side 511 of cam surface 509. This motion causes capsule 73 to move in the direction of arrow $A_3$ shown in FIG. 6B.

Conversely, when cam surface moves downward (i.e., when lever 72 is pivoted away from capsule 73 in the direction of arrow $B_1$, causing back piece 501 and thus cam surface 509 to move downward in the direction of arrow $B_2$), push rod 510 no longer contacts angled side 511. Instead, cam surface 509 moves such that push rod 510 corresponds to straight side 512. In this position, spring 513, which is disposed underneath capsule 73 and which biases capsule 73 relative to stationary section 502, moves capsule 73 in the direction of arrow B₃ shown in FIG. 6B.

As shown in FIG. 6B, lever 72 also includes flanges 287 which contact shoulders 286 on the capsule/stationary section assembly. As described in more detail below, this contact reduces the chances that lever 72 will engage a cartridge and/or ink reservoir in cartridge receptacle 64b.

As shown in FIG. 6A, cartridge receptacle 64b includes automatic alignment sensor 82. Automatic alignment sensor 82 senses a position of a dot pattern formed by printer 30. This information is used to align all print heads in printer 30. Also included in connection with cartridge receptacles 64a and 64b is a home location sensor (not shown), which is used to detect when cartridge receptacles 64a and 64b are at a home location relative to carriage 69. The position and significance of the home location are described in detail below.

Returning to FIG. 4, printer 30 includes wipers 84a and 84b and ink cleaning mechanism 86. Ink cleaning mechanism 86 is disposed at home location 87 and comprises a rotary pump (not shown) and print head connection caps 88a and 88b. Print head connection caps connect to print heads of cartridges installed in cartridge receptacles 64a and 64b, respectively, during print head cleaning and at other times, such as when printer 30 is powered off, so as to protect the print heads.

Line feed motor 61 drives the rotary pump of ink cleaning mechanism 86 so as to suction excess ink from a print head connected to print head connection cap 88a. As described in more detail in section 5.0 below, ink is suctioned only from a user-designated one or ones of the cartridges. User designation is described below.

Wipers 84a and 84b can comprise blades or the like which are driven by carriage motor 66 to wipe excess ink from cartridge print heads. Specifically, wipers 84a and 84b are lifted to contact a print head after a predetermined condition has occurred. For example, wipers 84a and 84b can be lifted after a predetermined number of dots have been printed by a print head.

1.2 Functions

Printer 30 includes a variety of functions and features which are available via access door 32 and printer 30's front panel. A description of these functions follows.

1.2.1 Manual Cleaning

Printer 30 includes a manual cleaning function which can be activated via its front panel. Specifically, manual cleaning is activated by pressing resume button 46 until printer 30 emits a beep which is two seconds long. To indicate that manual cleaning has been activated, indicator light 43 blinks. Any medium in the process of printing is then ejected from eject port 40. Ink cleaning mechanism 86 then cleans, e.g., suction ink from and wipes ink off of, the print heads of ink cartridges stored in cartridge receptacles 64a and 64b, and the suctioned and wiped ink is stored in a waste ink storage area. Thereafter, indicator light 43 stops blinking and is turned on if no errors have occurred. In the event that a waste ink error has occurred, e.g., the waste ink storage area is near capacity, the orange LED will illuminate indicator light 43 and printer 30 will emit six beeping sounds.

1.2.2 Cartridge Replacement

Printer 30 enters a cartridge replacement mode once access door 32 is opened unless any of the following conditions is present: printer 30 is powered off, a recording medium has been fed from a sheet feeder, printer 30 is printing or has received data from host processor 23, a paper empty error or a paper jam has occurred, the temperature of a print head in printer 30 is too high, or a fatal error has occurred.

In this regard, the cartridge replacement mode is generally entered either at printer setup to install either entire ink cartridges or ink reservoirs, or during the printer's lifetime to replace used or defective cartridges or reservoirs.

At initial printer setup, there is no ink cartridge or reservoir in one of cartridge receptacles 64a or 64b. To make this known, indicator light 43 blinks. To install a cartridge or reservoir, a user opens access door 32, which, as described below, causes cartridge receptacles 64a and 64b to move to a center position along carriage 69. At this position, a user can install an ink cartridge simply by lifting levers 72 of cartridge receptacles 64a and 64b, dropping the cartridges, print head first, into cartridge receptacles 64a and 64b, and closing levers 72. The process of replacing an empty or defective ink cartridge is identical to that described here. To replace an ink reservoir, the user can pull the defective or empty ink reservoir off of the cartridge, and insert a new ink reservoir in its place.

To terminate the cartridge replacement mode, a user need simply close access door 32. Once the replacement mode has been terminated, printer 30 checks the newly-installed cartridge to determine if it has been installed correctly. If the cartridge or reservoir is correctly installed, printer 30 causes cartridge receptacles 64a and 64b to move to home location 87. on the other hand, if the cartridge or reservoir is installed incorrectly, or cannot be used for some reason (e.g., it is defective), then indicator light 43 illuminates orange. In addition, printer 30 emits three beeps to indicate that there is a problem with an ink cartridge in cartridge receptacle 64b, and emits four beeps to indicate that there is a problem with an ink cartridge in cartridge receptacle 64a.

1.3 Ink Cartridge

The printer described herein can use ink cartridges which include removable ink reservoirs for storing different types of ink. An example of such a cartridge is shown in FIGS. 7A and 7B. As noted above, however, the present invention can also be used with disposable ink cartridges that do not contain removable ink reservoirs, but instead store all ink internally. An example of such a cartridge is shown in FIG. 7.

In general, printer 30 can operate with a variety of different cartridge types. For example, printer 30 can use a cartridge which stores dye-based black ink and which has a print head with 128 nozzles extending in the vertical direction. An example of such a cartridge is a Canon BC-20 cartridge. A similar type cartridge may also be used which stores pigment black ink. In this regard, generally speaking, dye-based black ink has high penetration characteristics relative to a recording medium. On the other hand, pigment-based black ink generally has low penetration characteristics (and in some cases no penetration) relative to a recording medium.

Printer 30 can also operate with color ink cartridges. For example, printer 30 can operate with an ink cartridge which stores cyan, magenta, yellow and black inks, and which includes 136 nozzles extending in the vertical direction. In such a cartridge, 24 nozzles print with cyan ink, 24 nozzles print with magenta ink, 24 nozzles print with yellow ink, and 64 nozzles print with black ink. An example of such a cartridge is a Canon BC-21(e) cartridge.

Still another example of an ink cartridge that may be used with printer 30 stores reduced optical density (e.g., "photo") ink, and includes 136 nozzles arranged in the vertical direction.

Such a cartridge also has the same nozzle configuration as the color cartridge described above.

1.4 Print Head Structure

Figure 8:
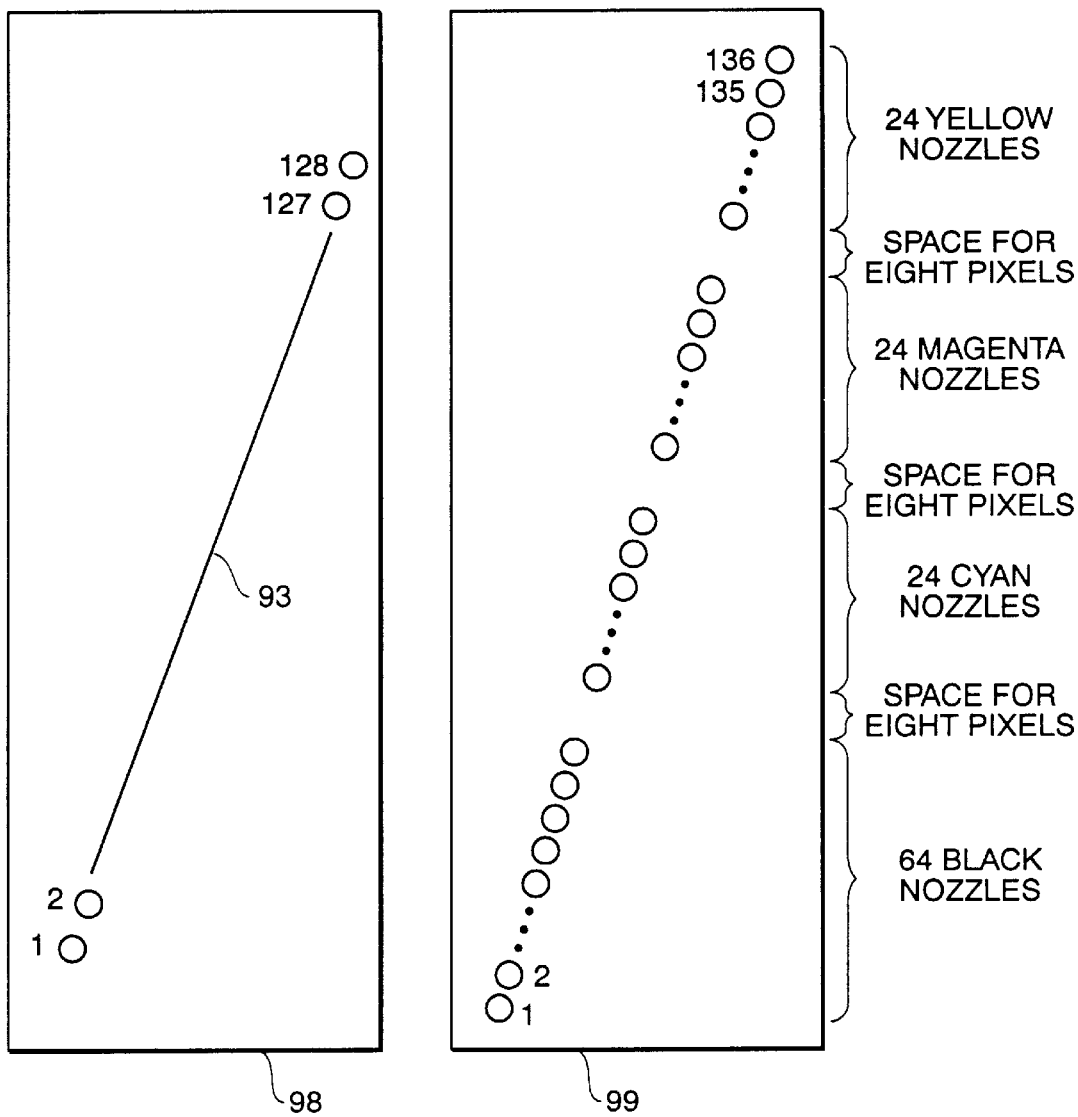
FIG. 8 shows a face-on view of head configurations for print heads used with the present invention.

With regard to the physical construction of the print heads of cartridges that may be used with the present invention, FIG. 8 shows a close-up, face-on view of nozzle configurations for a case in which printer 30 includes print head 98 having 128 nozzles and arranged near-vertical, with each nozzle closely spaced to adjacent nozzles. Such an arrangement is preferred for single color (such as black) printing. The nozzles are preferably arranged at a slight oblique slant so that as the print head is moved across the recording medium, it is possible to fire the nozzles in rapid succession, rather than all at once, so as to print a vertical line. The power and control requirements for firing nozzles in rapid succession are significantly reduced relative to those for firing all at once. One preferable arrangement of slant angle would correspond to a one pixel horizontal change for every 16 vertical nozzles, at 360 dpi resolution.

Print head 99 has 136 nozzles, with 24 nozzles preferably for yellow ink, 24 nozzles preferably for magenta ink, 24 nozzles preferably for cyan ink, and 64 nozzles preferably for black ink, arranged at a slight slant angle to vertical, one on top of another. Each color group of nozzles is separated from an adjacent group by a vertical gap corresponding to 8 nozzles. The slight slant angle is, again, arranged to provide one pixel of horizontal change for every 16 vertical nozzles, at 360 dpi.

1.5 Print Modes

During its operation, printer 30 includes different modes which may be set via commands issued to printer 30 by host processor 23 (see FIG. 1). In these modes, cartridges installed in printer 30 may eject different-sized ink droplets to form images having different resolutions. Whether certain modes of printer 30 are available depends, in part, on the type of cartridge installed in printer 30. That is, print heads on some types of cartridges are capable of ejecting different-sized droplets, e.g., large or small ink droplets, whereas print heads on other types of cartridges are capable of ejecting droplets having a single size.

As noted above, different ink droplet sizes are used during different printer operational modes to form images having different resolutions. More specifically, ink jet printers create images by forming dots on a page. The resolution of a formed image corresponds in part to the number of dots formed and in part to the arrangement in which those dots are formed. In the printer of the present invention, images can be formed at a variety of different resolutions using either the large or small ink droplets described above.

At this point, it is noted that dot allocation and arrangement during printing is limited, in part, based upon the type of paper used during printing. Specifically, plain paper can absorb approximately a maximum of four small droplets in a 360 dpi pixel, whereas high resolution (hereinafter "HR-101") paper can absorb a maximum of 6 small droplets in a 360 dpi pixel.

Figure 9:
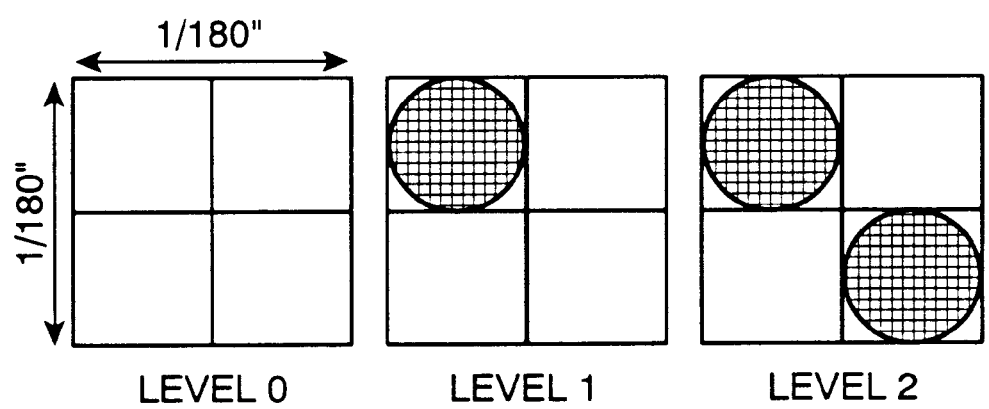
FIG. 9 shows dot configurations which are printed by the printer of the present invention.

With the foregoing in mind, FIG. 9 shows droplet arrangements for each pixel in a 180 horizontal (H) by 180 vertical (V) rasterization using regular (i.e., non-photo) ink and any type of paper. As shown in FIG. 9, this arrangement provides for three levels, and can attain a 360(H) by 360(V) dpi printout using large droplets.

2.0 Electrical

As described in section 1.0 above, printer 30 may use multiple print heads in different combinations, such as black-black, black-color, color-color, or color-photo, so that several print modes may be executed at different resolutions (e.g., 180 dpi, 360 dpi, 720 dpi). Further, print head combinations may be changed for different print modes, such as text, text and color, color and high quality color. As a result, printing tasks for the different modes require complex operations that vary based on the print head combination, recording media and print quality. In the information processing system of FIG. 1, printer parameters relating to print head configuration, print head alignment, etc. are stored in printer 30 and sent to host processor 23 based on data obtained by printer 30. Accordingly, a printer driver in host processor 23 performs the complex processing of print data and printer set up for the various print modes and sends dictated command sequences to the printer that simplify printing execution. Advantageously, the architecture of the printer is simplified while the demands of the print processing on host processor 23 have little or no effect on the operation of host processor 23.

2.1 System Architecture

Figure 10:
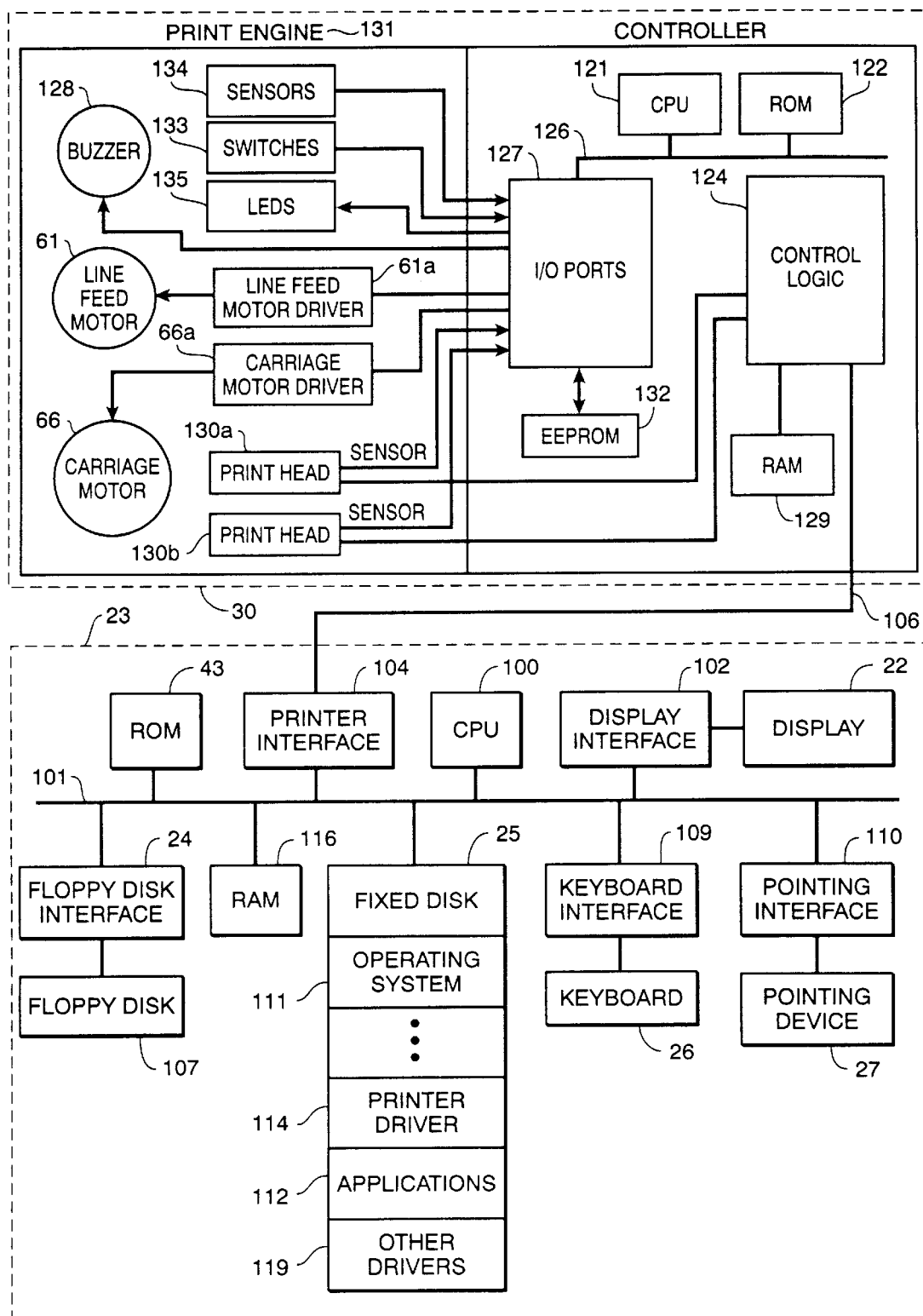
FIG. 10 is a block diagram showing the hardware configuration of a host processor interfaced to the printer of the present invention.

FIG. 10 is a block diagram showing the internal structures of host processor 23 and printer 30. In FIG. 10, host processor 23 includes a central processing unit 100 such as a programmable microprocessor interfaced to computer bus 101. Also coupled to computer bus 101 are display interface 102 for interfacing to display 22, printer interface 104 for interfacing to printer 30 through bi-directional communication line 106, floppy disk interface 24 for interfacing to floppy disk 107, keyboard interface 109 for interfacing to keyboard 26, and pointing device interface 110 for interfacing to pointing device 27. Disk 25 includes an operating system section for storing operating system 111, an applications section for storing applications 112, and a printer driver section for storing printer driver 114.

A random access main memory (hereinafter "RAM") 116 interfaces to computer bus 101 to provide CPU 100 with access to memory storage. In particular, when executing stored application program instruction sequences such as those associated with application programs stored in applications section 112 of disk 25, CPU 100 loads those application instruction sequences from disk 25 (or other storage media such as media accessed via a network or floppy disk drive 24) into random access memory (hereinafter "RAM") 116 and executes those stored program instruction sequences out of RAM 116. RAM 116 provides for a print data buffer used by printer driver 114 according to the invention, as described more fully hereinbelow. It should also be recognized that standard disk-swapping techniques available under the windowing operating system allow segments of memory, including the aforementioned print data buffer, to be swapped on and off of disk 25. Read only memory (hereinafter "ROM") 43 in host processor 23 stores invariant instruction sequences, such as start-up instruction sequences or basic input/output operating system (BIOS) sequences for operation of keyboard 26.

As shown in FIG. 10, and as previously mentioned, disk 25 stores program instruction sequences for a windowing operating system and for various application programs such as graphics application programs, drawing application programs, desktop publishing application programs, and the like. In addition, disk 25 also stores color image files such as might be displayed by display 22 or printed by printer 30 under control of a designated application program. Disk 25 also stores a color monitor driver in other drivers section 119 which controls how multi-level RGB color primary values are provided to display interface 102. Printer driver 114 controls printer 30 for both black and color printing and supplies print data for print out according to the configuration of printer 30. Print data is transferred to printer 30, and control signals are exchanged between host processor 23 and printer 30, through printer interface 104 connected to line 106 under control of printer driver 114. Other device drivers are also stored on disk 25, for providing appropriate signals to various devices, such as network devices, facsimile devices, and the like, connected to host processor 23.

Ordinarily, application programs and drivers stored on disk 25 need first to be installed by the user onto disk 25 from other computer-readable media on which those programs and drivers are initially stored. For example, it is customary for a user to purchase a floppy disk, or other computer-readable media such as CD-ROM, on which a copy of a printer driver is stored. The user would then install the printer driver onto disk 25 through well-known techniques by which the printer driver is copied onto disk 25. At the same time, it is also possible for the user, via a modem interface (not shown) or via a network (not shown), to download a printer driver, such as by downloading from a file server or from a computerized bulletin board.

Referring again to FIG. 10, printer 30 includes CPU 121 such as an 8-bit or a 16-bit microprocessor including programmable timer and interrupt controller, ROM 122, control logic 124, and I/O ports unit 127 connected to bus 126. Also connected to control logic 124 is RAM 129. Control logic 124 includes controllers for line feed motor 61, for print image buffer storage in RAM 129, for heat pulse generation, and for head data. Control logic 124 also provides control signals for nozzles in print heads 130a and 130b of print engine 131, carriage motor 66, line feed motor 61, and print data for print heads 130a and 130b, and receives information from print engine 131 for alignment of print heads 130a and 130b through I/O ports unit 127. EEPROM 132 is connected to I/O ports unit 127 to provide non-volatile memory for printer information such as print head configuration and print head alignment parameters. EEPROM 132 also stores parameters that identify the printer, the driver, the print heads, alignment of the print heads, the status of ink in the cartridges, etc., which are sent to printer driver 114 of host processor 23 to inform host processor 23 of the operational parameters of printer 30.

I/O ports unit 127 is coupled to print engine 131 in which a pair of print heads 130a and 130b (which would be stored in cartridge receptacles 64a and 64b, respectively) perform recording on a recording medium by scanning across the recording medium while printing using print data from a print buffer in RAM 129. Control logic 124 is also coupled to printer interface 104 of host processor 23 via communication line 106 for exchange of control signals and to receive print data and print data addresses. ROM 122 stores font data, program instruction sequences used to control printer 30, and other invariant data for printer operation. RAM 129 stores print data in a print buffer defined by printer driver 114 for print heads 130a and 130b and other information for printer operation.

Print heads 130a and 130b of print engine 131 correspond to ink cartridges that are stored in cartridge receptacles 64a and 64b, respectively. Sensors generally indicated as 134 are arranged in print engine 131 to detect printer status and to measure temperature and other quantities that affect printing. A photo sensor (e.g., automatic alignment sensor 82 shown in FIG. 6A) in cartridge receptacles 64 measures print density and dot locations for automatic alignment. Sensors 134 are also arranged in print engine 131 to detect other conditions such as the open or closed status of access cover 32, presence of recording media, etc. In addition, diode sensors, including a thermistor, are located in print heads 130a and 130b to measure print head temperature, which is transmitted to I/O ports unit 127.

I/O ports unit 127 also receives input from switches 133 such as power button 44 and resume button 46 and delivers control signals to LEDs 135 to light indicator light 43, to buzzer 128, and to line feed motor 61 and carriage motor 66 through line feed motor driver 61a and carriage motor driver 66a, respectively. As described above, buzzer 128 may comprise a speaker.

Although FIG. 10 shows individual components of printer 30 as separate and distinct from one another, it is preferable that some of the components be combined. For example, control logic 124 may be combined with I/O ports 127 in an ASIC to simplify interconnections for the functions of printer 30.

2.2 System Function

Figure 11:
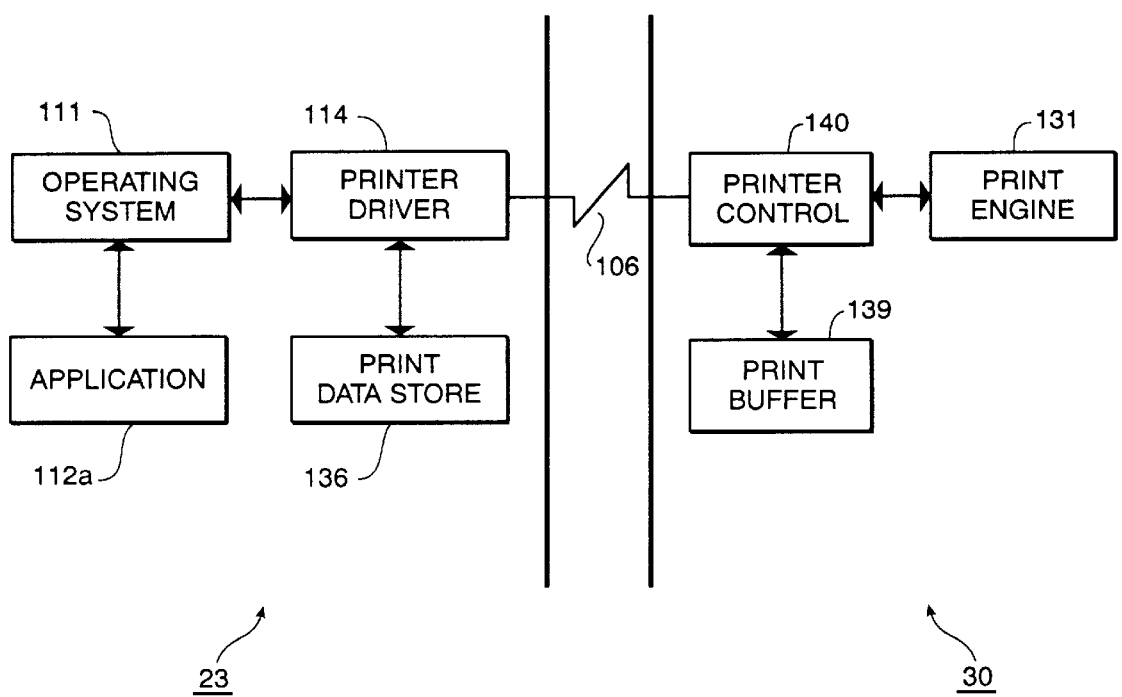
FIG. 11 shows a functional block diagram of the host processor and printer shown in FIG. 10.

FIG. 11 shows a high-level functional block diagram that illustrates the interaction between host processor 23 and printer 30. As illustrated in FIG. 11, when a print instruction is issued from image processing application program 112a stored in application section 112 of disk 25, operating system 111 issues graphics device interface calls to printer driver 114. Printer driver 114 responds by generating print data corresponding to the print instruction and stores the print data in print data store 136. Print data store 136 may reside in RAM 116 or in disk 25, or through disk swapping operations of operating system 111 may initially be stored in RAM 116 and swapped in and out of disk 25. Thereafter, printer driver 114 obtains print data from print data store 136 and transmits the print data through printer interface 104, to bi-directional communication line 106, and to print buffer 139 through printer control 140. Print buffer 139 resides in RAM 129 and printer control 140 resides in control logic 124 and CPU 121 of FIG. 10. Printer control 140 processes the print data in print buffer 139 responsive to commands received from host processor 23 and performs printing tasks under control of instructions stored in ROM 122 (see FIG. 10) to provide appropriate print head and other control signals to print engine 131 for recording images onto recording media.

Print buffer 139 has a first section for storing print data to be printed by one of print heads 130a and 130b, and a second section for storing print data to be printed by the other one of print heads 130a and 130b. Each print buffer section has storage locations corresponding to the number of print positions of the associated print head. These storage locations are defined by printer driver 114 according to a resolution selected for printing. Each print buffer section also includes additional storage locations for transfer of print data during ramp-up of print heads 130a and 130b to printing speed. Print data is transferred from print data store 136 in host processor 23 to storage locations of print buffer 139 that are addressed by printer driver 114. As a result, print data for a next scan may be inserted into vacant storage locations in print buffer 139 both during ramp up and during printing of a current scan.

2.3 Control Logic

Figure 12:
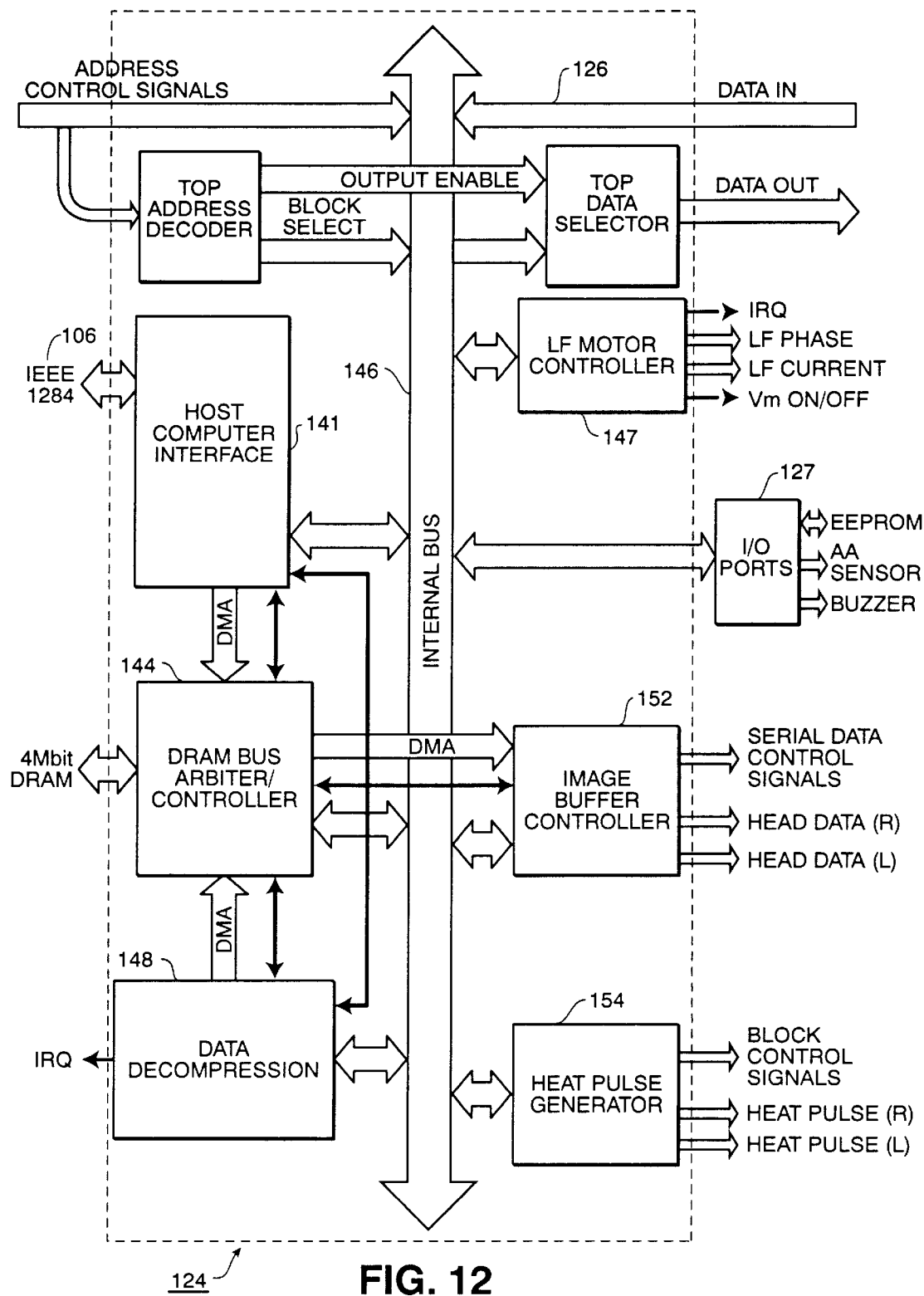
FIG. 12 is a block diagram showing the internal configuration of the gate array shown in FIG. 10.

FIG. 12 depicts a block diagram of control logic 124 and I/O ports unit 127 from FIG. 10. As mentioned above, I/O ports unit may be, alternatively, included within control logic 124. In FIG. 10, user logic bus 146 is connected to printer bus 126 for communication with printer CPU 121. Bus 146 is coupled to host computer interface 141 which is connected to bi-directional line 106 for carrying out bi-directional such as IEEE-1284 protocol communication. Accordingly, bi-directional communication line 106 is also coupled to printer interface 104 of host processor 23. Host computer interface 141 is connected to bus 146 and to DRAM bus arbiter/controller 144 for controlling RAM 129 which includes print buffer 139 (see FIGS. 10 and 11). Data decompressor 148 is connected between bus 146 and DRAM bus arbiter/controller 144 to decompress print data when processing. Also coupled to bus 146 are line feed motor controller 147 that is connected to line feed motor driver 61a of FIG. 10, image buffer controller 152 which provides serial control signals and head data signals for each of print heads 130a and 130b, and heat pulse generator 154 which provides block control signals and analog heat pulses for each of print heads 130a and 130b. Carriage motor control is performed by CPU 121 through I/O ports unit 127 and carriage motor driver 66a since line feed motor 61 and carriage motor 66 may operate concurrently.

Control logic 124 operates to receive commands from host processor 23 for use in CPU 121, and to send printer status and other response signals to host processor 23 through host computer interface 141 and bi-directional communication line 106. Print data and print buffer memory addresses for print data received from host processor 23 are sent to print buffer 139 in RAM 129 via DRAM bus arbiter/controller 144, and the addressed print data from print buffer 139 is transferred through controller 144 to print engine 131 for printing by print heads 130a and 130b. In this regard, heat pulse generator 154 generates analog heat pulses required for printing the print data.

Figure 13:
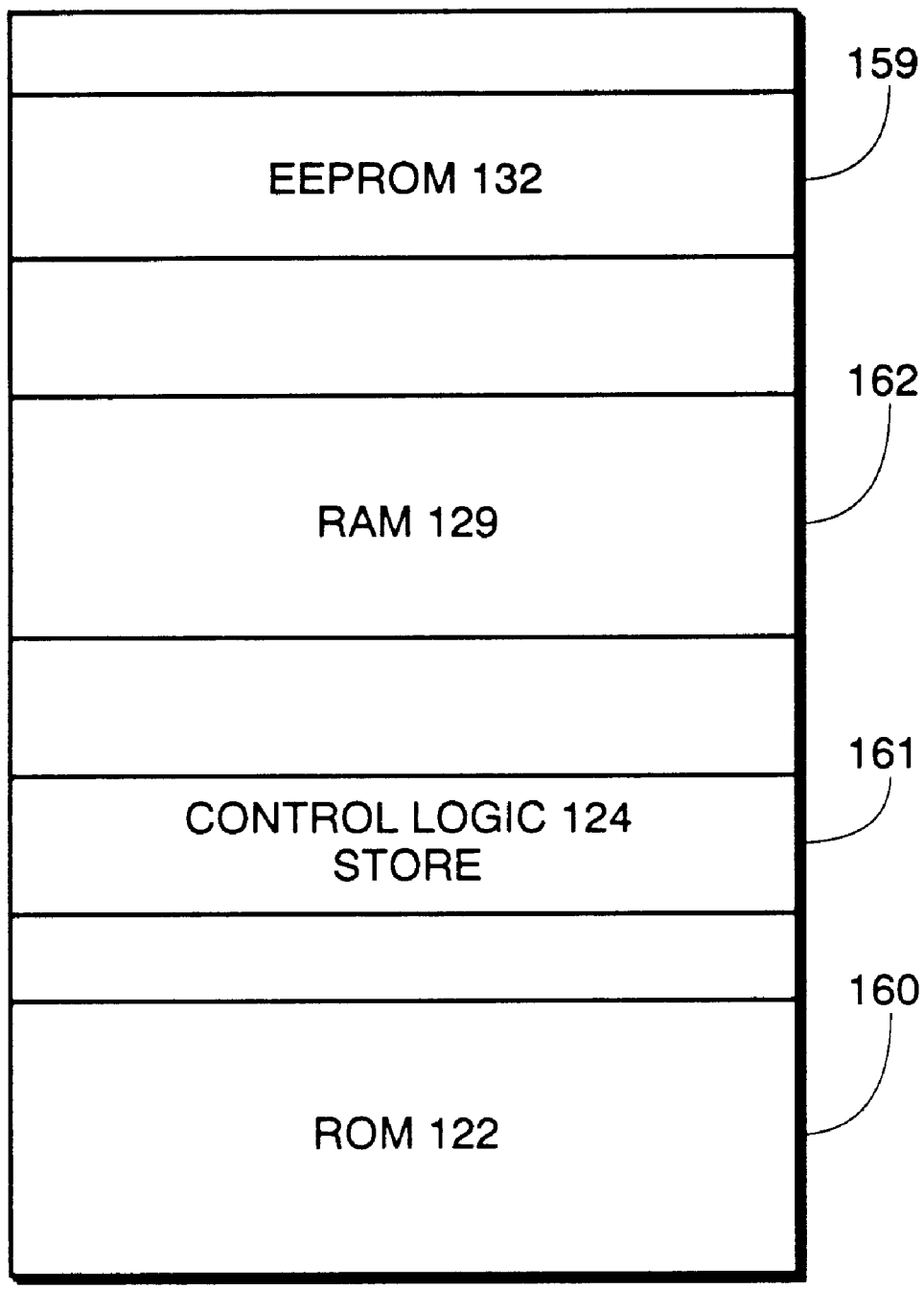
FIG. 13 shows the memory architecture of the printer of the present invention.

FIG. 13 shows the memory architecture for printer 30. As shown in FIG. 13, EEPROM 132, RAM 129, ROM 122 and temporary storage 161 for control logic 124 form a memory structure with a single addressing arrangement. Referring to FIG. 13, EEPROM 132, shown as non-volatile memory section 159, stores a set of parameters that are used by host processor 23 and that identify printer and print heads, print head status, print head alignment, and other print head characteristics. EEPROM 132 also stores another set of parameters, such as clean time, auto-alignment sensor data, etc., which are used by printer 30. ROM 122, shown as memory section 160, stores information for printer operation that is invariant, such as program sequences for printer tasks and print head operation temperature tables that are used to control the generation of nozzle heat pulses, etc. A random access memory section 161 stores temporary operational information for control logic 124, and memory section 162 corresponding to RAM 129 includes storage for variable operational data for printer tasks and print buffer 139.

2.4 General Operation

Figure 14:
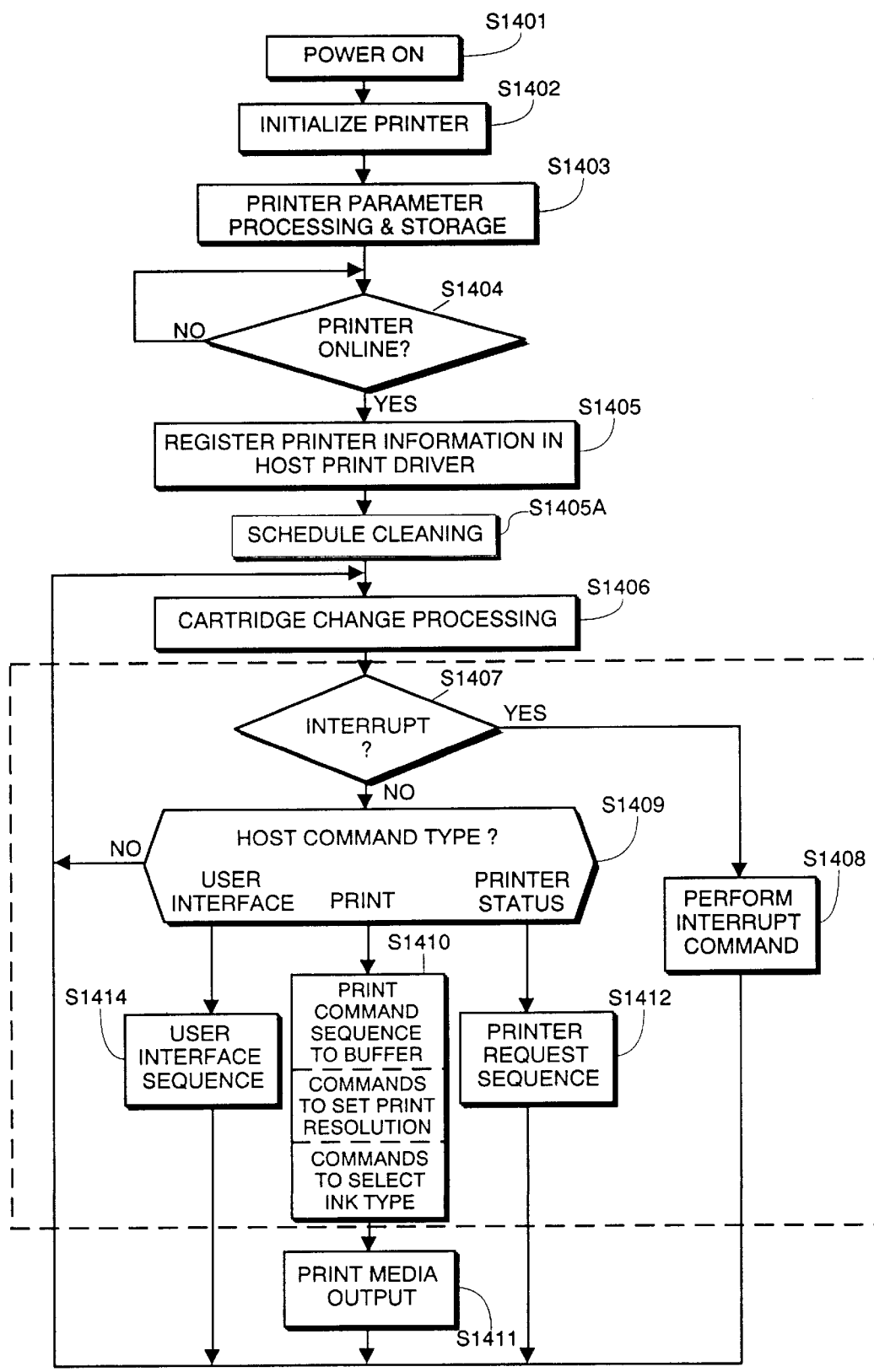
FIG. 14 shows an overall system flowchart detailing the operation of the printer of the present invention.

FIG. 14 is a flowchart illustrating the general operation of the information processing system shown in the block diagram of FIG. 10. After power is turned on in printer 30 in step S1401 of FIG. 14, printer 70 is initialized in step S1402. In the initialization, as discussed in greater detail in section 3.2 below and shown in FIGS. 19 and 20, CPU 121, control logic 124 and a system timer are set to an initial state. In addition, ROM 121, RAM 129 and EEPROM 132 of printer 30 are checked and interrupt request levels in CPU 121 are assigned on application of power to printer 30. When printer 30 is set to its on state, EEPROM 132 is read by printer driver 114, controller tasks are started by printer CPU 121 such as resetting the printer, determining if print head cleaning should be performed based on the system timer, etc. Also in the initialization process of step S1402, a data compression mode is selected, heat pulses for print heads 130a and 130b are defined, buffer control is defined, print buffer 139 is cleared, and messages are displayed indicating the status of printer 30.

Next, step S1403 is performed. In step S1403, printer driver 114 calculates printer parameters from data obtained by printer CPU 121 based on printer measurements related to head configuration and alignment if it is determined that the print head configuration has changed. The alignment system is described more fully in U.S. patent application Ser. No. 08/901,560, entitled "Auto-Alignment System For A Printing Device", filed on Jul. 28, 1997, which is incorporated herein by reference.

Following step S1403, processing proceeds to step S1404, in which it is determined if printer 30 is on-line. Once it is determined that printer 30 is on-line, processing proceeds to step S1405, in which the calculated printer parameters are registered in printer EEPROM 132.

Specifically, when printer 30 is determined to be on-line, the printer parameters stored in the EEPROM 132 are registered by printer driver 114 in step S1405. The parameters are then sent, in step S1405, by CPU 121 for storage in host processor 23 so that printer driver 114 can generate appropriate commands for printer operation. Such commands are indicated in the steps of the dashed box of FIG. 14 and take into account the current identification of printer 30, the print head configuration, print head alignment and cartridge ink status.

A method in accordance with step S1405 for sending the parameters comprises sending data representative of the printer parameters for the current head configuration to the host processor. A printer driver in the host processor generates commands for controlling printer function according to the characteristics of the attached print devices and sends the generated commands to the printer controller. The commands include parameters corresponding to the characteristics of the attached print devices to allow control of printer operations for a variety of multiple print device configurations. The sending of printer parameter data to the printer driver in the host processor and the generation and sending of commands are described in greater detail in section 6.0.

With regard to print head cleaning, cleaning can be scheduled at various times during operation of the printer, such as in step S1405A. The method for scheduling cleaning a print head in accordance with step S1405A includes receiving real time/date (time and/or date) information from an external source, storing the real time/date information in a volatile memory, storing, in a non-volatile RAM, a last cleaning time for at least one print head in the ink jet printer, and calculating an elapsed time by subtracting the stored real time/date information and the stored last cleaning time. The method further includes comparing the calculated elapsed time to a predetermined elapsed time, controlling the at least one print head to perform a cleaning process when the calculated elapsed time is greater than or equal to the predetermined elapsed time, and storing, in the non-volatile memory, the latest last time for cleaning the at least one print head. When the calculated elapsed time is less than the predetermined elapsed time, the method waits to perform a cleaning based on either an elapsed internal time, a comparison of the next downloaded time, or an occurrence of a cleaning event such as replacing a print head. The scheduling of print head cleaning is described in greater detail in section 7.0 below.

The parameters registered in step S1405 are used to control print head operation. A method in accordance with step S1405 for controlling a print head of an image printing device having at least one print head includes obtaining profile information of the at least one print head comprising the parameters registered in step S1405. The method includes storing the profile parameters in a non-volatile RAM and outputting, upon request, the profile information to a host processor connected to the image printing device. The host processor utilizes the print head profile information to produce compensation parameters which compensate print information to be sent from the host processor to the print head for printing. This method is described in greater detail in section 8.0.

After registration of the printer parameter information in step S1405, and cleaning scheduling in step S1405A, the status of each of print head cartridges 300a and 300b see FIG. 4) is checked in step S1406. This is done by ascertaining whether access door 32 has been opened and closed and detecting whether one or more of the ink cartridges or ink reservoirs has been changed. If a cartridge or reservoir has been changed, a cleaning operation is performed on the corresponding print head, in which the nozzles of the print head are cleaned.

A device used in step S1406 for cleaning a print head during ink reservoir/cartridge change comprises a cartridge receptacle which is mounted on a carriage for releasably receiving a cartridge having a print head and at least one removable ink reservoir. The receptacle includes a pivoting lever which permits removal of the at least one ink reservoir. The lever extends over at least a portion of the at least one ink reservoir so as to prevent access to the at least one ink reservoir until such time as the lever is pivoted away from the at least one ink reservoir. When the lever is pivoted away from the at least one ink reservoir and then is pivoted over the at least a portion of the at least one ink reservoir, a signal is output which prompts cleaning of the print head. Print head cleaning arrangements are described in greater detail in section 5.0.

Following the cartridge change processing performed in step S1406, processing proceeds to step S1407. In step S1407, it is determined whether an interrupt has been requested by printer 30 for operations such as print head heater control. In response to such an interrupt request, the requested printer operation is performed in step S1408. Thereafter, processing returns to step S1406.

If an interrupt has not been requested by the printer in step S1407, processing proceeds to step S1409. In step S1409, it is determined if printer driver 114 has requested a command sequence. In the system of FIG. 10, tasks of printer 30 are controlled by commands from printer driver 114 which have been generated in accordance with parameter and status information received from printer 30. When a user interface sequence is selected, step S1414 is entered and the processing shown in FIG. 15 is executed.

Upon selection of the user interface, in step S1501, the current status of printer 30 is requested and received from printer 30 over bi-directional communication line 106. Then, in step S1502, it is determined if printer 30 has a new print head. When a new print head is detected, an automatic alignment is performed in step S1503, and in step S1504 the status information of printer 30 is stored in printer driver 114. Otherwise, the latest printer driver information is obtained for the user in step S1505. In either event, it is then determined in step S1506 if the page to be printed is a utility page for head exchange and/or alignment or the top page of a document. When a utility page is selected, the current head configuration is displayed in step S1507 and the user selects whether to enable or disable printer 30 in step S1508. Selection step S1509 is then entered and the user may select alignment by step S1510, head exchange and alignment by steps S1510 and S1511 followed by storing of printer status information in step S1512, a recovery operation to clean print heads 130a and 130b by step S1513, or cancellation of the user interface in step 1514. Once the tasks selected in step S1509 are performed, control is returned to step S1409 of FIG. 14.

Figure 15:
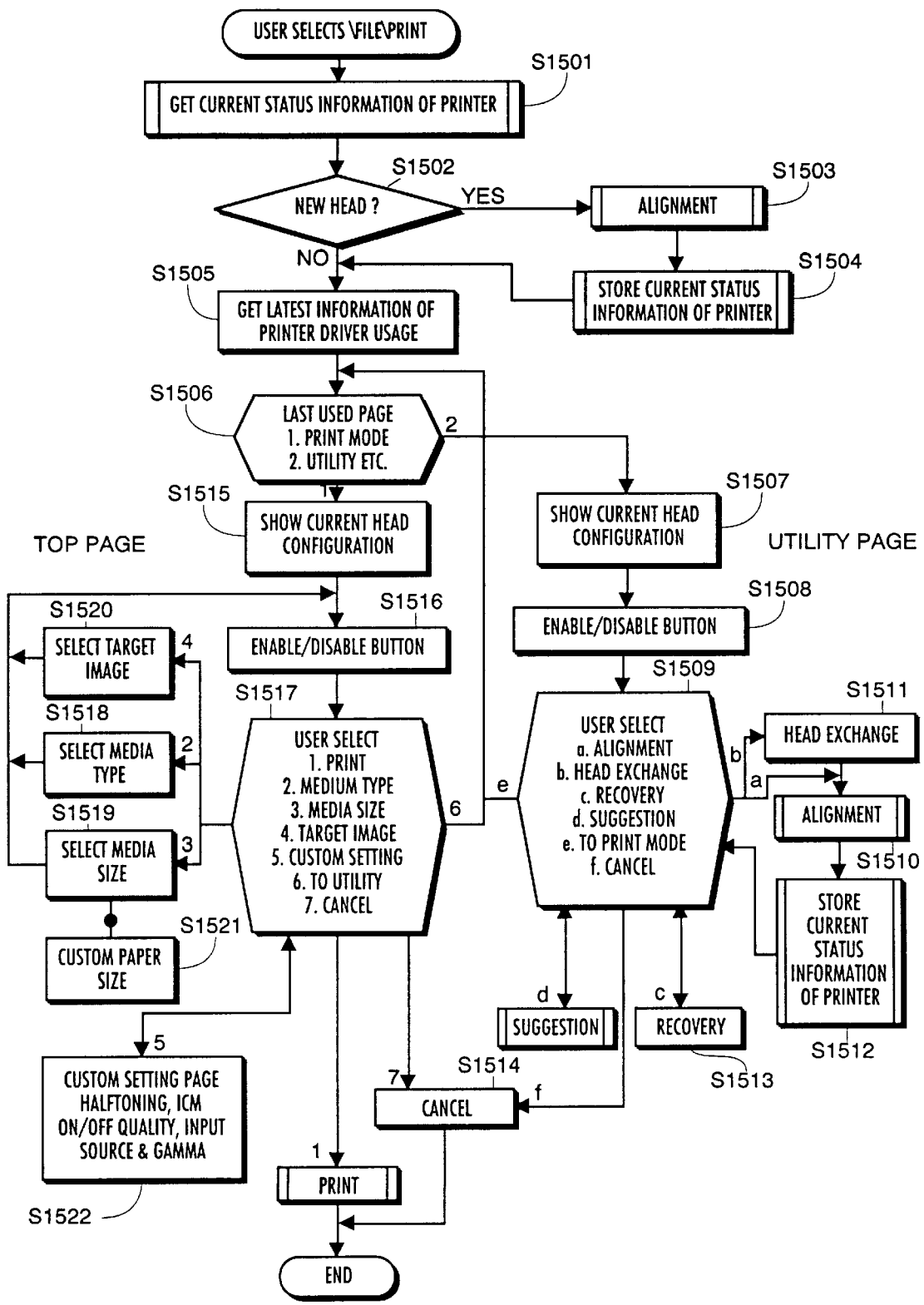
FIG. 15 is a flowchart showing printer response to user operation of the printer of the present invention.

When the print mode is selected in step S1506 of FIG. 15, the current head configuration is displayed to the user (step S1515). After operation of an enable-disable button in step S1516, the user may select, in step S1517, print, media type, media size, target image, custom page setting, utility or cancel operations. The selection of media type (step S1518), media size (step S1519), target image (step S1520) (i.e., text and color or photo-color), custom paper size (step S1521), and custom setting page (step S1522) causes information to be stored in printer driver 114 which controls the print parameters and print data for the print sequence to be performed. Upon completion of the user selections by means of keyboard and pointer entry on the user interface display, control is returned to step S1409 and is directed to use print command sequence step S1410.

If a print sequence is selected in step S1409, processing proceeds to step S1410. In step S1410, printer driver 114 generates a sequence of commands based on print head configuration, print head alignment, media type and size and target image information stored therein. These commands are sent to printer control 140 (see FIG. 11) in printer 30. In the printer, printer control 140 receives the commands and the firmware from printer ROM 122 and causes execution of command tasks in print engine 131.

The print command sequence includes transferring print data from print driver 114 to print buffer 139 which is defined for each print job. The print data transfer is performed without a receiving buffer in printer 30. Print data for a next scan is sent to empty storage locations of the current scan in print buffer 139 during ramp-up of the print heads in the current scan.

In brief, the print buffer to which commands are transferred in step S1410 includes a set of storage locations corresponding to the print positions of the current scan for each print head. The printer driver identifies empty storage locations of the current scan in the print buffer and sends print data for the next scan of the print head to the identified empty storage locations during the ramp-up period of the current scan of the print head. The print data transfer in the print command sequence according to the invention is described more fully below in section 9.0.

The command sequence of step S1410 includes commands to set print resolution of print heads 130a and 130b. These commands are set by controlling the size of ink droplets based on digital data stored in a print buffer for a print head and the order in which the print data is read out of the print buffer for the print head. Specifically, a method for controlling print resolution in a printer having first and second print heads includes controlling resolution of the first and second heads independently of each other. For ink jet type print heads which eject ink droplets based on digital data stored in a print buffer, resolution is controlled by controlling ink droplet size and by controlling readout order from the print buffer, with droplet size and readout order being controlled independently for each print head. Print resolution control is described in greater detail in section 10.0.

Further in the print command sequence of step S1410, printer driver 114 selects the type of ink that is to be used in printing a target pixel based on an analysis multi-level image data of adjacent pixels. As an example, a dye-based ink may be selected for a black target pixel surrounded by color pixels in an image while a pigment-based ink may be selected for a black target pixel surrounded by black pixels.

In summary, a method, in accordance with the present invention, of controlling printing of pixels corresponding to a multi-level image includes determining, based on multi-level image data for a target pixel and multi-level image data for pixels adjacent to the target pixel, whether the target pixel should be printed using a dye-based ink or whether the target pixel should be printed using a pigment-based ink, instructing a printer to print the target pixel using the dye-based ink in a case that it is determined that the target pixel should be printed using the dye-based ink, and instructing the printer to print the target pixel using the pigment-based ink in a case that it is determined that the target pixel should be printed using the pigment-based ink. The control of pixel printing is described in greater detail in section 11.0.

Upon completion of printing one page, flow proceeds to step S1411 of FIG. 14, wherein the page is output from printer 30 responsive to a paper eject command. Printer 30 then ejects the page to a pair of angled retractable flaps, adjustably positioned by springs on a tray as described in section 4.0. While moving onto the tray during printing, the level at which a page slides onto previously-ejected pages is maintained by downward movement the flaps so that the page does not bend in the print head area. Such bending may cause distortion of an image being printed. Moreover, the paper ejection tray has a structure which facilitates storage and setup.

To this end, this aspect of the invention is an ejection tray for a printer having a housing defining a media feed portion and a media eject port, where the housing is adapted to house a print engine for printing onto recording media. The ejection tray includes a base slidably receivable in the printer's housing at a position laterally distanced from the media eject port. The base includes at least a pair of recesses extending in a sliding direction of the base. A pair of flaps are also included in the ejection tray. The pair of flaps each have at least one width portion corresponding to the lateral distance between the base and the eject port. Each flap is hinged into a corresponding recess of the base and is biased in an upward direction via a spring which provides for angular motion of the flap relative to the base. Upon sliding action of the base out of the housing, the flaps are biased upward out of the recesses to a height corresponding to the position of the media eject port.

Figure 16:
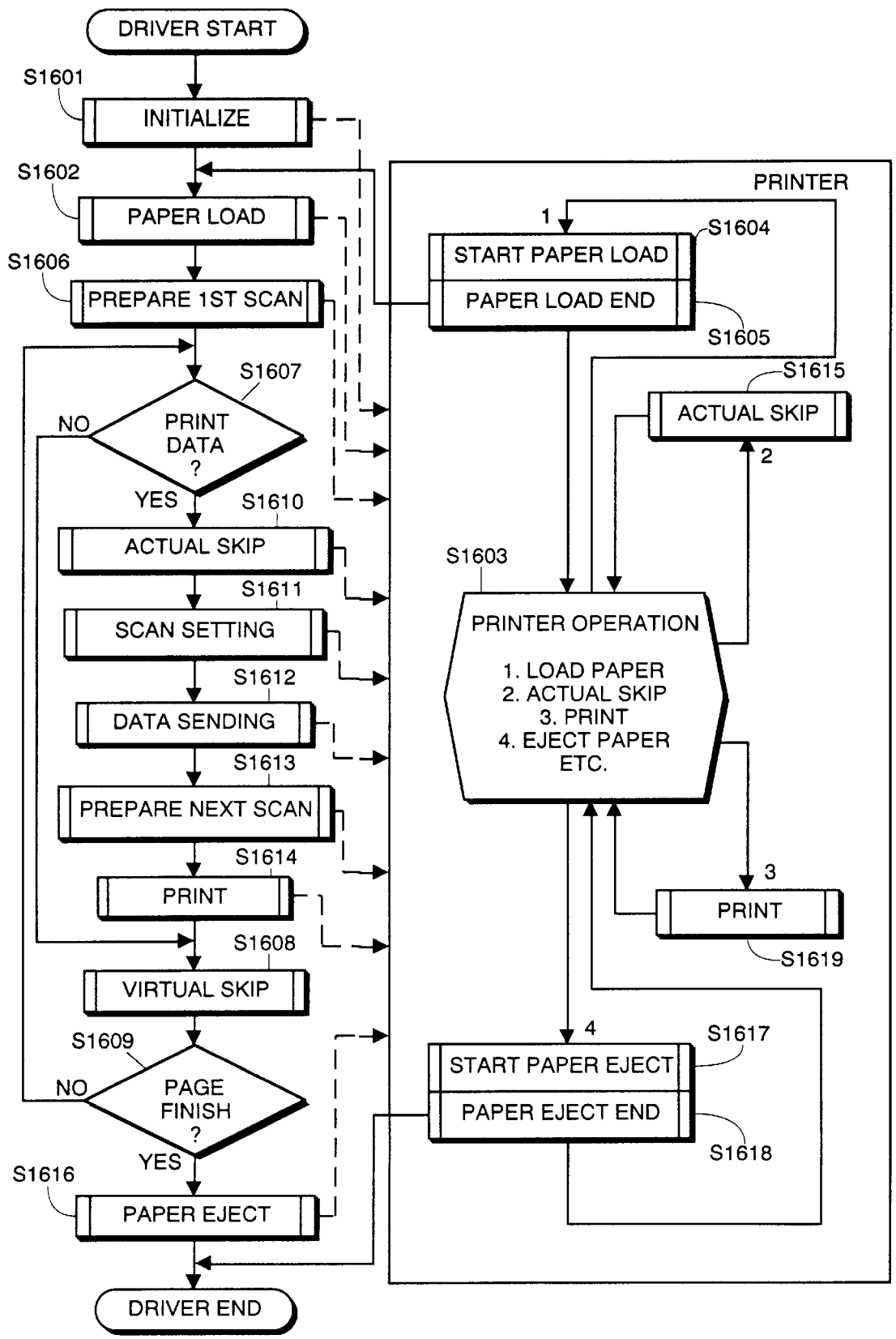
FIG. 16 is a flowchart showing print control flow in accordance with the present invention.

FIG. 16 is a flowchart that illustrates in greater detail a command sequence generated by printer driver 114 for printing and operating printer 30. In FIG. 16, the print command sequence is started by a printer initialization command in step S1601, which is sent to printer control 140 to reset printer operation. A paper load command (step S1602) is then provided to printer control 140, which selects a load paper operation in selection step S1603 and executes a start paper load (step S1604). When a paper load end is detected in printer control 140 in step S1605, a signal indicating end paper load is sent to printer driver 114, and the print data is prepared for a first scan of print heads 130a and 130b in step S1606. Printer control 140 is notified of this scan preparation. The preparation of print data in printer driver 114 is described more fully in U.S. patent application Ser. No. 08/901,719, entitled "Print Driver For A Color Printer", filed Jul. 28, 1997. If no print data for the scan is determined in decision step S1607, a virtual skip is performed in printer driver 114 in step S1608. Control is returned to step S1607 when a page finish is not detected in step S1609. Until the page finish is detected, steps S1610 through S1614 and S1608 are performed.

In step S1610, an actual skip command is provided by printer driver 114 to printer control 140 for printing correct print data. Printer control 140 selects the actual skip operation (step S1603) and executes the actual skip (step S1615). Scan setting is then performed (step S1611) in printer driver 114, and printer control 140 is notified. Next, print data generated in printer driver 114 and print buffer addresses for the print data are transferred to printer control 140 which stores this information in print buffer 139 (step S1612). The next scan is then prepared in printer driver 114, and printer control 140 is notified (step S1613). Then, a print command generated in printer driver 114 is sent to printer control 140. In response, printer control 140 selects a print operation in step S1619 and executes the print task in step S1614. A virtual skip is then performed by printer driver 114 in step S1608 to keep track of the lines of the page being printed. When a page finish is determined in decision step S1609, a page eject command is sent by printer driver 114 to printer control 140, which selects a page eject operation (step S1616) and starts page eject (step S1617). Upon completion of the page eject (step S1618), printer driver 114 is notified of the completion of the page eject and control is passed to step S1409 of FIG. 14.

Figure 17:
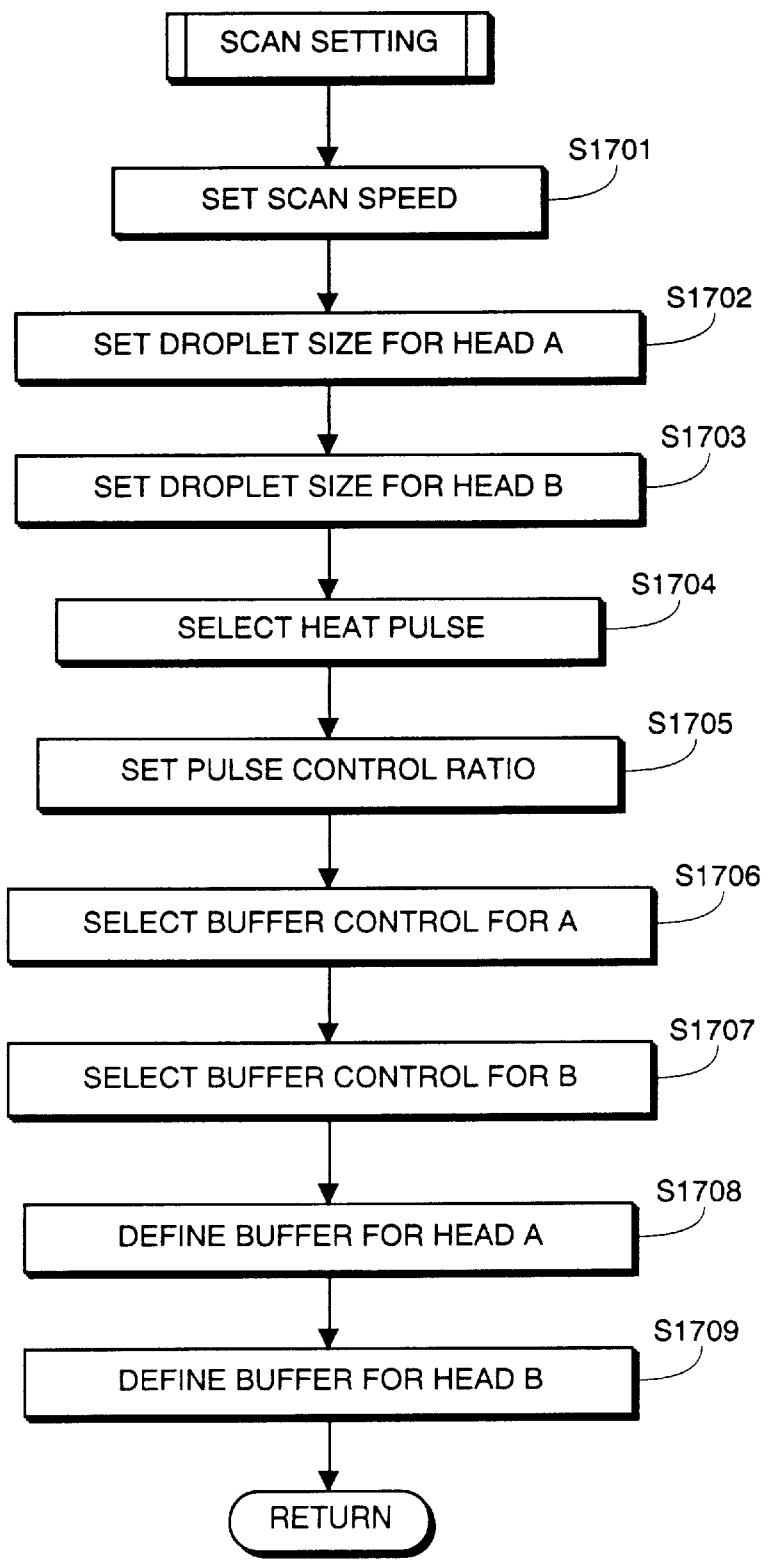
FIG. 17 is a flowchart showing setting of scan parameters in the present invention.

FIG. 17 is a flowchart illustrating the set of commands used in scan setting step S1611 for the current scan of FIG. 16. Referring to FIG. 17, a [SPEED] command is issued in step S1701 to set the scan speed, a [DROP] command is issued (step S1702) to set the droplet size for one print head (A) and another [DROP] command is issued (step S1703) to set the droplet size for the other print head (B). In steps S1704 and S1705, a [SELECT_PULSE] command is issued to set a heat pulse for printing and a [PCR] command is issued to set a pulse control ratio for temperature table adjustment. [SELECT_CONTROL] commands are issued in steps S1706 and S1707 to select the buffer control for each print head to determine a firing time of print head nozzles. [DEFINE_BUF] commands are issued in steps S1708 and S1709 to define the print buffer for each of print heads 130a and 130b. Accordingly, each aspect of a printer operation such as scan setting is controlled by host processor printer driver 114 taking into account the print head configuration and the print mode. The tasks performed by printer 30 are thereby defined in detail by printer driver 114 so that the printer architecture is substantially simplified and less costly.

An example of the command sequence from the host processor 23 to printer 30 to print a page in color mode with two color print heads is set forth in Table A shown in FIG. 18. Initially as indicated in Table A, the current time is set by a [UCT] command and printer 30 is reset by a [RESET] command. Data compression is selected to pack the print data by a [COMPRESS] command. Print buffers for print heads 130a and 130b are defined by [DEFINE_BUF] commands. The heat pulse and buffer control tables are defined for the color mode of the print head configuration by [DEFINE_PULSE] and [DEFINE_CONTROL] commands.

After the printer tasks are executed for the foregoing initializing commands, a paper load command [LOAD] to load a page or other print medium and a raster skip command [SKIP] to skip to the print position of the first print head scan are sent to printer 30, and the print direction and edges for printing of print heads 130a and 130b are set for the first scan. A loop of commands is then sent to control printer tasks for printing the lines of the page. In the first portion of the loop for each line, the scanning parameters for the line are set as described with respect to FIG. 17. Following completion of the printer tasks for the select buffer control table commands [SELECT_CONTROL], the print data blocks are selected by the [BLOCK] command, and the print colors are selected and transmitted by repeated select color [COLOR] and data transmission [DATA] commands according to the determined print areas for print heads 130a and 130b.

The direction of the second scan and the left and right edges of the print areas for the second scan are then set by the [DIRECTION] and [EDGE] commands. At this time, a [PRINT] command is transferred from host processor 23 to printer 30 to execute printing for the first scan, and a [SKIP] command is sent to skip to the print position of the second scan. When the last line has been printed, a paper eject command is given to printer 30 to execute paper ejection.

As can be seen from the command sequences for set scan operations and the example of the printing operations according to the invention, each aspect of printer operation, such as scan setting or printing, is controlled by printer driver 114 taking into account print head configuration and the print mode. The tasks to be performed by printer 30 are thereby defined in detail by printer driver 114 so that the printer architecture is substantially simplified to be less costly.

Returning to FIG. 14, when a printer status request is determined in step S1409, flow proceeds to step S1412. In step S1412, a printer status command sequence is performed. The status commands that provide requests for printer status information are described in detail in section 3.6. In general, each of the status commands is sent from host processor 23 to printer 30 to request the information on printer operation or information stored in printer 30. For example, a base status command [BASE-STATUS] requests the current status of the printer. In response, printer 30 returns one data byte indicating one of the following: printing status, whether print buffer 139 can or cannot receive data, whether printer 30 is busy performing start-up, cartridge replacement, print head cleaning, test printing, etc., and whether an error or alarm has been detected. A [HEAD] command requests return of print head configuration, and a [DATA_SEND] command requests return of EEPROM data to host processor 23. After return of the requested data in step S1412, control is returned to step S1406.

3.0 Architecture of Printer Software

Control over functionality of printer 30 is effected by individual programs executing on CPU 121. The individual programs include initialization routines such as routines executed on power-on, tasks to interpret commands received from host processor 23, interrupt handlers such as handlers to process real time hardware interrupts, and cyclic handlers that handle cyclic processes such as handlers for control over bi-directional communications with host processor 23.

Printer CPU 121 further executes an operating system so as to coordinate execution of each of the individual programs (i.e., the initialization routines, the tasks, the interrupt handlers, and the cyclic handlers). The operating system is responsible for inter-program communication through messaging and the like, and inter-program switching so as to switch execution from one program to another when appropriate. Details of the operating system follow.

3.1 Operatina System

The operating system is a real-time operating system (or "kernel" or "monitor") created to modularize printer control programs and to facilitate maintenance, inheritance, and expansion. The real-time operating system is system software that provides for a preemptive multi-task software environment, in which a currently executing program can be suspended in favor of a switch to another program with a higher priority.

The operating system allows for four different types of programs, each of which is executed by the operating system in accordance with its specific type. The types are initialization routines, tasks, interrupt handlers, and cyclic handlers. Initialization routines are routines scheduled by the operating system immediately after printer 30 is reset but after the operating system initializes itself. Tasks are ordinary programs (sometimes called "execution units") of continuous processing that are executed sequentially. Thus, tasks are one or more sequences of instructions handled by the operating system as units of work executed by CPU 121 in a multiple-programming or multiple-processing environment. An illusion of concurrent processing is created by the operating system by scheduling processing in individual task units.

An interrupt handler is a (usually short) program unit that is activated by the operating system immediately upon receipt of a hardware interrupt. Cyclic handlers are similar to interrupt handlers, but rather than being activated by a hardware interrupt, cyclic handlers are activated by a timer interrupt of the operating system.

When printer 30 is reset, execution of the operating system is the first software executed by CPU 121. CPU registers are set according to predefined requirements, and then user-defined initialization routines are executed if any exist. Thereafter, control reverts to the operating system, which activates each of the tasks in the system. One such task is a start task. After the start task begins, the operating system is activated each time a system call is issued or an interrupt occurs. After executing the system call, or handling the interrupt, execution reverts back to the operating system, which schedules tasks so as to execute the executable task with the highest priority.

Scheduling of tasks involves a determination of which task is executed if there are several tasks currently eligible for execution. Tasks are scheduled according to an assigned priority in which a higher priority task is executed before all other lower priority tasks. Tasks eligible for execution but not currently being executed because of their lower priority level are placed in a ready queue based on their priorities.

As each task becomes newly eligible for execution, it is placed at the end of the ready queue. Scheduling is then performed when returning from a system call issued by a task or when returning from interrupt processing to a task, both of which can cause new tasks to be entered into a queue or can cause a change in priority of tasks already existing in the queue. Scheduling orders the tasks in the task queue based on each task's priority and makes the task with the highest priority the currently executable run task. If there are two or more tasks in the ready queue of the same priority, the decision as to which task should be selected is made based on which task first entered into the queue.

The operating system uses semaphores as one basic means of communication between tasks and for control or synchronization between tasks. Tasks can also communicate and transfer data therebetween using messages. Messages are sent to mailboxes by one task, and a task that needs to receive the message issues a receive request: to the mailbox so as to obtain the message.

The operating system further uses event flags to synchronize tasks. Any task desiring to be released from a wait state based on a certain event can register an event flag pattern, upon the occurrence of which the operating system will release the task from the wait state.

Interrupt management by the operating system is provided by an interrupt handler and by interrupt permission level settings. Time management is provided by the operating system's actuation of an interrupt handler based on the system timer.

Cyclic handlers carry out processing at each of specified time intervals, based on cyclic handlers registered with the operating system. Typically, a cyclic handler is a short program that specifies a task that is performed at each of specified time intervals.

Initialization routines, tasks, interrupt handlers, and cyclic handlers that are preferred for printer 30 are described in the following sections.

3.2 Initialization

During power-up, initialization functions are performed to initialize printer 30, such as initializing control logic 124, checking ROM 122, checking RAM 129, and checking EEPROM 132.

Figure 19:
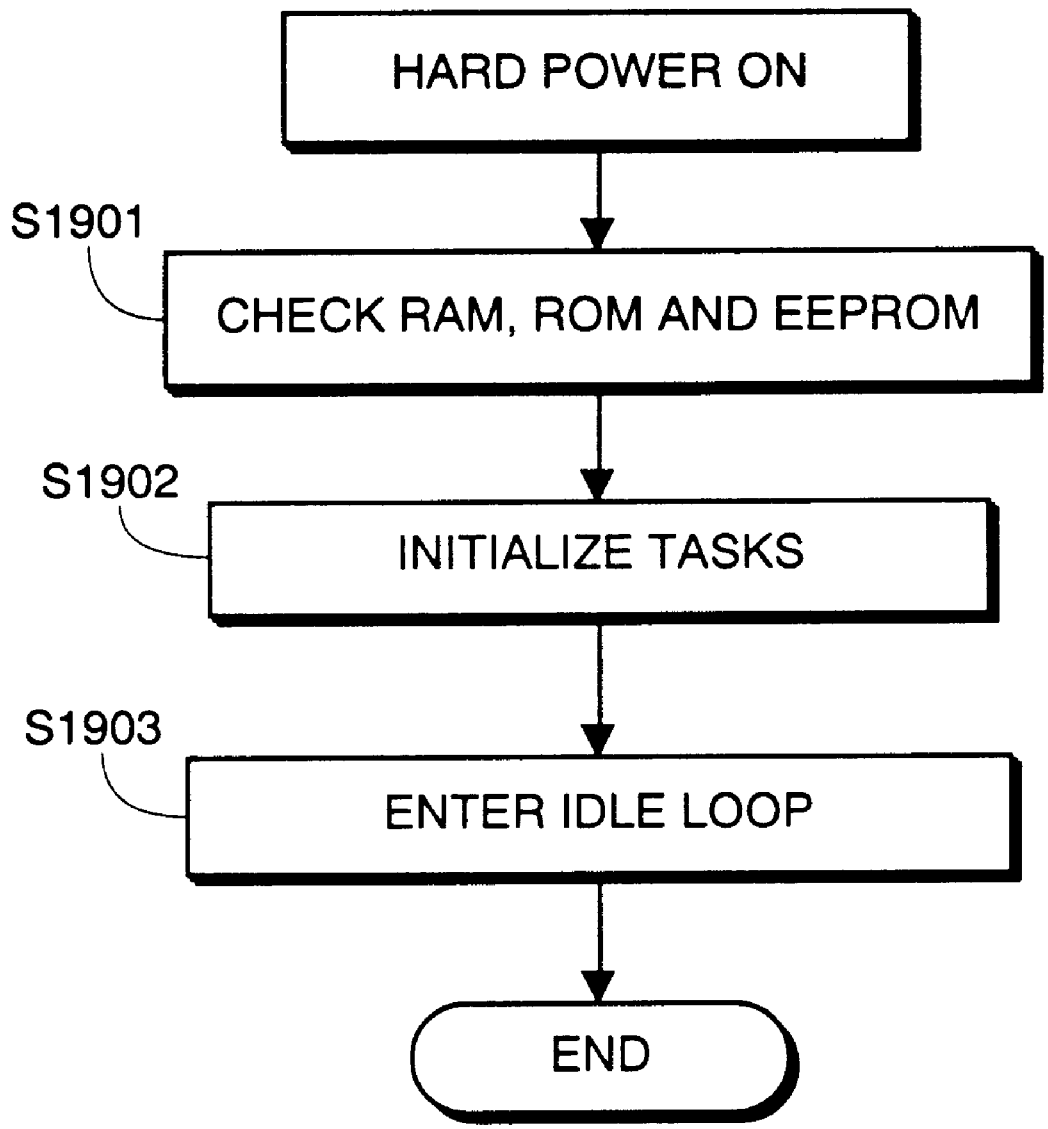
FIG. 19 is a flow diagram which depicts a hard power-on sequence for the printer of the present invention.
Figure 20:
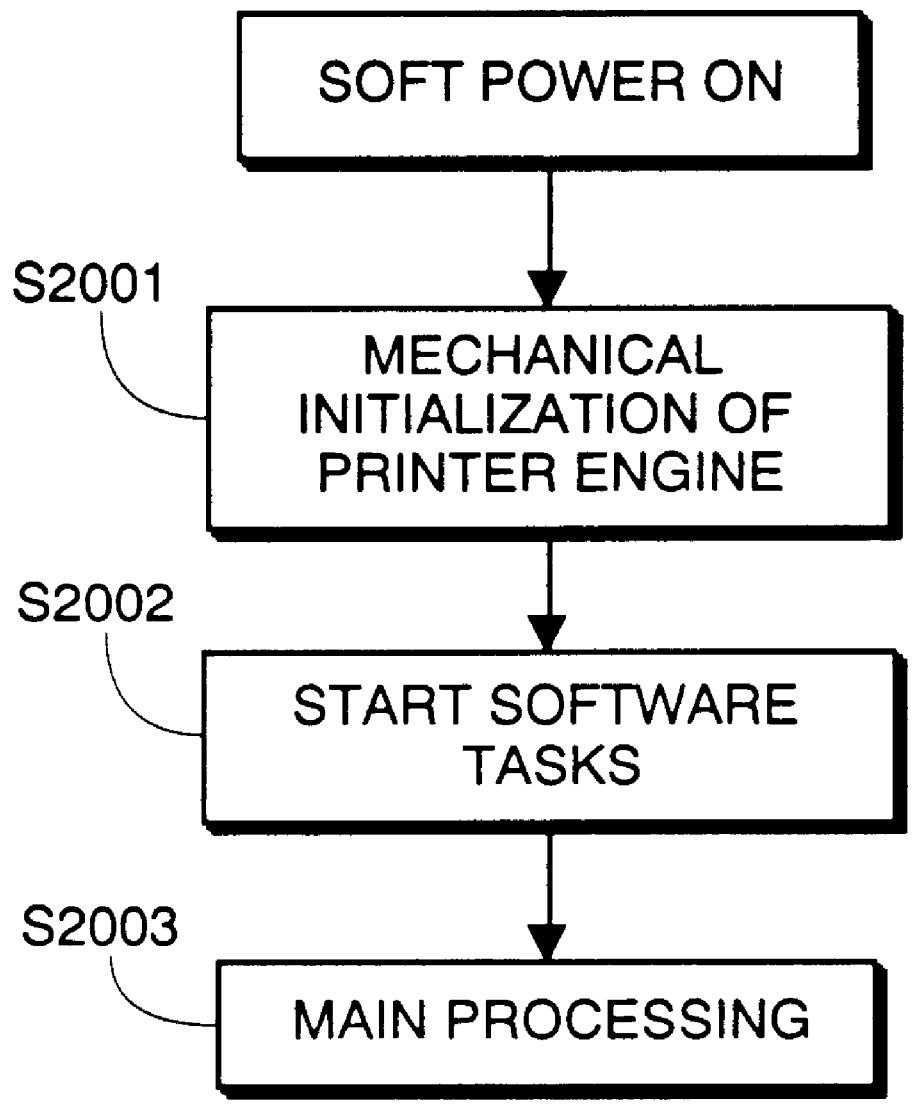
FIG. 20 is a flow diagram which depicts a soft power-on sequence for the printer of the present invention.

FIGS. 19 and 20 illustrate a hard power-on sequence and a soft power-on sequence, respectively. In this regard, it is noted that so long as power is supplied to printer 30, CPU 121 is executing software regardless of the status of power button 44. Thus, a "hard power-on" refers to initial application of power to printer 30. Thereafter, user activation of power button 44 simply causes a soft power-on or soft power-off. This arrangement is preferred, since it allows printer 30 to monitor ongoing events (such as elapsed time) even when printer 30 is "off".

Referring to FIG. 19, which shows a hard power-on sequence, upon initial application of power, step S1901 performs memory checks such as a ROM check, a RAM check, and an EEPROM check. Step S1902 initializes software tasks, and in step S1903, CPU 121 enters an idle loop, awaiting a soft power on.

FIG. 20 indicates the soft power-on sequence. Step S2001 performs mechanical initialization of printer engine 131, such as a reset to the home position, step S2002 starts the software control tasks including Centronics communication tasks, and step S2003 enters the main processing mode.

Figure 21:
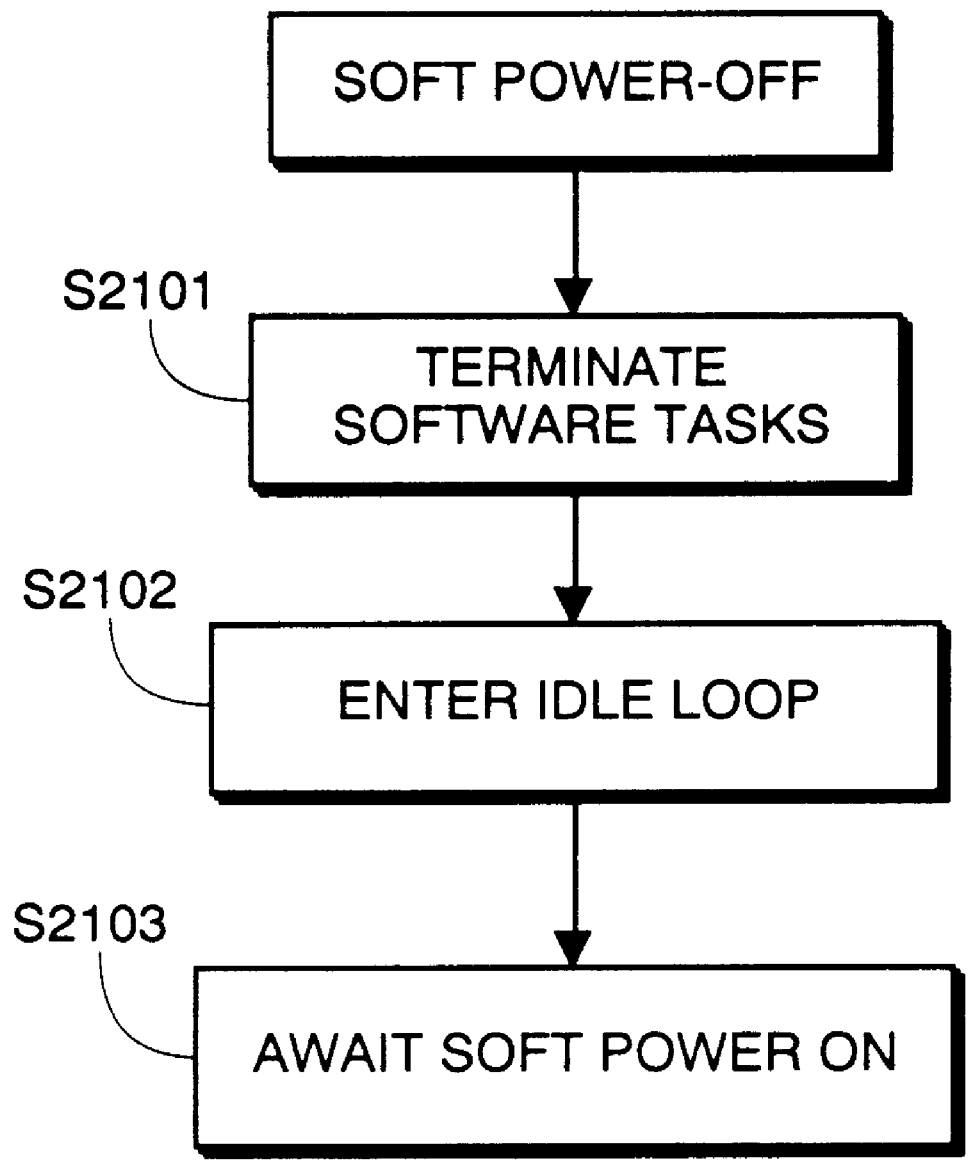
FIG. 21 is a flow diagram which depicts a soft power-off sequence for the printer of the present invention.

FIG. 21 details a soft power-off sequence. Step S2101 terminates all software tasks, and step S2102 enters an idle loop during which, in step S2103, printer 30 awaits the next soft power-on sequence.

3.3 Tasks

In the preferred embodiment of the invention, printer tasks are designed to isolate functionality so that each task is responsible for a single cohesive aspect of printer control. Generally speaking, the tasks can be divided into three conceptual groups, namely engine tasks, controller tasks, and miscellaneous tasks.

With respect to the engine-related tasks, tasks are provided to control carriage motor 66 for carriage movement, to control line feed motor 61 for paper advance, and to control both paper feeding and cleaning operations for print heads 130a and 130b, such as ink suction, purging, and the like. Other tasks transmit messages from print engine 131 to other tasks, and control printer engine 131 based on a message from another task.

With respect to the control tasks, tasks are provided to interpret commands received from host processor 23; these commands are described in detail below in section 3.6. Test-related tasks may be provided if desired.

With respect to the miscellaneous tasks, an initializer task, which was discussed above in section 3.2, initializes printer 30. Other tasks are provided to control displays on printer 30, to scan key switches corresponding to buttons on the printer 30's front panel and detect their status, to initialize hardware related to host computer interface 141 and I/O ports unit 127, to control Centronics output signals, and to interpret and transmit those signals to other tasks. A task is provided to control the engine control task and the communications tasks. In addition, this task initiates, suspends and resumes other tasks. An idle task basically does nothing and is provided for use by the operating system when no other tasks are queued in a wait state.

Figure 22:
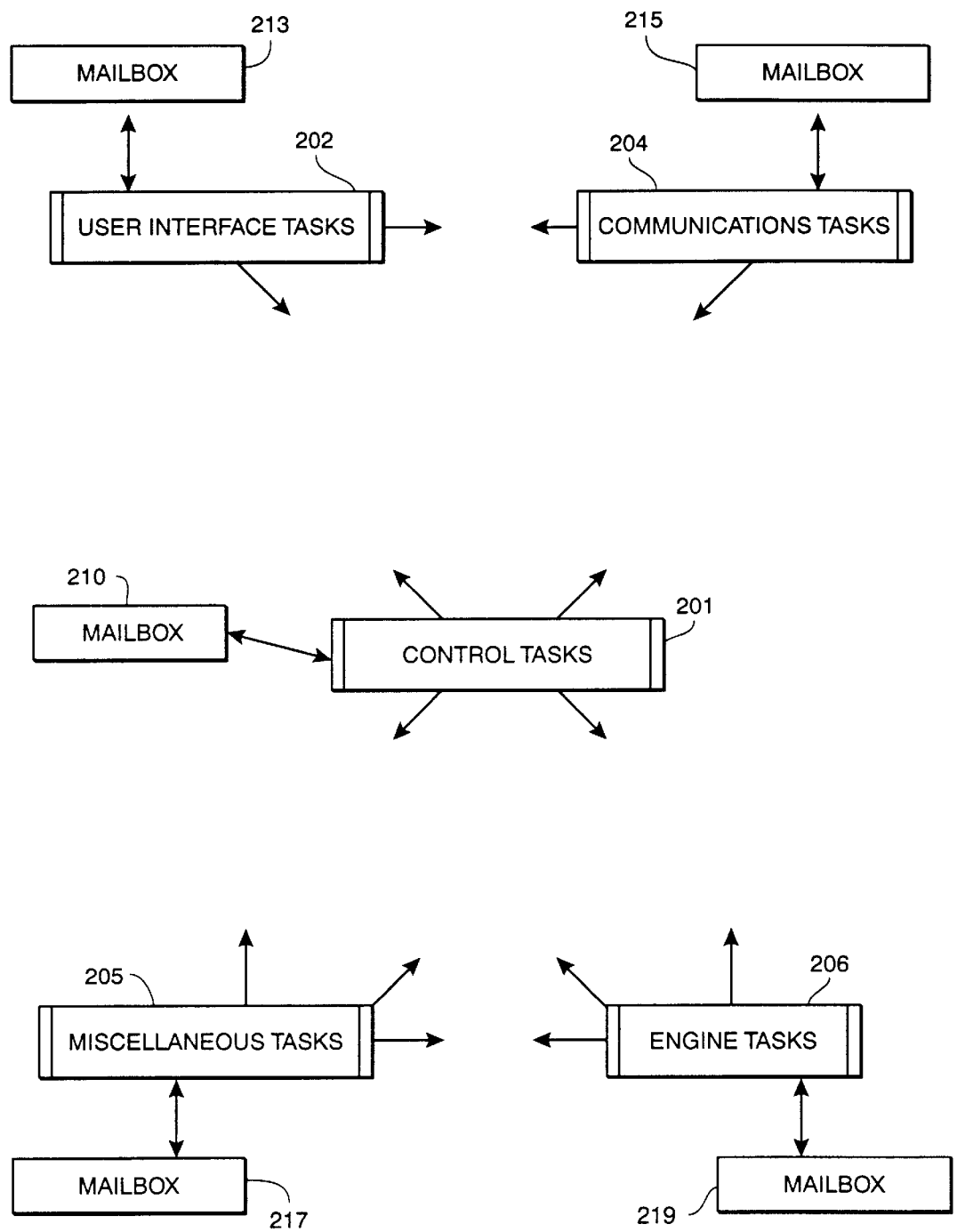
FIG. 22 shows cyclic handlers for various tasks including a Centronics interface task.

Interface and other communications between tasks are accomplished through use of mailboxes into which messages are placed and semaphores to coordinate message communication. This arrangement is illustrated in FIG. 22. Shown in FIG. 22 are controller tasks 201, user interface tasks 202, bi-directional communications tasks 204, miscellaneous tasks 205, and engine tasks 206. Each task in the task group has an associated mailbox, which are illustrated diagrammatically in FIG. 22, with 210 indicating mailboxes for each task in the controller tasks 201, 213 indicating mailboxes for each task in user interface tasks 202, 215 indicating mailboxes for each task in communications task 204, 217 indicating mailboxes for each task in miscellaneous tasks 205, and 219 indicating mailboxes for each task in engine tasks 206. With the exception of engine tasks 206, coordination of messages sent to, and retrieved from, the mailboxes are controlled by semaphores. For the engine tasks 206, no semaphores are used since a detection of memory usage is sufficient.

Each mailbox is adapted to receive messages from each of the other tasks and is further adapted to deliver messages to its associated task. Thus, mailbox 210 can receive messages from any of user interface tasks 202, communications tasks 204, miscellaneous tasks 205, and engine tasks 206; and can deliver those messages to its associated task in task group 201. Likewise, mailbox 213 is adapted to receive messages from any of controller tasks 201, communications tasks 204, miscellaneous tasks 205, and engine tasks 206; and to deliver those messages to the associated tasks in user interface task 202. Likewise, mailbox 215 is adapted to receive messages from any of controller tasks 201, user interface tasks 202, miscellaneous tasks 205, and engine tasks 206; and to deliver those messages to the communications task 204. Likewise, mailbox 217 is adapted to receive messages from any of controller tasks 201, user interface tasks, communications tasks 204, and engine tasks 206; and to deliver those messages to the associated tasks in miscellaneous task group 205. Finally, mailbox 219 is adapted to receive messages from any of controller tasks 201, user interface tasks 202, communications tasks 204, and miscellaneous tasks 205; and to deliver those messages to the associated tasks in engine tasks 206.

3.4 Interrupt Handlers

Although the operating system can accommodate interrupt handlers such as handlers for periodic clock interrupts, such cyclic events can also be handled with cyclic handlers.

3.5 Cyclic Handlers

Cyclic handlers are provided for communications task 204 and for user interface tasks 202, as shown and described above in connection with FIG. 22.

Figure 23:
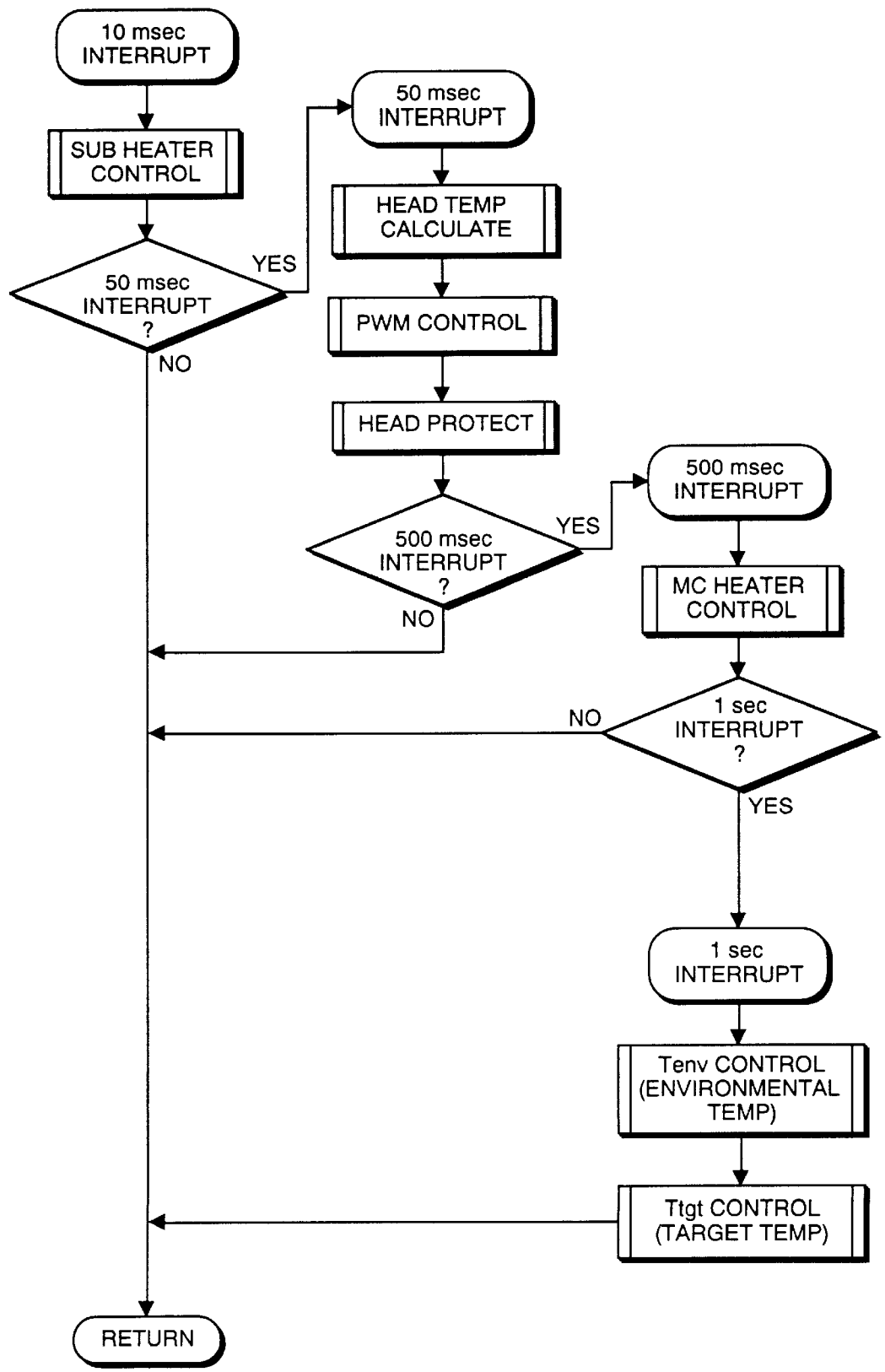
FIG. 23 is a flow diagram illustrating controller timer control according to a cyclic handler for controlling timer operations.

In addition, a cyclic handler is provided for controller timer operations. FIG. 23 is a flow diagram illustrating controller timer control according to this cyclic handler. As shown in FIG. 23, upon receipt of a 10 ms interrupt, sub heater control is effected. The purpose of sub heater control is to drive the temperature of each print head in printer 30 (namely, print heads 130a and 130b) toward a target temperature. This is done by setting a sub heater driving time based on a difference between a calculated head temperature and a target head temperature.

The 50 ms interrupt as shown in FIG. 23 calculates head temperature for each head based on the amount of head driving pulses applied at each head. Calculations are based on pre-stored tables in ROM 122 which provide constants for use in calculating temperature increase as well as temperature decrease based on head firings.

The 50 ms interrupt further controls pulse width modulation control in accordance with pre-stored tables in ROM 122 so as to set the pre-heat pulse for each print nozzle as well the actual main pulse width for each nozzle. The pulse parameters are then sent to control logic 124.

The 50 ms interrupt further effects head protect control so as to ensure that the width of the pre-heat pulse and the width of the main pulse are not in excess of limits that might damage the print head.

As shown in FIG. 23, the 500 ms interrupt effects main heating control. As also shown in FIG. 23, the 1 sec. interrupt calculates environmental temperature, and then proceeds to update target temperatures based on the calculated environmental temperature.

It should be noted that each of the 10 ms, 50 ms, 500 ms, and 1 sec. durations are merely illustrative and may be altered.

3.6 Commands To And From The Host Processor

The following summarizes the commands sent to and from host processor 23 over bi-directional printer interface 104. Generally speaking, each command will include one or more parameters, with some commands (such as the [DATA] image data transmission command) also including data.

The status request command [STATUS] is a generalized command that elicits a response over bi-directional interface 104 from printer 30. Through use of the status request command, host processor 23 can obtain detailed information concerning printer 30, such as the contents of EEPROM 132, alignment and density sensor results, and the like. The status request command is therefore discussed in considerable detail below.

In the sections below, a mnemonic for each command is shown enclosed by square brackets ("[ ]"). The mnemonics shown below are simply examples. The actual sequence and combinations of letters used to form the command mnemonics is immaterial, so long as usage is consistent in the printer side and the host processor side such that commands sent by one are understandable to the other.

3.6.1 Control Commands

Control commands serve to control print operations of printer 30. The following is a description of the various control commands.

[LOAD]—Paper Load

The load command causes paper loading, but does not eject the recording medium currently loaded. This command must be sent to printer 30 even when a medium is already loaded manually.

[EJECT]—Paper Eject

This command prints all data remaining in the print buffer, then ejects the medium currently loaded.

[PRINT]—Print Execution

The Print Execution command causes the data in the print buffer to be printed on a currently-loaded recording medium. The printing area extends from the left edge to the right edge of each print buffer specified by the Left and Right parameters of the [EDGE] command described below.

[CARRIAGE]—Carriage Movement

The Carriage Movement command includes a Position parameter which specifies carriage position in units of column position. This command is used for forward and reverse seeking.

[SKIP]—Raster Skip

The Raster Skip command is used to advance the vertical print position by the number of raster lines specified by a Skip parameter.

[DATA]—Image Data Transmission

This command is used to transmit bit image data of yellow (Y), magenta (M), cyan (C) or black (Bk or K) to printer 30 individually in column image format. Multiple sequences of this command may be issued to make a single scan line. Bit image data is stored into the area specified by the block [BLOCK] and color [COLOR] commands described below. Printer 30 will actually start printing when the [PRINT] command is received.

3.6.2 Setting Commands

Setting commands specify settings for print operations performed by printer 30. Once these commands are set, they are valid until the settings are changed by another command. If no settings are provided for a page, the settings will be reset to default settings. Setting commands are described in more detail below:

[RESET]—Printer Reset

The Mode parameter defines the Printer Reset command and specifies the reset mode. Default settings are included for data compression flag, buffer size, droplet size, print speed, pulse control tables, buffer control tables, and the like.

[COMPRESS]—Select Data Compression

The Mode parameter of the Select Data Compression command specifies whether the image data is compressed or un-compressed, with un-compressed being the default setting.

[DEFINE_BUF]—Define Print Buffer

The Define Print Buffer command is used to define the memory size and configuration of print buffer 139, for each of heads A and B in common.

[DROP]—Select Droplet Size

This command is used to specify the ink droplet size (large or small) for each print head.

[SPEED]—Select Print Speed

This command is used to specify the printing speed.

[DIRECTION]—Set Print Direction

The Direction parameter of this command specifies whether printing will be in the forward direction (left to right) or the backward direction (right to left).

[EDGE]—Set Print Edge

The Set Print Edge command specifies the left edge and the right edge of print position in units of column position; the left edge must be smaller than the right edge.

[BLOCK]—Select Print Block

This command is used to specify the left edge and the right edge of a data block in units of column position from the top of each print buffer. The [BLOCK] command also specifies where bit images following a [DATA] command (described above) are stored.

[COLOR]—Select Print Color

This command is used to specify the location, corresponding to color, in print buffer 139 where bit images data following a [DATA] command (described above) are stored.

[DEFINE_PULSE]—Define Heat Pulse Table

The [DEFINE_PULSE] command is used to define up to plural different heat pulse block tables. The pulse block table must be defined before printer 30 receives the [SELECT_PULSE] command which will be defined below.

[SELECT_PULSE]—Select Heat Pulse Table

The Select Heat Pulse Table command is used to select one heat pulse block table, from among plural tables defined by the [DEFINE_PULSE] command above, that is in common with all heads.

[DEFINE_CONTROL]—Define Buffer Control Table

This command is used to define up to plural different print buffer control tables. The print buffer control table must be defined before the printer receives [SELECT_CONTROL] command (described below).

[SELECT_CONTROL] Select Buffer Control Table

This command is used to select a print buffer control table for each print head 130a and 130b, from among the plural tables defined in the [DEFINE_CONTROL] command.

3.6.3 Maintenance Commands

Maintenance commands serve to maintain print operations of printer 30 and are described in more detail below.

[RECOVER]—Head Recover

Receiving this command causes printer 30 to go into head recovery mode, such as cleaning and ink suction operations.

[PCR]—Change Pulse Control Ratio

This command is used to change a ratio of the Pulse Control Table. Each ratio can be set from 1 through 200, which means 1% through 200%. Default setting is 100 which means 100%.

[UCT]—Universal Coordinated Time

This command is used to set the current time in printer 30, and must be sent to printer 30 at the onset of a print job start. Printer 30 uses the time to determine whether or not printer 30 should recover the print head. The time value is expressed as the number of seconds elapsed since midnight (00:00:00), Jan. 1, 1970, Universal Coordinated Time (UCT), according to the system clock of host processor 23.

[SCAN]—Scan Sensor

This command is used to read an auto-alignment sensor value and to send the result back to host processor 23. Scanning speed, direction, resolution and area are defined by the [SPEED], [DIRECTION], [DEFINE_BUF] and [EDGE] commands, respectively, as described above.

[NVRAM]—NV-RAM Control

This command is used to read data from EEPROM 132 and send the read data back to host processor 23.

[STATUS]—Status Request

This command is used as a prefix command to send status requests to printer 30. Requests can be made for basic settings, main status, and detailed status.

Basic Setting Commands are commands used by host processor 23 to set printer 30 and do not necessarily require a response from printer 30.

Main Status Request/Response commands are commands which are used to obtain status information in regular mode and include Base Status [BASE_STATUS], Echo Command [ECHO], print head configuration [HEAD], Alignment Sensor Results [SENSOR_RESULTS], EEPROM data sending to host [DATA_SEND], and Shift Buffer Size sending to host [BUFFER SIZE]. For each Main Status Request/Response command issued, a response is automatically returned to host processor 23.

Detailed Status Request/Response commands are used to obtain detailed status information. These commands include Detailed Job Status [JOB_STATUS], Detailed Busy Status [BUSY_STATUS], Detailed Warning Status [WARNING_STATUS], Detailed Operator Call Status [OPERATOR_CALL], and Detailed Service Call Status [SERVICE_CALL]. Like Main Status Request/Response commands, for each Detailed Status Request/Response command issued, a response is automatically returned to host processor 23.

3.7 Commands To And From The Printer Engine

Host processor 23 and printer 30 send commands to printer engine 131 through insertion of messages into mailbox 219 (see FIG. 22). The messages are processed by engine tasks 206.

4.0 Paper Ejection Tray

In brief, this aspect of the present invention is an ejection tray for use with the printer described herein. Structurally, the printer includes a housing defining a media feed portion and a media eject port, where the housing is adapted to house a print engine for printing onto recording media. The ejection tray includes a base slidably receivable in the printer's housing at a position laterally distanced from the media eject port. The base includes at least a pair of recesses extending in a sliding direction of the base. A pair of flaps are also included in the ejection tray. The pair of flaps each have at least one width portion corresponding to the lateral distance between the base and the eject port. Each flap is hinged into a corresponding recess of the base, and is biased in an upward direction via a spring which provides for angular motion of the flap relative to the base. Upon sliding action of the base out of the housing, the flaps are biased upward out of the recesses to a height corresponding to the position of the media eject port.

As described in more detail below, the foregoing configuration provides for easy set-up and storage of the paper ejection tray. In addition, the foregoing configuration reduces the chances that paper ejected from the printer will block the printer's ejection area.

4.1 First Embodiment

FIG. 24 shows a perspective view of printer 30 with paper ejection tray 41 set up for use. At this point it should be noted that although the paper ejection tray of the present invention will be described with respect to printer 30 shown in FIGS. 1 and 24, the paper ejection tray of the present invention can be used to receive paper or other types of recording media ejected from any type of apparatus (e.g,. a facsimile machine, etc.). In this regard, for ease of description the invention will be described with respect to paper, as opposed to other types of recording media.

Figure 25:
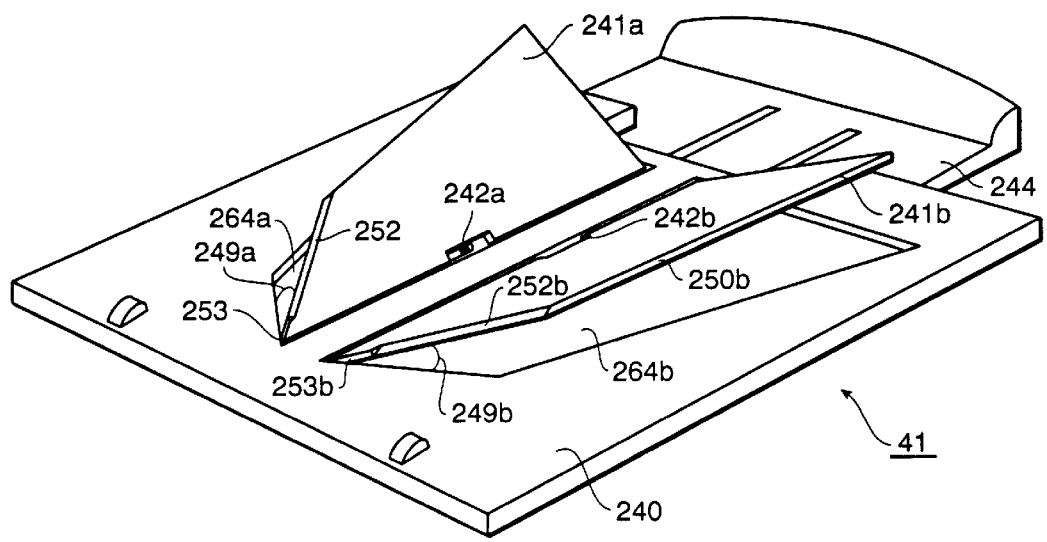
FIG. 25 shows a detailed perspective view of the ejection tray of FIG. 24.

FIG. 25 shows a detailed perspective view of paper ejection tray 41. As shown in the figures, paper ejection tray 41 includes base 240, two flaps 241a and 241b, springs 242a and 242b, and tray extension 244. Each of flaps 241a and 241b is hinged at one edge to one of recesses 264a and 264b of base 240, as described in more detail below. Additionally, each of flaps 241a and 241b is biased is an upward direction relative to base 240 via springs 242a and 242b, respectively. Additionally, springs 242a and 242b provide for controlled upward and downward angular motion of flaps 241a and 241b relative to base 240.

Figure 26:
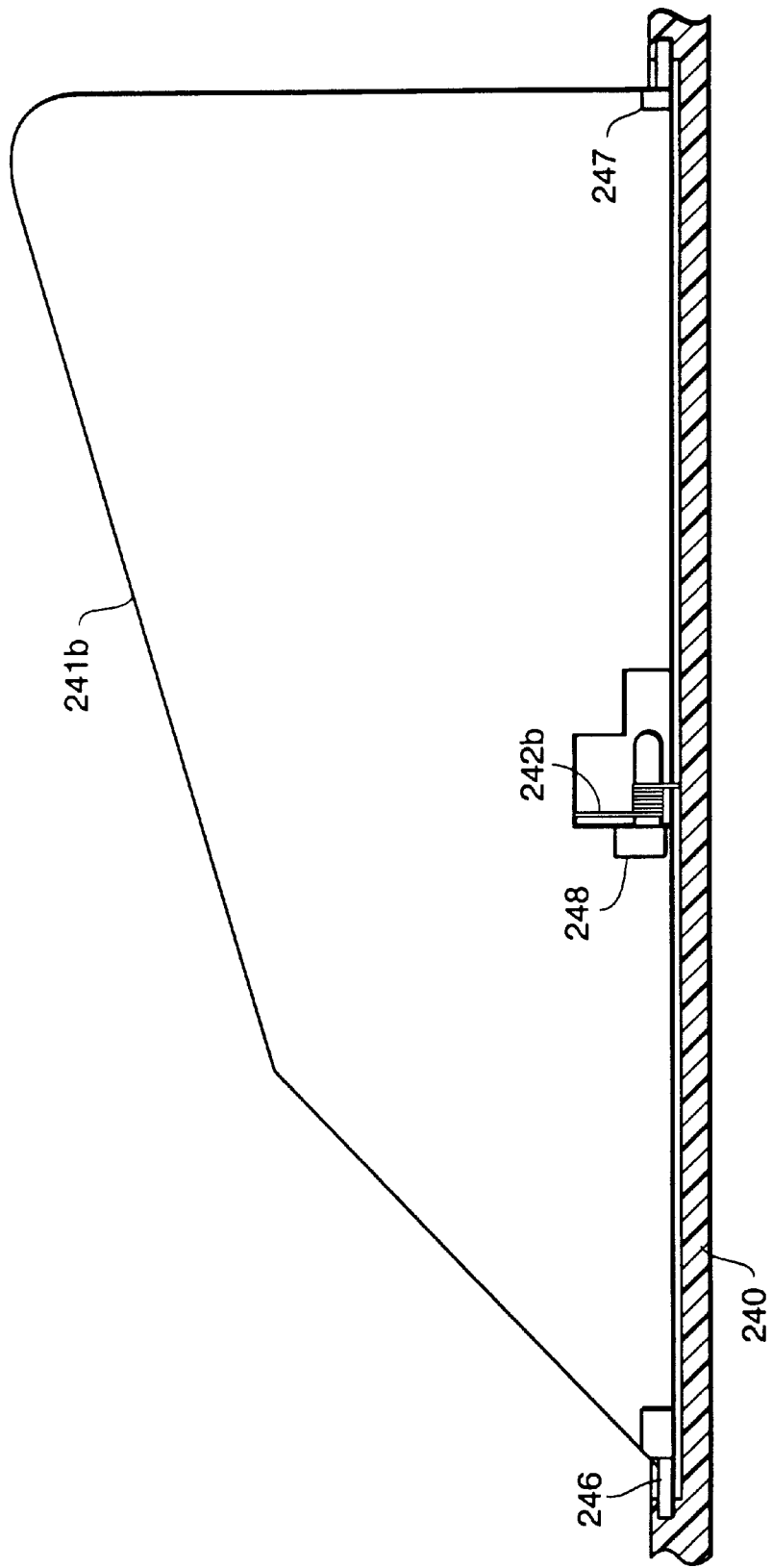
FIG. 26 shows a detailed perspective view of connections of a flap on the ejection tray of FIG. 24.

FIG. 26 shows a closeup side view of the connection of flap 241b to base 240. In this regard, both of flaps 241a and 241b are hinged to base 240 in the same manner. Accordingly, only the connection of flap 241b is described here. Specifically, flap 241b is hinged via dowels 246 and 247 which are disposed at each end thereof, and which fit into corresponding receiving holes (not shown) in recess 264b of base 240. These dowels form an axis about which flap 24b rotates angularly relative to base 240.

Also included on flap 241b is center rod 248, shown in FIG. 26. Spring 242b is wound around center rod 248 and connected to both flap 241b and base 240. Inherent tension in spring 242b biases flap 241b in an upward direction out of recess 264b when paper ejection tray 41 is outside of housing 31. Thus, flap 241b is at an initial angle relative to base 240 when no downward force is applied to flap 241b. Examples of this initial angle, labelled 249a and 249b, are shown in FIG. 24. In preferred embodiments of the invention, the initial angle is less than 90°.

When downward pressure is applied to flaps 241a and 241b, springs 242a and 242b are compressed. However, springs 242a and 242b prevent flaps 241a and 241b from contacting base 240 at least until a predetermined amount of pressure is applied to flaps 241a and 241b. Thus, when pressure is applied to flaps 241a and 241b, flaps 241a and 241b move angularly downward towards base 240, but do so in a controlled manner. During this motion, the angle between each of flaps 241a and 241b and base 240 decreases from the initial angle, eventually down to 0° if the pressure is sufficiently great. In this regard, the amount of pressure required to move each of flaps 241a and 241b down to 0° is based on the tension of a corresponding one of springs 242a and 242b.

Figure 27:
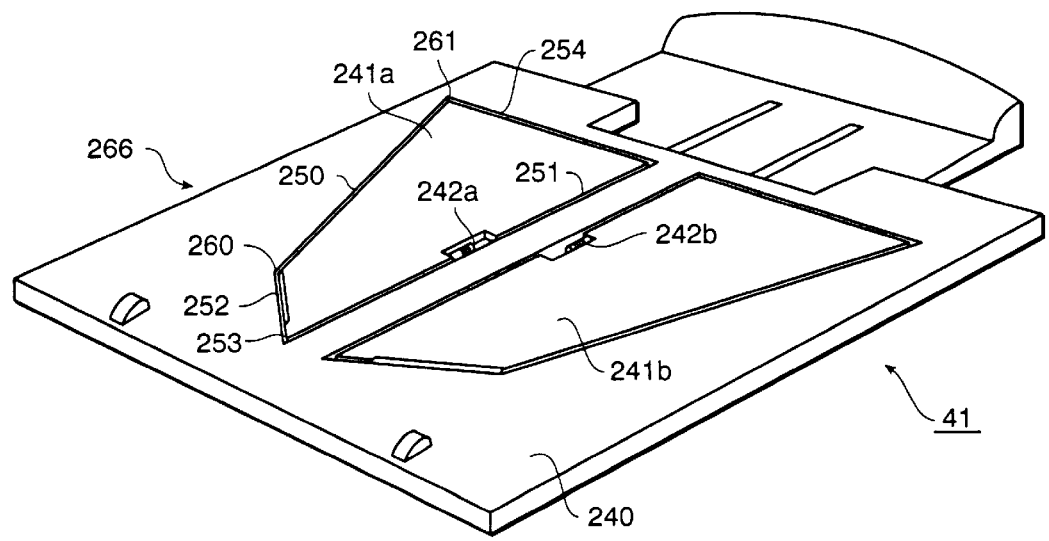
FIG. 27 shows an alternate detailed perspective view of the ejection tray of FIG. 24.

Preferably, each of flaps 241a and 241b has a width portion which roughly corresponds to a lateral distance between base 240 and media eject port 40. To illustrate this, FIG. 27 shows flaps 241a and 241b flat against base 240. Specifically, as shown in FIG. 27, flap 241a includes four edges, namely top edge 250 which supports paper ejected from printer 30, bottom edge 251 which connects to base 240, and side edges 254 and 252 (i.e., the width portion noted above), respectively.

Preferably, the edge of each flap which faces printer 30, i.e., side edge 252 for flap 241a and side edge 252b for flap 241b, is beveled (e.g., tapered) and is angled away from printer 30 as shown in FIG. 25. More specifically, because edges 252 and 252b are beveled, when these edges contact housing 31 of printer 30, the edges slide relative to housing 31 causing flaps 241a and 241b to fold. Eventually, flaps 241a and 241b fold enough so that the lateral pushing forces printer 30 and into tray receptacle 42. This feature is described in more detail below.

Figure 25A:
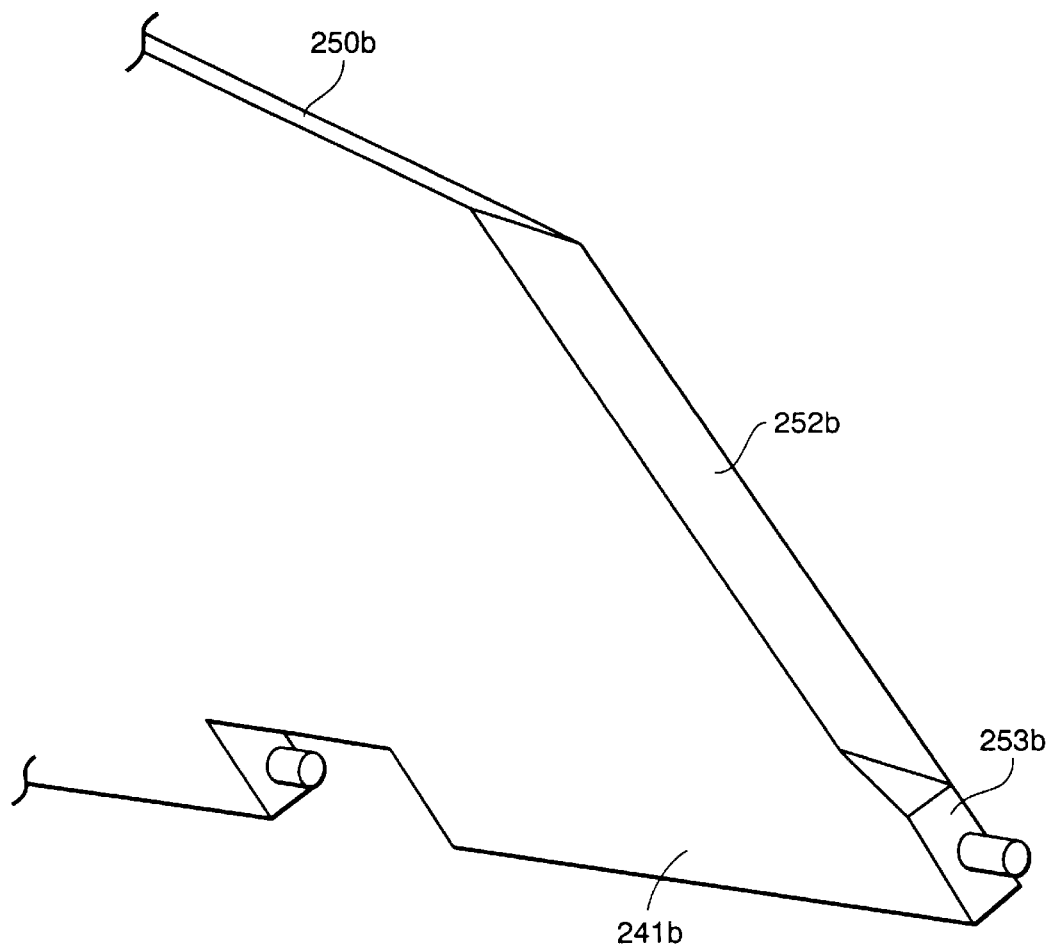
FIG. 25A is a close-up perspective view of an example of a beveled edge which is included on flaps used in the ejection tray of FIG. 25.
Figure 25B:
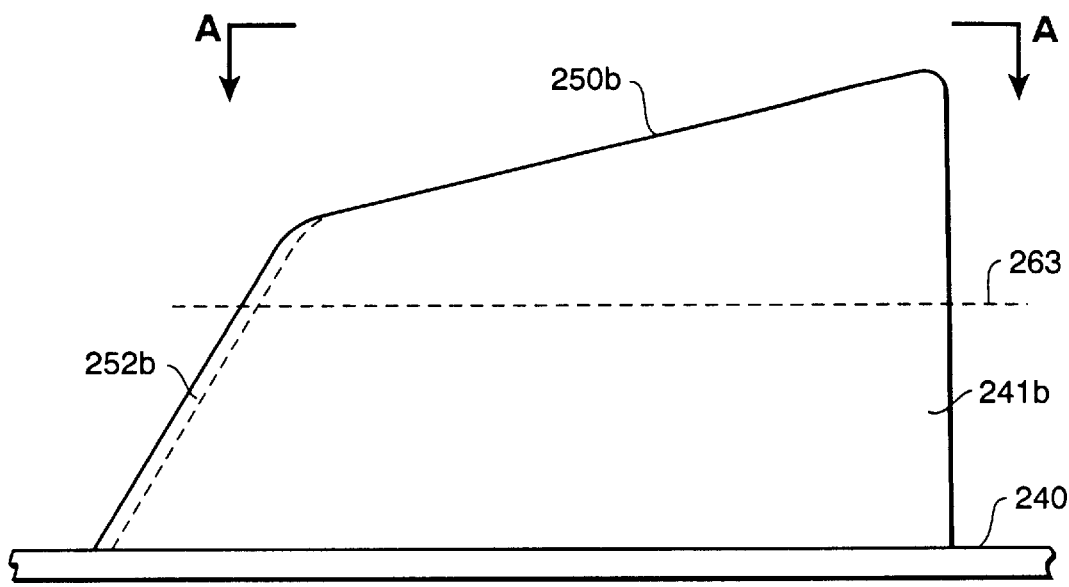
FIGS. 25B and 25C are views of the flap shown in FIG. 25A used to explain the beveled edge.
Figure 25C:
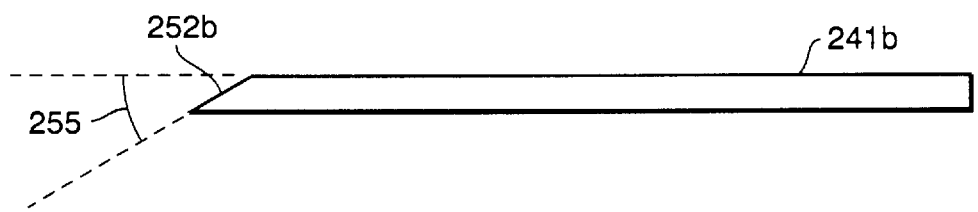

FIG. 25A shows a close-up view of edge 252b of flap 241b. As noted above, and as shown in FIG. 25A, edge 252b is beveled, meaning that it is angled relative to top edge 250b and to base 240. FIGS. 25B and 25C illustrate this feature even further. In this regard, FIG. 25B shows a close-up side view of flap 241b. FIG. 25C shows a view, taken from position A—A, of a cross section of flap 241b taken along dashed line 63. Thus, as depicted in FIG. 25C, beveled edge 252b is angled relative to top edge 250b and base 240. This angle is labelled 255 in FIG. 25C and, in preferred embodiments of the invention, is roughly 45°.

Thus, when ejection tray 41 is pushed towards printer 30, as is the case during storage of tray 41, the beveled edges of flaps 141a and 141b contact housing 31 of printer 30, in particular exterior edge 272. In response to this contact, and as additional lateral pushing force is applied, contact between exterior edge 272 and the beveled edges force flaps 241a and 241b downwards toward the recesses in base 240. If enough force is applied, flaps 241a and 241b are forced sufficiently downward to slide underneath exterior edge 272 and into tray receptacle 42. This feature of the invention is described in greater detail below.

Side edge 252 also includes portion 253 (corresponding side edge 252b includes similar portion 253b), which is preferably not beveled or angled. Such an arrangement provides a flat surface for engaging each of flaps 241a and 241b to base 240 via dowel 246, thereby increasing structural strength at the engagement. Side edges 253 and 253b fit underneath exterior edge 272 and thus do not adversely affect storage of ejection tray 41 into receptacle 42.

With regard to side edge 254, that edge is neither angled nor beveled in the example shown. However, side edge 254 may be angled and beveled if desired so as to facilitate pulling of paper ejection tray 41 from printer 30.

With regard to top edge 250 and bottom edge 251, these edges preferably are not parallel to each other so as to reduce the chances that ejected paper will bend. That is, in preferred embodiments of the invention, top edge 250 is angled slightly upwards relative to bottom edge 251 and base 240 so as to facilitate downward movement of ejected paper. Thus, a distance between top edge 250 and bottom edge 251 is at a minimum at intersection point 260 between side edge 252 (the beveled edge) and top edge 250. This distance increases farther away from intersection point 260 such that the distance is at a maximum at intersection point 261, i.e., the point where side edge 254 intersects top edge 250. This angled construction of top edge 250 relative to bottom edge 251 reduces the chances that paper will fall off of flaps 241a and 241b during ejection.

As noted above, base 240 also includes recesses 264a and 264b (see FIGS. 24 and 25), which correspond to respective ones of flaps 241a and 241b and which extend in a sliding direction of base 240. In preferred embodiments, each of recesses 264a and 264b has a shape which corresponds to a shape of a respective one of flaps 241a and 241b. By virtue of this configuration, when the angle between a flap, such as flap 241a, and base 240 is roughly 0°, the flap can fit almost entirely within its corresponding recess. When both flaps are fitted thusly, top surface 266 of base 240, including flaps 241a and 241b, is substantially planar, as shown in FIG. 27. This facilitates sliding of paper ejection tray 41 into receptacle 42, a described below.

Figure 28:
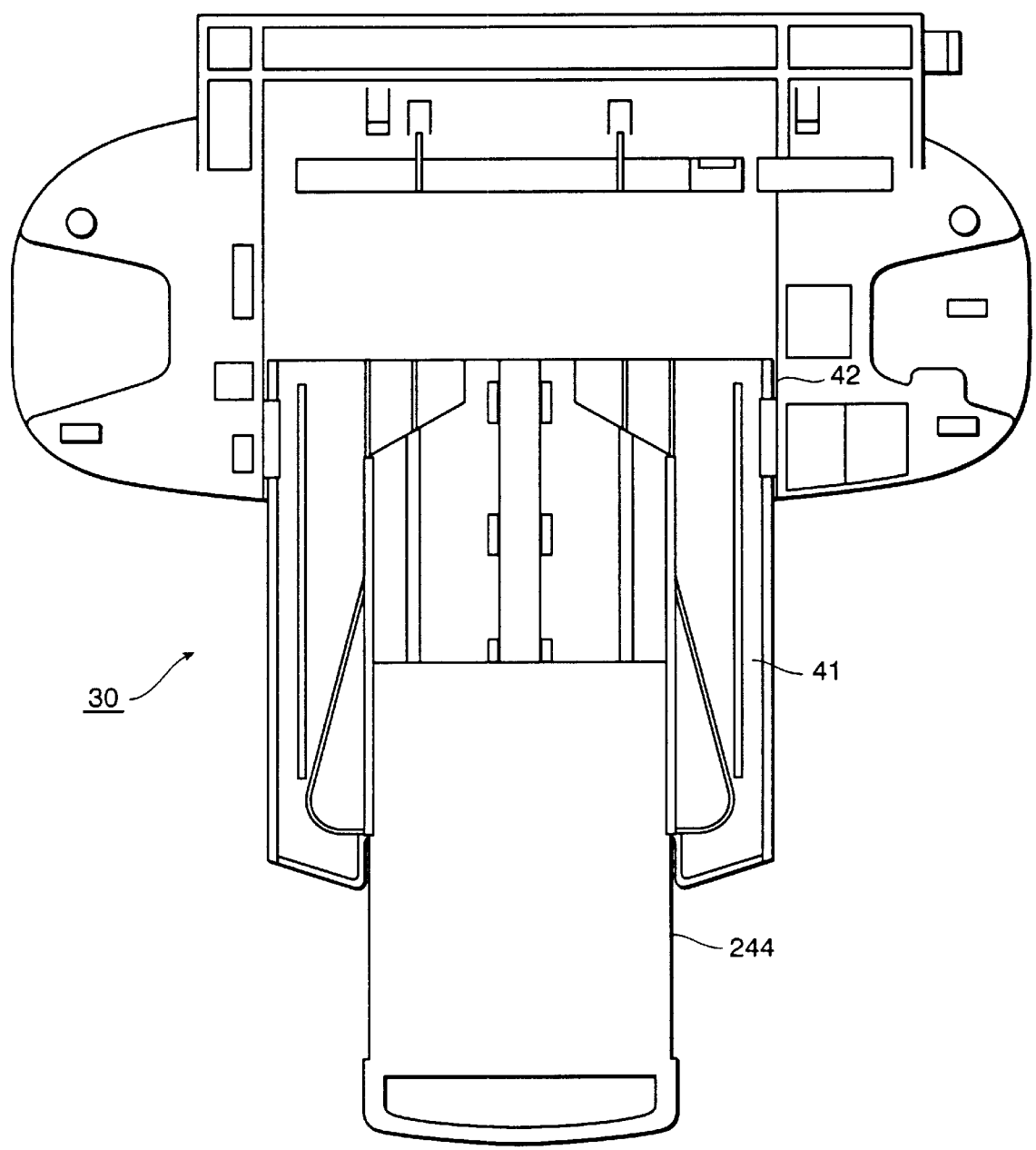
FIG. 28 shows a bottom view of the printer of FIG. 1.

More specifically, as noted above, printer 30 includes tray receptacle 42 (see FIG. 24) which stores paper ejection tray 41 when printer 30 is not in use. FIG. 28 is an underside view of printer 30, which shows tray receptacle 42. As shown, tray receptacle 42 preferably comprises a slot or the like on the underside of printer 30, into which paper ejection tray 41 (including tray extension 244) fits. When flaps 241a and 241b are at 0°, or substantially close to 0°, relative to base 240, paper ejection tray 41 can slide within tray receptacle 42. In this regard, FIG. 1 shows a front view of paper ejection tray 41 stored within printer 30.

Paper ejection tray 41 also may include tray extension 244 noted above. As shown in FIG. 24, tray extension 244 preferably slides into and out of a slot within base 240. This facilitates storage of paper ejection tray 41 within printer 30. Additionally, tray extension 244 includes manual stop 269. Manual stop 269 is used to slide tray extension 244 into or out of the slot in ejection tray 41 and to keep ejected sheets of paper from falling off of paper ejection tray 41.

In addition, manual stop 269 can be helpful in setting up and storing paper ejection tray 41. That is, as shown in FIG. 1, when paper ejection tray 41 is stored within tray receptacle 42, manual stop 269 does not fit entirely within tray receptacle 42 and therefore remains accessible to a user. By grasping manual stop 269 and pulling manual stop 269 away from printer 30, the user is able to set paper ejection tray 41 up for operation. Conversely, by pushing on manual stop 269 towards printer 30, the user can store paper ejection tray 41 within printer 30. These operations are described in greater detail below.

In this regard, FIGS. 29A to 29D show the operation of paper ejection tray 41 during use. Reference is also made to FIGS. 2 and 24 to describe setup and storage of paper ejection tray 41. To begin, FIG. 1 shows printer 30 when not in use. In this configuration, paper ejection tray 41 is stored within receptacle 42. It is preferable to store paper ejection tray 41 when printer 30 is not in use, since storage reduces the chances that paper ejection tray 41 will be inadvertently damaged.

To set up paper ejection tray 41, a user simply pulls paper ejection tray 41 out of printer 30, thereby causing paper ejection tray 41 to slide out of receptacle 42 in housing 31. This is typically done by pulling on manual stop 269; although pulling on other portions of paper ejection tray 41 will accomplish the same result. During this pulling action, flaps 241a and 241b remain relatively flat against base 240 until flaps 241a and 241b are freed from tray receptacle 42.

Once flaps 241a and 241b are freed from tray receptacle 42, flaps 241a and 241b are biased upward out of recesses 264a and 264b, respectively, to a height corresponding to the position of media eject port 40. That is, when flaps 241a and 241b are freed from tray receptacle 42, there is no longer anything to hold flaps 241a and 242b against base 240. Consequently, springs 242a and 242b cause flaps 241a and 241b to bias upwards so that the flaps assume a rough "V" shape when viewed head-on. As noted above, at this point, each of flaps 241a and 241b is at an angle relative to base 240 which is preferably less than 90°. Once flaps 241a and 241b are in this position, printer 30 may begin ejecting paper onto paper ejection tray 41.

Figure 29A:
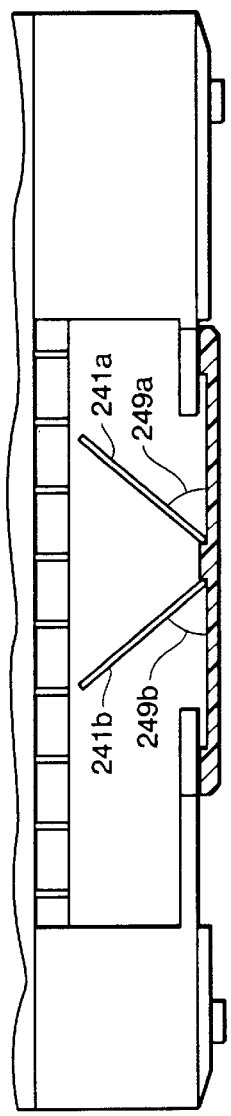
FIGS. 29A to 29D show the operation of the ejection tray of FIG. 24.
Figure 29B:
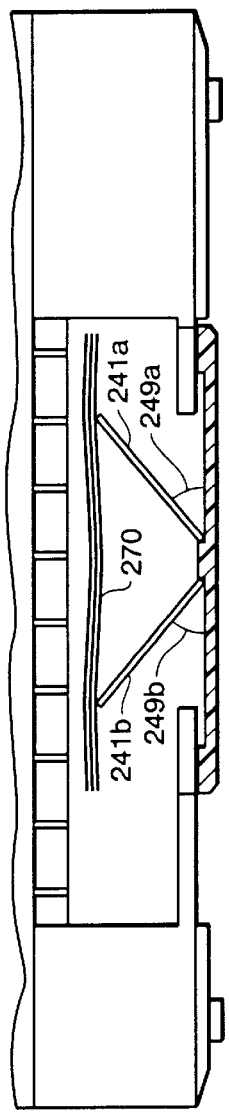

FIGS. 29A to 29D show front views of paper ejection tray 41 set up to receive paper ejected from printer 30. As shown in FIG. 29A, angles 249a and 249b, referred to above as the initial angles, are less than 90° relative to base 240. Because angles 249a and 249b are less than 90°, the weight of paper ejected onto flaps 241a and 241b will cause the flaps to move downward, thereby decreasing angles 249a and 249b, respectively. This is shown in FIG. 29B.

Figure 29C:
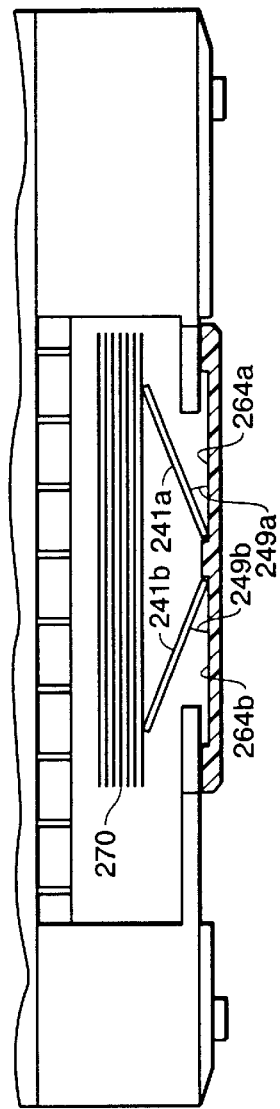

More specifically, FIG. 29B shows a case in which paper ejection tray 41 has received several sheets of paper 270 which have been ejected from printer 30. As shown, weight from paper 270 causes flaps 241a and 241b to move downward, toward base 240. As a consequence, angles 249a and 249b between the flaps and the base decrease from the initial angle. FIG. 29C shows a case in which even more sheets have been added to paper ejection tray 41, thus forcing flaps 241a and 241b still further downward, and thus decreasing angles 249a and 249b still further. This action reduces the chances that sheets of paper ejected from media eject port 40 will block media eject port 40 during operation of printer 30.

Figure 29D:
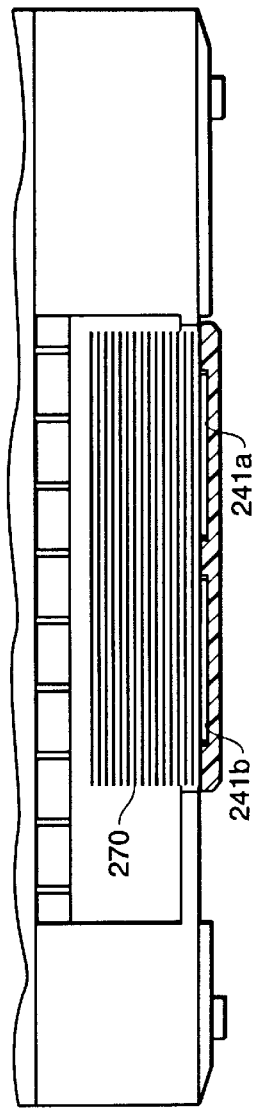

FIG. 29D shows a case in which still more sheets of paper have been received by flaps 241a and 241b. In this case, the weight of paper 270 on flaps 241a and 241b is sufficient to force flaps 241a and 241b to roughly a 0° angle relative to base 240. As a result, each of flaps 241a and 241b will be forced into a corresponding one of recesses 264a and 264b. Thus, as compared with its conventional counterparts, printer 30 is able to print more paper without substantially blocking media eject port 40.

As described above, the degree to which flaps 241a and 241b move downward in response to an applied force depends on the tension of springs 242a and 242b biasing flaps 241a and 241b relative to base 240. As noted above, in preferred embodiments of the invention, springs 242a and 242b have a tension such that flaps 241a and 241b are biased to a height of media eject port 40 when no paper is ejected thereon. In particularly preferred embodiments of the invention, the position to which paper is ejected remains relatively the same for all sheets of paper.

Moreover, in preferred embodiments of the invention, both of flaps 241a and 241b have substantially the same shape and, as noted above, the same connections to base 240. Springs 242a and 242b in connection with both of flaps 241a and 241b also preferably have roughly the same tension. By virtue of this symmetry, the present invention is able to hold more paper with fewer mechanical malfunctions. In this regard, it should also be noted that paper ejection tray 41 also operates in cases where flaps 241a and 241b have different shapes, and springs 242a and 242b produce different biases.

Next, storage of paper ejection tray 41 within printer 30 will be described with reference to FIGS. 2 and 24. In this regard, as shown in FIG. 24, receptacle 42 on printer 30 includes exterior edge 272. Additionally, each of flaps 241a and 241b includes a side edge (i.e., side edges 252 and 252b shown in FIGS. 25 and 27) which faces printer 30, which is angled away from printer 30, and which is beveled, as described above with respect to FIGS. 25A, 25B and 25C, such that the side edge is substantially flat and angled relative to the top edge and base. As described below, these side edges, namely side edges 252 and 252b, are constructed in this manner so as to facilitate storage of paper ejection tray 41 within tray receptacle 42.

More specifically, to store paper ejection tray 41 within tray receptacle 42, a user need only push laterally on base 240 (or tray extension 269). This lateral pushing forces the flaps to co-act with housing 31 so as to fold the flaps back into the recesses upon sliding action back into housing 31. Specifically, the lateral pushing action forces portion 253 underneath tray receptacle 42 and forces side edges 252 and 252b against exterior edge 272 of tray receptacle 42. Exterior edge 272 "responds" with an equal, but opposite, force against the side edges. Because side edges 252 and 252b are beveled and angled (see, e.g., FIG. 25A), this equal but opposite force includes a downward component which forces flaps 241a and 241b to move downward towards base 240. As additional lateral pushing force is applied to ejection tray 41, side edges 252 and 252b slide against exterior edge 272, forcing flaps even further downward.

As was the case above, as flaps 24a and 241b move downward, the angles between flaps 241a and 241b and base 240 decrease. Due to the angle of the side edge, as additional force is applied to the side edges, flaps 241a and 241b continue to slide along exterior edge 272, thus forcing flaps 241a and 241b still further downwards. Eventually, if enough lateral pushing force is applied, flaps 241a and 241b are forced downward such that they fold within recesses 249a and 249b. Thus, paper ejection tray 41 slides easily into tray receptacle 42. FIG. 1 shows paper ejection tray 41 stored within tray receptacle 42 of printer 30.

Accordingly, unlike its conventional counterparts, the present invention provides a means for storing paper ejection tray 41 which does not require significant physical manipulations by the user. Moreover, because the shape of flaps 241a and 241b and housing 31 is primarily responsible for the ease with which paper ejection tray 41 can be stored, the number of additional mechanical components on paper ejection tray 41 is reduced.

At this point, it is noted that the shape of the holding members (e.g., the flaps) used to hold the recording material may also vary. In this regard, the present invention also can be implemented using a single holding member of more than two holding members. For example, the invention can be implemented using a single "V"-shaped holding member in which one or more biasing springs are positioned between opposing arms of the holding member. An example of a second embodiment of the paper ejection tray of the present invention that may be used with printer 2460 is shown in FIG. 29E.

4.2 Second Embodiment

Figure 29E:
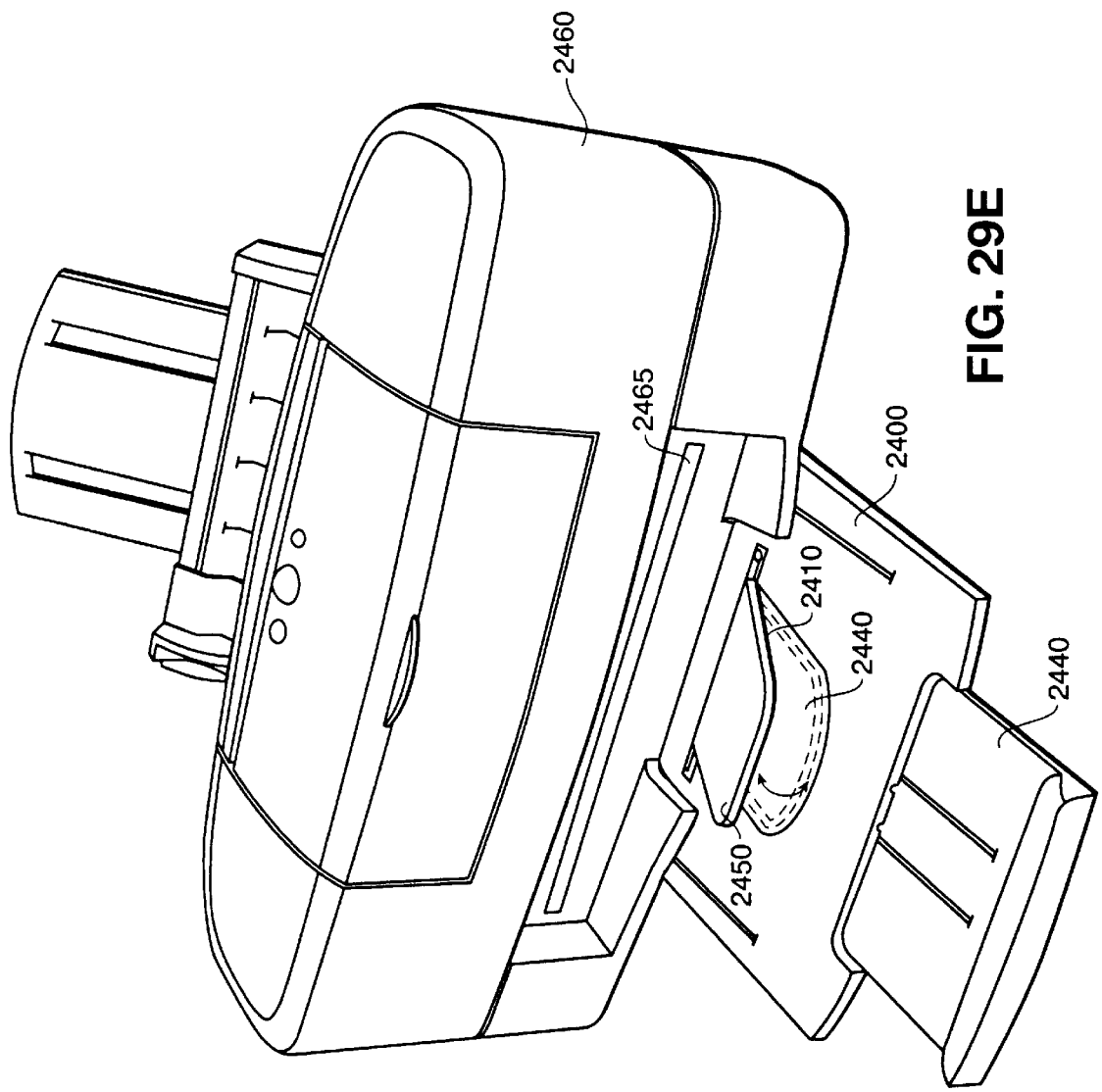
FIG. 29E is a perspective view of a second embodiment of the paper ejection tray of the present invention.

As shown in FIG. 29E, paper ejection tray 2400 includes a single flap, namely flap 2410. Flap 2410 is hinged inside single recess 2440 and biased by a spring (not shown) relative to recess 2440. Flap 2410 operates in a similar manner to the flaps described in the first embodiment. above. Accordingly, a detailed description will be omitted here for the sake of brevity. Suffice it to say that top surface 2450 of flap 2410 co-acts with printer 2460 when tray 2400 is pushed towards printer 2460 so that flap 2410 folds within recess 2440. This permits flap 2410 to be stored within printer 2460. Likewise, when tray 2400 is withdrawn from printer 2460, a spring (not shown) underneath flap 2410 biases flap 2410 to a height roughly equal to that of media eject port 2465 of printer 2460.

During printing, flap 2410 operates in a manner similar to the flaps described above in the first embodiment. Specifically, as paper is ejected onto flap 2410, flap 2410 moves downwardly toward recess 2440 and eventually, when enough paper has been ejected, into recess 2440. As was the case above, downward motion of flap 2410 is controlled via a spring (not shown) which biases flap 2410 relative to recess 2440.

Finally, it is noted that although the paper ejection tray of the present invention has been described with respect to a single flap and a pair of flaps, the invention can be used with multiple flaps as well.

5.0 Ink Cleaning Mechanism

In brief, this aspect of the present invention is a cartridge receptacle which is mounted on a carriage for releasably receiving a cartridge having a print head and at least one removable ink reservoir. The receptacle includes a pivoting lever which permits removal of the at least one ink reservoir. The lever extends over at least a portion of the at least one ink reservoir so as to prevent access to the at least one ink reservoir until such time as the lever is pivoted away from the at least one ink reservoir. When the lever is pivoted away from the at least one ink reservoir, and then the lever is pivoted over the at least a portion of the at least one ink reservoir, a signal is output which prompts cleaning of the print head.

As described above with respect to FIG. 4, printer 30 includes cartridge receptacles 64a and 64b. Access to ink cartridges (and thus to ink reservoirs in those cartridges) in cartridge receptacles 64a and 64b is provided automatically via access door 32 shown in FIG. 2. More specifically, as noted above, printer 30 includes a sensor which senses when access door 32 has been opened or closed. In response to this sensor sensing that access door 32 has opened, carriage motor 66 is driven so that cartridge receptacles 64a and 64b move roughly to the center of carriage 69, i.e., to roughly the location shown in FIG. 4. This area of printer 30 corresponds to the internal portion of printer 30 which is accessible when access door 32 is open. Thus, it is possible to access cartridge receptacles 64 merely by opening access door 32. The significance of this will become apparent below.

FIGS. 6A and 6B, described above, show the physical construction of cartridge receptacle 64b. FIGS. 7A and 7B, described above, show the physical construction of ink cartridge 300b, which can be installed in cartridge receptacle 64b. As noted above, circuit contacts for the cartridge receptacle shown in FIGS. 6A and 6B and the ink cartridge shown in FIGS. 7A and 7B are used in connection with ink cartridge cleaning. More specifically, according to the present invention, a circuit contact on a cartridge receptacle engages and disengages a circuit contact on an ink cartridge in response to opening and closing a lever of the cartridge receptacle.

Figure 30A:
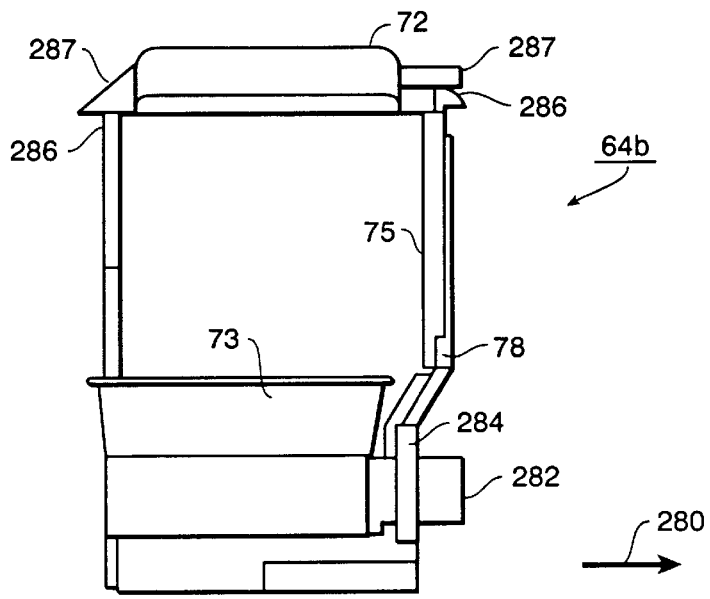
FIGS. 30A and 30B show the operation of a cartridge receptacle in the printer of the present invention.
Figure 30B:
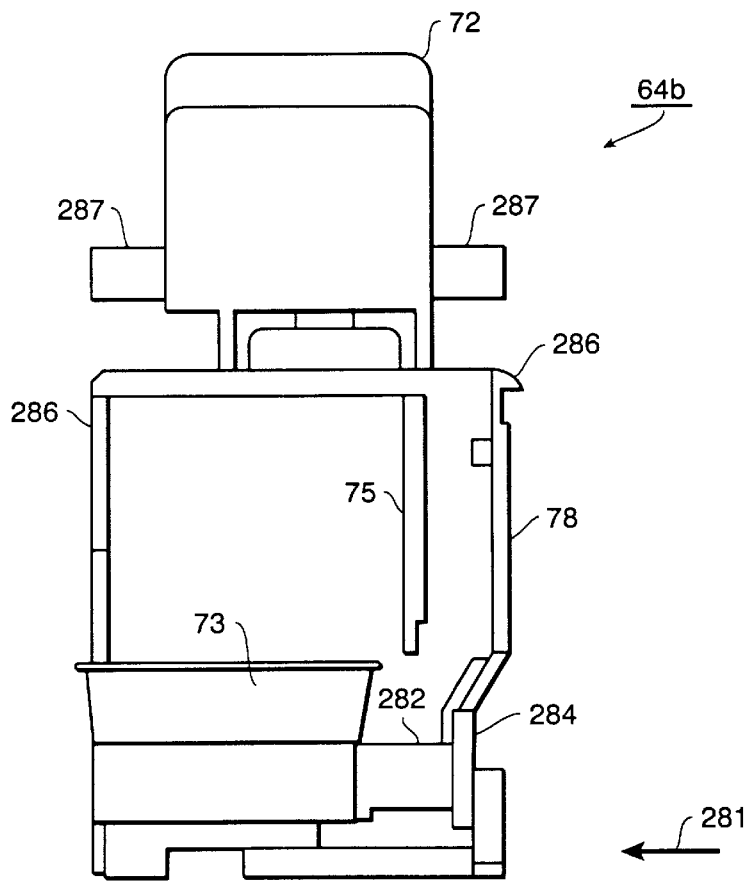

Front views of the cartridge receptacle shown in FIGS. 6A and 6B during operation are shown in FIGS. 30A and 30B. As shown in FIGS. 30A and 30B, cartridge receptacle 64b includes capsule 73 and lever 72, among other things. Lever 72 is hinged so that it pivots relative to capsule 73. This pivoting action permits a user to access and to remove either an entire ink cartridge in cartridge receptacle 64b or just an ink reservoir from the cartridge.

Lever 72 is also connected to capsule 73 so that when lever 72 is pivoted, e.g., opened or closed, capsule 73 moves laterally, as described in detail above with respect to FIG. 6B. More specifically, when lever 72 is pivoted from the open position shown in FIG. 30B to the closed position as shown in FIG. 30A, capsule 73 moves laterally within cartridge receptacle 64b in the direction of arrow 280 (see FIG. 30A). This movement causes side wall 75 of capsule 73 to come into contact with side wall 78 of cartridge receptacle 64b. On the other hand, when lever 72 is moved from the closed position shown in FIG. 30A to the open position shown in FIG. 30B, capsule 73 moves laterally within cartridge receptacle 64b in the direction of arrow 281 (see FIG. 30B). This movement causes side wall 75 of capsule 73 to move away from side wall 78 of cartridge receptacle 64b.

During the motion described above, namely the movement of capsule 73 between the position shown in FIG. 30A and the position shown in FIG. 30B, finger 282 on capsule 73 slidably engages sleeve 284. As also shown in FIGS. 30A and 30B, capsule 73 includes shoulders 286, and lever 72 includes flanges 287. Thus, when lever 72 is closed, as shown in FIG. 30A, flanges 287 contact shoulders 286, and not an installed ink cartridge or ink reservoir. By virtue of these features, cartridge movement caused by inadvertent contact with lever 72 can be reduced.

Figure 31A:
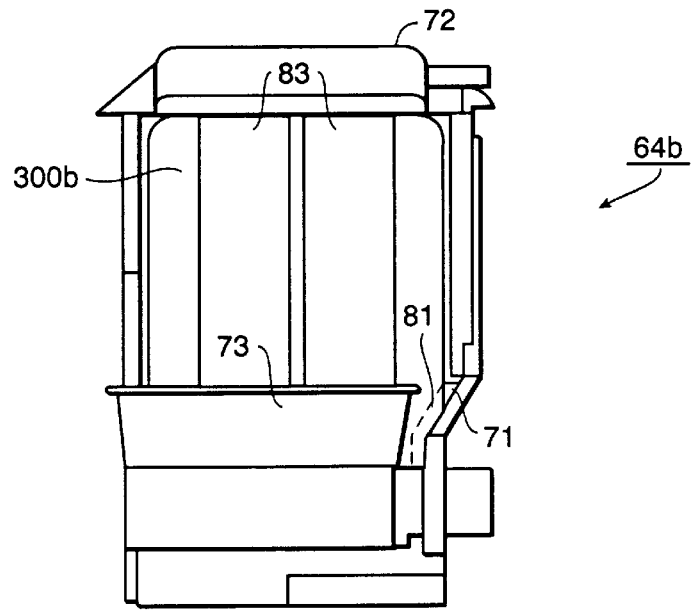
FIGS. 31A and 31B show an ink cartridge installed in the cartridge receptacle of FIGS. 30A and 30B.
Figure 31B:
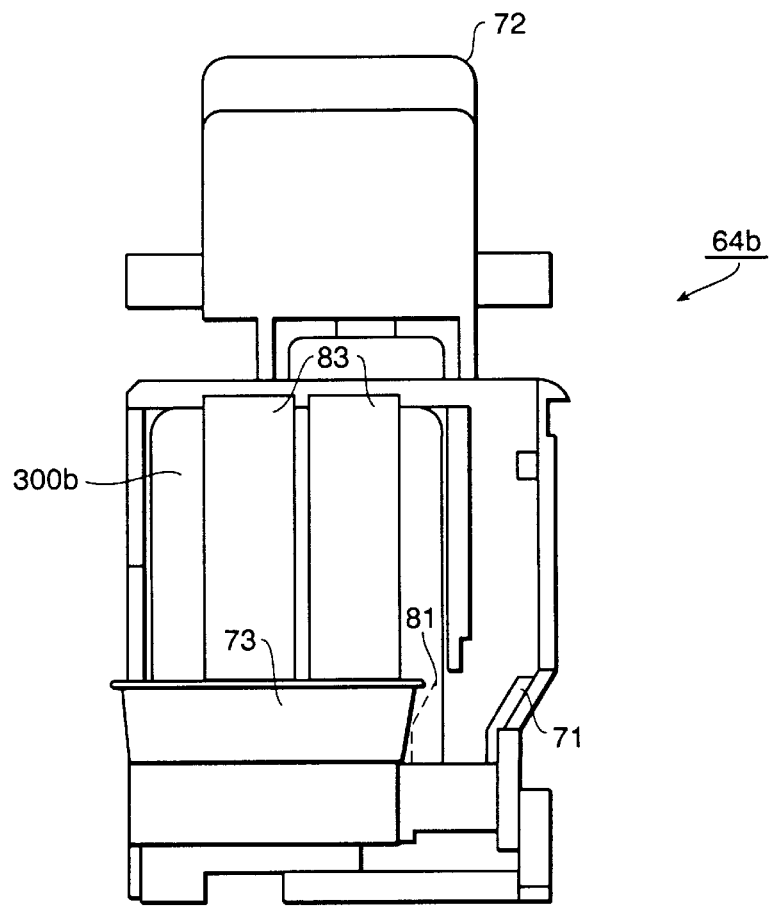

FIGS. 31A and 31B show views of cartridge receptacle 64b with ink cartridge 300b installed therein. As shown in FIG. 31A, when lever 72 is pivoted over a portion of ink reservoirs 83, i.e., lever 72 is in the closed position, an operator is prevented from accessing ink reservoirs 83. That is, in this position, the tops of ink reservoirs 83 are covered, at least in part, by lever 72, thereby restricting access thereto. In addition, in this position, cartridge circuit contact 81 on ink cartridge 300b engages device circuit contact 71 on cartridge receptacle 64b. In contrast, when lever 72 is pivoted away from ink reservoirs 83, i.e., lever 72 is in the open position, an operator can access ink reservoirs 83. In this position, cartridge circuit contact 81 on ink cartridge 300b is disengaged from device circuit contact 71 on cartridge receptacle 64b.

Thus, during the lateral motion of capsule 64b described above with respect to FIGS. 30A and 30B, circuit contacts 71 and 81 engage and disengage. Specifically, circuit contacts 71 and 81 disengage when lever 72 is opened, and engage when lever 72 is closed. This engaging and disengaging of circuit contacts is the means by which a user designates print head 300b for cleaning, and causes a signal to be output which prompts cleaning of print head 300b. A controller (such as CPU 121 described above) in printer 30 receives this signal and initiates the cleaning process described below.

In this regard, it is noted that either one of both of the ink cartridges in printer 30 can be designated for cleaning in the foregoing manner. It is further noted that ink cleaning is performed only for the cartridge or cartridges that have been designated in this manner.

Once an ink cartridge has been designated, ink cleaning does not actually take place until access door 32 is closed. That is, during ink cartridge designation, access door 32 must be open. Ink cleaning will not take place until the access door sensor noted above senses that access door 32 is closed. In this regard, once it is sensed that access door 32 is closed, cartridge receptacles 64a and 64b move automatically to home location 87, i.e., the position corresponding to ink cleaning mechanism 86. Ink cleaning mechanism 86 is then used to clean (i.e., suction) ink from the print head of a designated cartridge.

Figure 32:
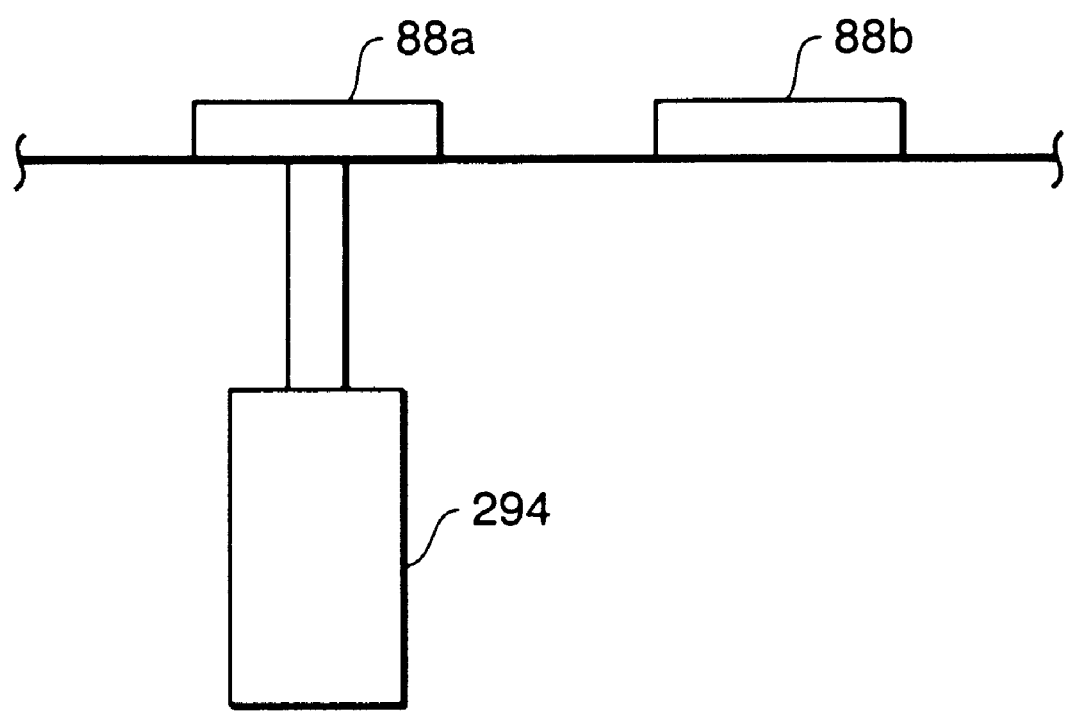
FIG. 32 shows the configuration of an ink cleaning mechanism used on the printer of FIG. 1.

To this end, ink cleaning mechanism 86 includes two print head connection caps 88a and 88b (see FIG. 4). Each of these print head connection caps corresponds to a print head of an ink cartridge in one of cartridge receptacles 64a and 64b, respectively. However, only one of print head connection caps, namely cap 88a, is connected to a rotary pump which cleans (i.e., suction) ink from print heads. An example of this configuration is shown in FIG. 32, in which print head connection cap 88a is connected to pump 294.

Figure 33A:
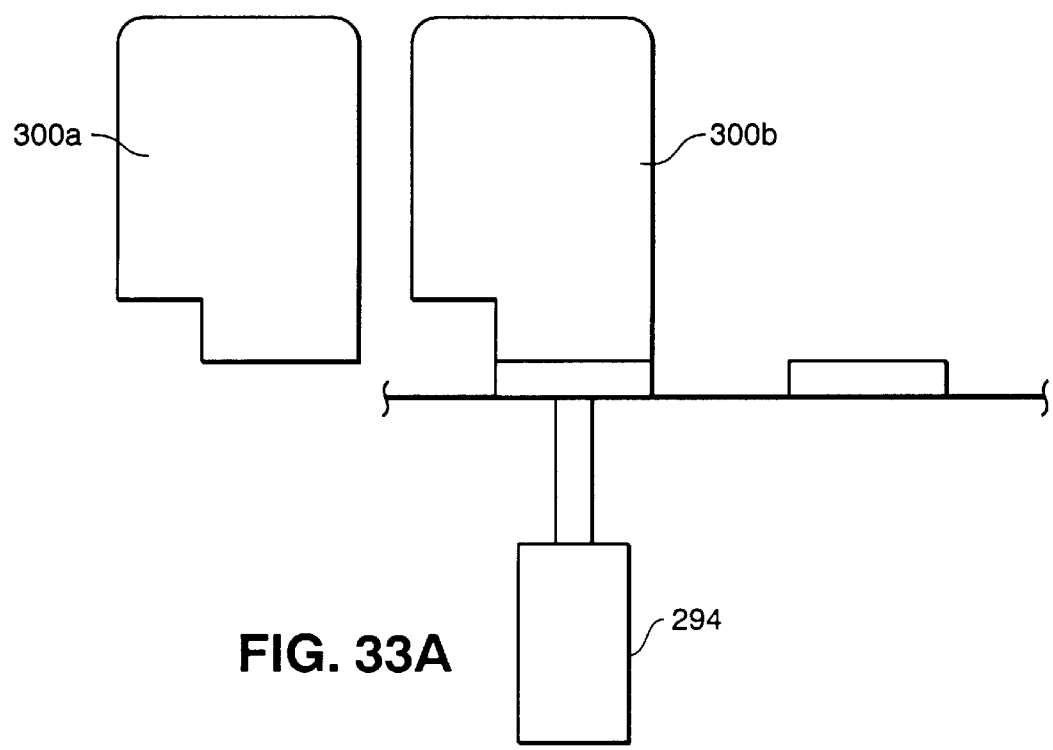
FIGS. 33A and 33B show ink cleaning of each print head installed in the printer of FIG. 1.
Figure 33B:
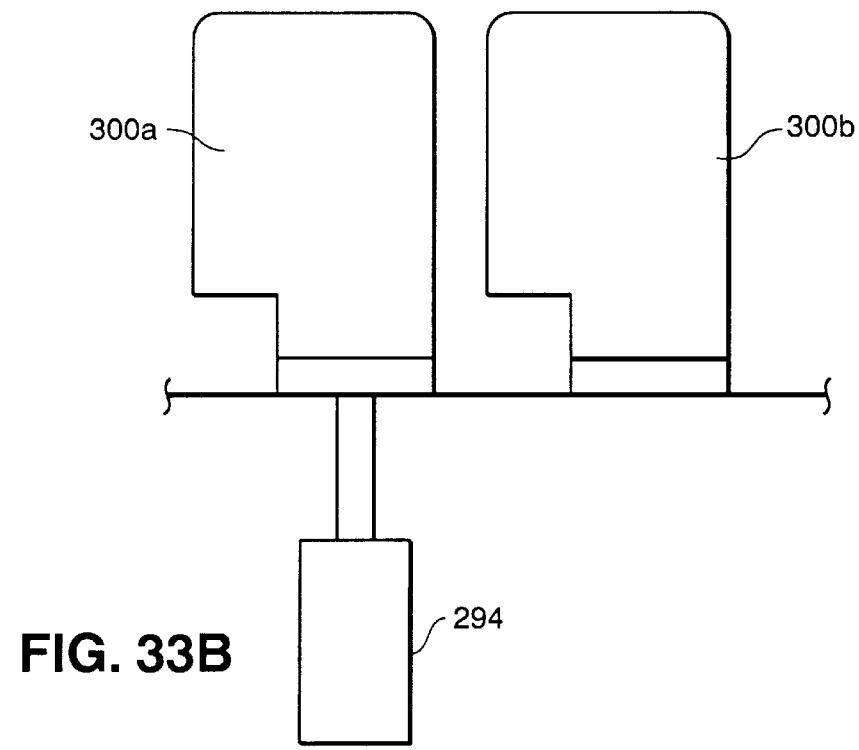

Thus, when access door 32 is closed, the print head of the ink cartridge which has been designated for cleaning connects with print head connection cap 88a. For example, as shown in the block diagram of FIG. 33A, if ink cartridge 300b has been designated for cleaning, ink cartridge 300b is moved into contact with cap 88a. On the other hand, if ink cartridge 300a has been designated for cleaning, ink cartridge 300a is moved into contact with cap 88a when access door 32 is closed, as shown in the block diagram depicted in FIG. 33B. In the case that both ink cartridges have been designated for cleaning in the manner set forth above, the ink cartridges connect with cap 88a in sequence.

Once connection is sensed via the home location sensor noted above, ink is extracted (i.e., suctioned) by pump 294 from nozzles or holes in the print head of the cartridge. Following this cleaning operation, the cartridge may then be used for printing.

6.0 Storing Printer Profile Parameters

In brief, this aspect of the invention is a method for controlling a print head of an image printing device having at least one print head. The method includes the steps of obtaining profile information of the at least one print head, storing the profile parameters in a non-volatile RAM, outputting, upon request, the profile information to a host processor connected to the image printing device, wherein the host processor utilizes the print head profile information to produce compensation parameters which compensate print information to be sent from the host processor to the print head for printing.

In detail, when applying power and performing a hard power-on, printer 30 enters an offline mode. In this mode, CPU 121 in printer 30 retrieves from ROM 122 initialization software and executes a power-on self-test program (POST). Among many of the self-tests and status-checking programs that it performs, CPU 121 checks the status of print head 130a and print head 130b to determine whether either or both print heads have been installed in printer 30. One way in which CPU 121 checks this status is by determining whether access door 32 has been opened and, if so, comparing print head identification (ID) information stored in EEPROM 132 with a current print head's ID. If a new print head has been installed, this change will be noted in EEPROM 132 with other stored printer profile parameters, as discussed below.

However, at an initial installation and power-on, CPU 121 gathers various profile parameters regarding printer 30 as part of its installation programming. For example, CPU 121 will obtain the printer ID, print head ID information (or, if more than one print head is installed, then printer IDs for all print heads), as well as the current status of printer 30 and print head 130a and 130b (this feature is also performed after any subsequent power-on as well as at specific predetermined times and events, which will be discussed in greater detail below).

Once POST processing has been performed, printer 30 enters an online mode and awaits commands from host processor 23. As shown in FIG. 10, host processor 23 sends commands through printer interface 104 directly to control logic 124 of printer 30. Commands from host processor 23 to read/write to EEPROM 132 of printer 30 are also directed through printer interface 104 and control logic 124.

Typically, after going online, host processor 23 will send a status request command [STATUS] to printer 30 via control logic 124. Upon receiving such a status request command, CPU 121 of printer 30 will send stored printer profile parameters from EEPROM 132, I/O ports unit 127, and control logic 124 to host processor 23. An example of printer profile parameters which are stored in a specific area in EEPROM 132 and registered with host processor 23 are shown below in Table 1.

TABLE 1

| CONTENTS OF EEPROM |
| --- |
| Waste Ink Amount |
| Print Head Change Count |
| Driver's Information |
| Print Head Clean Time |
| Print Head Changed |

These foregoing printer profile parameters are used by host processor 23 to compensate print head command data during a print operation.

Figure 34:
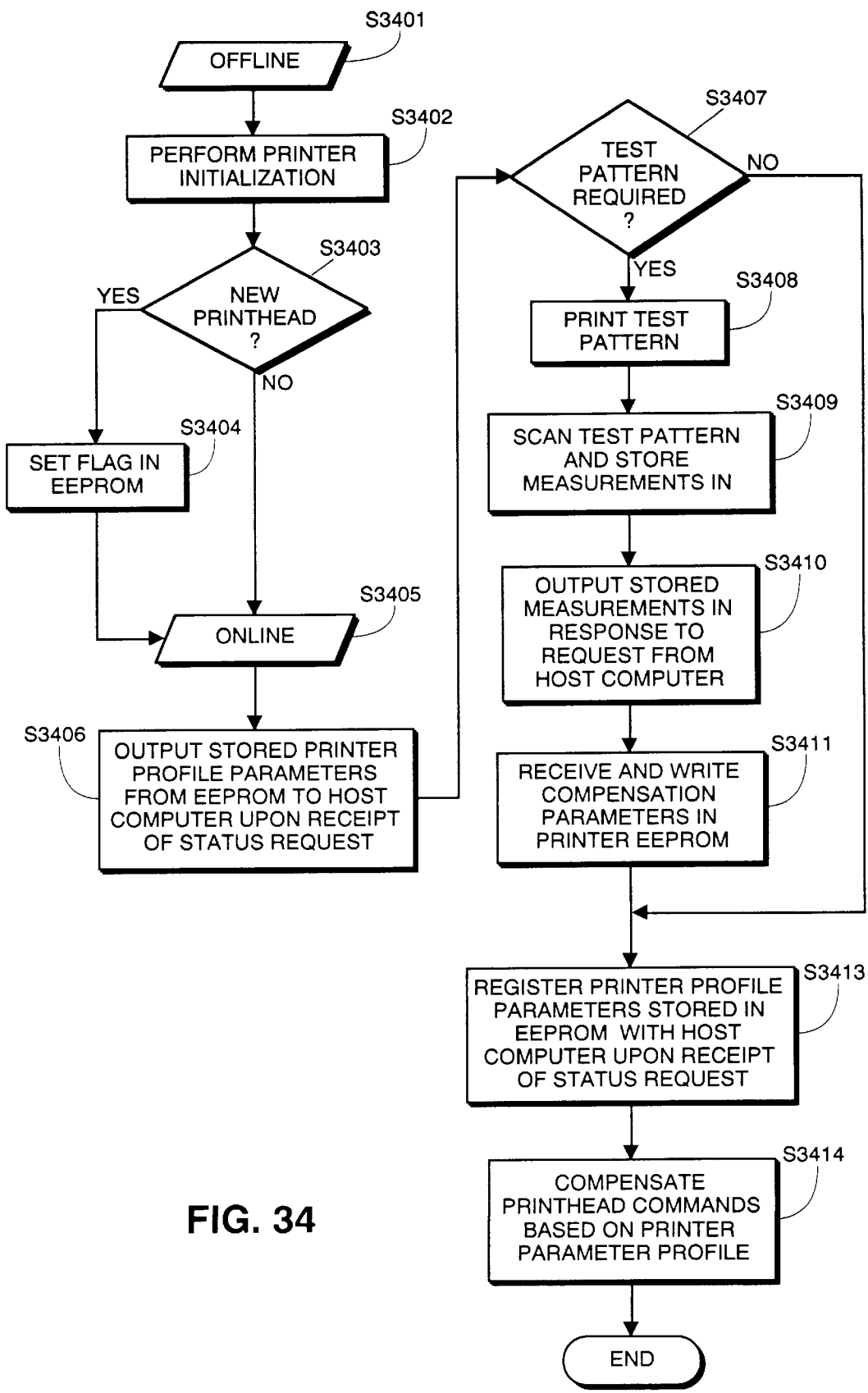
FIG. 34 is a flowchart showing compensation of print head command data in a host processor.

Thus, with reference to the flow diagram shown in FIG. 34, in step S3401, upon performing a hard power-on, printer 30 enters an offline mode. During this offline mode, in step S3402 printer 30 performs a POST operation so as to gather status and functional data, and to check for any hardware or software faults. After initialization, in step S3403, CPU 121 of printer 30 determines if a new print head has been installed. In the case that step S3403 is encountered during the initial power-on after installing printer 30 and one or more ink cartridges having one or more print heads, respectively, have been installed, CPU 121 obtains information from the newly-inserted print heads and stores that information in EEPROM 132 and commands a cleaning process at a next soft power-on. However, if printer 30 is only offline because a user has opened access door 32 and has installed a new print head, in step S3404 CPU 121 will gather the print head ID and set a flag in EEPROM 132, which indicates that the print head has been changed. This flag instructs host processor 23 that an ink cartridge has been changed. This process will be performed when a print head has been installed for the very first time as well as when a print head has been subsequently changed.

In this regard, EEPROM 132 stores a plurality of printer profile parameters which are registered with host processor 23 for various purposes, such as for providing compensation parameters to host processor 23 which are in turn used to compensate for physical characteristics of both a print head and ink within a print head cartridge. For example, as shown in Table 2 below, EEPROM 132 stores, in addition to print head alignment and optical density information, information and parameters relating to a waste ink amount, print head change count, print head cleaning times, print head ID, print head type, etc.

TABLE 2

| Contents | Note |
| --- | --- |
| Driver's Information | The Printer Driver reads/writes alignment data, etc. |

TABLE 2-continued

| Contents | Note |
|---|---|
| Check Sum | The check sum of this data block |
| Cleaned Time for RIGHT Head (A_Head) | The last cleaned time for the RIGHT head (A_Head) |
| Cleaned Time for LEFT Head (B_Head) | The last cleaned time for the LEFT head (B_Head) |
| Check Sum | The check sum of this data block |
| Print head changed | The status whether print head changed or not |
| Cleaned Time for RIGHT Head (A_Head) [Mirror] | Backup for recovering in System Master |
| Cleaned Time for LEFT Head (B_Head) [Mirror] | Backup for recovering in System Master |
| Check Sum | The check sum of this data block |

Returning to FIG. 34, if a new ink cartridge has not been installed, in step S3405 printer 30 enters an online mode in which printer 30 is capable of communicating with host processor 23, or if networked, with a host server. Once online, printer 30 waits to receive commands from host processor 23. These commands, some of which have been listed previously, are typical of the commands which can be sent to printer 30 once printer 30 is online. In this regard, normally, after going online, host processor 23 will output a status request [STATUS] command to printer 30 in order to obtain any new information or parameters which may have changed while the printer was offline. In response, in step S3406 printer 30 will transmit printer profile parameters stored in EEPROM 132 to host processor 23. Upon receiving the parameters, host processor 23 will review the parameters, in particular, the parameters dealing with the print heads, to determine if a print head has been changed. If it is determined that a print head has been changed, in step S3407 host processor 23 will determine if a test pattern should be requested. Normally, a test pattern will be printed so that print head alignment and optical density of the printed image can be measured. If a print head has been changed and a test pattern is required, in step S3408 host processor 23 transmits one or more commands through printer interface 104 and control logic 124 to print engine 131. For example, host processor 23 can transmit a series of commands, as shown in Table 3 below. These commands can be transmitted together with print data to print engine 131 so as to print a test pattern to be scanned.

TABLE 3

EXAMPLE OF TEST PATTERN AND SCAN COMMAND FLOW
The sample command flow in case of BC-21 × 2, Color Mode, 360 dpi and 8.5" of print buffer 139 is described below:

| | |
|---|---|
| [UCT] | Universal Coordinated Time (Set Current Time) |
| [RESET] | Printer Reset (Software Reset) |
| [COMPRESS] | Select Data Compression (Byte Packing Mode) |
| [DEFINE_BUF] | Define Print Buffer A (360 dpi, 12 bytes × 3,060 columns, . . . ) |

TABLE 3-continued

EXAMPLE OF TEST PATTERN AND SCAN COMMAND FLOW
The sample command flow in case of BC-21 × 2, Color Mode, 360 dpi and 8.5" of print buffer 139 is described below:

| | |
|---|---|
| [DEFINE_BUF] | Define Print Buffer B (360 dpi, 12 bytes × 3,060 columns, . . . ) |
| [DEFINE_PULSE] | Define Heat Pulse Table (16 partition) |
| [DEFINE_CONTROL] | Define Buffer Control Table (BC-21 Color Mode) |
| [LOAD] | Paper Load (Letter size of Plain Paper, 8.5 inch × 11 inch) |
| [SKIP] | Raster Skip to the print position for the 1st scan |
| [DIRECTION] | Set Print Direction for the 1st scan |
| [EDGE] | Set Left and Right Edge of Head A for the 1st scan |
| [EDGE] | Set Left and Right Edge of Head B for the 1st scan |
| Loop 1: Begin | Repeat until [EJECT] command |
| [SPEED] | Select Print Speed for the 1st scan (6.51 Khz) |
| [DROP] | Select Droplet Size of Head A for the 1st scan |
| [DROP] | Select Droplet Size of Head B for the 1st scan |
| [SELECT_PULSE] | Select Heat Pulse Table to next scan |
| [SELECT_CONTROL] | Select Buffer Control Table of Head A for the 1st scan |
| [SELECT_CONTROL] | Select Buffer Control Table of Head B for the 1st scan |
| Loop 2: Begin | Repeat 18 times for 9 Block (4.5 inch/ 0.5 inch) × 2 Head (Head A and Head B) |
| [BLOCK] | Select Print Block |
| Loop 3: Begin | Repeat 4 times for 4 Color (Yellow, Magenta, Cyan, Black) |
| [COLOR] | Select Print Color |
| [DATA] | Image Data Transmission (540 byte/block) |
| Loop 3: End | |
| Loop 2: End | |
| [DIRECTION] | Set Print Direction for the 2nd scan |
| [EDGE] | Set Left and Right Edge of Head A for the 2nd scan |
| [EDGE] | Set Left and Right Edge of Head B for the 2nd scan |
| [PRINT] | Print Execution for the 1st scan |
| [SKIP] | Raster Skip to the print position for the 2nd scan (24 raster) |
| [SCAN] | Scan Test Pattern and Store Data in RAM |
| [SENSOR_RESULTS] | Transmit Scanning Results |
| [NVRAM] | Write compensation parameters into EEPROM |
| [EJECT] | Paper Eject (Eject Only) |

Once the test pattern has been printed, in step S3409 host processor 23 outputs a scan [SCAN] command to printer 30 which initiates a scan of the printed test pattern by sensors 82 on print heads 130a and 130b. Specifically, upon receiving the [SCAN] command, each print head 130a and 130b will return to home location 87 at which time covers of each sensor 82 are uncapped and a sheet of paper on which a test pattern is printed is advanced so as to align the printed test pattern with sensors 82.

Each sensor 82 scans a portion of the printed test pattern which has been printed by its corresponding print head, and stores the resulting test pattern data (e.g., alignment measurements) in RAM 129. This test pattern data is 8-bit digitized data obtained from analog-to-digital conversion of the output voltage level of sensor 82.

The test pattern data stored in RAM 129 remains there until host processor 23 sends a status request [SENSOR_RESULTS] command to printer 30.

Upon receiving the [SENSOR_RESUlTS] command, in step S3410 printer 30 transmits the test pattern data stored in RAM 129 to host processor 23. When the data is received, host processor 23 retrieves compensation equations from disk 25 and uses the equations with the received data in order to derive compensation parameters. Once the compensation parameters are computed, host processor 23 sends a [NVRAM] control command to printer 30 which causes printer 30 to write the compensation parameters into EEPROM 132 in step S3411.

As stated previously, EEPROM 132 stores separate parameters and measurements for each print head 130a and 130b and compensation parameters are separately computed and downloaded based on each print head's alignment and optical density. An example of the type of compensation parameters downloaded by host processor 23 is shown in Table 4 below.

TABLE 4

Contents

Printer Id
Head Id (Head A)
Status (Head A)
X-Align (Head A)
Y-Align (Head A)
Frd-Align (Head A)
Rev-Align (Head A)
Fwd_Optical Density (Head A)
Bwd_Optical Density (Head A)
Head Id (Head B)
Status (Head B)
X-Align (Head B)
Y-Align (Head B)
Frd-Align (Head B)
Rev-Align (Head B)
Fwd_Optical Density (Head B)
Bwd_Optical Density (Head B)
Reserved The information and parameters shown above relate to alignment of print heads 130a and 130b as well as the optical density of an image printed by each print head 130a and 130b. This information is utilized by host processor 23 when sending print head command signals to print heads 130a and 130b during a print operation.

Returning to the flow diagram in FIG. 34, in step S3411, printer 30 awaits further commands from host processor 23.

In step S3413, host processor 23 sends a status request [DATA_SEND] command to printer 30 and printer profile parameters are again registered with host processor 23. The [STATUS] commands may be sent to printer 30 at specific time intervals or after a specific printer event such as replacing a print head. Next, in step S3414 host processor 23 utilizes the printer profile parameters in order to compensate for physical characteristics and variations in each of print heads 130a and 130b as well as the inks in ink cartridges attached to each print head 130a and 130b when sending print information to each of print heads 130a and 130b.

Therefore, printer 30 memorizes a profile individually or separately from host processor 23. That makes it possible for another host processor to read the registered profile from printer 30 in order to compensate for physical characteristics related to printer 30.

7.0 Scheduling Cleaning Of Print Heads

In brief, one aspect of the invention disclosed in this embodiment is an ink jet printer which includes an interface for interfacing with a host processor and for receiving print data, print commands, and real time/date information from the host processor, a memory for storing the print data, print commands and real time/date information, a print engine for printing an image in accordance with the print data and print commands, the print engine controlling at least one print head to print the image, and a processor for controlling processing events of the print engine based on the real time/date information received via the interface from the host processor and based on printer-related events.

More specifically, since print head nozzles clog due to bubbles or dry ink being trapped therein, print heads 130a and 130b of printer 30 must be cleaned. The cleaning process consists of moving a print head to its home location where rotary pump 294 suction ink from the print head. Resulting waste ink is deposited into a waste storage area, such as a waste well, where the waste ink eventually evaporates over time. It is important to clean print heads 130a and 130b after a predetermined time, which in the present invention has been determined to be an elapse of seventy-three (73) hours since a last cleaning. If this is not done, print head nozzles may clog, thereby adversely affecting print quality. In addition, in order to ensure proper operation of ink jet printer 30, each print head 130a and 130b is cleaned at ink cartridge installation and each time an ink cartridge is replaced.

As discussed previously, with the exception of event-scheduled cleaning, printer 30 performs a print head cleaning based on an elapsed time. The elapsed time is calculated by determining how much time has elapsed since a last cleaning. An example of manual initiation of a cleaning operation is described above in section 5.0. The determination of elapsed time is based on a real-time/date stamp which is downloaded from host processor 23 at the beginning of every print job. In this manner, printer 30 will be able to keep track of how much time has elapsed since the last cleaning process.

The foregoing process will now be discussed in greater detail with respect to the flow diagram in FIG. 35. Upon installation and applying power to printer 30 for the first time, in step S3501, a hard power-on begins a cleaning schedule process for printer 30. In steps S3502 and S3503, CPU 121 of printer 30 performs its power-on self-test initialization programs by executing process steps stored in ROM 122. CPU 121 uses these programs to check on and define various hardware parameters. In step S3504, CPU 121 reads the various parameters stored in EEPROM 132. These parameters have been discussed above in section 6.0. For the purpose of this aspect of the invention, CPU 121 is interested in a last cleaning time listed for each print head 130a and 130b. It is this information which is required for scheduling a next cleaning time. However, if EEPROM 132 has not been initialized yet, the last cleaning times will be set to zero.

As explained above, EEPROM 132 maintains profile information on all print heads used in printer 30. Therefore, in the presently-disclosed embodiment, EEPROM 132 maintains last cleaning times for print heads 130a and 130b in separate memory locations. Each cleaning time also is stored with a check sum value. That is, the cleaning times are secured with data error correction by check-sum processing or CRC check processing. Both the cleaning times and check-sums are mirrored in separate locations or EEPROM 132 in order to prevent loss of the cleaning times which may occur at an accidental power-down, or if a hard-on reset occurs during the middle of a writing operation to EEPROM 132. As a result, at least one set of cleaning times is quarantined even if an accident occurs.

In step S3505, CPU 121 resets variables Delta A_A, which represents an elapsed time since print head A (e.g., print head 130a from FIG. 10) was last cleaned. This variable, when enabled, is incremented in one second intervals and is cleared after every hard power-off. Similarly, CPU 121 also resets Delta A__B for a print head B (e.g., print head 130b from FIG. 10). CPU 121 resets other indicator flags at this time, such as FlagRealTime Active which indicates whether a real-time has been set or not, FlagRealTime Reset which indicates whether the real-time has been reset or not, FlagRecordYet__A which indicates that Delta T__A value indicates the time of the last cleaning of print head A only when the real-time is not yet set, and FlagRecordYet__B which indicates similar information from print head B. Each of the variables and flags which are set and reset during the cleaning scheduling process of the present invention are listed below in Table 5.

TABLE 5

| Variable/Flag | Definition |
| --- | --- |
| RealTime | This indicates that the current time and its values are valid only when FlagRealTimeActive is set. Also, this will be incremented at every one second if the value is valid. |
| Delta T__A | This indicates the passed time of A-head from the last cleaning and its value is valid only when FlagRealTimeActive is reset. Also, this will be incremented at every one second if it is valid. |
| Delta T__B | This indicates the passed time of B-head from the last cleaning and its value is valid only when FlagRealTimeActive is reset. Also, this will be incremented at every one second if it is valid. |
| FlagRealTimeActive | This indicates whether or not the RealTime flag has been set. |
| FlagRealTimeReset | This indicates whether or not the RealTime flag has been reset. |
| FlagRecordYet__A | This indicates whether the Delta__A value is indicating a passed time from the last cleaning of A-head only when RealTime flag is not yet set. |
| FlagRecordYet__B | This indicates whether the Delta__B value is indicating a passed time from the last cleaning of B-head only when RealTime flag is not yet set. |

In step S3506, CPU 121 determines if the last cleaning time for each of the print heads equals zero. In this regard, in a case that the printer is newly installed, these variables will read zero. Therefore, in step S3507, the elapsed time since cleaning print head A will be set to a predetermined time, which, as noted above, is 73 hours. As a result, upon performing a soft power-on, printer 30 will perform a cleaning operation on print head A. Steps S3508 and S3509 perform similar processing for print head B.

In step S3510, CPU 121 enables the cleaning schedule process. In step S3511, CPU 121 awaits a soft power-on and commands from host processor 23. In the case of an initial installation, a cleaning process will be performed on each print head at this step.

7.1 Cleaning Schedule Process

Figure 35:
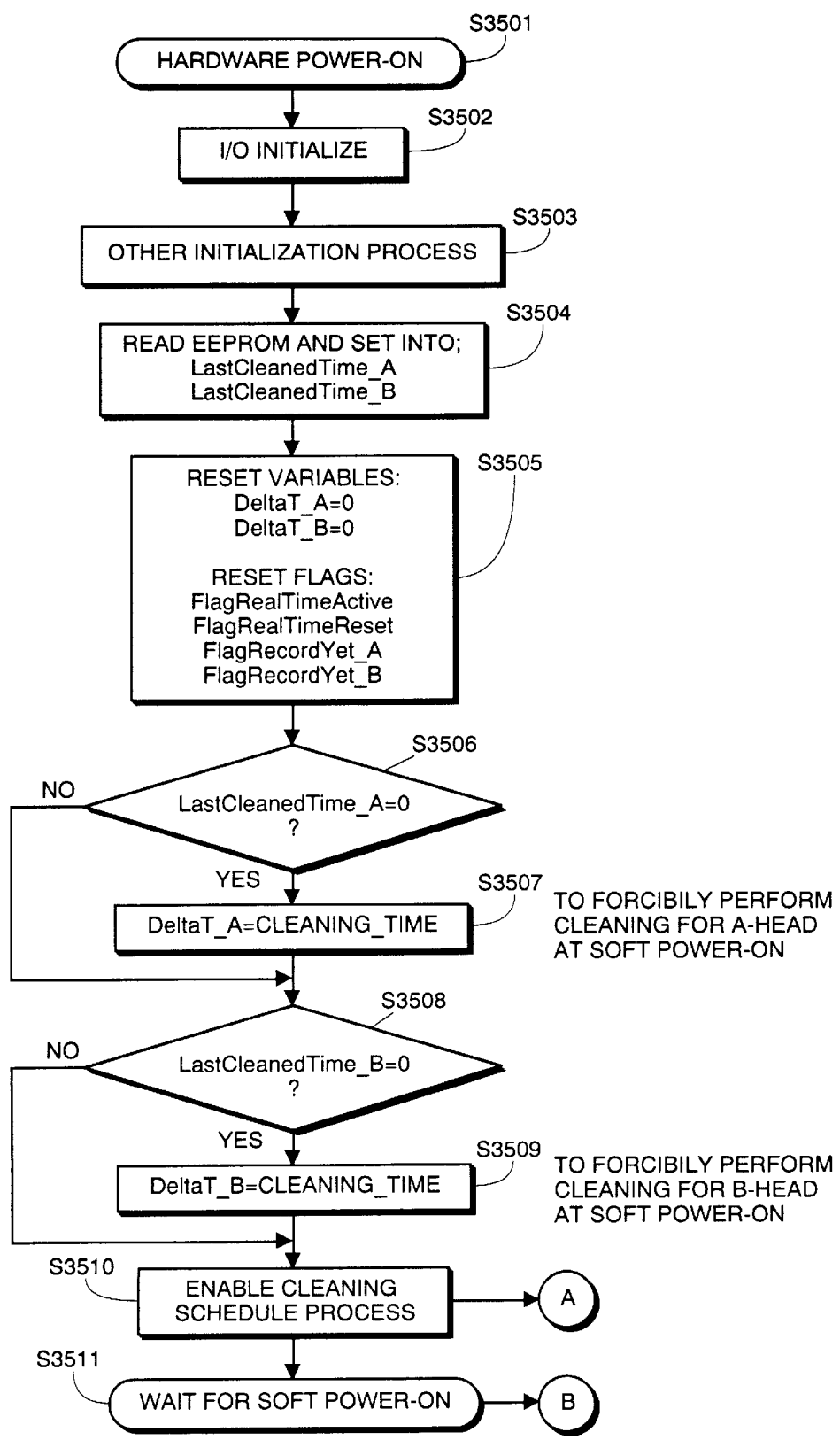
FIG. 35 is a flowchart showing time based cleaning performed in accordance with the present invention.
Figure 36:
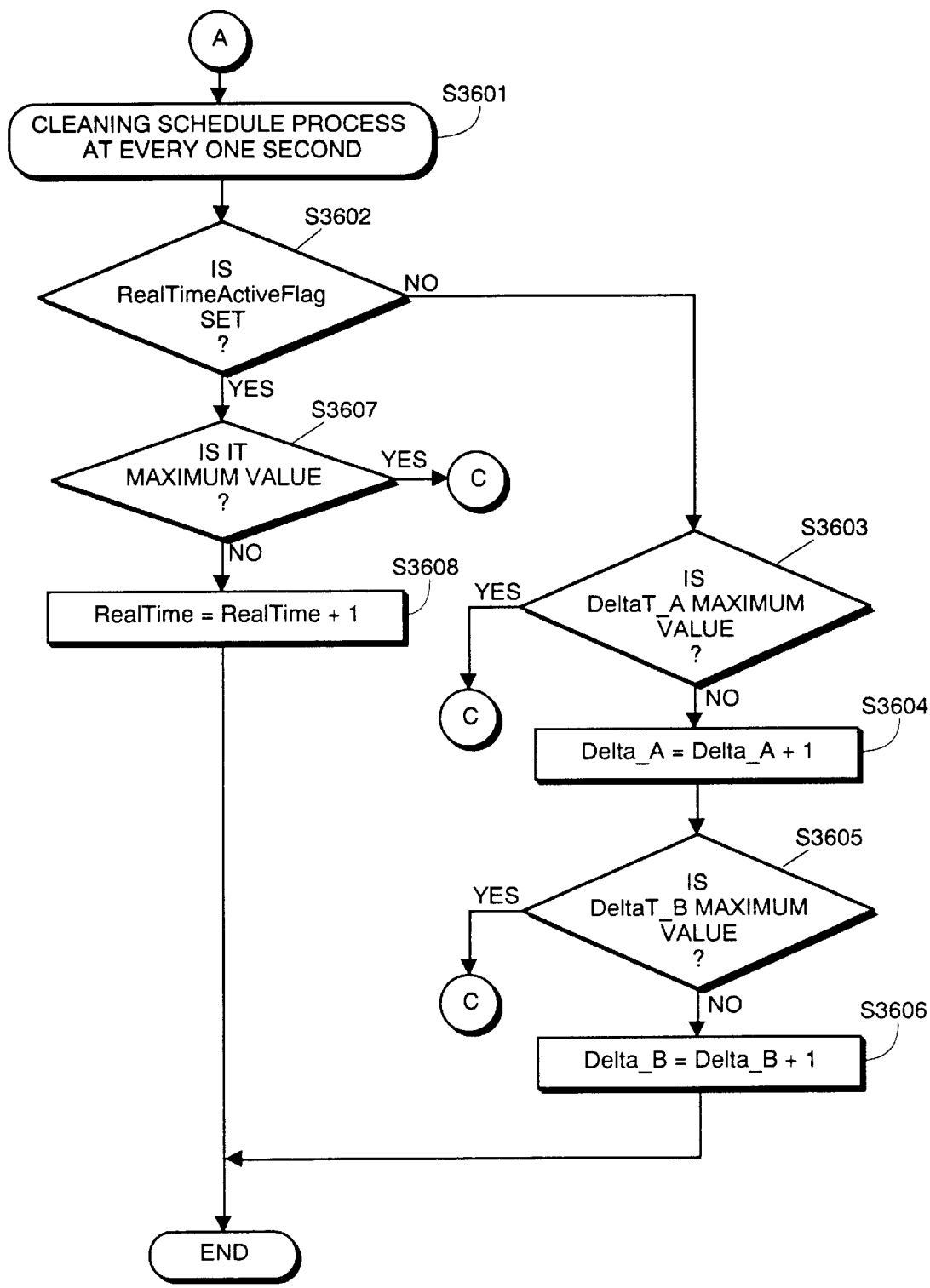
FIG. 36 is a flowchart showing the steps by which the printer of the present invention maintains an elapsed time schedule.

As discussed above, after initialization, CPU 121 enables a cleaning schedule in step S3510 of FIG. 35. The manner by which an elapsed time schedule is maintained will now be discussed in greater detail with respect to the flow diagram shown in FIG. 36. The shown process is performed at every one second in the case the cleaning process has been enabled as an interrupt process.

Specifically, in step S3601, the cleaning schedule process is enabled and the elapsed time is incremented every second for both print heads A and B. In step S3602, it is determined if the FlagRealTimeActive has been set. This flag will indicate that a real-time has been downloaded from host processor 23. In the case this flag has not been set, flow proceeds to step S3603, in which it is determined if the elapsed time since the last cleaning of print head A has reached the predetermined maximum time of 73 hours or the maximum value of its variable range. If it has, then flow proceeds to the automatic cleaning process, discussed below. Alternatively, if the value of DeltaT__A reaches maximum value, it can be ignored and reset. This will prevent the value from overflowing in memory.

If the time since last cleaning has not reached the maximum time, then in step S3604 Delta T__A is incremented by one second. This process is performed because printer 30 may sit idle for more than 73 hours before receiving a real-time. If this is the case, cleaning will be performed based on an elapsed time from the printer 30's internal clock, later on at soft power-on, or at the automatic cleaning procedure. A similar process is performed for print head B in steps S3605 and S3606.

In the case that the FlagRealTimeActive has been set, which means that host processor 23 has downloaded a time/date stamp, in step S3607, it is determined if the RealTime reaches the maximum value of 73 hours or at the maximum value of its variable range. If it has, then flow proceeds to the automatic cleaning sequence, discussed below. Alternatively, if the value of RealTime reaches the maximum value, it may be ignored and reset. This prevents the value from overflowing in memory. On the other hand, if the real-time has not reached the maximum value, then the real-time is incremented by one second in step S3608.

Figure 37:
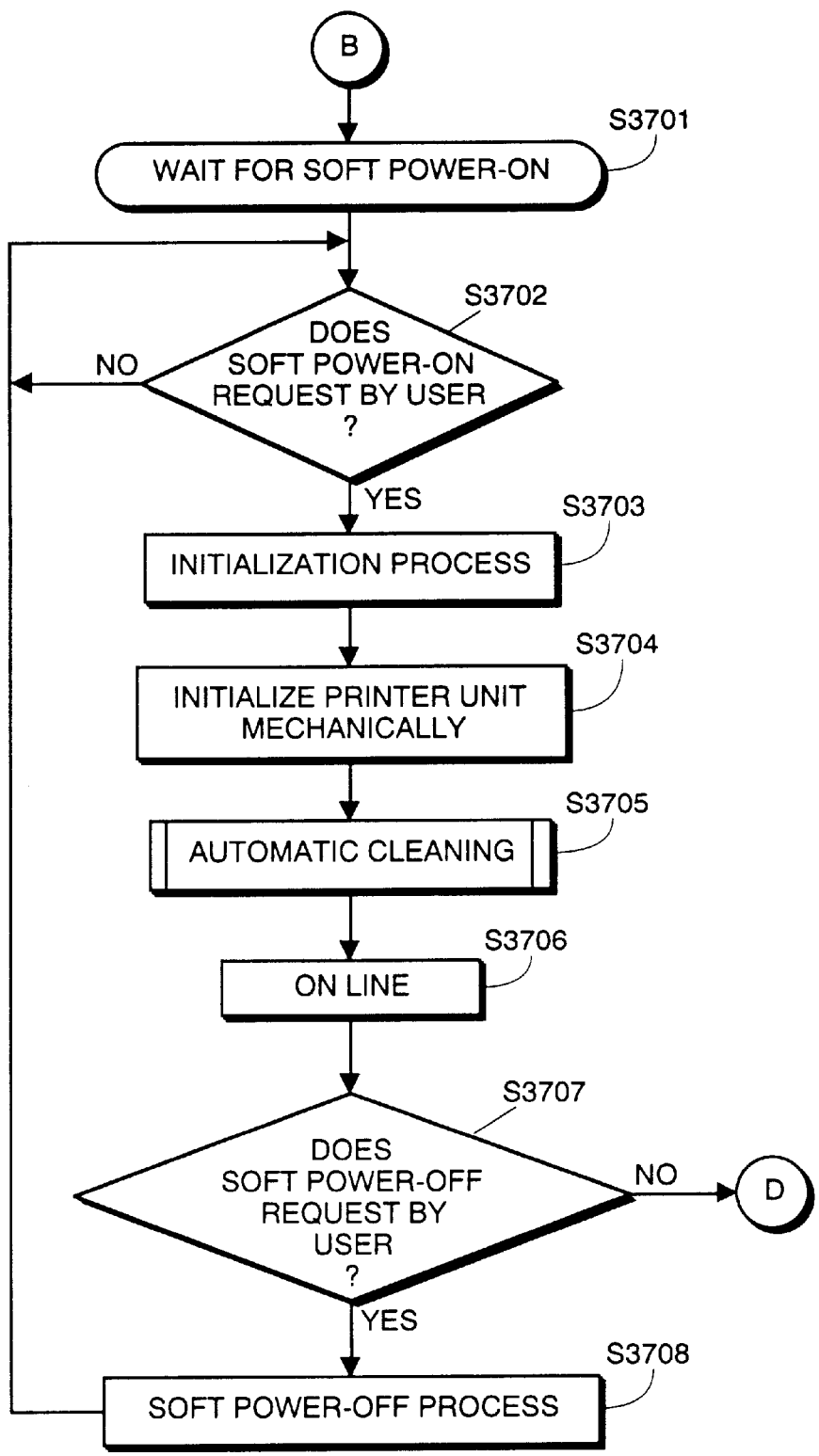
FIGS. 37, 38, 39 and 40 are flowcharts showing the automatic cleaning sequence performed by the printer of the present invention.

Returning to step S3511 of FIG. 35, upon soft power-on, flow proceeds to step S3701 in FIG. 37, which waits for a soft power-on. Next, in step S3702, CPU 121 determines if the user has requested a soft power-on. If the answer is yes, then in steps S3703 and S3704 CPU 121 performs initialization of software programs and printer unit mechanics. Upon completing initialization, CPU 121 directs, in step S3705, each print head to perform an automatic cleaning operation if needed (the automatic cleaning operation will be discussed in greater detail below).

After performing the automatic cleaning operation, printer 30 goes online in step S3706 and awaits either print commands from host processor 23 or a soft power off entered by the user in step S3707. If neither of these events occurs, printer 30 remains in a wait state for commands from host processor 23. On the other hand, if a soft power-off request has been received, printer 30, in step S3708 performs its soft power-off process by performing a status check and updating parameters in EEPROM 132 based on the current status of printer 30.

In the present invention, printer 30 awaits commands from host processor 23, such as a command to print a test pattern, scan the test pattern and so on. One command which printer 30 looks for is the universal coordinated time (UCT) which provides a time/date stamp to printer 30. The UCT command is used to set the current time in printer 30, and must be sent to printer 30 at the onset of a print job start. Printer 30 uses the time to determine whether or not printer 30 should recover print head. The time value is expressed as the number of seconds elapsed since midnight (00:00:00), Jan. 1, 1970, Universal Coordinated Time (UCT) according to the system clock of host processor 23. In this regard, the UCT command is downloaded at the beginning of a print command such that each print command is preceded by the UCT command. However, it is to be noted that only after a hard power-off is there a need to store the downloaded time/date stamp since the time which is incremented by printer 30's own internal clock is cleared from memory at hard power-off.

Figure 38:
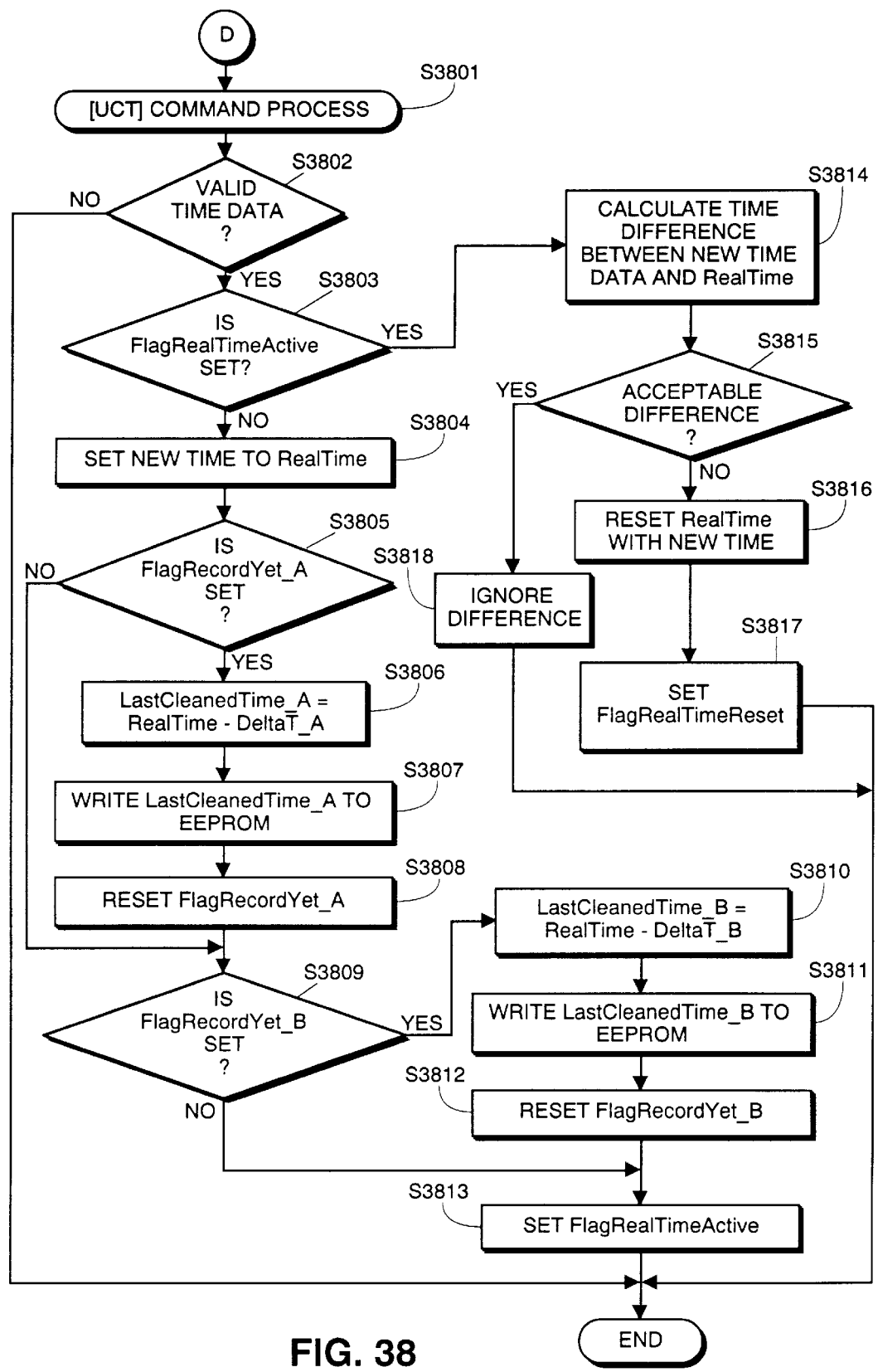

Thus, with reference to the flow diagram of FIG. 38, in step S3801, host processor 23 sends a UCT command. In step S3802, it is determined if the time and date are valid. In this regard, it is possible that a downloaded time/date stamp is invalid, e.g., if printer 30 has been connected to a host processor which has an internal clock that is ahead of the real-time clock of host processor 23. In some instances, a time and date could be later than the actual last time and date stored in printer 30. If the time/date is not valid due to data formatting error or value out of range, etc., then the flow will proceed to the automatic cleaning process described in detail below. Alternatively, if the time is invalid, an error processing program may be executed, or the invalid time may be ignored.

If, in step S3802, it is determined that the current time and date are valid, flow proceeds to step S3803. In step S3803, it is determined if the real-time has actually been stored in printer 30. For example, FlagRealTimeActive may not be set. This will be the case when no real-time has yet been set in printer 30, as would normally occur when printer 30 is being used for the first time and no print jobs have been printed. If FlagRealTimeActive has not been set, then in step S3804 the current time and date provided at the beginning of the print job is set as the real-time.

Flow then proceeds to step S3805. In step S3805, CPU 121 determines, in the case the real-time has not been set, whether the elapsed time for a print head A, such as print head 130a from FIG. 10, corresponds to a time of the last cleaning of print head A. If it is determined that the elapsed time has been recorded, then in step S3806, printer 30 determines the last cleaning time by subtracting the real-time from the stored elapsed time. In step S3807, the last cleaning time is written to EEPROM 132 and, in step S3808, FlagRecordYet_A is reset for print head A. Similar processing is performed for a print head B, such as print head 130b from FIG. 10, in steps S3809 to S3812. In this manner, the last cleaning time and check-sum are updated and are written to EEPROM 132 in separate respective memory locations for each print head A and B.

Returning to step S3805, if FlagRecordYet_A and FlagRecordYet_B have not been set, flow proceeds to step S3813 where FlagRealTimeActive is set in order to indicate that the real-time has been set.

Returning to step S3803, if the real-time has been stored from a previous printing operation and it is determined to be a valid time, flow proceeds to step S3814 in which previously-downloaded new time data is compared to the real-time data. If the differences between the new time data and the real-time data are acceptable in step S3815, then the difference is ignored in step S3818 and flow proceeds.

On the other hand, if step S3815 determines that the differences are not acceptable due to a change in the host's real-time clock or an error in the printer's internal clock, in step S3816, the real-time is reset with the new time data. In step S3817, FlagRealTimeReset is set so as to indicate that the real-time has been reset. As a result, the new time data will be used to calculate when the automatic cleaning should be scheduled for print heads A and B. This prevents a cleaning process from occurring even if a user accidently resets the host computer's real-time clock to some distant time in the future followed by a print job and [UCT] command and then reset back to actual current time.

7.2 Automatic Cleaning Process

Figure 39:
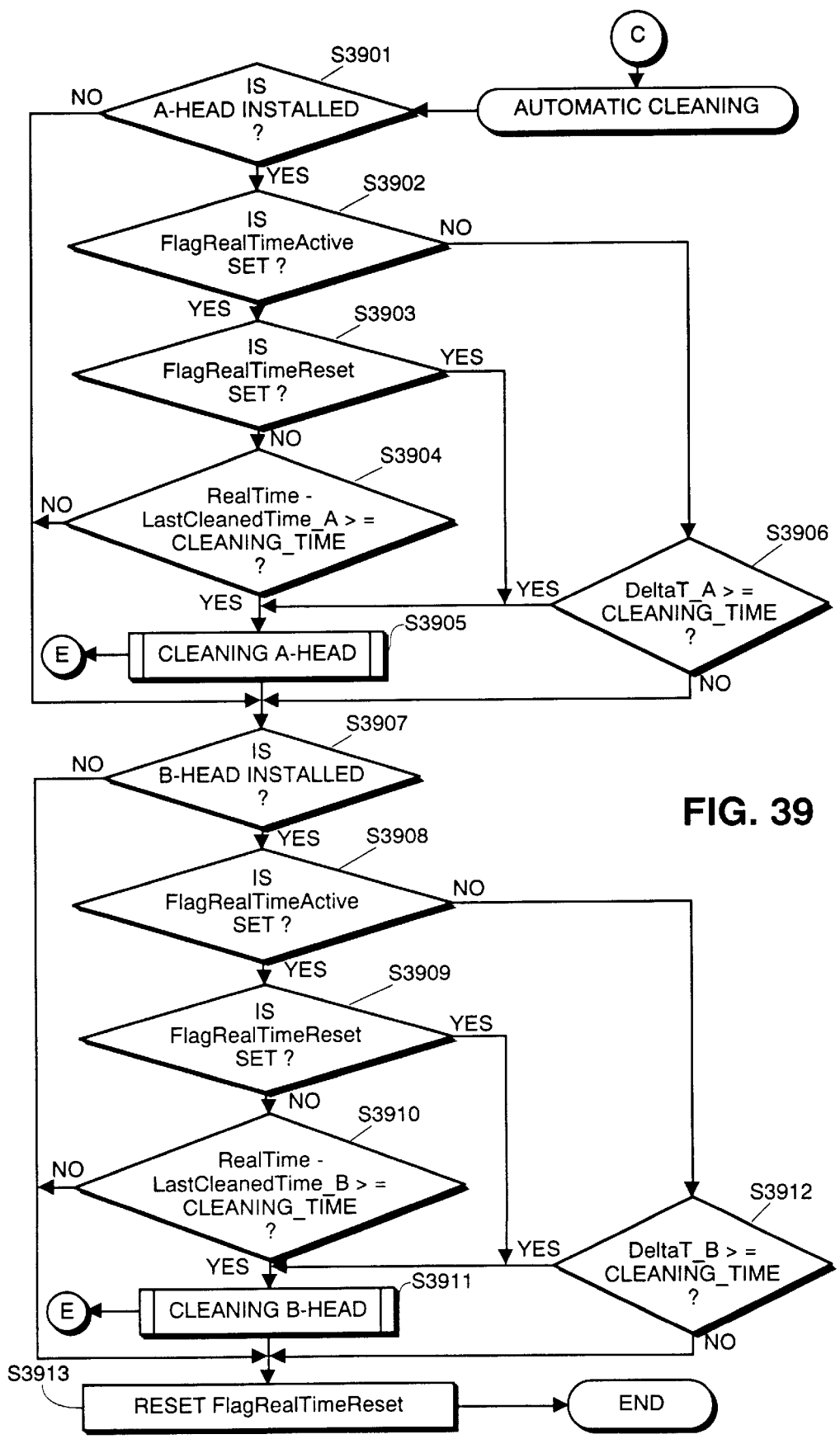

FIG. 39 describes the automatic cleaning process. If cleaning is the result of an initial use of printer 30 or is a result of a time scheduled cleaning, in step S3901, it is determined if print head A exists in the printer. If print head A does exist in step S3901, CPU 121 checks to see if FlagRealTimeActive has been set. If yes, flow proceeds to step S3902 to check to see if FlagRealTimeReset has been set. If no, then CPU 121 calculates the Cleaning Time by subtracting the last cleaning time for print head A stored in EEPROM 132 from the real-time. If the difference is greater than the preset cleaning time of 73 hours, then in step S3905, print head A is cleaned. However, if the difference is less than the preset cleaning time, then flow proceeds to step S3903 and FlagRealTimeReset is set so that the new time data is reset as the real-time. In this case, print head A is forcibly cleaned, because real-time has been reset in step S3817.

Reverting to step S3902, if FlagRealTimeActive is not set flow proceeds to Step S3906. In step S3906, the elapsed time for print head A is compared to the Cleaning Time. If greater than or equal to 73 hours has elapsed since print head A was cleaned, and print head B is not installed, flow proceeds to step S3913 at which time FlagRealTimeReset is reset. Step S3913 will normally be executed when printer 30 has not been used since a hard power-on.

In the case that print head B is installed, similar processing is performed for print head B in steps S3907 to steps S3912.

7.3 Cleaning Of A Print Head

Figure 40:
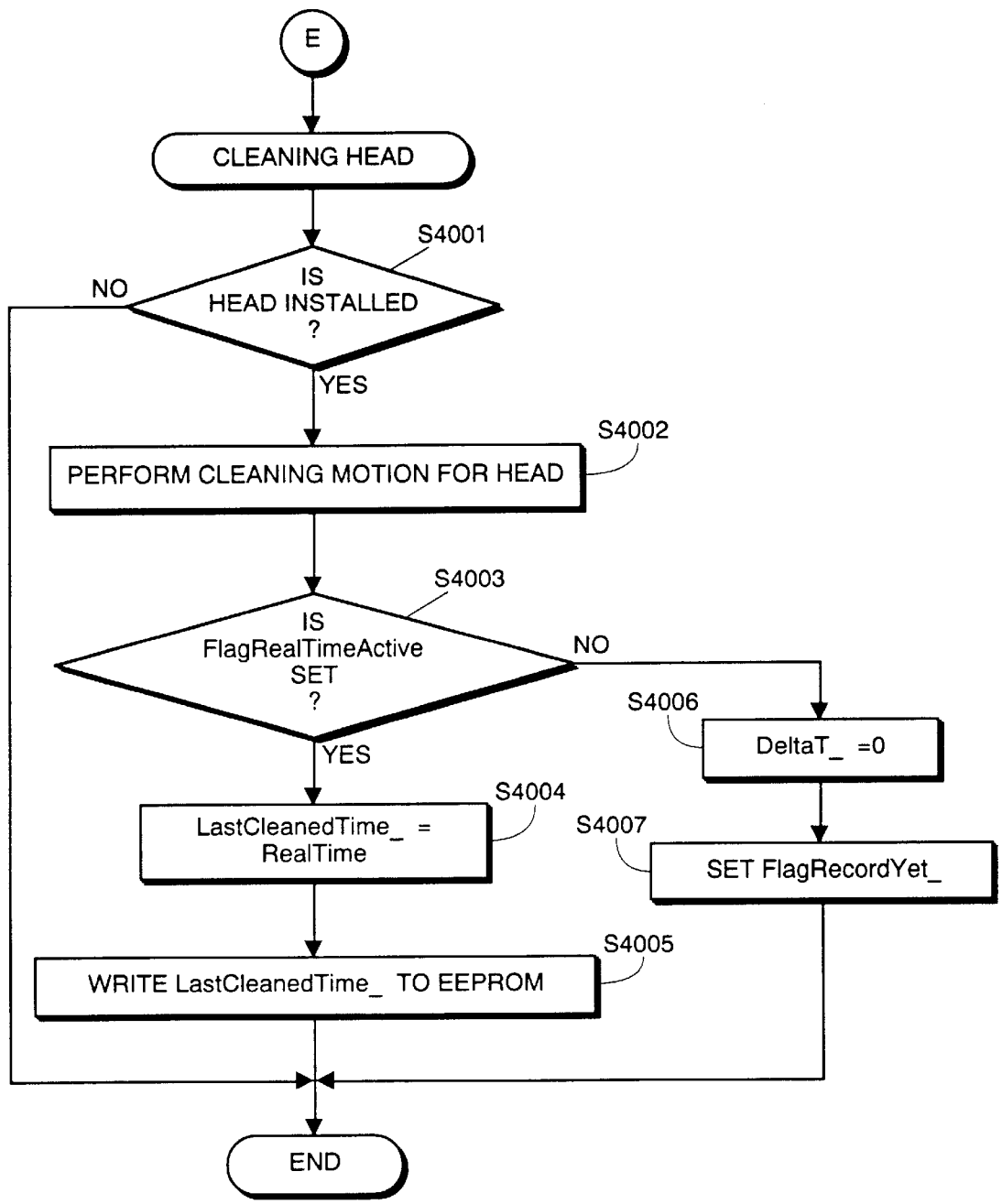

FIG. 40 is a more detailed description of the operations performed in steps S3905 and S3911 of FIG. 39. In step S4001, it is determined if a print head is installed. If it is determined that a print head is installed in step S4001, a cleaning operation is performed in step S4002. The cleaning operation consists of moving the print head to its home location, aligning nozzles on the print head to be cleaned with print head connection cap 88a (see FIG. 4), suctioning ink from the nozzles, and depositing waste ink in a waste well. The number of droplets sucked from the print head is counted and this information is updated in EEPROM 132 in the same manner as discussed above with respect to updating last cleaning times.

In step S4003, it is determined if FlagRealTimeActive is set. In the case that the flag is set, the last cleaning time of the cleaned print head is set as the real-time in step S4004. In step S4005, the real-time, which is the last cleaning time of the print head, is written to EEPROM 132.

Returning to step S4003, if FlagRealTimeActive is not set, since a UCT command has not been downloaded to the printer in the last 73 hours, in step S4006 the elapsed time is set to zero and FlagRecordYet for the particular print head is set in step S4007. This will indicate that the real time has not been set in step S4007 and the elapsed time counter restarts.

Figure 41:
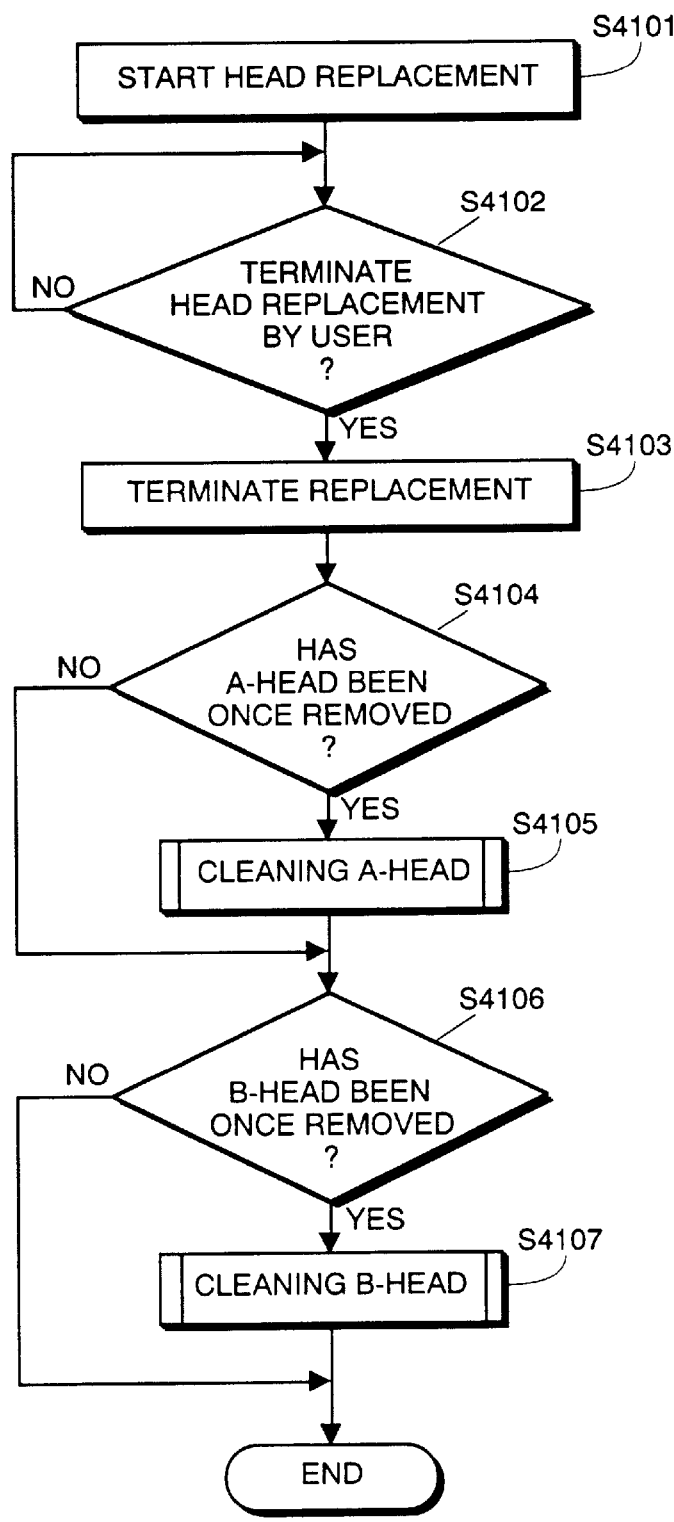
FIG. 41 is a flowchart showing ink cartridge head replacement in accordance with the present invention.

As mentioned previously, cleaning of a print head will be performed in the case that the print head or the ink cartridge has been replaced. FIG. 41 is a detailed flow diagram regarding the cleaning of a print head following such an event.

In step S4101, print head replacement processing begins. In step S4102, CPU 121 awaits the termination of a head replacement mode by the user. In step S4103, the replacement process is terminated. Therefore, in step S4104, CPU 121 checks to see which head has been removed; i.e., which print head has engaged and disengaged a circuit contact on its corresponding cartridge receptacle. If print head A has been removed, then in step S4105 print head A is cleaned. The cleaning is performed in the same fashion as described with respect to the flow in FIG. 40. Similar processing is performed for print head B in steps S4106 and S4107.

Figure 42:
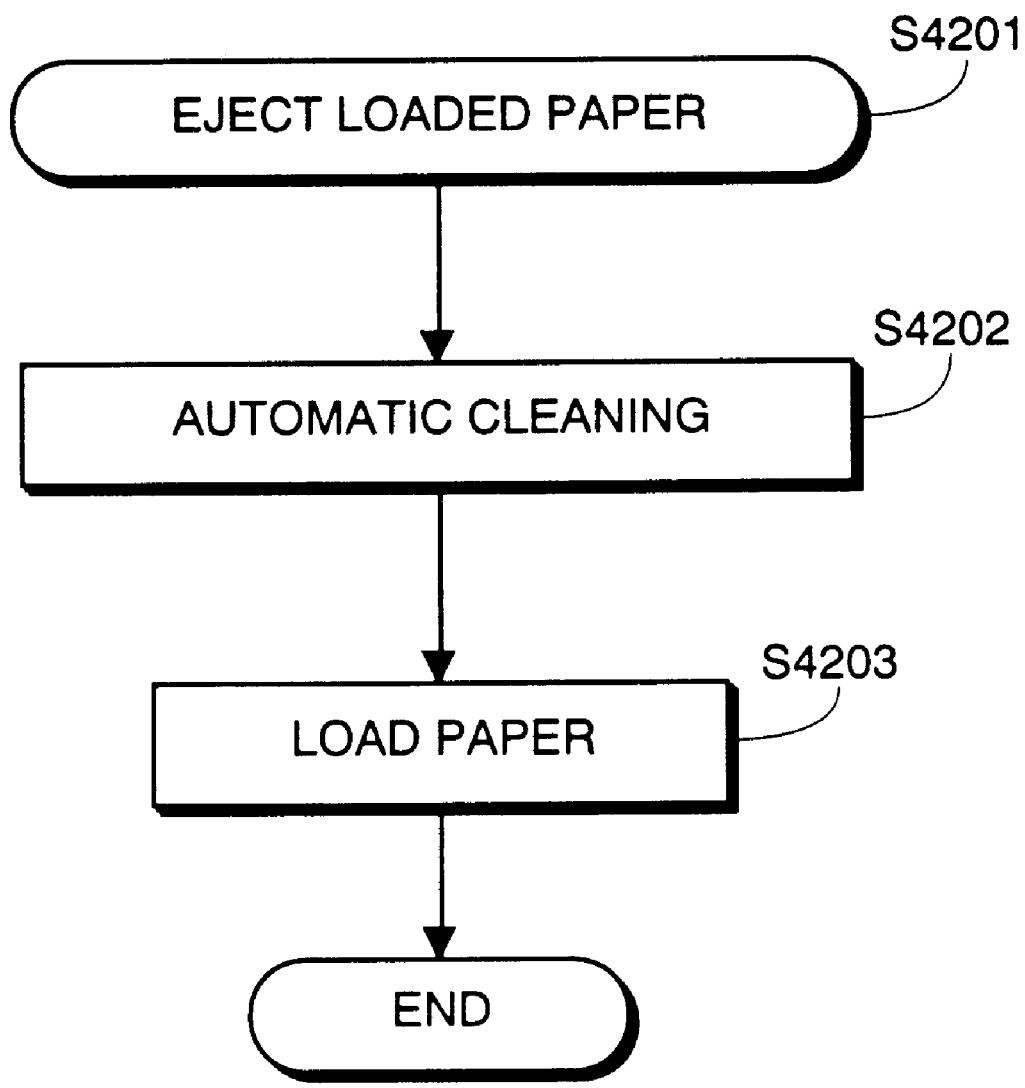
FIG. 42 shows steps which are performed when paper is loaded in the printer of the present invention and an automatic cleaning sequence is initiated.

The flow diagram in FIG. 42 describes what occurs when an automatic cleaning process is scheduled and paper has been loaded into a printing position in printer 30. In the case that paper has been loaded into the printing position and an automatic cleaning has been scheduled, the paper is ejected by a command in order to complete the printing in step S4201. Once the paper has been ejected, automatic cleaning of one or more print heads is performed in step S4202. Following the automatic cleaning process, a new paper is loaded into the printing position in step S4203. In this regard, steps S4201 and S4202 will be executed following every automatic cleaning regardless of whether a paper was previously loaded.

Figure 43:
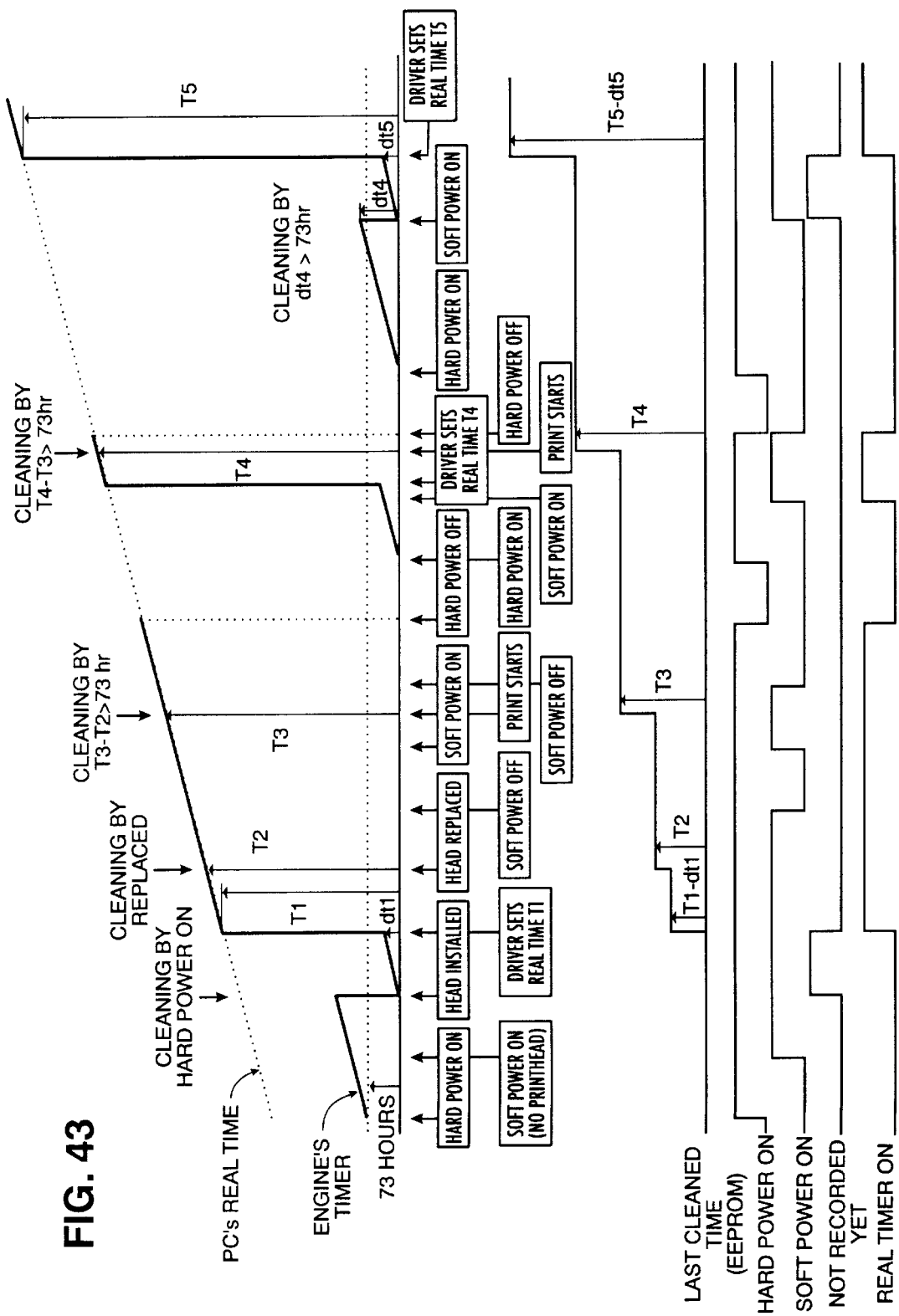
FIG. 43 is a timing diagram showing a cleaning schedule in accordance with the present invention.

FIG. 43 is an example of a typical cleaning schedule for a print head, which is performed in accordance with the present invention as described above with respect to FIGS. 35 to 42. Before describing the typical cleaning schedule, it should be understood that printer 30 maintains separate cleaning times and cleaning schedules for each of print heads 130a and 130b. The reason for this is that one print head may be replaced before the other or one may not be used in a 73 hour period. For example, when printing only text documents, the black print head will be used more than the colored print head. Therefore, the black print head may need to be cleaned more frequently than the color print head. That is, it may not be necessary to clean the color print head until immediately before a printing even if it has been more than 73 hours from last cleaning and soft power-on has occurred. In this manner, ink may be saved.

FIG. 43 is a time table which shows five separate time periods (T1–T5) being downloaded to printer 30. The time periods shown in FIG. 43 begin at a time period of when the printer is first installed.

At initial hard power-on, printer 30 performs its initialization process and the last cleaning times are read from EEPROM 132. Because it is the first power-on, all flags and variables are reset. As discussed above, this reset will initiate a cleaning process upon the soft power-on. In the example shown in FIG. 43, because a soft power-on is performed prior to installing a head into the printer, a cleaning will not be performed until the head is installed. Once the head is installed, an automatic cleaning is performed for each of print heads 130a and 130b. The Delta_T variable is set to 0 for all print heads and FlagRecordYet is set as discussed above in steps S4006 and S4007.

Once the print heads are cleaned and software has been initialized, printer 30 goes online. Recognizing that printer 30 is online, host processor 23 sends the first print job and a universal coordinated time (UCT) command, which provides the current date and time stamp. When the UCT command is received for the first time, FlagRealTimeActive is set and the new time is set as the real-time. In the present example, because the last cleaning was less than 73 hours since the print head was installed, an automatic cleaning process is not performed at T1.

In the time chart example shown in FIG. 43, the next time at which a cleaning time is set is when the head is replaced at T2 and it is at this time that cleaning will take place regardless of elapsed time.

As mentioned previously, the UCT command prefaces every print command. Therefore, according to this sample time chart shown in FIG. 43, a print command provides the next new time data at T3. Assuming that it is a valid time and FlagRealTimeActive has been set, the difference between the new time data and the real-time data is calculated. In the case shown in FIG. 43, the difference between time T3 and time T2 is greater than 73 hours, and a cleaning is performed. Since the internal clock of printer 30 has been active since the previous date stamp, the elapsed real-time should be the same as the new real-time downloaded at the beginning of the print job. As a result, there is no need to store the newly downloaded time.

Following printing of the print job, printer 30 performs a hard power-off which clears all stored times. A hard power-on follows and resets all flags and variables. The hard power-on is followed by a soft power-on which places printer 30 online. Once online, the host processor sends a print job which is prefaced with a UCT command which provides the current time and date at T4. As discussed with respect to FIG. 38, since FlagRealTimeActive has not been set, the real-time that is download is stored as the new time and FlagRealTimeActive is set.

At this time, CPU 121 determines if print heads 130a and 130b are installed, if FlagRealTimeActive is set and whether FlagRealTimeReset is set. Because a new time has been provided by host processor 23, the difference between the real-time and the last cleaning time of a print head is calculated. As shown in FIG. 43, the difference between time T4 and time T3 is greater than 73 hours. As a result, a cleaning is preformed at T4.

Following the last print job, a hard power-off occurs which clears the stored times. The next hard power-on resets all variables and flags. As previously discussed, after a hard power-on, elapsed time variables are incremented in intervals of one second. As shown in the example in FIG. 43, a period of 73 hours elapses before the next soft power-on. As a result, a cleaning is performed. This cleaning is performed based on printer 30's own internal elapsed clock and not a real-time download because printer 30 has been idle for more than 73 hours without receiving a print job. Alternatively, cleaning of the print head, after 73 hours has elapsed on the internal clock, may not be required and may be rescheduled for immediately before a printing operation. By postponing cleaning until immediately before printing in this manner, ink can be conserved.

As mentioned above, EEPROM 132 can be replaced with any kind of non-volatile memory such as a static-ram with battery backup, or flash memory, etc. In this case information, including the last cleaning time discussed above, can be stored in similar types of non-volatile memory devices.

Furthermore, ROM 122 can be replaced with any kind of rewritable memory device, such as a flash memory, etc. In this case, such memory devices can receive program code downloaded to printer 30 via interface 104 of host processor 23 and host computer interface 141 of printer 30. It is also possible to utilize a memory device to memorize all information in a specific area of the memory device instead of EEPROM 132.

In addition, although communication line 106 was described as bi-directional, even a unidirectional interface can be used with this invention. More specifically, while the IEEE-1284 interface was implemented in the above description, any kind of interface like SCSI, USB (Universal Serial Bus), and IEEE-1394 (high speed serial bus interface), etc. may be used in its place.

Finally, the present invention was described using two print heads. However, it should be understood that this number could be increased or decreased. Likewise, the number of memory locations in EEPROM 132 and RAM 129 can be either increased or decreased based on the number of print heads used in printer 30.

8.0 Setting And Modifying Print Head Driving Parameters

Because print heads 130a and 130b are designed to be removable and replaceable into printer 30, and because different kinds of cartridges (such as cartridges having different nozzle configurations and different ink characteristics) can be loaded into print head receptacles 64a and 64b, printer 30 is pre-loaded with print head driving parameters for many different types of print heads. For example, the pulse width sequence for driving each individual nozzle so as to eject an ink droplet is heavily dependent on temperature of the print head, ink characteristics (for example, whether color or black and whether dye or pigment), temperature of the surrounding environment, ink droplet size, and the like. As a consequence, ROM 122 includes pre-stored tables defining driving pulse sequences for various head/ink/resolution combinations. The pre-stored tables in ROM 122 cover various known combinations of head/ink/resolutions, as well as anticipated combinations of head/ink/resolutions.

Likewise, parameters used to make internal calculations such as calculations of print head temperature are also dependent on each particular combination of printer head and nozzle configurations, ink type, and resolution. For the same reason, therefore, printer 30 includes within ROM 122 various tables of heat-up coefficients for known combinations of head/ink/resolution, as well as anticipated combinations of head/ink/resolution.

The inventors herein have recognized that it is not possible to anticipate all possible combinations of head, ink and resolution, and to pre-store suitable tables for all such combinations. The reason for this is simple: It is not known what new developments in printer heads and inks might occur in the future. At the same time, there is a desire to utilize printer 30 with any combination of head and ink and resolution that might occur in the future, without requiring a new set of tables in ROM 122. Particularly, new tables would require re-manufacture of printers, and an upgrade program to distribute new ROM's to existing customers.

The present invention addresses this desire by providing for modification of the values in pre-stored tables via commands from host processor 23, and by permitting real-time definition of print head control parameters from host processor 23. By virtue of these features, it is possible through the use of commands from host processor 23 to define print head driving parameters which are suitable for controlling the functionality of newly-developed cartridges, or other cartridges for which pre-stored tables in ROM 122 are not available, ordinarily without changing ROM tables or other printer hardware.

Briefly, according to this aspect of the invention, a printer controller that receives commands from an external processor controls a process function of a printer having a detachable cartridge based on the commands. The commands are capable of defining new cartridge driving parameters which are tailored to control functionality of new cartridges for which pre-stored driving parameters are not already available in the printer. Such parameters include, for example, timing for heat pulse sequences so as to eject ink droplets, heat-up coefficients for calculating print head temperatures needed for such heat pulse sequences, print speed, droplet size, buffer readout control, nozzle firing sequence, and the like.

Figure 43A:
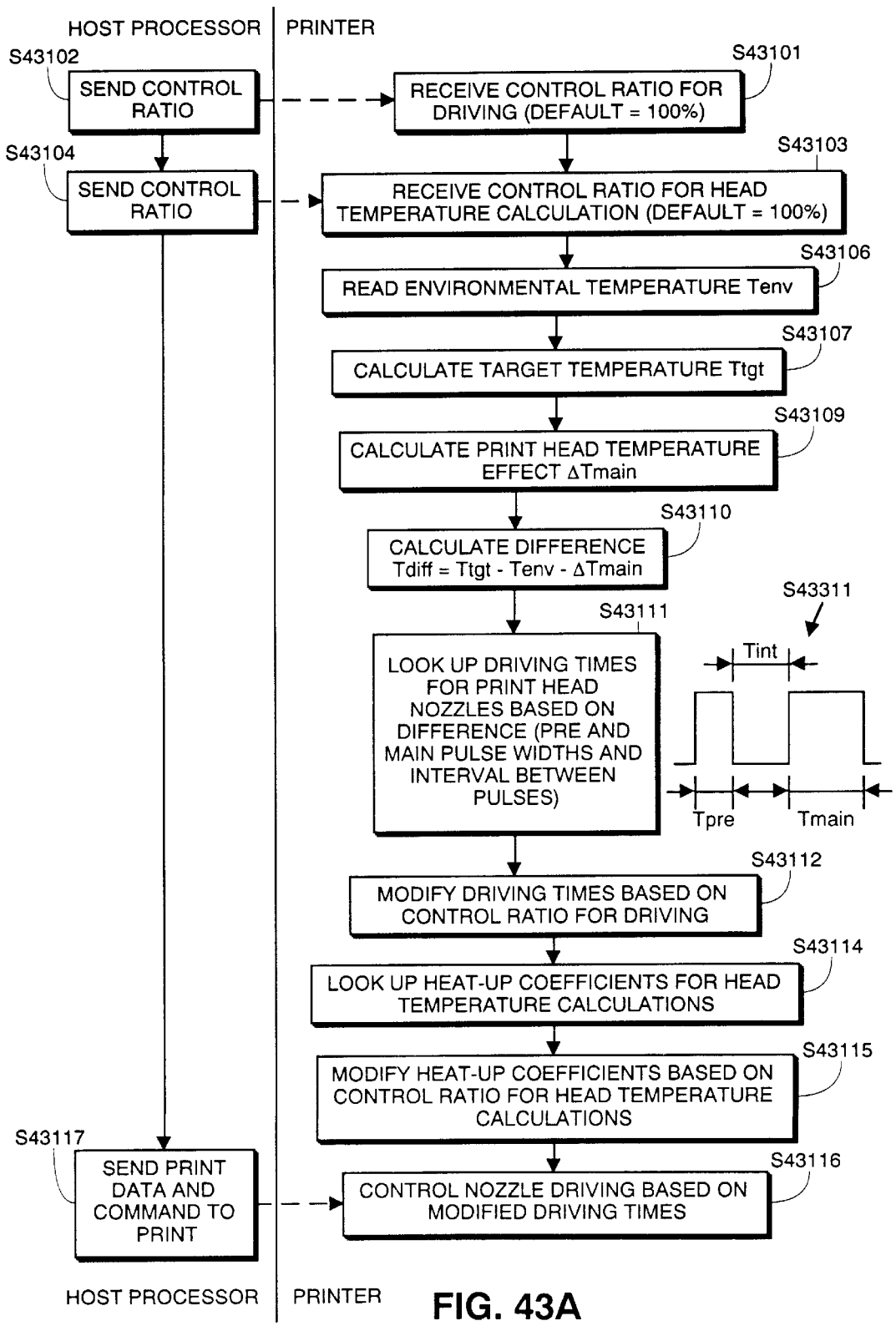
FIG. 43A is a flowchart for describing control of printer nozzle driving times.

FIG. 43A is a flow diagram illustrating a first embodiment of the invention, in which a command that defines driving control parameters for a print head is comprised by a command to modify values in pre-stored tables of print head driving conditions. Briefly, according to FIG. 43A, to control print head driving conditions in a printer having a pre-stored look-up table defining pre-stored print head driving conditions for at least one of plural detachable print heads, an external host processor sends a command to modify the pre-stored look-up table such as by modification through multiplication by a control ratio. A print controller obtains print head driving conditions form the pre-stored look-up table and modifies the print head driving conditions so as to obtain modified print head driving parameters. The modified print head driving parameters are then subsequently used for print operations.

In more detail, in step S43101, printer 30 receives a command to set a control ratio for driving a print head pulse width sequence. The command is sent by host processor 23 (step S43102), and in the absence of receiving any such command, printer 30 maintains a default value of 100%. The control ratio for driving that is received in step S43101 is a factor applied to look-up values from a pre-stored table in ROM 122, as described more fully below in step S43112.

In step S43103, printer 30 receives a command for a control ratio for head temperature calculations. The command is received from host processor 23 (step S43104), and in the absence of receipt of such a command, printer 30 maintains a default value of 100%. The control ratio for head temperature calculations is applied as a multiplication factor against pre-stored values of heat-up coefficients used for calculating head temperature, as described more fully below in connection with step S43115.

Preferably, steps S43101 through S43104 are effected through use of the change pulse ratio command ([PCR]) defined above in Section 3.6. As described above, the [PCR] command is used to change a ratio of pulse control tables such as a ratio of heat-up coefficients used for calculating head temperature, and such as changing a ratio of pulse widths for a pulse width driving sequence for each individual nozzle of print heads 130a and 130b when ejecting an ink droplet from the nozzle.

Flow continues in printer 30 with steps S43106 through S43115 which are executed repeatedly at cyclic intervals of, for example, 50 ms so as to maintain in real time the most current values for print head driving parameters. More specifically, as described above in connection with FIG. 23, steps S43106 through S43115 are executed at 50 ms cyclic intervals, for example, so as to calculate head temperature and to derive pulse width timings for a pulse width sequence applied to eject an ink droplet from a nozzle, together with other tasks also executed at 50 ms intervals.

Referring again to FIG. 43A, step S43106 reads current environmental temperature ($T_{env}$) from an unshown thermistor in printer 30. The current environmental temperature may be the most current value read from the thermistor, or more preferably the actual value read from the thermistor is subjected to low pass filtering so as to smooth any irregularities, discount bad readings of the thermistor, remove noise such as analog-to-digital sampling noise, and the like.

Based on the environmental temperature $T_{env}$ read in step S43106, a target temperature ($T_{tgt}$) is calculated in step S43107. The target temperature is the preferred operational temperature for printer 30 based on the current environmental temperature. Generally speaking, printer 30 is controlled through unshown heaters in print heads 130a and 130b so as to reach the target temperature, as explained above in connection with FIG. 23 at the 500 ms interrupt level. The target temperature is the most preferred temperature for print head operation based on the current environmental temperature. The relationship between target temperature and environmental temperature is inverse, meaning that low environmental temperatures result in relatively higher target temperatures, whereas high environmental temperatures result in relatively lower target temperatures. For example, at extremely low environmental temperatures such as $T_{env}$= 5° C., a preferred target temperature might be $T_{tgt}$=35° C., whereas at extremely high environmental temperatures such as $T_{env}$=35° C., a preferred target temperature might be $T_{tgt}$=15° C.

Step S43109 calculates the effect on print head temperature caused by actual ink droplet ejection from print heads 130a and 130b. More particularly, the environmental temperature read in step S43106 is based on an environmental temperature read by a thermistor mounted exteriorly of print heads 130a and 130b. Proper control over print head driving parameters, on the other hand, is more directly affected by the internal temperature of ink adjacent the print head nozzles. It is not generally considered practicable to mount a thermistor within such a small area. At the same time, it is known that active ink droplet ejection will cause a rise in ink temperature and that in the absence of any ink ejection, ink temperature will generally fall. It is the purpose of step S43109 to calculate the effect of print head temperature caused by ink droplet ejection to make this calculation.

The calculation of print head temperature in step S43109 is made based in part on the number of ink droplets actually ejected over a previous time interval such as 50 ms. Each ejection of an ink droplet within the predetermined time interval is assigned a heat coefficient weight. Based on the number of ink droplet ejections within the predetermined time period, it is possible to calculate the effect of ink droplet ejection on print head temperature.

At the same time, it is known that such heat-up coefficients vary in dependence on the particular type of print head used, the ink characteristics used in the read, the resolution of printout by the head, and the like. Each different combination of head/ink/resolution changes heat-up coefficient values corresponding to the number of dots printed. Accordingly, ROM 122 is pre-stored with tables for heat-up coefficients. This situation is illustrated in FIG. 43B.

Figure 43B:
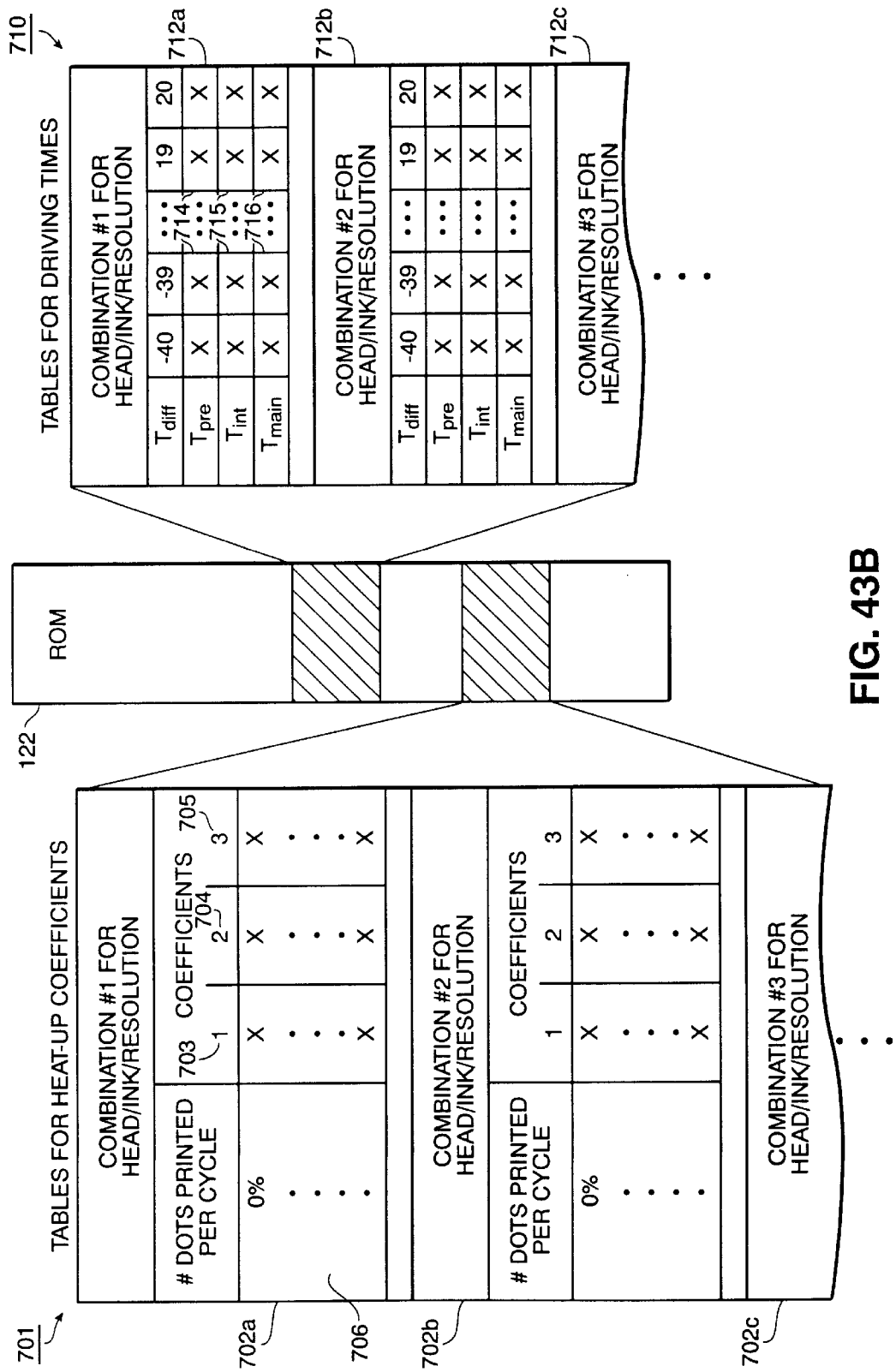
FIG. 43B is a diagram showing exploded views of tables for heat-up coefficients and tables for driving times stored in a printer.

As shown in FIG. 43B, one portion of ROM 122 includes pre-stored tables 701 for heat-up coefficients. The tables include plural tables 702a, 702b, etc., one table for each different combination of printer head, ink characteristics, and resolution. Each of the plural tables includes tabularly accessed coefficients such as the coefficients labelled 1, 2 and 3 (reference numerals 703, 704 and 705), which are accessed through look-up operation based on the number of ink drops ejected in any one particular interval, for example, 50 ms (as indicated at reference numeral 706). Printer 30 selects one heat-up table from the tables stored at 701, based on a default selection or based on a commanded selection (as described below in connection with FIG. 43C), and then selects heat-up coefficients from the selected table based on the number of droplets ejected in a 50 ms period.

The coefficients obtained through look-up operation in tables 701 are used to calculate the effect on print head temperature by ink droplet ejection. One suitable calculation is as follows:

$$\Delta T_{main}=(coeff1*(\#black\ droplets\ ejected))+(coeff2*(\#color\ droplets\ ejected))+(coeff3*(heater\ duty\ cycle))-coeff4$$

where coeff1 1 is a heat-up coefficient based on the number of black ink droplets ejected, coeff2 is a heat-up coefficient based on the number of color droplets ejected, coeff3 is a heat-up coefficient based on the current duty cycle of the heater, and coeff4 is a heat-up coefficient which actually shows cool down of the print head based on inactivity. Of course, the actual coefficients and calculations used depend on the head/ink/resolution combination. For example, the calculation given above is suitable for a four-color print head whereas an all-black print head would use a different calculation that excludes, for example, dependence on the number of color droplets ejected.

Armed with the environmental temperature $T_{env}$, the target temperature $T_{tgt}$ and the print head temperature effect $\Delta T_{main}$, step S43110 calculates the difference $\Delta T_{diff}$, as follows:

$$T_{diff}=T_{tgt}-T_{env}-\Delta T_{main}$$

Step S43111 accesses a look-up table in ROM 122 that stores pulse width times for a pulse width driving sequence, based on the temperature difference $T_{diff}$. Suitable tables are illustrated diagrammatically in FIG. 43B as described below.

Specifically, as shown in FIG. 43B, ROM 122 includes look-up table 710 for storing driving times. The driving times are pulse widths for a pulse sequence used to drive nozzle heaters to eject an ink droplet. A typical pulse sequence is shown at 43311 in FIG. 43A, and includes a pre-heat pulse of width $T_{pre}$, a quiescent period of width $T_{int}$, and a main heating pulse of width $T_{main}$. Such a pulse sequence is applied to nozzle heaters in each nozzle of print heads 130a and 130b so as to eject a droplet of ink for printing. It is the purpose of table 710 to calculate each of $T_{rep}$, $T_{int}$ and $T_{main}$ based in part on the temperature difference calculated in step S43110.

At the same time, it is recognized that the pulse widths of the pulse driving sequence differ based on particular combinations of print head, ink characteristics, resolution, and the like. Accordingly, as shown in FIG. 43B, tables 710 include individual tables such as 712a, 712b, etc. Each table 712a, 712b, etc. is tailored for a particular combination of print head, ink type and resolution. As shown at 710, each table includes entries 714 for the width of the pre-heat pulse $T_{pre}$, entries 715 for the width of the quiescent interval $T_{int}$, and entries 716 for the width of the main heating pulse $T_{main}$. Any one particular entry is accessed through look-up operation based on the temperature difference $T_{diff}$ calculated at step S43110.

Printer 30 selects one table of driving time from the tables stored at 710, based on a default selection or based on a commanded selection (as described more fully below in connection with FIG. 43C). Printer 30 thereafter accesses the entries in the selected table, and looks up appropriate times for the pre-heat pulse, the quiescent interval, and the main heat pulse, all based on the temperature difference calculated in step S43110, and in a particular combination of print head/ink/resolution.

Reverting to FIG. 43A, step S43112 modifies the driving times obtained by look-up operation from table 710, based on the control ratio for driving that was received in step S43101. The purpose of this step is to allow for modification of pre-stored values from look-up tables 710, taking into consideration any difference between an actual print head mounted in printer 30, and the print head combination stored in table 710. In more detail, and as explained previously, although ROM 122 of printer 30 is pre-stored with plural tables for driving times, with each table tailored to a particular combination of print head/ink and resolution, it is not possible to anticipate each and every combination of print head/ink and resolution. Modification in step S43112, therefore, allows for use of previously unknown, or otherwise unstored, combinations of print head/ink and resolution.

Modification in step S43112 is preferably through multiplication of the driving times obtained through look-up operation in step S43111 by the control ratio received in step S43101. For this reason, the default control ratio is 100%. The control ratio that is commandable through the change pulse control ratio command [PCR] is constrained to lie between 1% to 200%, thereby allowing modification of pulse times from effectively negligible pulse times up to twice the values stored in tables 710.

Flow then advances to step S43114, in which printer 30 looks up heat-up coefficients for head temperature calculations. As described previously in connection with tables 701 of FIG. 43B, heat-up coefficients are obtained based on a particular combination of print head, ink and resolution, and are looked up from one of tables 702*a*, etc. based on the number of dots printed per cycle, each having a duration of approximately 50 ms.

Step S43115 modifies the heat-up coefficients based on the control ratio received in step S43103. Again, the purpose of such modification is to permit usage of a particular combination of print head, ink and resolution not already stored in one of tables 701.

Preferably, modification of the heat-up coefficients in step S43115 is through multiplication of the coefficients obtained through look-up operation in step S43114 by the control ratio received in step S43103. For this reason, the default control ratio is 100%. The control ratio that is commandable through the change pulse control ratio command [PCR] is constrained to lie between 1% to 200%, thereby allowing modification of heat-up coefficient from effectively negligible values up to twice the values stored in tables 701.

In step S43116, printer 30 controls nozzle driving based on the modified driving times obtained in step S43112, all in response to a command from host processor 23 that sends print data to printer 30, and a command for printer 30 to print such data (step S43117). Flow repeats as before, with steps S43106 through S43115 being executed at 50 ms cyclic intervals, for example, and with control over nozzle driving based on modified driving times, as set out in step S43116, being executed as commanded by host processor 23. In addition, it should be recognized that control ratios for driving, as well as control ratios for head temperature calculations, may be sent from host processor 23 at any time, and are responded to by printer 30 as set out in steps S43101 and S43103 described above.

Figure 43C:
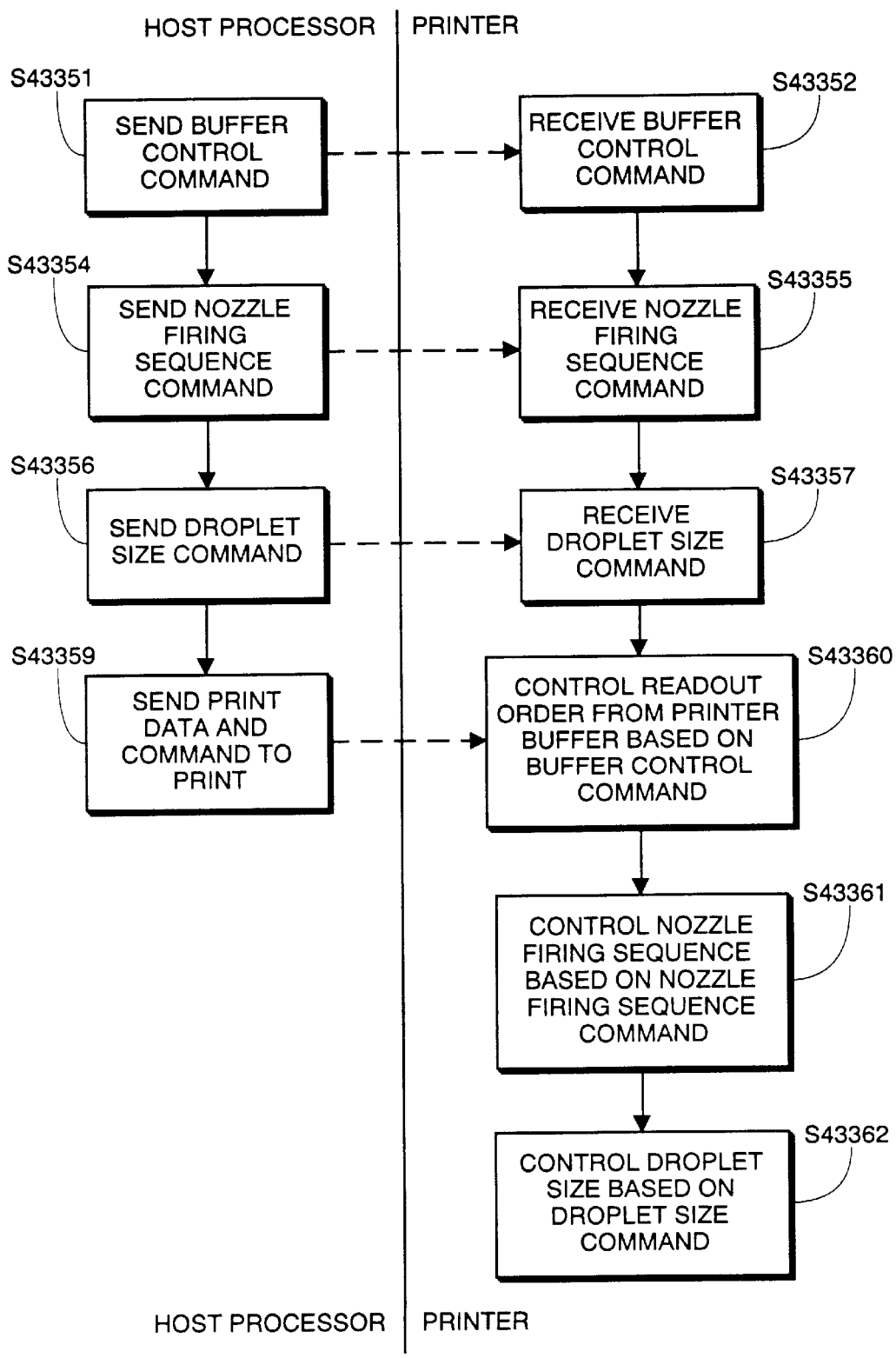
FIG. 43C is a flowchart for describing control of nozzle firing sequence and droplet size.

FIG. 43C shows another embodiment of the present invention by which commands capable of defining print head driving parameters for a printer having a detachable print head are sent from an external device such as host processor 23 to a print controller. One difference in the embodiment shown in FIG. 43C from that shown in FIG. 43A, is that rather than responding to a parameter that modifies pre-stored print head driving parameters, the embodiment of FIG. 43C responds to actual print head driving parameters. Generally speaking, parameters received in FIG. 43C control readout order for data in print buffer 139, control the nozzle firing sequence for individual nozzles in a print head, control droplet size for droplets ejected from the nozzles, and control other print head driving parameters. Preferably, commands from host processor 23 define plural sets of each of buffer controls and nozzle firing sequences. These buffer controls and nozzle firing sequences are registered in RAM 129 of printer 30. By subsequent commands from host processor 23, any of the registered sets of buffer controls or nozzle firing sequences may be selected for use in a particular scan, or plural scans, of a print head across the printing medium.

In more detail, in step S43351, host processor 23 sends a buffer control command to printer 30, and in step S43352 printer 30 receives the buffer control command and responds appropriately as described below. The buffer control commands sent in step S43351 may be of two types: a first type that defines a buffer control sequence, and a second type that selects one of plural buffer control sequences already defined in printer 30. With respect to the first type, which defines buffer control sequences, host computer 23 defines buffer control sequences by which data is read out from print buffer 139 during print operation by printer 30. In response to such a command, the buffer control readout order is stored in RAM 129 by printer 30 for later selection. Preferably, to define a buffer control readout order, the define buffer control table command ([DEFINE_CONTROL]), described above in Section 3.6, is used.

Once plural buffer control readout orders are registered in RAM 129, the second type of buffer control command allows host processor 23 to select any one of them for use in subsequent printout operations. Preferably, the select buffer control table ([SELECT_CONTROL]) command defined above in Section 3.6 is used in this operation.

FIG. 43D illustrates two different buffer control readout orders, as examples of the buffer control tables that may be registered in RAM 129 based on the [DEFINE_CONTROL] command. The reason that such buffer control readout orders are needed is to accommodate at least three different factors that affect how data must be read from print buffer 139 during a print operation. The first such factor is the a slant adjust of print nozzles as they are arranged on the print head. This factor has been described above in connection with FIG. 8, which illustrates that nozzles are preferably in a slightly slanted (oblique) direction such that for every 16 nozzles there is a lateral displacement of one pixel/360 dpi, two pixels/720 dpi, and four pixels/1440 dpi.

The second factor among those affecting buffer readout order is the print head configuration, and the nozzles actually used during a printing operation. This factor is explained in connection with FIGS. 43D, 43E and 43F, which show examples of buffer readout order for a variety of print head configurations and nozzles, as well as resolution.

FIG. 43D shows one possible print head configuration, in which a print head consists of 24 nozzles for each of yellow, magenta and cyan inks, arranged slantingly vertically on top of 64 nozzles for black in. For four-color printing, usually only 24 black nozzles out of the total of 64 such black nozzles are used, in correspondence to the 24 nozzles for the three other colorants. Physically, however, there is a considerable offset between the 24 black nozzles used for printing, and the closest adjacent nozzle of cyan. In addition, the cause of the nozzle offset length, explained above in connection with FIG. 8, buffer readout order must compensate for the nozzle offsets in the horizontal direction.

Buffer readout order compensates for these effects as follows. First, the actual nozzle arrangement 740 is defined with respect to a fictitious standard: a print head having 256 nozzles. Since the print head of FIG. 43D actually has the 24-24-24-64 nozzle arrangement described above for the yellow, magenta, cyan and black inks, the start position for nozzles actually commences at a location 15 bytes lower in a print buffer than would begin with a 256 nozzle head. Thus, a nozzle start position 741 is defined as 15 bytes. Thereafter, byte locations for nozzle offsets are defined for each successive group of nozzles. As shown in 742, nozzle offsets correspond to one byte for each of the yellow, magenta and cyan inks. Because the gap between the last adjacent cyan nozzle and the first black nozzle actually used for printing corresponds to six bytes against the standard 256 nozzle head, a nozzle offset of six is defined for the first black nozzle actually used in printing.

A buffer readout control further defines the buffer data height 743 in bytes (in this example, buffer data height is 12 bytes) and print buffer height 744 (in this example, print buffer height is 12 bytes).

To control buffer readout order in compensation for nozzle slant, a start position 745 is defined for locations in the print buffer, a portion of which is designated at 746. Each subsequent offset for eight nozzles, which correspond to a single eight bit byte in the print buffer, is specified as shown at 747. In the example of FIG. 43D, buffer readout order is being specified for 360 dpi printing. At this resolution, the nozzle slant corresponds to one printed pixel horizontally for 16 vertical nozzles. Accordingly, the first two bytes in the print buffer (corresponding to 16 bits, one for each of the first 16 nozzles in yellow ink), are read out sequentially. However, at 360 dpi resolution, the next nozzle for yellow ink will actually be printed one pixel horizontally away from the previous 16 nozzles. To compensate for this horizontal offset, a buffer offset of 13 bytes is provided, so as to permit printing of the final eight nozzles of yellow ink in proper vertical relationship to the previous 16 nozzles. Since there is a physical gap corresponding to eight nozzles between yellow and cyan inks, as shown in FIG. 8, there is no need to provide readout data for the non-existent nozzles in the gap.

Since the first nozzle for magenta printing is located a physical distance of 16 nozzles away from the beginning of the last print buffer readout for yellow nozzles, an additional 13 bytes offset must be provided between printing for the last set of yellow nozzles and the first set of magenta nozzles. Similarly, offsets of plus one byte, plus 13 bytes, plus 13 bytes, plus 1 byte and plus 13 bytes are provided, in sequence, for the remainder of magenta printing, and for the cyan printing.

With respect to black ink printing, because the location of the 24 black nozzles actually used for printing corresponds to a horizontal shift of three pixels due to the slant angle shown in FIG. 8, and because of the eight nozzle between cyan and black nozzles, an offset of 37 bytes is needed for buffer readout order. This also is depicted at 747.

Thus, in summary, buffer readout order is affected by physical arrangement of nozzles on the print head, including gaps and slant angles, actual nozzles used for printing, print resolution and the like. One way to specify buffer readout order therefore involves a specification of the nozzle start position, nozzle offsets, print buffer data height, print buffer height, and byte offsets for bytes in the print buffer that correspond to nozzles used in printing.

This arrangement is shown again in connection with FIG. 43D which shows printing at 720 dpi. Since print head configuration has not changed, nozzle offsets and the like are not necessarily different. However, since at 720 dpi the slant angle of FIG. 8 corresponds to a two pixel horizontal offset for every 16 vertical nozzles, buffer offsets must be changed as shown at 749.

Figure 43F:
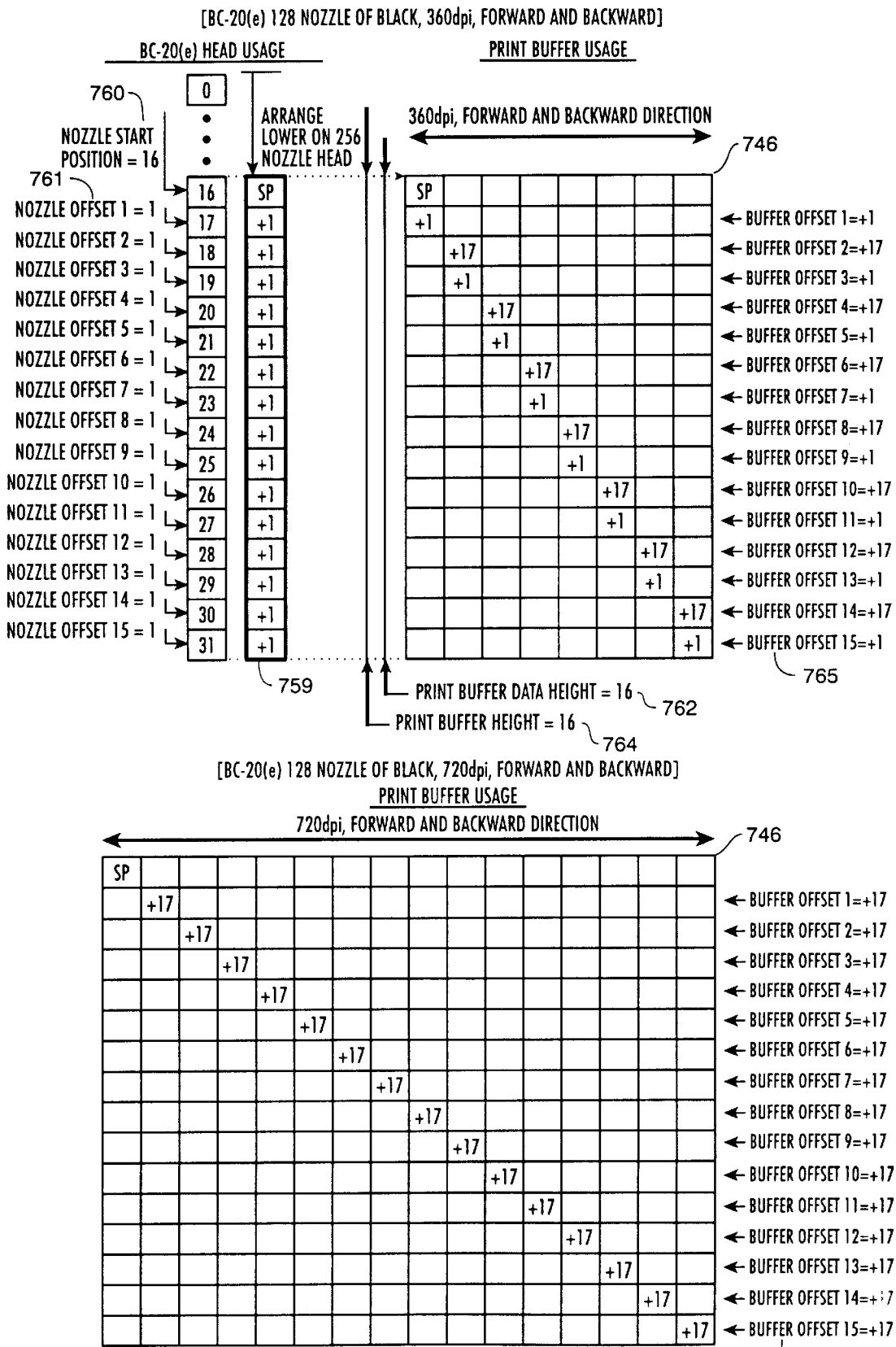

Additional examples of how to specify buffer readout order for different combinations of print head configuration (including physical arrangement of nozzles on the print head and slant angle of the nozzles), actual nozzles used during printing, and print resolution, are given in FIGS. 43E and 43F. FIG. 43E, for example, shows printout using the same print head shown in FIG. 43D, but using only all 64 black nozzles and without using any color nozzles. Thus, as shown at 750, with respect to a fictitious standard of a 256 nozzle head, the first nozzle involved in printing is located 24 bytes lower. Accordingly, the nozzle start position 751 is altered appropriately, as are the nozzle offsets 752 which include eight successive eight bit bytes. Print buffer data height changes as shown at 754 to eight bytes, although print buffer height 755 remains at 12 bytes. Buffer offsets 756, overlayed onto a portion 746 of the physical print buffer, indicate offsets for proper readout order of each byte from the print buffer.

Buffer offsets for printing at 720 dpi resolution are shown at 757.

FIG. 43F shows examples of buffer readout order when using a print head comprised of 128 nozzles of black ink arranged sequentially on a print head with a slant angle, as shown at 98 in FIG. 8. Such a nozzle arrangement 759 differs from the fictitious standard of a 256 nozzle head by beginning at a nozzle start position 760 of 16 bytes lower. Nozzle offset 761 indicate 16 sequential eight bit groups of nozzles. Print buffer data height 762 is set at 16 bytes, as is print buffer height 764. Buffer offset 765 shows how the buffer readout order is affected by the slant of the print heads, as overlayed onto a portion 746 of the print buffer.

For printing at 720 dpi resolution, buffer offsets are as indicated at 766.

The third factor among other factors affecting readout order is print resolution. In particular, when printing at a high resolution, a slower carriage speed is used than when printing at a low resolution. Because of the difference in carriage speed, and how the difference calculates into the effect of the non-oblique arrangement of the print nozzles, it is necessary to modify buffer readout order based on print resolution.

Thus, in summary, step S43351 sends plural buffer control tables to printer 30, where they are registered in step S43352. One such table is selected for use during actual printing operations.

In step S43354, host processor 23 sends nozzle firing sequence commands to printer 30. Nozzle firing sequence commands sent from host processor 23 are received by printer 30 in step S43355 and processed appropriately as described below. Generally speaking, step S43354 sends one of two types of nozzle firing sequence commands: a first type which defines plural different nozzle firing sequences, and a second type in which one of the previously-defined nozzle firing sequences is selected for use during a subsequent printing operation. For the first type of nozzle firing sequence command, in which nozzle firing sequences are defined, host processor 23 preferably sends the define heat pulse table command ([DEFINE_PULSE]), described above in Section 3.6. For each such nozzle firing sequence defined by host processor 23, printer 30 responds by registering the nozzle firing sequence in RAM 129.

For the second type of nozzle firing sequence command, host processor 23 selects one of the plural previously registered nozzle firing sequences for use in subsequent printing operations. Preferably, host processor 23 utilizes the select heat pulse table command ([SELECT_PULSE]) described above in Section 3.6. Upon receipt of the select heat pulse table command, printer 30 retrieves the designated one of the previously registered heat pulse tables from RAM 129, and utilizes it for subsequent printing operations such as the next scan or plural scans of print heads 130a and 130b across the print medium.

Examples of different nozzle heating sequences are illustrated in FIG. 43G. The reason that different nozzle firing sequences are needed is because the actual nozzle firing sequence is dependent on many factors including resolution, direction of scan (i.e., forward or backward), and slant angle of the nozzles. Other factors also affect nozzle firing sequence. Resolution, for example, affects nozzle firing sequence since for a low resolution printout, a print head is moved across a carriage at a high speed. This speed is calculated so that as 16 nozzles are fired, the carriage advances by exactly one pixel/360 dpi, two pixels/720 dpi, or four pixels/1440 dpi, in correspondence to the slant angle of the nozzles. This results in a situation where a vertical line will be printed if the nozzles are fired sequentially, from top to bottom. On the other hand, at a low resolution, the carriage speed is slowed. Accordingly, so as to result in a vertical line, it is necessary to fire every other nozzle in sequence. Thus, resolution is one factor that affects the nozzle firing sequence.

Print direction is another factor among others that affect nozzle firing sequence, as can be readily understood. Specifically, because of the slant angle, the nozzle firing sequence must be reversed between forward and backward printing.

FIG. 43G illustrates some examples of nozzle firing sequences that can be defined by host processor 23 and registered in printer RAM 129, for subsequent selection of one sequence. As shown in FIG. 43E, nozzle firing sequences for nozzle numbers 1 through 16 are defined for each of four different printing conditions: 360 dpi printing in a forward direction, 360 printing in a reverse direction, 720 dpi printing in a forward direction, and 720 printing in a reverse direction. Each of the four nozzle firing sequences is defined by host processor 23, and transmitted to printer 30 whereupon printer 30 registers the nozzle firing sequence in RAM 129. Thereafter, host processor 23 selects one of the nozzle firing sequences, as appropriate to the currently desired printing condition, and transmits a suitable select command to printer 30. Printer 30 responds to the command by selecting the designated nozzle firing sequence, and using it for subsequent printing operations.

Thus, in summary, step S43354 allows host processor 23 to define plural different nozzle driving sequences, one of which is designated for use in a subsequent printing operation. In step S43355, printer 30 responds to commands from host processor 23 by registering each of plural nozzle firing sequences in RAM 129, and selecting a designated one of the registered nozzle firing sequences for use in subsequent printing operations.

In step S43356, host processor 23 sends a droplet size command such as the [DROP] command described above in Section 3.6, and in step S43357, printer 30 responds to the droplet size command by selecting the droplet size commanded thereby. Printing is thereafter effected in the droplet size.

In step S43359, host processor 23 sends print data (preferably with the [DATA] command), and thereafter commands printer 30 to effect printing of the data (with the [PRINT] command). Printer 30 responds in step S43360 through S43362, by controlling readout order from printer buffer 139 based on the buffer control command selected in step S43352, by controlling nozzle firing sequence based on the nozzle firing sequence command received in step S43355, and by controlling droplet size based on the droplet size command received in step S43357.

Thus, by virtue of the foregoing processing, a printer can be controlled to utilize print heads having configurations not envisioned at the time of design, by use of commands from an external host processor that set parameters for driving the print heads. As a consequence, the flexibility of printer 30 to accept new print heads as they are developed with different head configurations and other characteristics is greatly increased.

9.0. Print Buffer Operation

Figures 1A, 43:
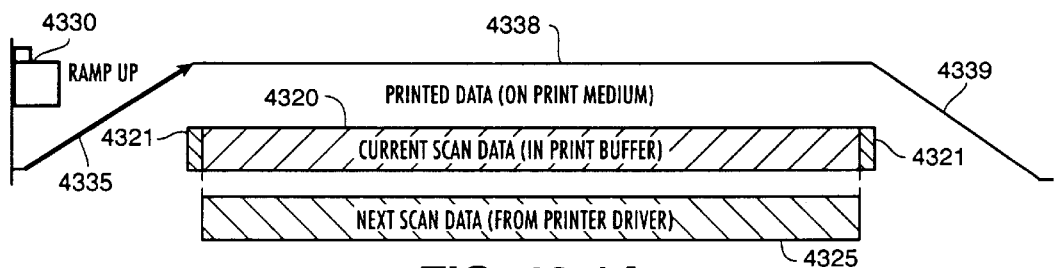
Figures 1B, 43:
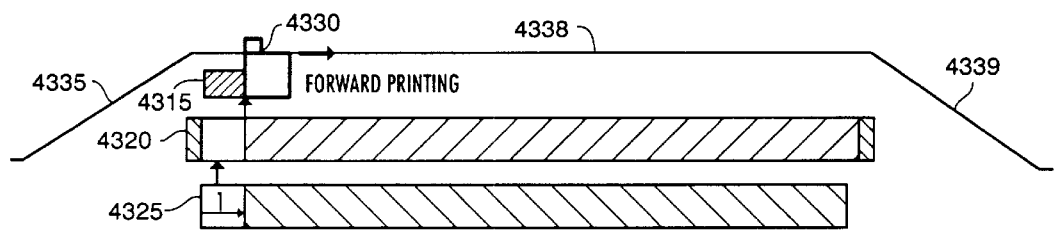
Figures 1C, 43:
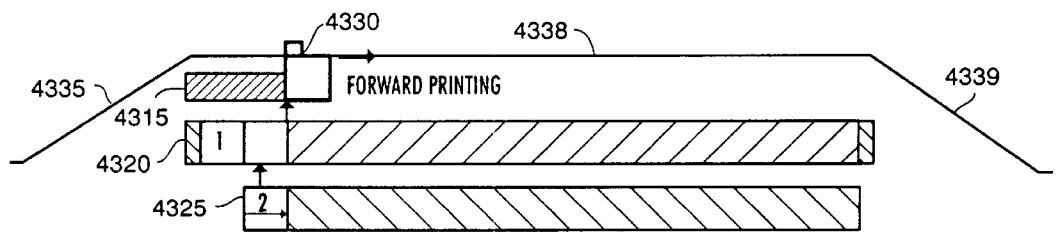
Figures 1D, 43:
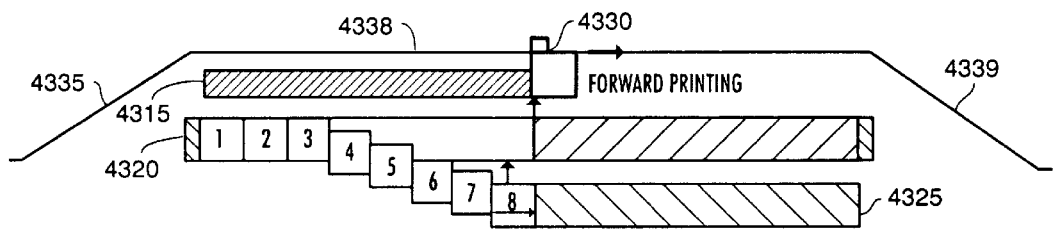
Figures 1E, 43:
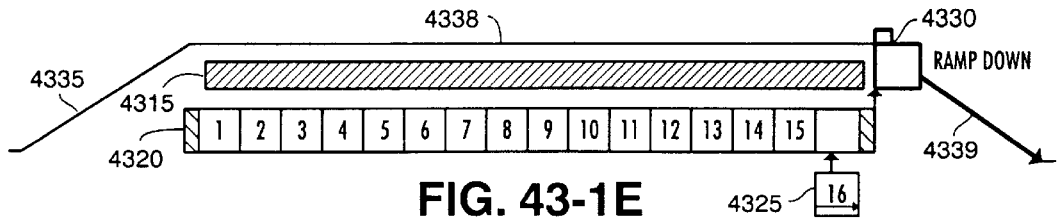

FIGS. 43-1A through 43-1E illustrate the transfer of print data from print data store 136 in host processor 23 to print buffer 139 (depicted in FIGS. 10 and 11), for printing in a forward direction. The print transfer in FIGS. 43-1A through 43-1E is controlled by stored program codes in print driver 114 and by stored program codes in printer 30. In FIGS. 43-1A through 43-1E, a single print head 4330 performs scanning across a recording medium by ramping up from a stationary position to a uniform scanning speed in a forward direction, by scanning across the recording medium, and by ramping down from the uniform scanning speed to the stationary position. The ramp-up position is indicated by reference 4335, the scan area is indicated by reference 4338, and the ramp-down is indicated at 4339. Reference numeral 4320 represents an area in print buffer 139 in which is stored print data for the current scan. Areas 4321 are extra areas of the print buffer reserved for storage of print data corresponding to the slant angle of the print head. (The need for extra storage in print buffer 139, so as to store data corresponding to the slant angles of the print nozzles, was described above in connection with FIG. 43D to 43F, with respect to the description in the preceding section concerning buffer readout order.) Reference numeral 4325 represents print data derived by printer driver 114 and stored in print data store 136 in host processor 23. The print data is for a next scan. Reference numeral 4315 represents a printed image on the recording medium, the printed image being stored in accordance with current scan data in print buffer 4320.

As shown in FIG. 43-1A, there is print data for the current scan in all print positions of the print buffer, and there is print data for the next scan in all print positions of print data store 136. During the ramp-up period 4335, print head 4330 moves in the forward direction without any printing until it reaches a uniform scanning speed. Since there is no printing, there is no emptying of any print data in print buffer 4320 and there is consequently no room in print buffer 4320 so as to transfer print data for a next scan from print data store 136.

FIG. 43-1B illustrates a situation in which print head 4330 has reached a scanning speed and has begun printout as illustrated at 4315. Since print data for the current scan has been emptied (or, more precisely, is no longer needed since it has already been printed) from print buffer 4320, a first block of print data for a next scan can be transmitted from printer driver 114 from print data store 4325 to print buffer 4320. No further room is yet available in print buffer 4320 for additional data from print data store 4325; accordingly, no further data is transmitted.

One mechanism by which printer driver 114 determines that there is a vacant or empty area in printer buffer 4320 is through use of a signal from printer 30 that indicates that data transfer to printer 30 can not currently be accepted. Examples of such a signal include a "busy" signal or a "not-ready" signal or the like, and will hereinafter be referred to as a "busy signal". The busy signal is generated by printer 30 and transmitted over host computer interface 141 to host processor 23. Specifically, since printer 30 utilizes a stepper motor for stepping its carriage across the recording medium, printer 30 at all times knows the print position of its print head 4330. Printer 30 further knows the left and right edges of the currently unprinted areas in printer buffer 4320. By comparison between the position of print head 4330 and the left and right edges of print buffer 4320, printer 30 can determine whether there is an empty area in the print buffer into which to store data received from print driver 114. If there is no empty area in the print buffer, then printer 30 generates a busy signal to host processor 23. On the other hand, if there is an empty area in the printer buffer 4320, then printer 30 clears the busy signal, indicating that it is ready to accept print data.

In FIGS. 43-1C through 43-1E, more and more print data from the current scan is printed from print buffer 4320 onto the recording medium, as signified at 4315. As each successive block of print data is emptied from buffer 4320, print driver 114 transmits successive blocks of print data for a next scan from area 4325 of print data store 136 to print buffer 4320. Thus, as shown in FIG. 43-1C, a second block of print data is transmitted from 4325 to 4320, in FIG. 43-1D, successive blocks 3 through 8 are transmitted from print data store 4325 to print buffer 4320, and in FIG. 43-1E, a sixteenth block of print data for a next scan is transmitted from print data store 4325 to print buffer 4320. In FIG. 43-1E, the entirety of a current scan has been printed, as signified at 4315, and print head 4330 begins its ramp-down operation. As will be appreciated, it is now possible for print head 4330 to begin printing in a reverse direction, utilizing the print data for the next scan that has now been stored in print buffer 4320, during which print data for a further successive scan will be transmitted by printer driver 114 from print data store 136 to print buffer 139.

Reverse printing is described as follows, in connection with FIGS. 43-2A through 43-2E.

Figures 2A, 43:
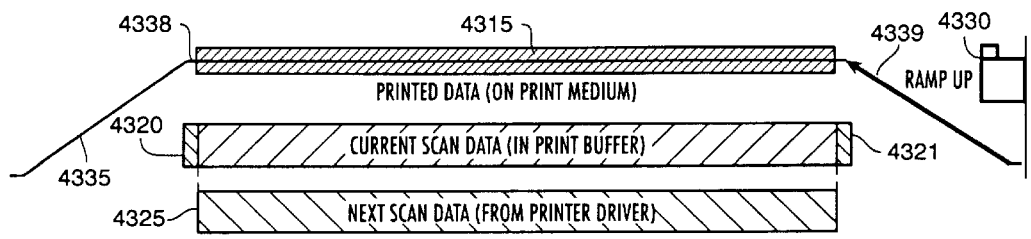
Figures 2B, 43:
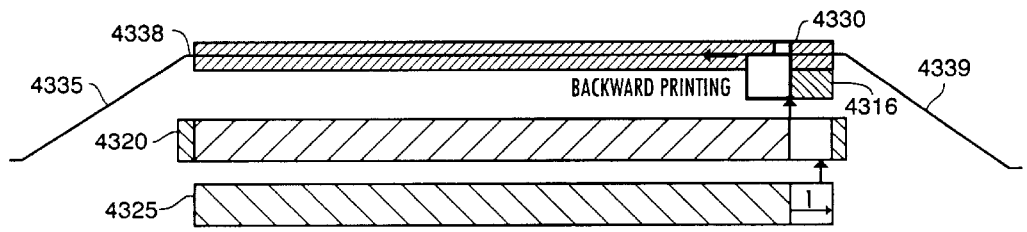

Specifically, FIG. 43-2A illustrates a situation like that in FIG. 43-1A, in which the size of the print data for a current scan (stored in print buffer 4320) is the same as or larger than the size of the print data for a subsequent scan (stored in print data store 4325). Reference numeral 4321 refers to extra storage of print buffer 4320 so as to accommodate the buffer readout order that compensates for slant angle of nozzles on print head 4330. Hereinafter, such an area will be referred to as the "nozzle offset length". Numeral 4315 refers to printed data already on the recording medium from a forward scan. During a ramp-up period as signified at 4339, print head 4330 ramps-up from a stationary position to a uniform scanning speed; no data is printed and none is emptied from print buffer 4320. In FIG. 43-2B, print head 4330 is moving at a uniform speed in a reverse direction and has begun to print data corresponding to print data for a current scan in print buffer 4320. The printed data on the recording medium is signified at 4316. Because a sufficiently large area of print buffer 4320 has been emptied by printout on the recording medium, a first block of data from print data store 4325 is transferred by printer driver 114 to print buffer 4320.

Figures 2C, 43:
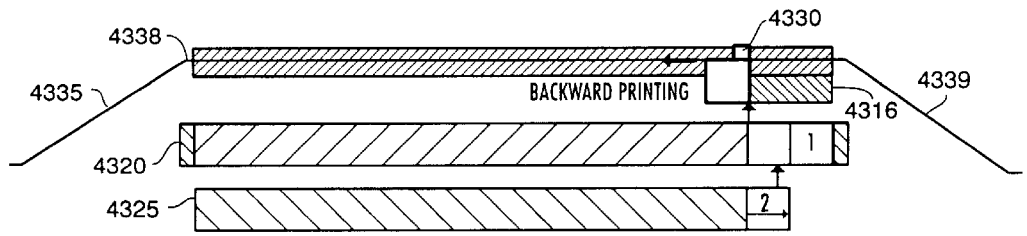
Figures 2D, 43:
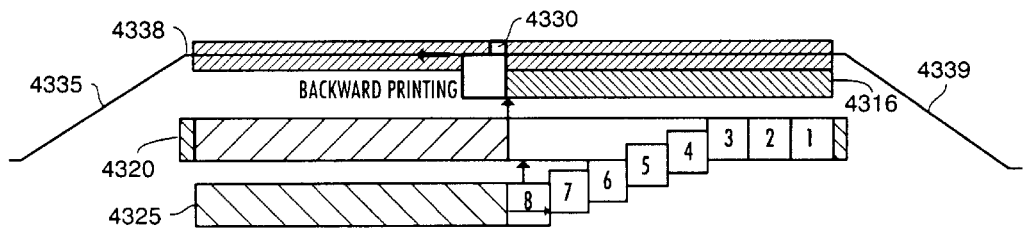
Figures 2E, 43:
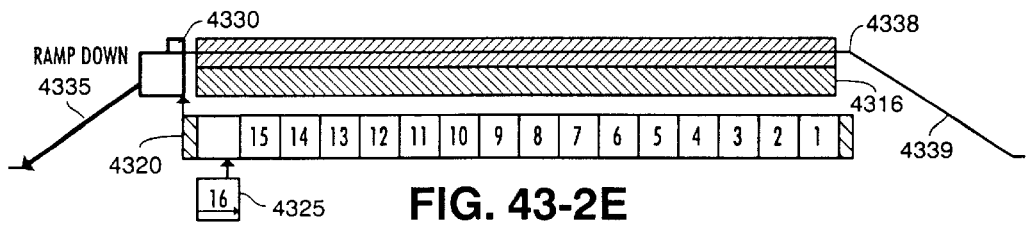

With continued printing in the reverse direction, subsequent blocks of data are printed on the recording medium, thereby emptying print data from print buffer 4320. This situation is illustrated in FIGS. 43-2C and 43-2D, in which a second and subsequent blocks 3 through 8 are transferred by printer driver 114 from print data store 4325 into emptied areas of buffer 4320. As in the situation of FIG. 43-1, printer driver 114 transmits data to printer 30 so long as a busy signal is not received from printer 30. In FIG. 43-2E, a final block of print data has been printed from print buffer 4320 onto recording medium at 4316, thereby permitting transfer of the final block of print data for the next scan from print data store 4325 to print buffer 4320. The print head 4330 subsequently ramps-down from the uniform scanning speed to a stationary position, as indicated at 4335.

Figures 3A, 43:
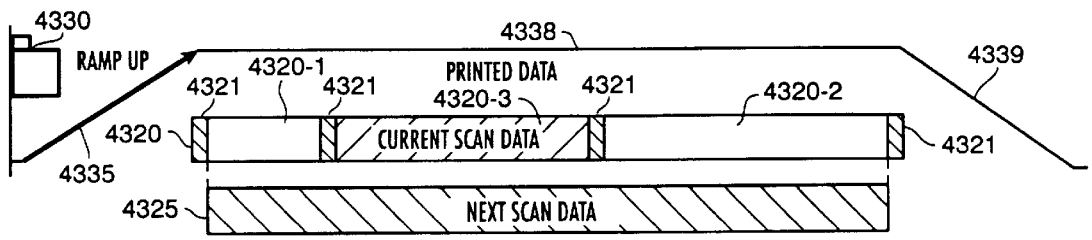
Figures 3B, 43:
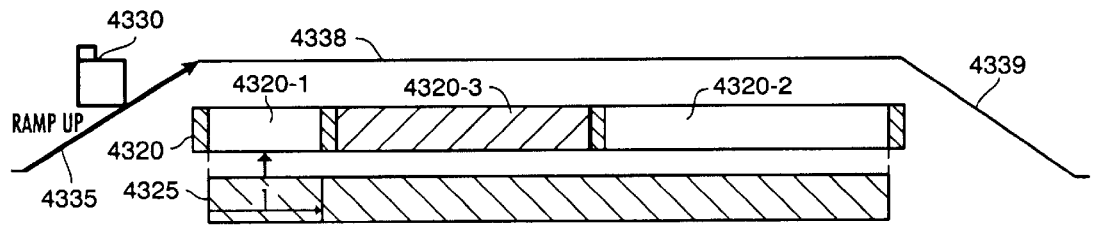
Figures 3C, 43:
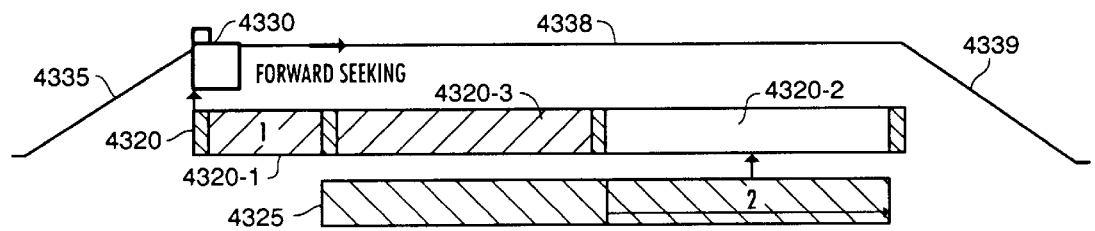
Figures 3D, 43:
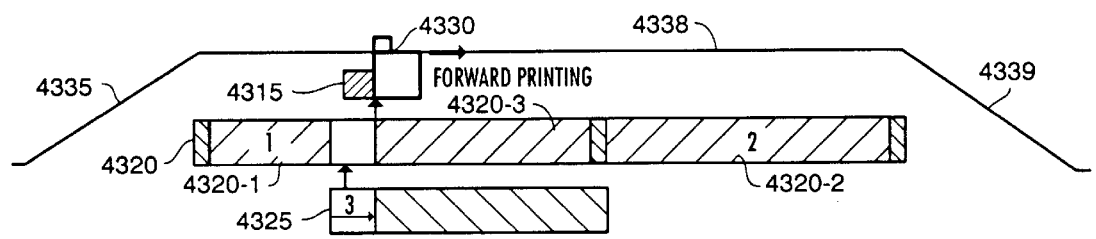
Figures 3E, 43:
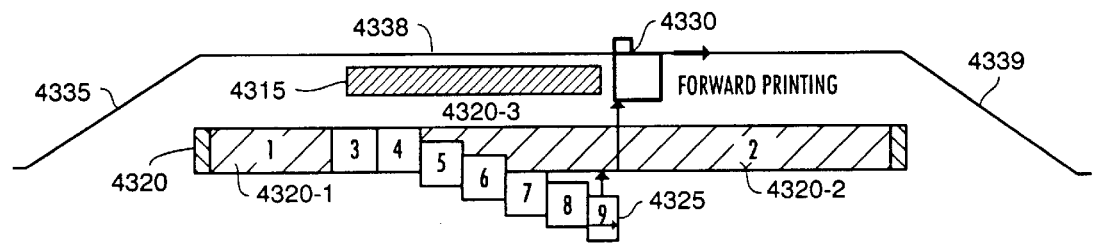
Figures 3F, 43:
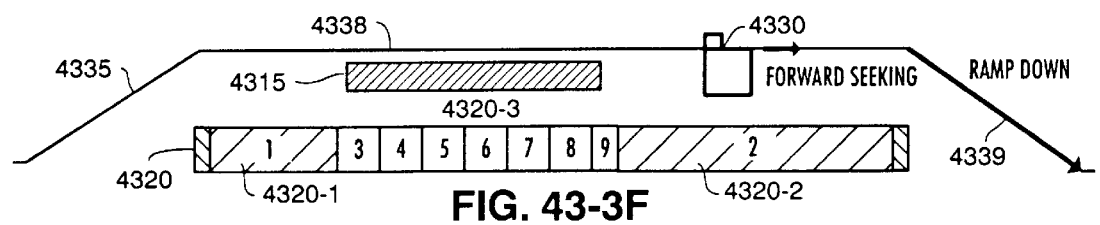

FIGS. 43-3A through 43-3F illustrate transfer of print data from print data store 136 in host processor 23 to print buffer 139 of printer 30, during a forward scan of a single print head 4330 across a recording medium, in a situation in which current print data stored in print buffer 4320 is smaller than the print data for a next scan as stored in print data store 4325 in host processor 23. Because the amount of current print data is smaller than the next print data, there are empty areas in print buffer 4320 even before printing has begun. It is therefore possible to take advantage of this situation, by transferring print data for a next scan into the already-empty areas of print buffer 4320. Such processing is explained below, in connection with FIGS. 43-3A through 43-3F.

In this situation, print driver 114 does not need to rely exclusively on busy/ready signal generation from printer 30, in order to determine whether there are empty spaces in the print buffer into which to store print data for a next scan. specifically, because it was the print driver that previously transmitted data for the current scan for storage into particular print buffer locations, the print driver can determine without any feedback from the printer exactly which locations in the print buffer should be empty and ready to receive print data for a next scan. Printer 30 might generate a busy signal during print driver transmission of print data, but the busy signal would ordinarily be generated for reasons unrelated to the empty/full status of print buffer locations (e.g., the printer might not be ready to receive new data because it is occupied with other tasks such as head cleaning).

In FIG. 43-3A, a single print head 4330 prints across a recording medium by ramping up from a stationary position to a uniform scanning speed in area 4335, printing (or seeking in a forward direction to a next print area) in a uniform speed across area 4338, and then ramping down from a uniform scanning speed to a stationary position at area 4339. 4320 refers to a print buffer which includes areas 4320-1, 4320-2, and 4320-3, of which only the latter area contains print data for a current scan. The remaining areas are empty, indicating that no data is to be printed at the corresponding locations on the recording medium. 4321 refers to the nozzle offset areas of print buffer 4320. 4325 refers to data for a next scan in print data store 136, as yet to be transmitted from host processor 23 to printer 30.

In FIG. 43-3B, during a ramp-up period of print head 4330, since there are empty locations in print buffer 4320, a first block of information is transferred by printer driver 114 from print data store 4325 to print buffer 4320. Likewise, in FIG. 43-3C, since print buffer 4320-2 is empty, a second block of print data is transmitted from print data store 4325 to print buffer 4320. At this point, print head 4330 has reached its uniform scanning speed, and commences forward seeking to its first printing area corresponding to current print data in print buffer 4320. This situation is depicted at FIG. 43-3D, in which printed data 4315 is printed by print head 4330 on the recording medium. Moreover, since printing of print data 4315 empties the area in print buffer 4320, a subsequent block of print data is transferred by printer driver 114 from print data store 4325 to print buffer 4320. As print head 4330 continues to move in the forward direction, FIG. 43-3E depicts the situation in which additional printed data is printed at 4315, and subsequent blocks of print data are transferred by printer driver 114 from print data store 4325 to print buffer 4320. In FIG. 43-3F, print head 4330 has completed printing of all current print data in print buffer 4320, as depicted at 4315, and is commencing forward seeking toward the end of the next print data which at this point has all been transferred from print data store 4325 into print buffer 4320. When forward seeking is completed, print head 4330 ramps down in area 4339 from its uniform scanning speed to a stationary position, and commences ramp-up in a reverse direction to a uniform scanning speed for printing of print data now all stored in print buffer 4320.

Reverse printing proceeds generally along the lines shown in FIG. 43-2, and involves transfer of next scan data into empty locations of print buffer 4320 during ramp-up, and sequential transfer of blocks of print data to the print buffer as print buffer locations are emptied during printout.

9.1 Single Print Buffer

In the forward printing operation of FIG. 43-1, and the reverse printing operation of FIG. 43-2, since the amount of print data for a current scan is the same or larger than the amount of print data for a subsequent scan, it is not possible to transfer print data in advance from printer store 4325 to print buffer 4320. As a consequence, performance suffers since it is necessary to wait for the print head 4330 to empty data in the print buffer 4320 by printing before new data can be transmitted from printer driver 114 to printer 30.

In contrast, in the situation of FIG. 43-3, since the amount of print data for a current scan is smaller than the amount of print data for a subsequent scan, it is possible for printer driver 114 to transfer data for a subsequent scan to empty areas of print buffer 4320, even before print head 4330 begins printing. This arrangement provides advantageous processing speeds. At the same time, the situation where a current scan is smaller than a next scan occurs relatively infrequently, since it is much more ordinary for print data for each successive scan to be the same as, or approximately the same as, print data for a previous scan.

To improve performance of print data transfer for all scans, the inventors herein have considered to provide an additional area in print buffer 4320 corresponding to the ramp-up period of print head 4330. The additional area will hereinafter be referred to as the "shift area". Provision of an additional shift area for print buffer 4320 means that, for all times, even when print head 4330 is not printing, there will be empty areas in print buffer 4320 into which printer driver 114 can deposit print data for a next scan. Particularly, printer driver 114 can transfer print data into the shift area during or in advance of completion of ramp-up of print head 4330. Moreover, the print driver need not rely exclusively on the printer's generation of a busy/read signal to determine whether the printer is ready to accept print data to this shift area; because it is the print driver itself that designates where print data for a current scan and a next scan are stored in the print buffer, the print driver can determine whether the shift area is ready to receive print data, ordinarily without feedback from the printer.

Figures 4A, 43:
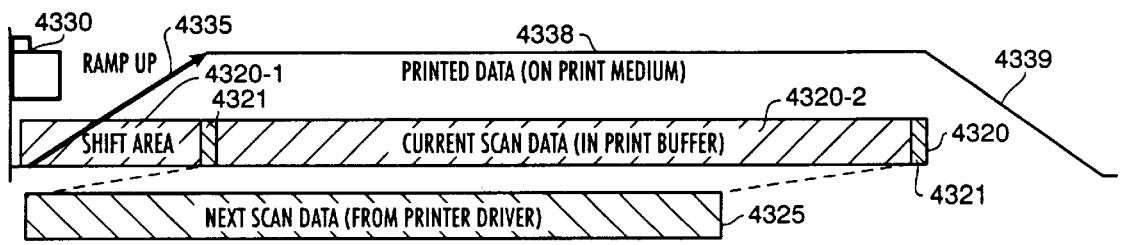
Figures 4B, 43:
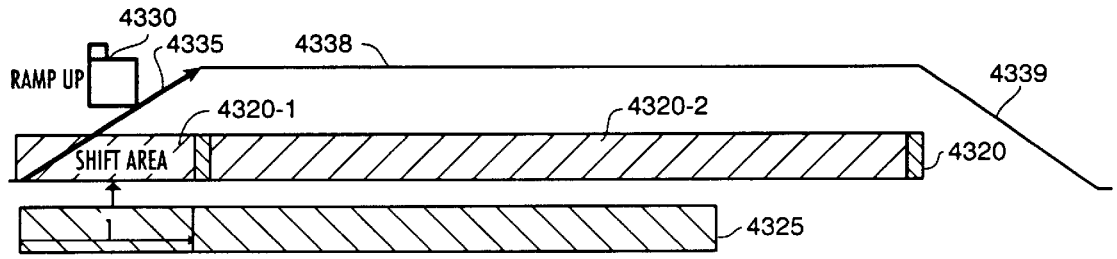
Figures 4C, 43:
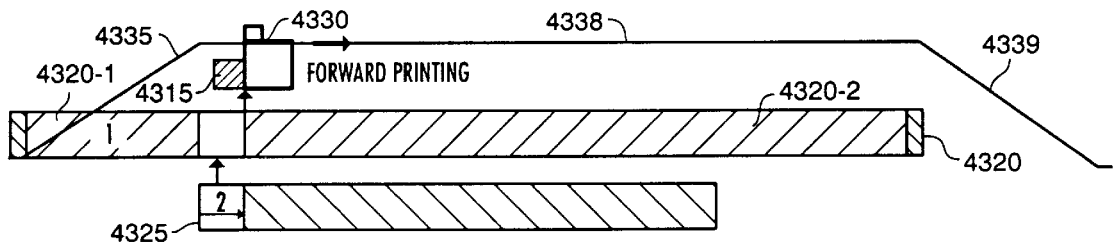
Figures 4D, 43:
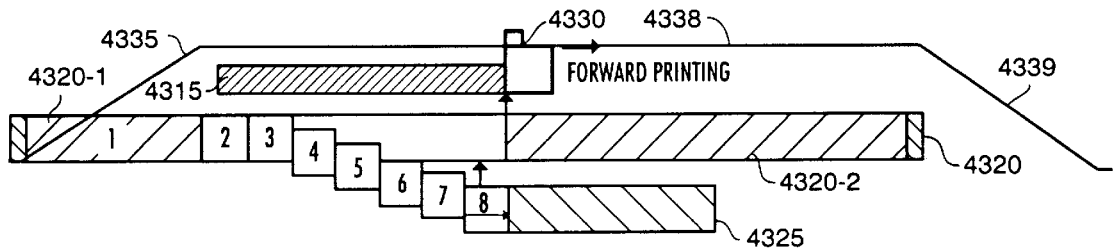
Figures 4E, 43:
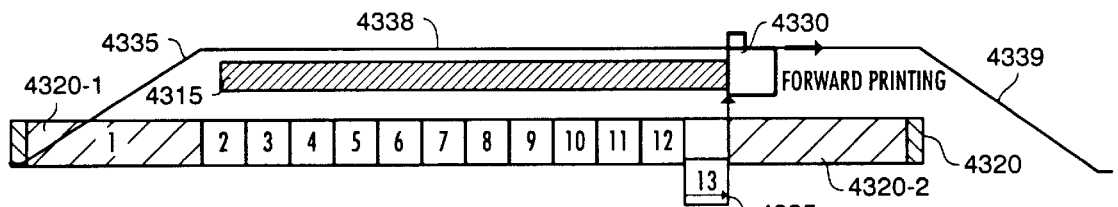
Figures 4F, 43:
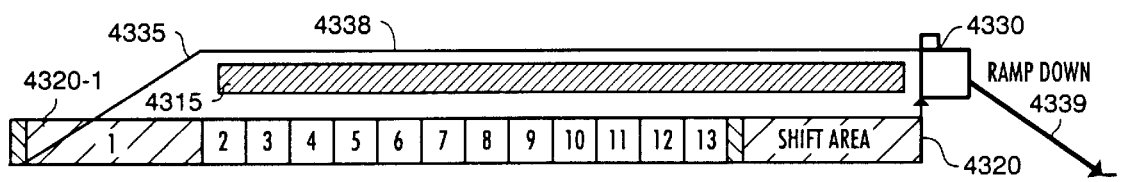

FIGS. 43-4A through 43-4F illustrate use of a shift area to improve efficiency of data transfer, during a forward printing in a situation analogous to that illustrated in FIG. 43-1, that is, where print data for a current scan is approximately the same size as that for a next scan. In FIG. 43-4A, print buffer 4320 includes a shift area 4320-1 which is appended at the forward most edge of area 4320-2. 4321 refers to areas in the print buffer that compensate for nozzle offset length. Region 4320-2 stores print data for a current scan, shift area 4320-1 is empty, and print data store 4325 stores print data for a next scan that is awaiting transmission from printer driver 114. Unlike the illustration in FIG. 43-1, print data for a next scan is illustrated in a shifted position from its actual print position, with the shift from its actual print position being indicated by dotted lines. The purpose for this shift is only for illustrative purposes so as to simplify illustration of transfer of data into the shift area 4320-1 and area 4320-2 of print buffer 4320.

In the absence of a busy signal from printer 30, printer driver 114 determines that it is permissible to transmit print data from print data store 4325 to print buffer 4320. Thus, as illustrated in FIG. 43-4B, during ramp-up period 4335 of print head 4330, printer driver 114 transmits a first block of print information for a next scan from print data store 4325 to the shift area 4320-1 of print buffer 4320. After the shift area has been filled, printer 30 generates a busy signal which stops further transmission of data. In FIG. 43-4C, print head 4320 has reached a uniform scanning speed and commences printout of print data for a current scan by printing out data in area 4320-2 of print buffer 4320. Printing is illustrated at 4315. After an area of print buffer 4320-2 has been emptied, printer 30 releases the busy signal indicating to printer driver 114 that it is ready to receive additional data. As a consequence, printer driver 114 commences transmission of a second block of print data for a next scan from print data store 4325 to print buffer 4320.

As print head 4330 continues printing in a forward direction, successive areas of print buffer 4320 are emptied of print data, thereby freeing those locations in print buffer 4320 for receiving print data for a next scan from print data store 4325. This situation is illustrated in FIGS. 43-4D and 43-4E in which successive areas of print buffer 4320 are emptied of print data by printout at 4315, and successive blocks of print data are transmitted by printer driver 114 from print data store 4325 into print buffer 4320.

Figures 5A, 43:
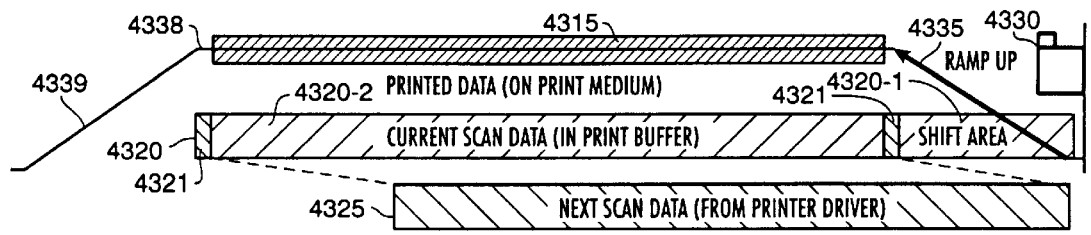
Figures 5B, 43:
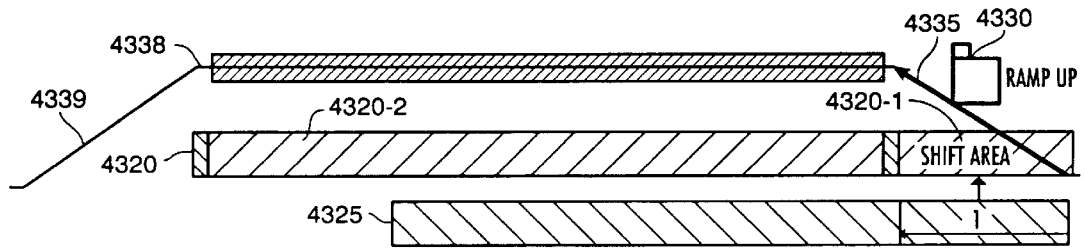

In FIG. 43-4E, a last block of print data for a next scan has been transmitted from print data store 4325 to print buffer 4320. However, printing for a current scan has not yet been completed, since print data for the current scan remains unprinted in print buffer 4320. Thus, as shown in FIG. 43-4F, print head 4330 continues to print, freeing additional area of print buffer 4320. The additionally freed area of print buffer 4320 is not needed for print data for a next scan, since all print data has already been transmitted as shown at FIG. 43-4E. As a consequence, the newly-freed areas of print buffer 4320 are re-allocated into a shift area during reverse printing, which is shown in FIGS. 43-5A through 43-5F. In any event, at the conclusion of printing in the forward direction, print head 4330 ramps down from a uniform scanning speed to a stationary position, at 4339.

FIGS. 43-5A through 43-5F illustrate transfer of print data from print data store 4325 for a next scan into print buffer 4320, which contains print data for a current scan in area 4320-2 as well as an empty shift area 4320-1. Thus, printing illustrated in FIG. 43-5 is similar to that illustrated in FIG. 43-2, that is, printing in a reverse direction. However, data transfer of FIG. 43-5 is different from data transfer illustrated in FIG. 43-2, primarily because of the use of shift area at 4320-1 which provides for more efficient data transfer.

Before conclusion of ramp-up period of print head 4330 from a stationary position to a uniform scanning speed at ramp-up area 4335, since printer 30 has an empty area in its print buffer 4320, it indicates a ready signal to host computer 23. As a consequence, printer driver 114 transmits print data for a first block of a next scan from print data store 4325 to shift area 4320-1. This is illustrated in FIG. 43-5B, in which print head 4330 is commencing its ramp-up to a uniform scanning speed. After print data for block 1 has been transmitted from print data store 4325 to shift area 4320-1, printer 30 generates a busy signal indicating to printer driver 114 that no further print data is to be transmitted.

Figures 5C, 43:
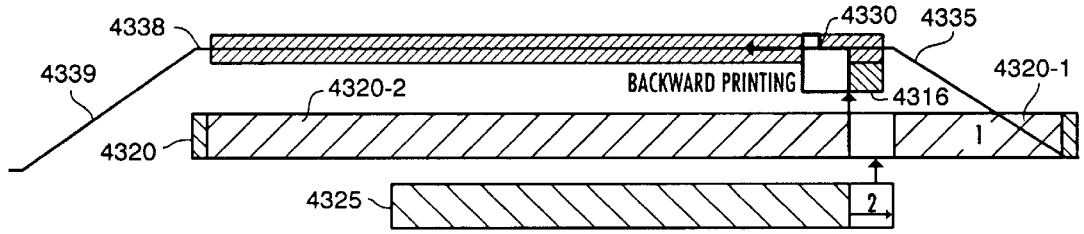

In FIG. 43-5C, print head 4330 has reached uniform scanning speed and has commenced printing in the reverse direction. Printout at 4316 in the reverse direction has emptied an area in print buffer 4320. As a consequence, printer 30 generates a ready signal signifying to printer driver 114 that printer 30 can accept print data. Printer driver 114 consequently transmits block 2 of print data for a next scan from print data store 4325 to print buffer 4320.

Figures 5D, 43:
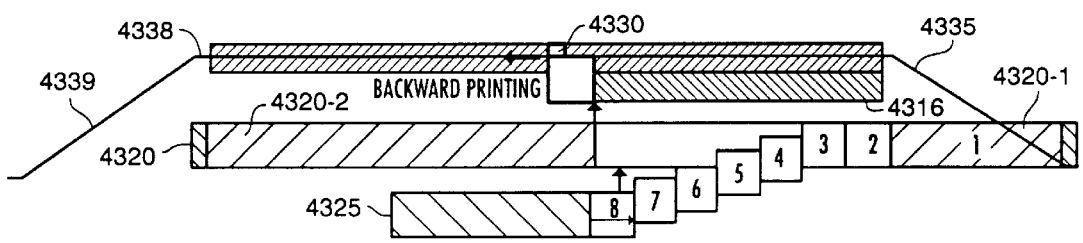
Figures 5E, 43:
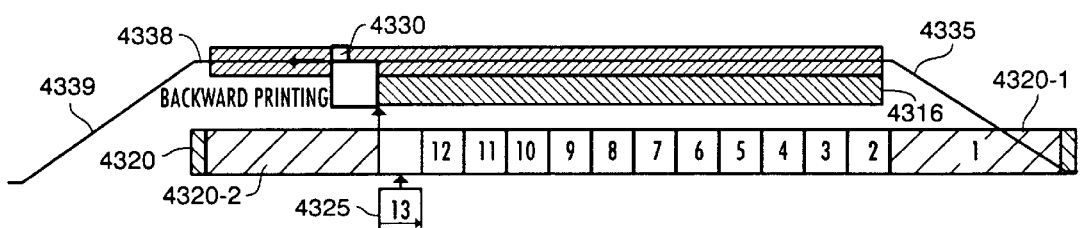
Figures 5F, 43:
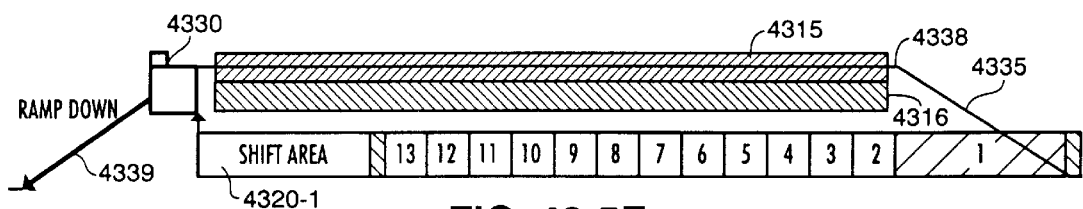
Figures 6A, 43:
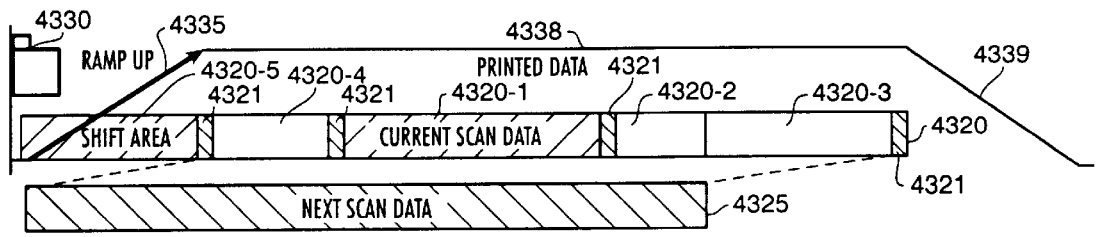
Figures 6B, 43:
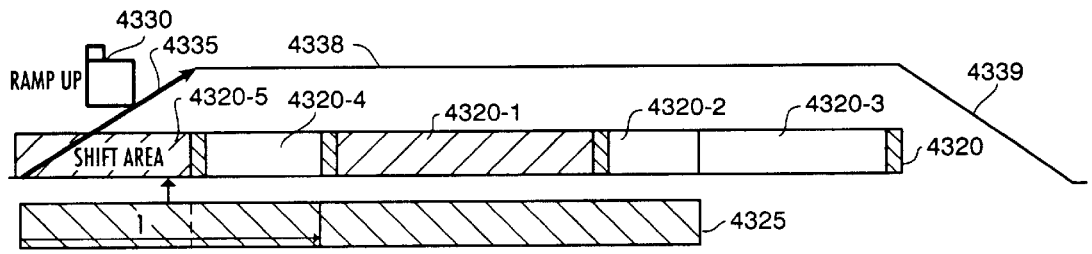

FIGS. 43-5D and 43-5E illustrate continued printing in the reverse direction. Thus, in FIG. 43-5D, print head 4330 continues printing in a reverse direction, thereby emptying print locations in print buffer 4320. In response to emptied print locations, printer driver 114 transmits print data for successive blocks of a next scan into successively emptied locations of print buffer 4320. In FIG. 43-5E, a last block of print data for a next scan is being transmitted from print data store 4325 to print buffer 4320. However, printing in the reverse direction has not yet completed, since there are remaining unprinted data in print buffer 4320. Therefore, as illustrated in FIG. 43-5F, printing continues in the reverse direction, emptying successive locations of print buffer 4320. The emptied locations are not needed for any print data for a next scan, since all such data was transmitted in FIG. 43-5E. The emptied locations of print buffer 4320 therefore become a shift area for a succeeding printing in the forward direction.

By virtue of the processing shown in FIGS. 43-4 and 43-5, transfer of print data is made more efficient by the use of a shift area in which the shift area is prefixed at a forward end of print buffer 4320 during a forward print, and is created at the tail end of print buffer 4320 as a current line of print data is finished printing. The shift buffer created at the tail end of print buffer 4320 is used in a succeeding scan in a reverse print direction. As a consequence, since printer driver 114 has empty locations of print buffer 4320 in which to transmit data during ramp-up of the print data, efficiency of print data transfer is increased.

FIG. 43-6 illustrates transfer of data in a situation similar to that of FIG. 43-3 in the sense that the size of print data for a current scan is smaller than the size of print data for a next scan. However, in the data transfer illustrated in FIG. 43-6, a shift area 4320-5 is provided corresponding to a ramp-up period of print head 4330, so as to increase efficiency of data transfer.

In FIG. 43-6, print buffer 4320 includes area 4320-1 which contains print data for a current scan. Areas 4320-2, 4320-3 and 4320-4 are empty areas that do not contain print data. Areas 4321 are areas of print buffer 4320 provided for nozzle offset length. Area 4320-5 is a shift area corresponding to the ramp-up period of print head 4330.

Figures 6C, 43:
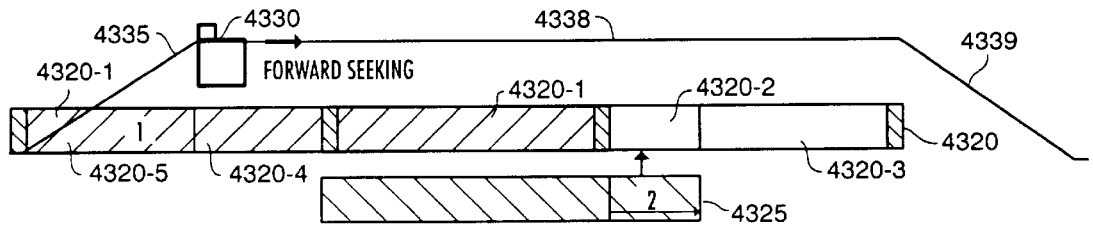

As shown in FIG. 43-6A, print data for a next scan, which is currently stored in print data store 4325 in host processor 23, is larger than print data for a current scan. Accordingly, there are areas of print buffer 4320 that are empty and can accept data even though print head 4330 has not yet commenced printing. This situation is illustrated in FIG. 43-6B, which before completion of a ramp-up of print head 4330 from a stationary position to a uniform scanning speed, a first block of print data for a next scan is transmitted by printer driver 114 from print data store 4325 to print buffer 4320. The print data is stored into shift area 4320-5 and empty area 4320-4. Thereafter, as shown in FIG. 43-6C, print head 4330 has reached a uniform scanning speed and commences forward seeking to the first printing position corresponding to print data in area 4320-1 of print buffer 4320. During this period, since there still remain empty areas in print buffer 4320, printer driver 114 transmits a second block of print data for a next scan from print data store 4325 into empty area 4320-2 of print buffer 4320.

Figures 6D, 43:
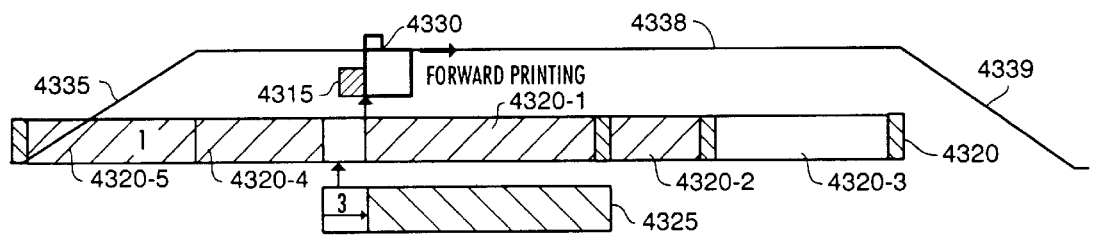

In FIG. 43-6D, print head 4330 has reached the first print position and commences printout as shown at 4315. As print head 4330 continues to print, it empties print data from print buffer 4320, thereby freeing those areas of print buffer 4320 to receive print data for a next scan. Thus, printer driver 114 transmits a third block of print data for a next scan from print data store 4325 to print buffer 4320.

Figures 6E, 43:
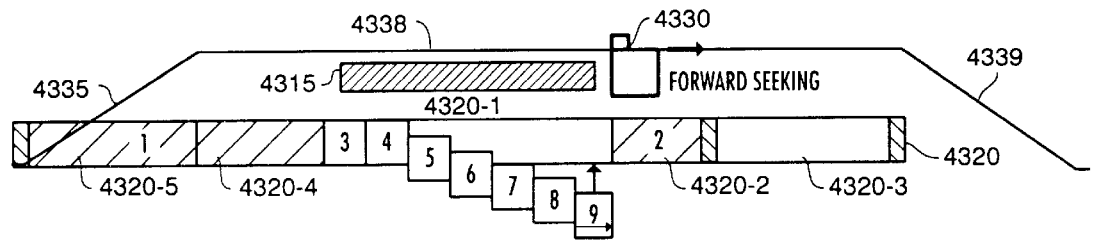
Figures 6F, 43:
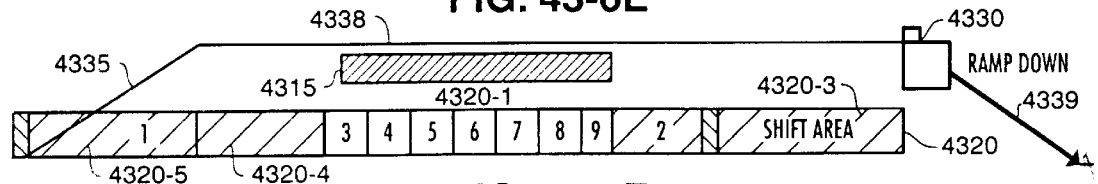
Figures 7A, 43:
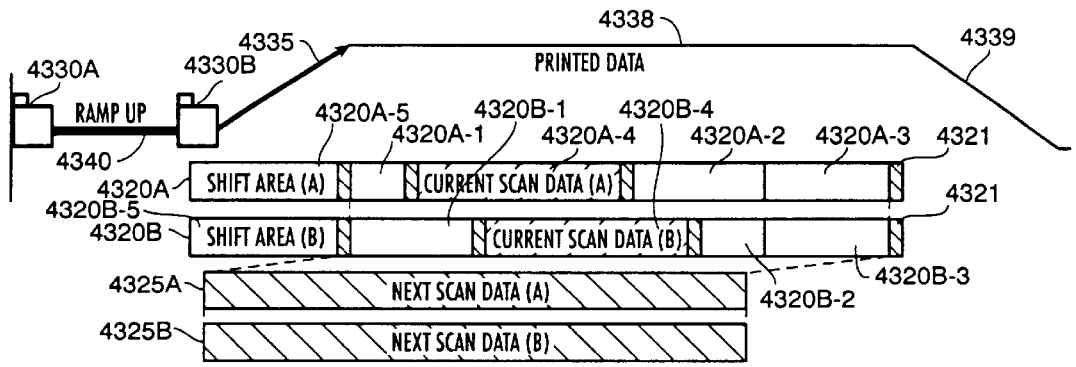
Figures 7B, 43:
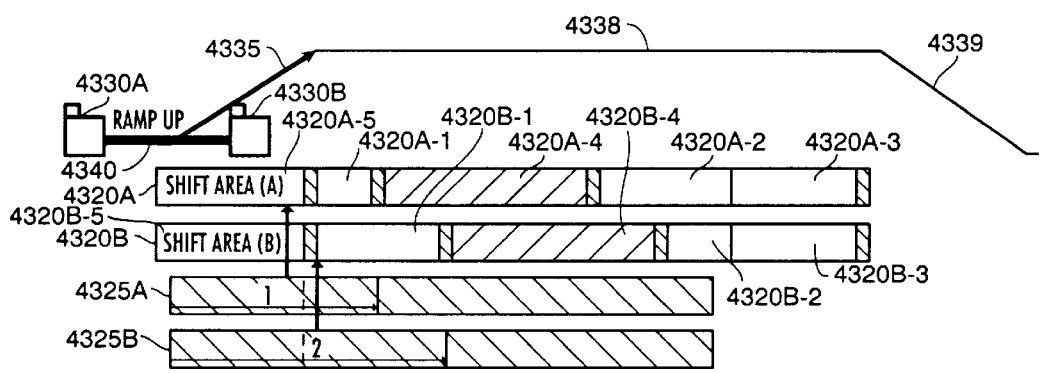

As print head 4330 continues to print in the forward direction, it continues to empty storage locations in print buffer 4320. This situation is illustrated in FIG. 43-6E in which print head 4320 has completed printing of all print information in a current scan at 4315. Printer driver 114 continues to transfer subsequent blocks of print data for a next scan into the emptied locations of print buffer 4320. At the same time, print head 4320 commences forward seeking to the first print position of the print data for the next scan. In FIG. 43-6F, print head 4330 reaches that position and begins ramp-down from a uniform scanning speed to a stationary speed so as to reverse scanning direction for reverse direction printing.

During ramp-down and prior to ramp-up for reverse printing, area 4320-3 is now available as an empty location for a shift area for reverse printing. As a consequence, even if print data for a next sequential scan is the same size or larger than the print data stored in print buffer 4320, there is still empty locations in print buffer 4320 at area 4320-3 to accept print data for the next sequential scan. As a consequence, transmission of print data from printer driver 114 to print buffer 4320 is increased.

Reverse printing proceeds generally along the lines shown in FIG. 43-2, and involves transfer of next scan data into empty locations of print buffer 4320 during ramp-up, and sequential transfer of blocks of print data to the print buffer as print buffer locations are emptied during printout.

In summary, use of a shift area so as to increase efficiency of transmitting print data involves cooperation between control on the printer driver and control on the printer side. On the printer driver side, the printer driver monitors the left and right edges for the current scan (which has previously been transmitted) and a next scan (which has yet to be transmitted). If the next scan's left edge is smaller than the current scan's left edge, then the printer driver sends a data block until the current scan's left edge has been reached. Likewise, if the next scan's right edge is larger than the current scan's right edge, then the printer driver sends a data block for the right side of the next scan until the current scan's right edge has been reached. This processing ensures that, in a situation where a next scan is larger than a current scan, data is transmitted as efficiently as possible.

In addition, for overlapping areas where a next scan's print area overlaps onto a current scan's print area, the printer driver divides the overlapping area into small blocks. In dependence on receipt of busy or ready signals from the printer, the printer driver transmits the overlapping areas in units of the small blocks. If the current scan is in a forward direction, then the printer driver transmits the next scan's overlap data in small blocks from left to right; whereas if the current scan is in a reverse direction, the printer driver sends the overlapping area of the next scan in small blocks from right to left.

On the printer side, when printing starts for a current scan, the printer maintains a monitor on the location of the print head. If the right edge of a received block of printer data is smaller than the current scan's left edge (as updated by the printer's monitor of carriage movement), then the printer puts the received data block into the print buffer immediately. Likewise, if the left edge of a received block of print data for a next scan is larger than the right edge of a current scan (as updated by the printer's monitor of carriage movement), then the printer puts the received data block into the print buffer immediately. For overlapped areas, that is, where a received block overlaps onto a current scan's print area, the printer issues a busy signal so as to stop transmission of any additional print data from the printer driver. When the block specified by the printer driver becomes vacant entirely, as updated by the printer's monitor of carriage movement, then the printer puts the received data block into the print buffer, and releases the busy signal so as to signify to the printer driver that the printer is ready to receive additional information.

In any event, if a current scan is in the forward direction, then the printer prints commencing from the end of the shift area (as measured in the forward direction) of the print buffer, whereas, if the current scan is in the backward direction, then the printer prints commencing from the end of the shift area (as measured in the backward direction).

These generalized procedures are illustrated in FIG. 43-7, which illustrates printing by two print heads using two print buffers, each with a shift area, in a situation where current print data is smaller than print data for a next scan. Printing illustrated in FIG. 43-7 is for a forward direction, but as will be appreciated from the general guidelines outlined above, printing and data transfer in a reverse direction proceeds complementarily.

In FIG. 43-7A, dual print heads 4330A and 4330B are displaced with a lateral distance 4340 therebetween, and are arranged to print in a uniform scanning speed from a stationary position, through a ramp-up period at 4335 to a uniform scanning speed, through a print area 4338 at a uniform scanning speed, and through a ramp-down period at 4339 from the uniform scanning speed to the stationary position. One print buffer is provided for each print head, with print buffer 4320A being provided for print head 4330A, and with print buffer 4320B being provided for print head 4330B. Each print buffer includes print data for a current scan, with the size of print data for a next scan being larger than the size of print data for the current scan. Thus, for print buffer 4320A, print data for a current scan is stored in area 4320A-4, with empty areas 4320A-1, 4320A-2 and 4320A-3 being empty. A shift area 4320A-5 prefixes print buffer 4320A so as to increase efficiency of data transfer. 4321 denotes storage locations for the nozzle offset length.

Likewise, for print buffer 4320B, area 4320B-4 contains print data for a current scan. Areas 4320B-1, 4320B-2 and 4320B-3 are empty. A shift area 4320B-5 precedes print buffer 4320B so as to increase the efficiency of data transmission to print buffer 4320B, and 4321 indicates storage locations for the nozzle offset.

At the host processor side, one print data store is provided for each print head. Thus, data store 4325A is provided for print head 4330A and stores print data for a next scan; and print data store 4325B is provided for print head 4330B and contains print data for a next scan for print head 4330B.

In FIG. 43-7B, print heads 4330A and 4330B begin to ramp-up from a stationary position to a uniform scanning rate across a recording medium. Printer driver 114, in the absence of a busy signal from printer 30, determines based on previously transmitted print data that the left edge of next scan data for print head 4330A is smaller than the left edge for current print. data, and consequently sends a first block of print data from print data store 4325A to print buffer 4320A, which is stored in shift area 4320A-5 and area 4320A-1. Likewise printer driver 114 determines that the left edge of next scan data for print head 4330B is smaller than the left edge of the current scan data for print head B. As a consequence, printer driver 114 transmits one block of print data for print head 4330B from print data store 4325B to print buffer 4320B. The block of print data for the next scan is stored in shift area 4320B-5 and in area 4320B-1.

Figures 7C, 43:
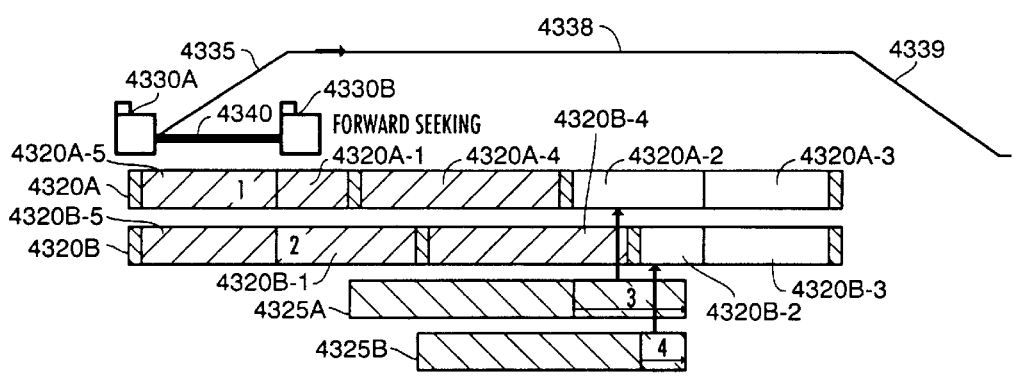

In FIG. 43-7C print heads 4330A and 4330B have reached their uniform scanning speed and commence forward seeking to the first print position for either of print head 4330A and 4330B. Printer 30 still has not sent a busy signal since empty areas remain in print buffers 4320A and 4320B and printer driver 114 has not sent data that overlaps onto existing print data for a current scan. Since printer driver 114 therefore concludes that printer 30 is ready to accept additional print data, it transmits print data appropriately. In this case, since the right edge of next scan data for print head 4330A is larger than the right edge of print data for a current scan, printer driver 114 transmits a block of print data from print data store 4325A to print buffer 4320A. In this case, the transmitted data is stored in area 4320A-2. Printer driver 114 may attempt to send new print data for print head 4330A, but since the transmitted data would overlap onto non-empty locations in the print buffer, any such transmission would cause the printer to generate the busy signal. At this point printer driver 114 determines that, for print head 4330A, the left edge for next scan is not smaller than the left edge for the current scan, and that the right edge for the next scan is not larger than the right edge for the current scan. Consequently, no print data for head 4330A is transmitted by the printer driver until the busy signal clears.

On the other hand, printer driver 114 determines that the right edge of next scan data for print head 4330B is larger than the right edge for print data for the current scan. Accordingly, a block of print data is transmitted from print data store 4325B to print buffer 4320B. In this case, the block of transmitted data is stored in area 4320B-2. Printer driver 114 may attempt to transmit additional print data for head 4330B, but since the transmitted data would overlap onto non-empty locations in the print buffer, any such transmissions would cause the printer to generate the busy signal. At this point printer driver 114 determines that, for print head 4330B, the left edge of the next scan print data is not smaller than the left edge of the current scan print data, and that the right edge of the next scan print data is not larger than the right edge of the current scan print data. Consequently, no print data for head 4330B is transmitted to the print driver until the busy signal clears.

At this point, no further data is transmitted from printer driver 114 to printer 30. If printer driver 114 were to transmit print data for either of print heads 4330A or 4330B, the printer driver would precede the data with an [EDGE] command which specifies to the printer the locations in the print buffer to which the succeeding block of print data should be stored. Based on the locations specified in the [EDGE] command, the printer would realize that any succeeding blocks of print data from driver 114 would overlap onto non-empty locations in the print buffer. the printer thereupon issues the busy signal since any transmitted print data would -unprinted print data, and printer 30 would is therefore not ready to receive additional print data.

Figures 7D, 43:
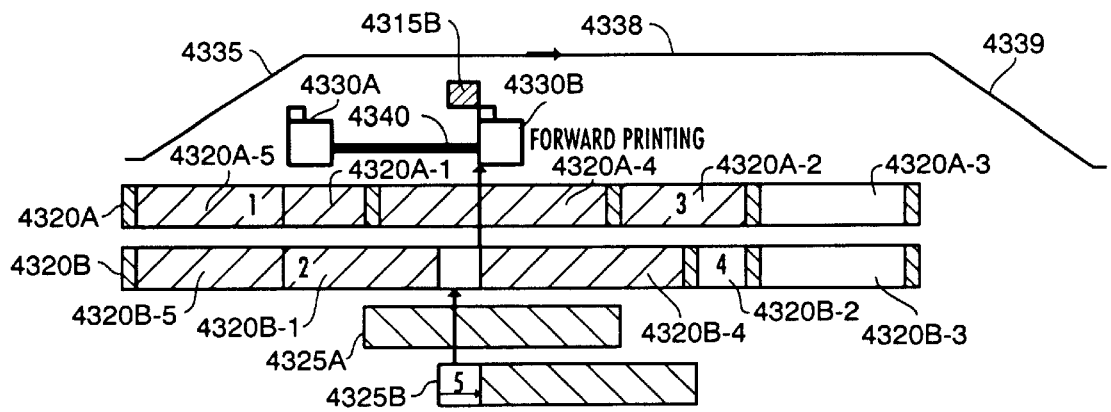

At FIG. 43-7D, through continued forward seeking of print heads 4330A and 4330B, print head 4330B has reached its first print position. Accordingly, printout commences as indicated at 4315B, thereby emptying locations in print buffer 4320B. Printer driver 114, which has divided the next scan's print area into small blocks, transmits a first one of the small blocks from print data store 4325B into print buffer 4320B. Printer 30, sensing that the buffer locations in 4320B are empty based on the current location of print head 4330B, permits immediate storage of the transmitted block.

Figures 7E, 43:
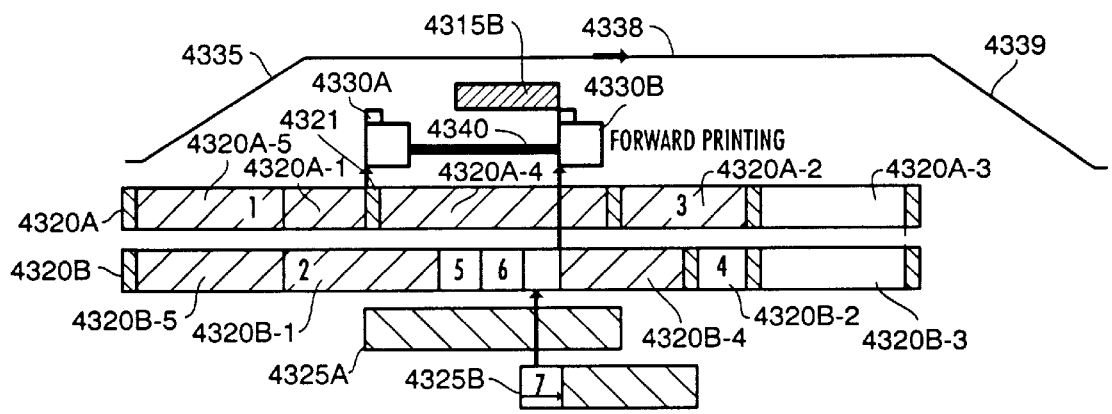

In FIG. 43-7E, upon continued forward printing of print head 4330B, additional locations in print buffer 4320B are emptied, thereby permitting transfer of data by printer driver 114 from print data store 4325B into print buffer 4320B. At the same time, print head 4330A has reached its first print position (more accurately, print head 4330A has reached the first print position in the nozzle offset area 4321A). Printing therefore commences by print head 4330A, and continues for print head 4330B.

Figures 7F, 43:
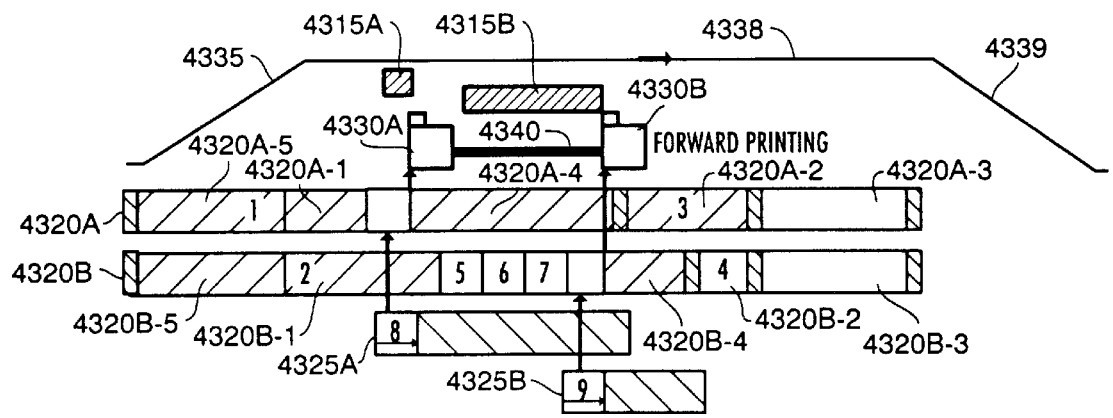

In FIG. 43-7F, with continued printing by print head 4330B at 4315B, additional locations in print buffer 4320B are emptied. Printer driver 114 transmits additional blocks of print data for a next scan from print data store 4325B to print buffer 4320B. Since these locations are empty, printer 30 permits immediate storage of the transmitted blocks.

In the meantime, print head 4330A has commenced printing as indicated at 4315A, thereby emptying locations in print buffer 4320A. As a consequence, printer driver 114 transmits a block of print data for a next scan from print data store 4325A to print buffer 4320A. Since the locations in print buffer 4320A are empty and do not contain overlapped data (as-yet-unprinted data for a current scan), printer 30 allows the transmitted data to be stored immediately into print buffer 4320A.

Figures 7G, 43:
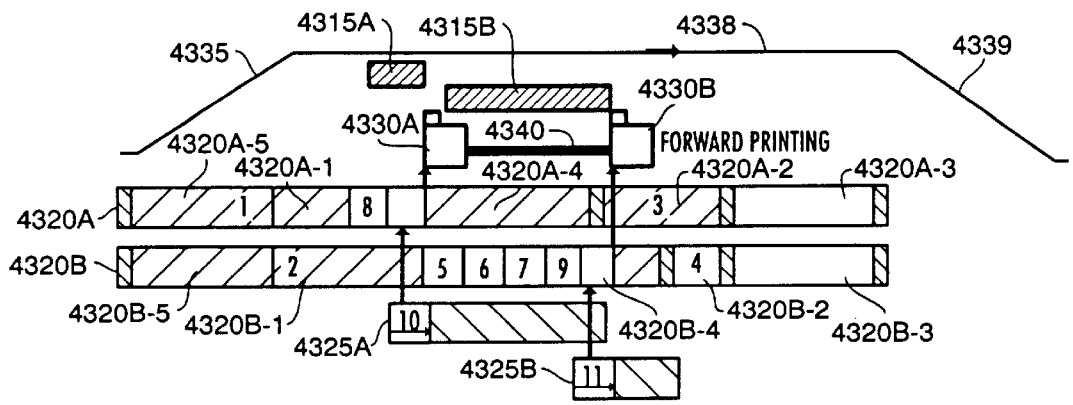
Figures 7H, 43:
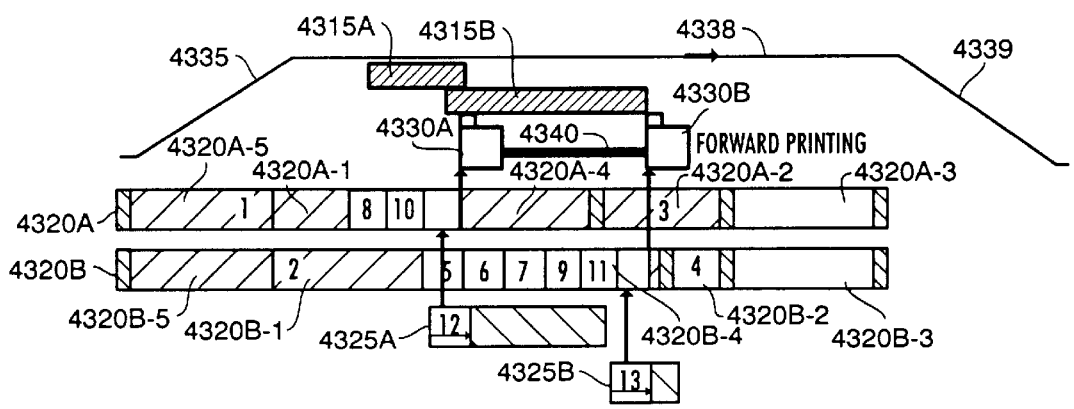

At FIGS. 43-7G and 43-7H, print heads 4330A and 4330B continue printing, as indicated respectively at 4315A and 4315B. With continued printing, additional locations in print buffers 4320A and 4320B are emptied. As a consequence, printer driver 114 transmits additional print data for a next scan from print data stores 4325A and 4325B, block-by-block, into empty locations of print buffers 4320A and 4320B, respectively. During this processing, and all processing in which print data for a next scan is available for transmission from driver 114 to both heads, driver 114 determines which head will have data transmitted first (i.e., A before B or B before A). the driver makes this determination based on which head is more likely to empty a block first, based on the relative positions of the overlapped areas. This processing is described below in FIGS. 44C to 44J, which explains the procedure by which the driver decides whether to send blocks of print data for head A before B, or head B before A.

Figures 7I, 43:
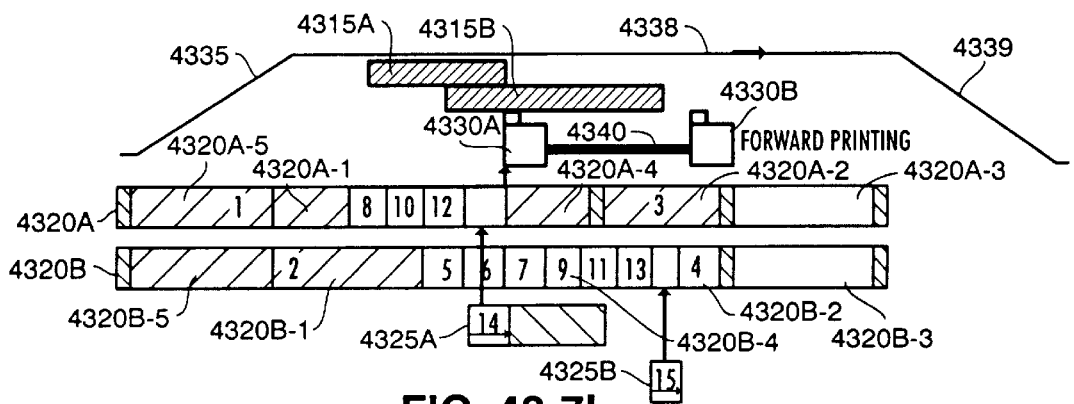

In FIG. 43-7I, printing has concluded for print head 4330B, thereby emptying the last location for print buffer 4320B. Accordingly, printer driver 114 transmits the last remaining block of print data for a next scan from print data store 4325B to print buffer 4320B. At the same time, printout for print head 4330A continues as indicated at 4315A, emptying additional locations in print buffer 4320A. As those locations are emptied, printer driver 114 transmits blocks of print data for a next scan from print data store 4325A to print buffer 4320A.

Figures 7J, 43:
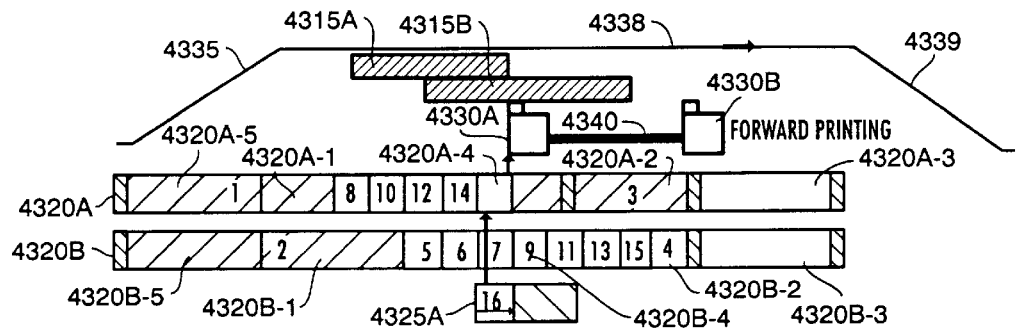
Figures 7K, 43:
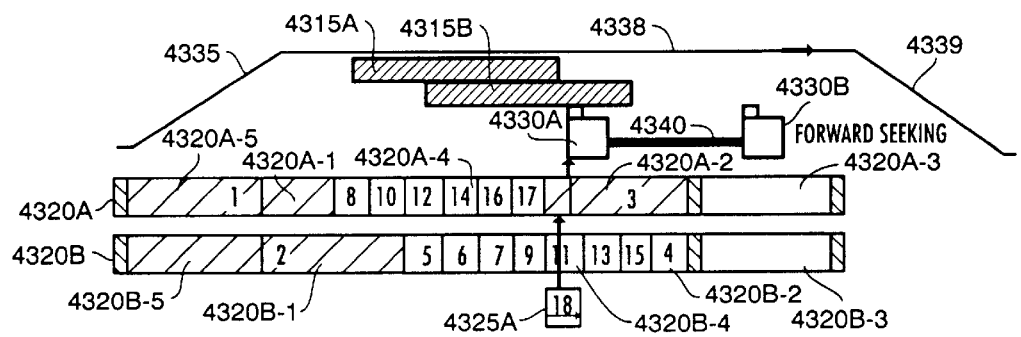

In FIGS. 43-7J and 43-7K, printing continues for print head 4330A, emptying additional locations in print buffer 4320A. As those locations are emptied, they are filled by print data for a next scan transmitted by driver 114 from print data store 4325A, block-by-block, to print buffer 4320A. In FIG. 43-7K, printout of current print data for print head 4330A is completed, resulting in a last block being transmitted from print data store 4325A to print buffer 4320A. Heads 4330A and 4330B then commence forward seeking so as to reach the first print position for print data in the next scan.

Figures 7L, 43:
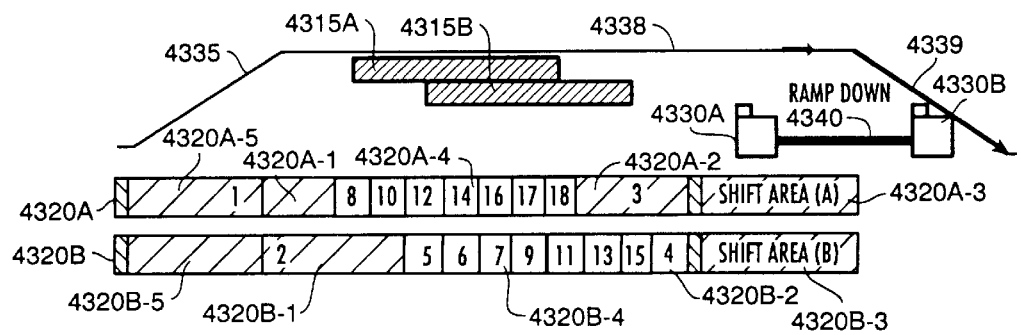

In FIG. 43-7L, after print heads 4330A and 4330B have reached the first print position for reverse printing of the next scan line, the print heads ramp-down from the uniform scanning speed to a stationary position. At that time, areas 4320A-3 and 4320B-3 are empty locations in buffers 4320A and 4320B, respectively. These empty areas therefore become shift areas that receive print data for a next subsequent scan during a ramp-up period for reverse printing of the now-current scan print data currently stored in print buffers 4320A and 4320B.

9.2 General Description Of Buffer Control

The flowcharts of FIGS. 44C through 44J illustrate the process steps performed by CPU 100 of host processor 23 as part of execution of printer driver 114, so as to effect data transmission of print data for a next scan line from print data store 136 to print buffer 139, in accordance with the shift buffer control according to the invention. The process steps illustrated in these flowcharts are stored as computer executable process steps on a computer-readable medium such as disk 25 or in RAM 116, and executed by CPU 100 so as to effect shift buffer control according to the invention.

Figure 44A:
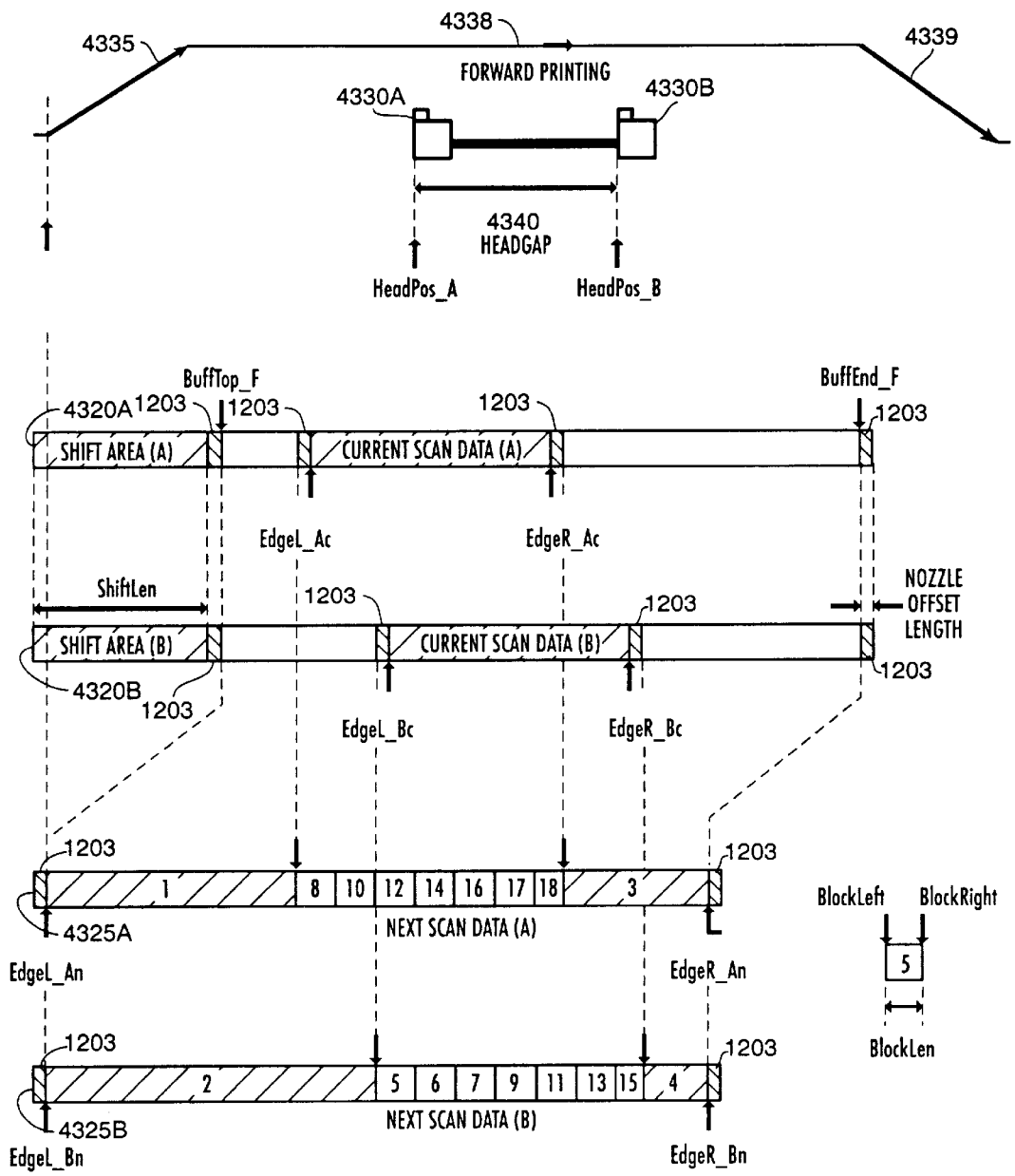
FIG. 44A shows print data transfer in a forward direction for a pair of print heads.
Figure 44B:
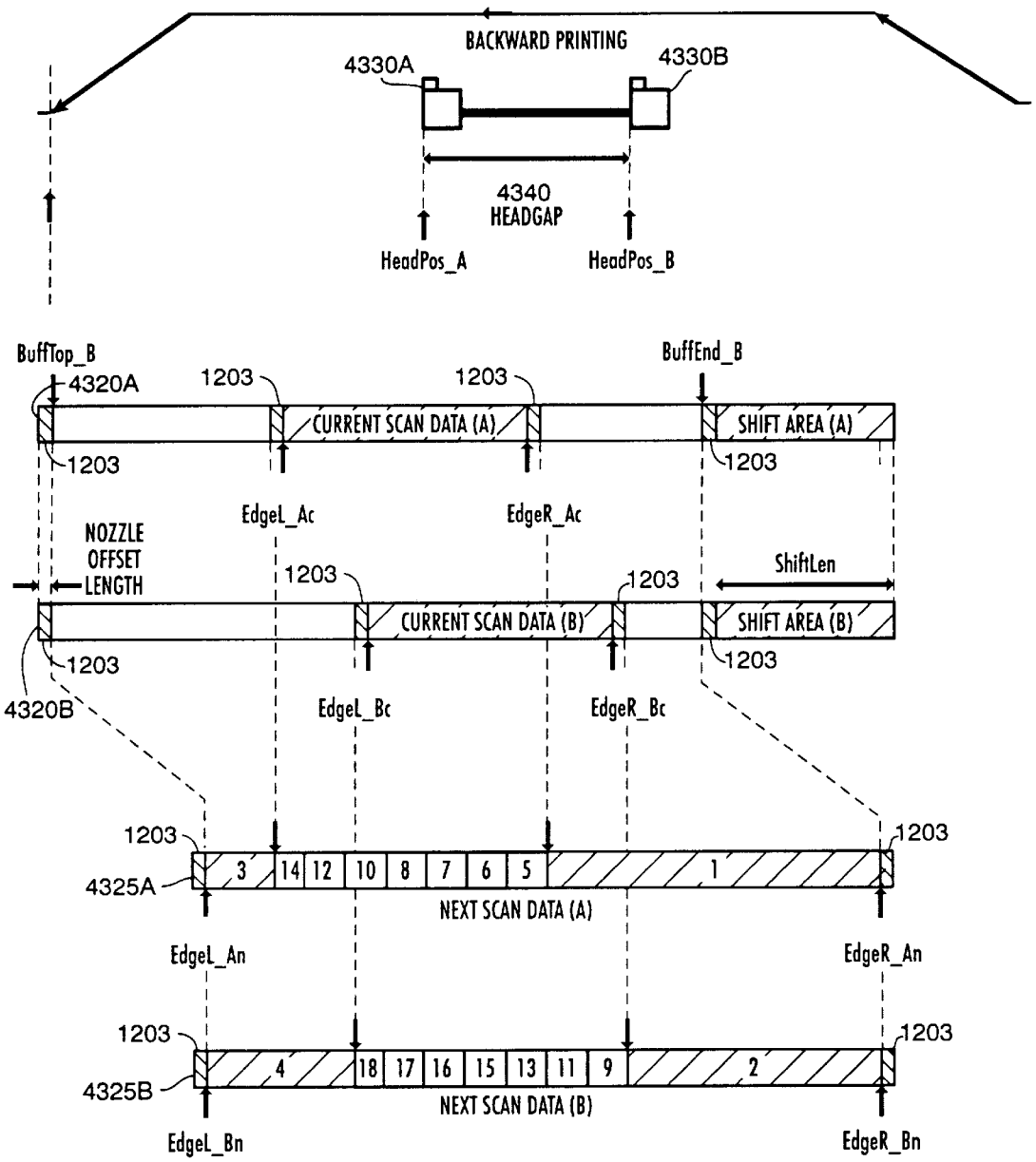
FIG. 44B shows print data transfer in a backward direction for a pair of print heads.
Figure 44C:
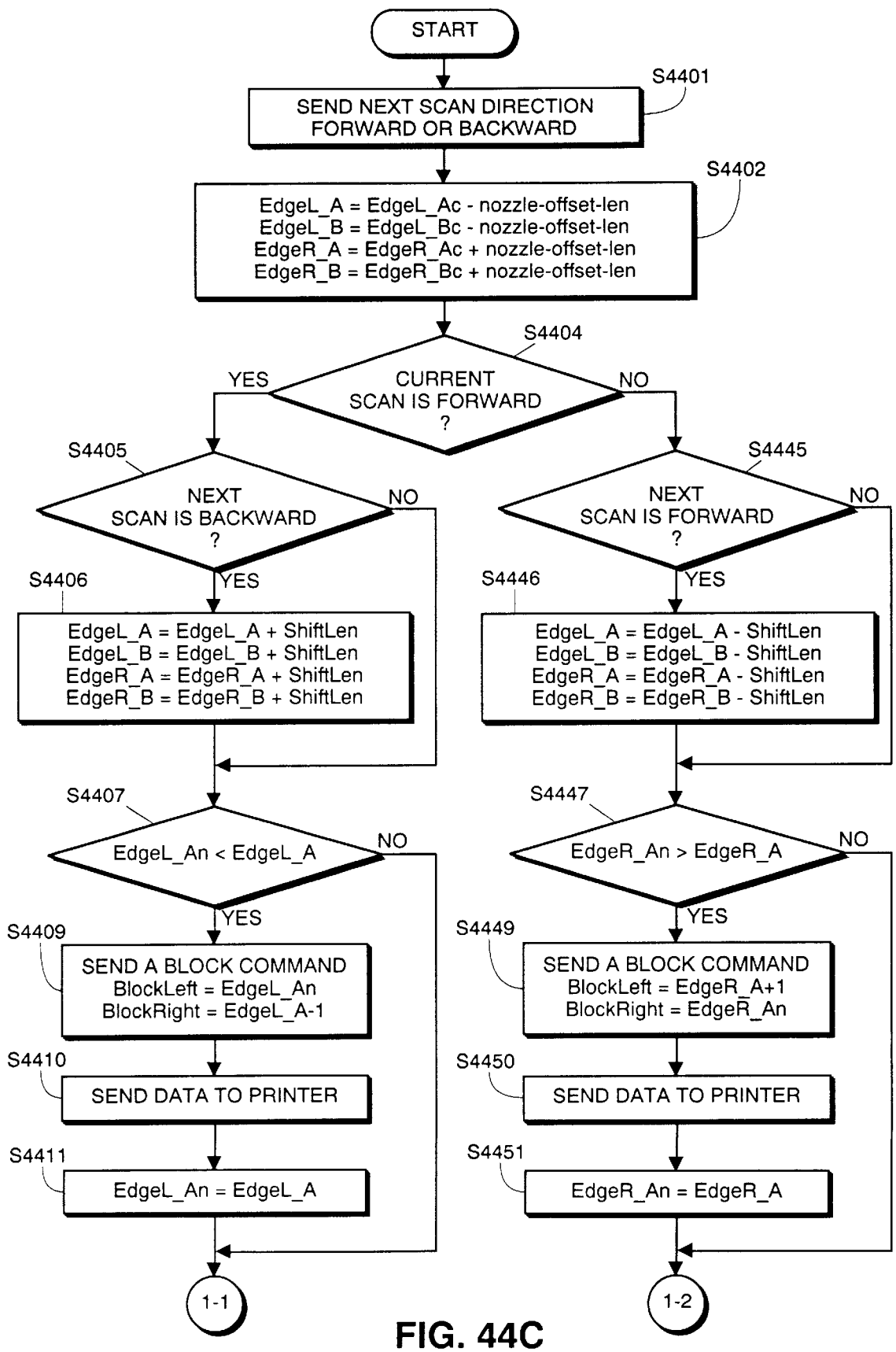
FIGS. 44C to 44M are flowcharts illustrating transfer of print data from a print data store in a host processor to a print buffer in a printer.
Figure 44D:
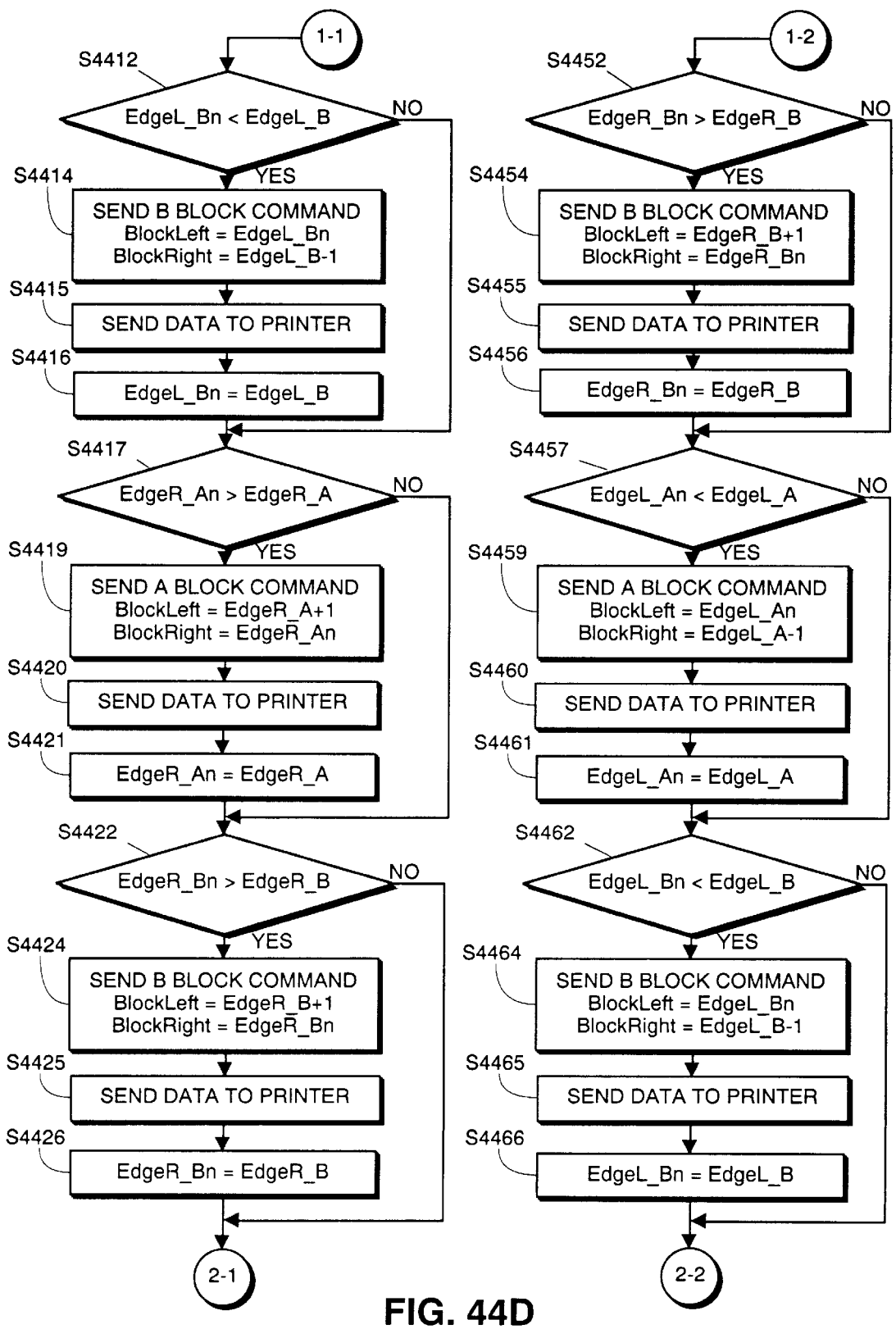
Figure 44E:
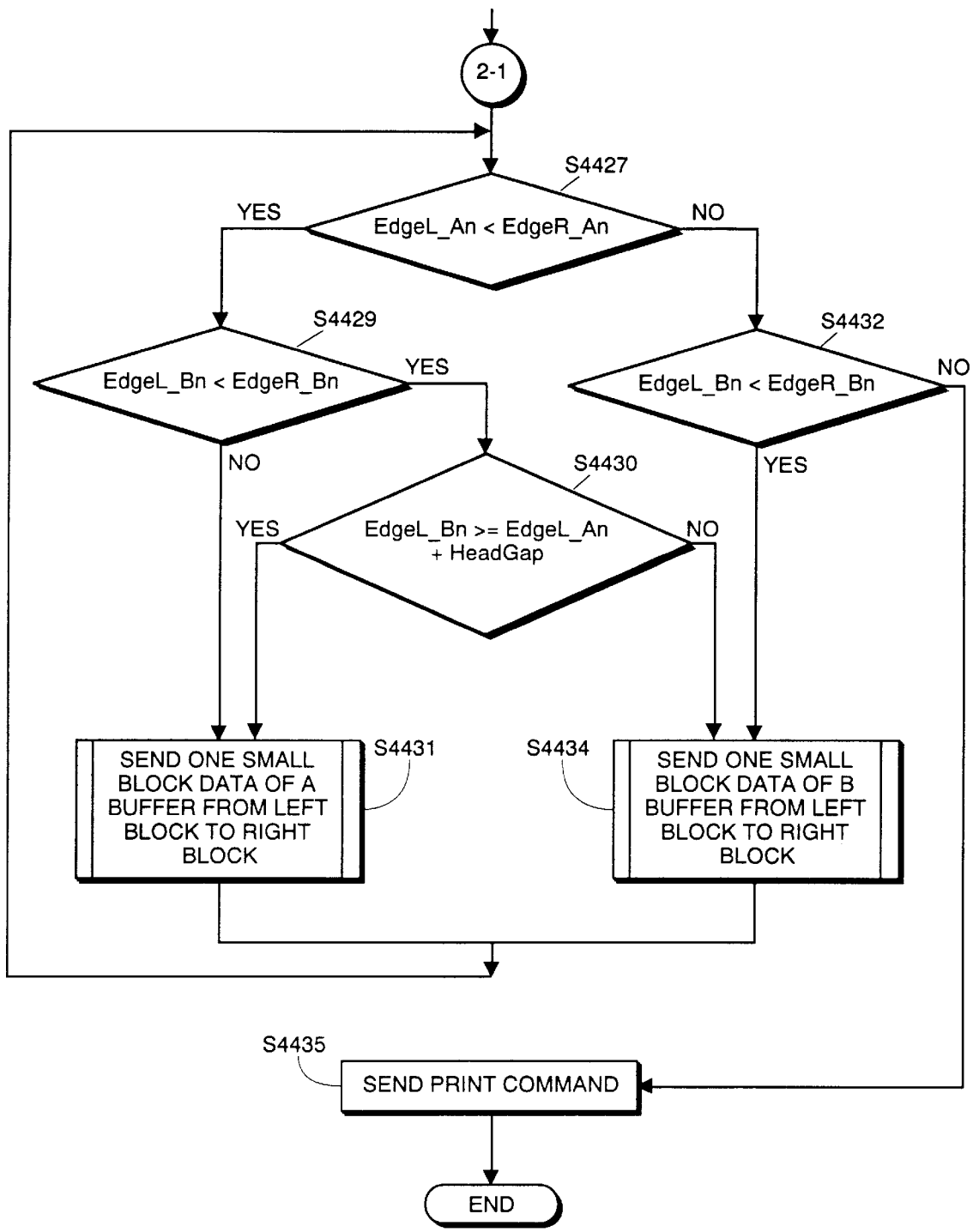
Figure 44F:
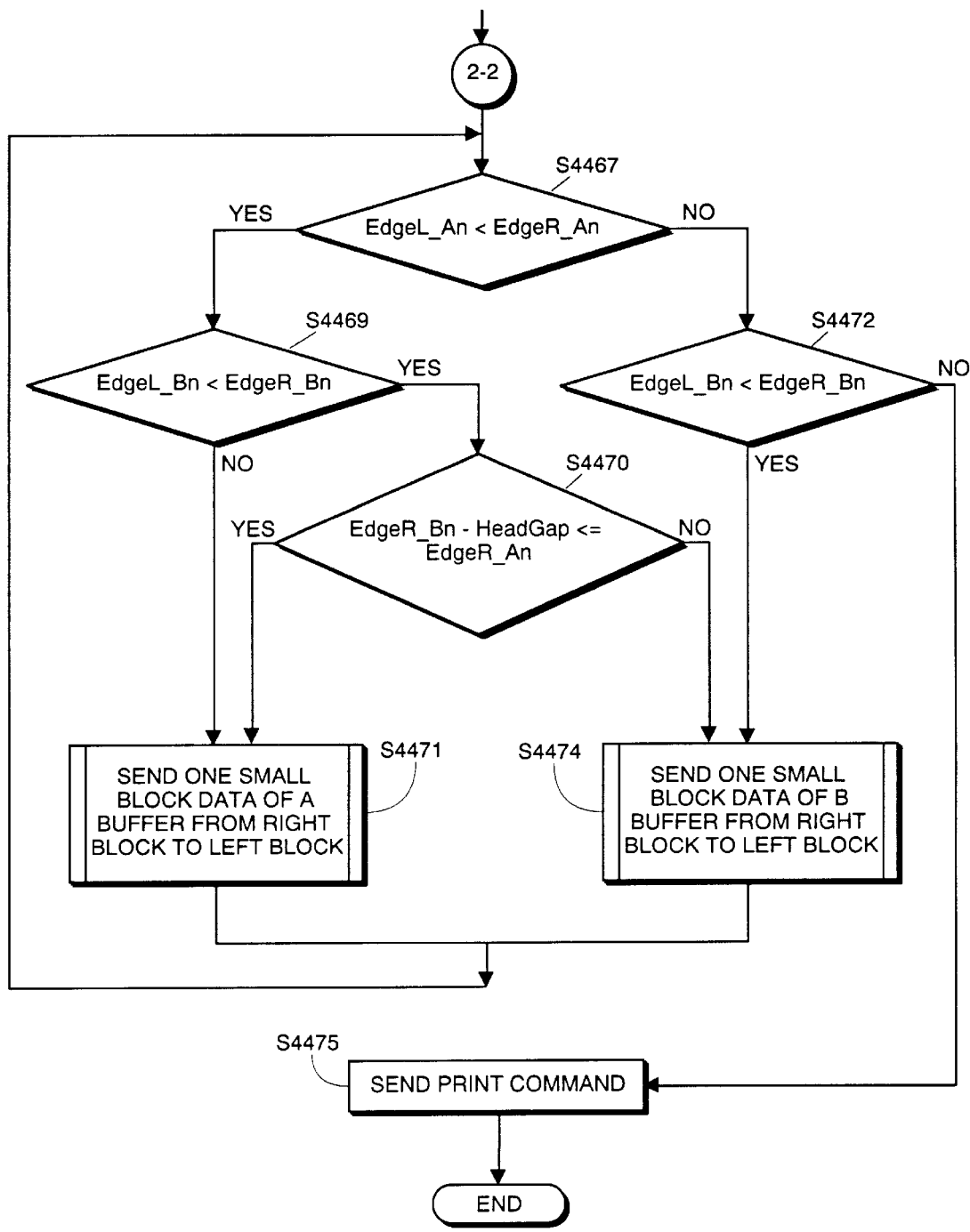
Figure 44G:
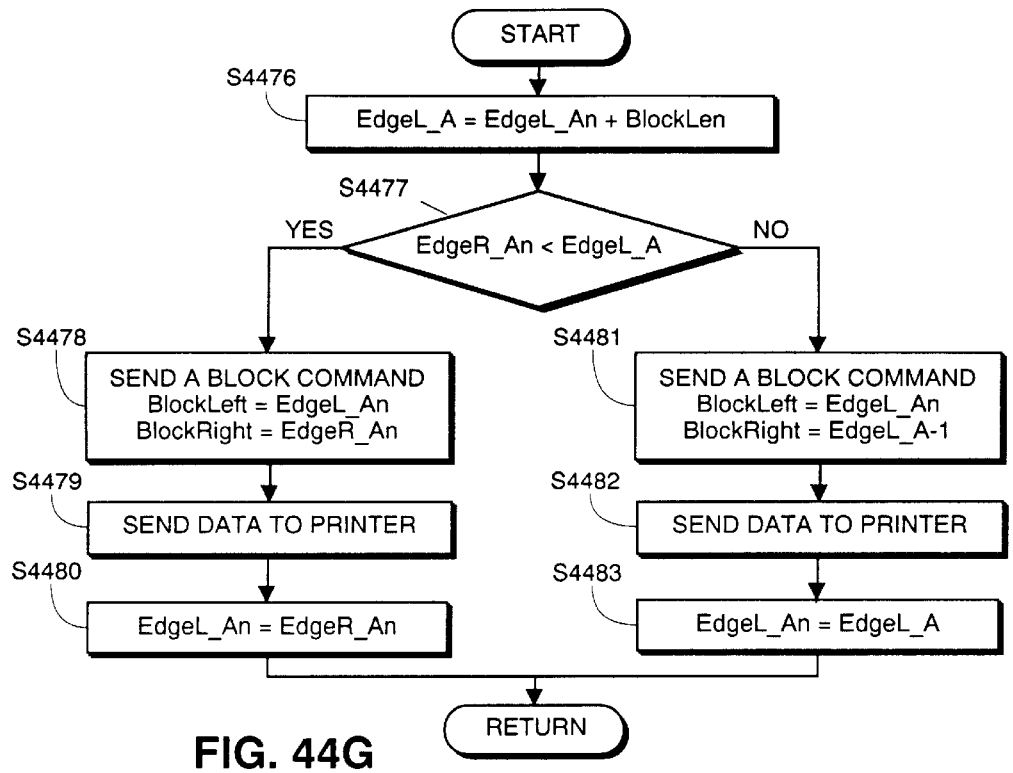
Figure 44H:
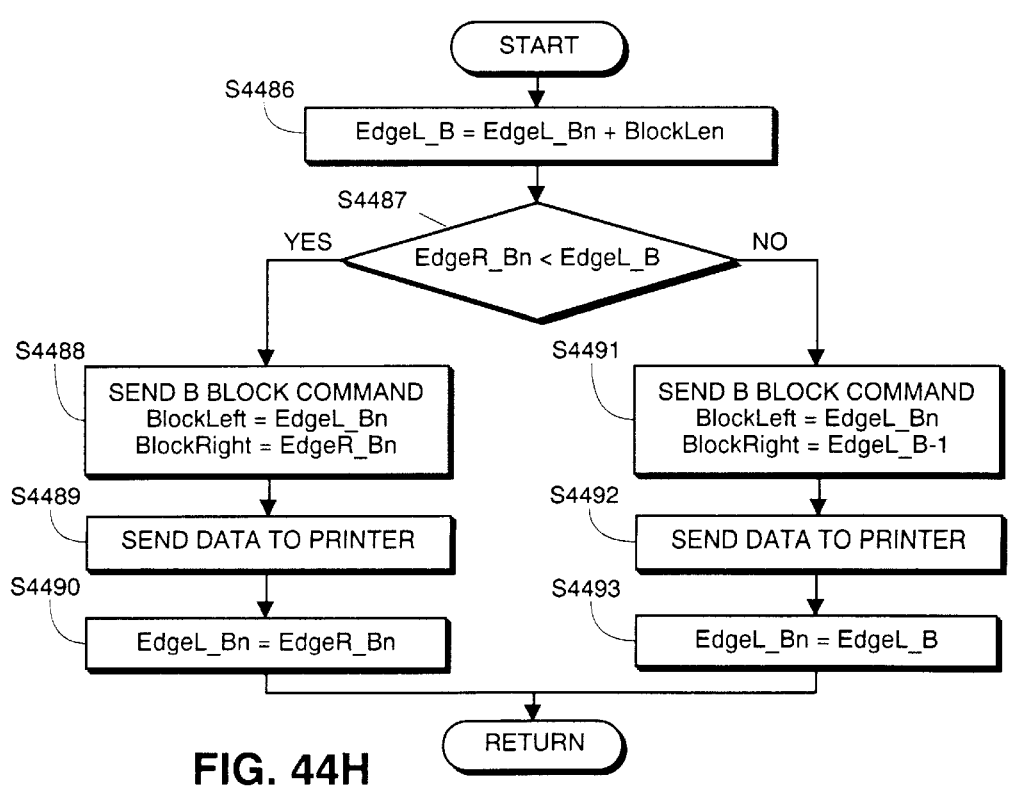
Figure 44I:
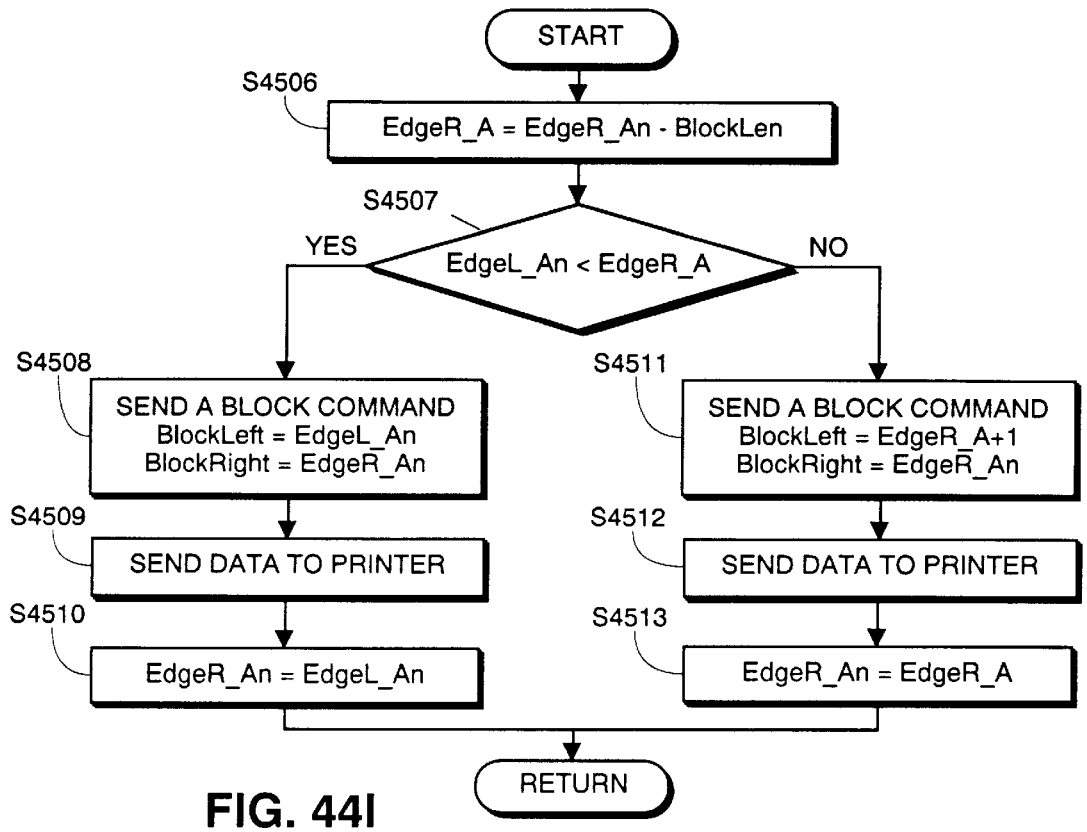
Figure 44J:
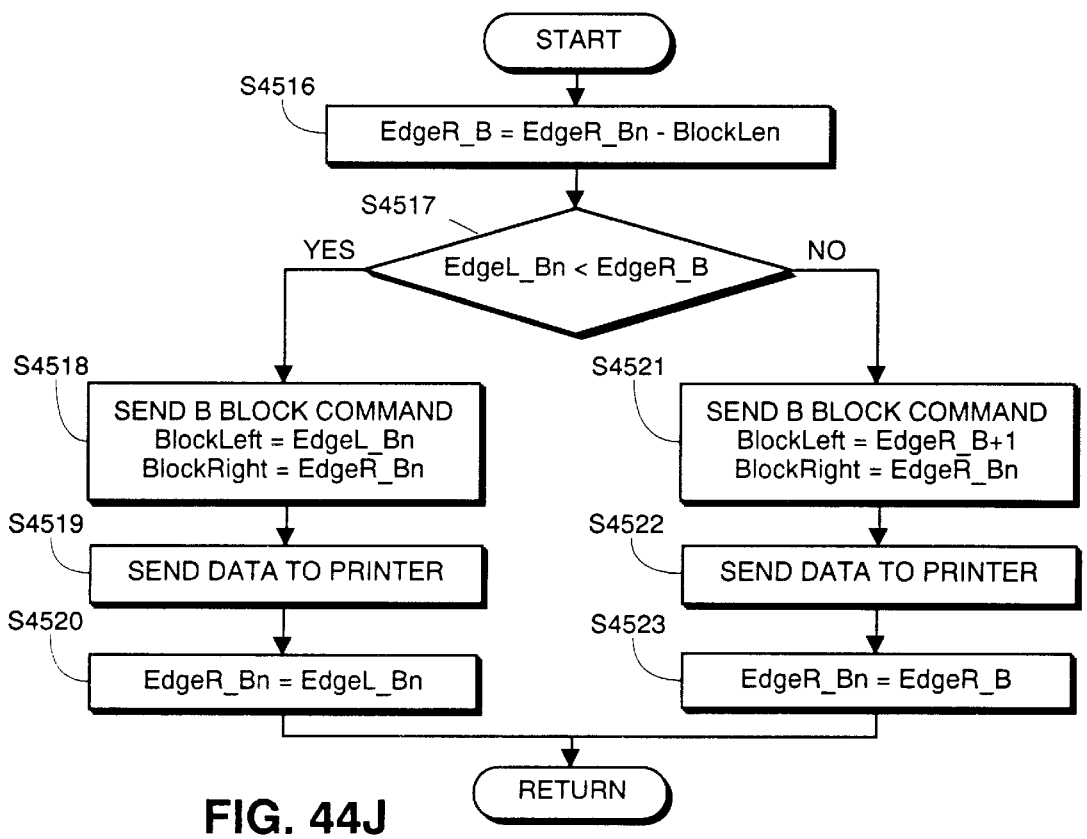
Figure 44K:
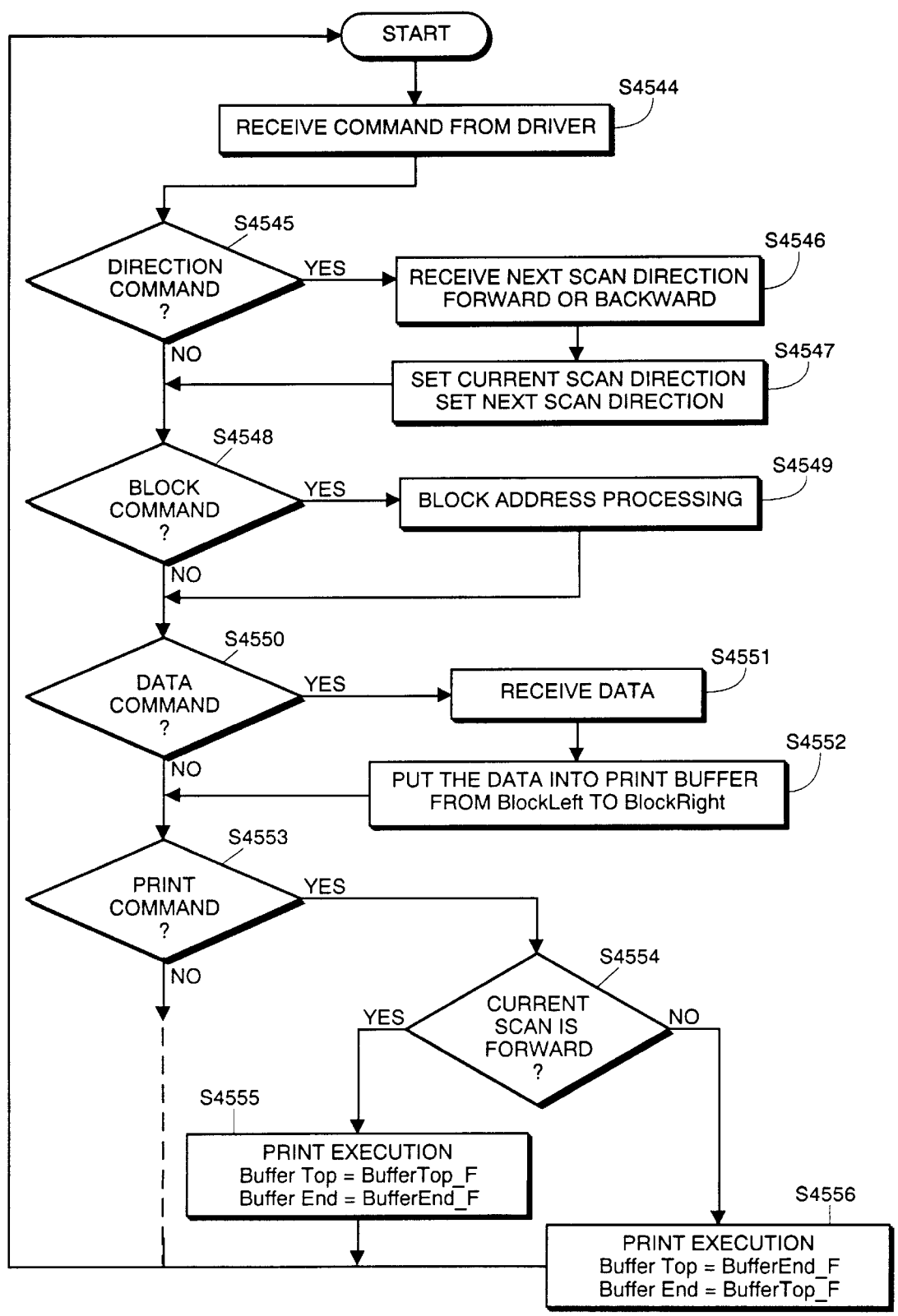
Figure 44L:
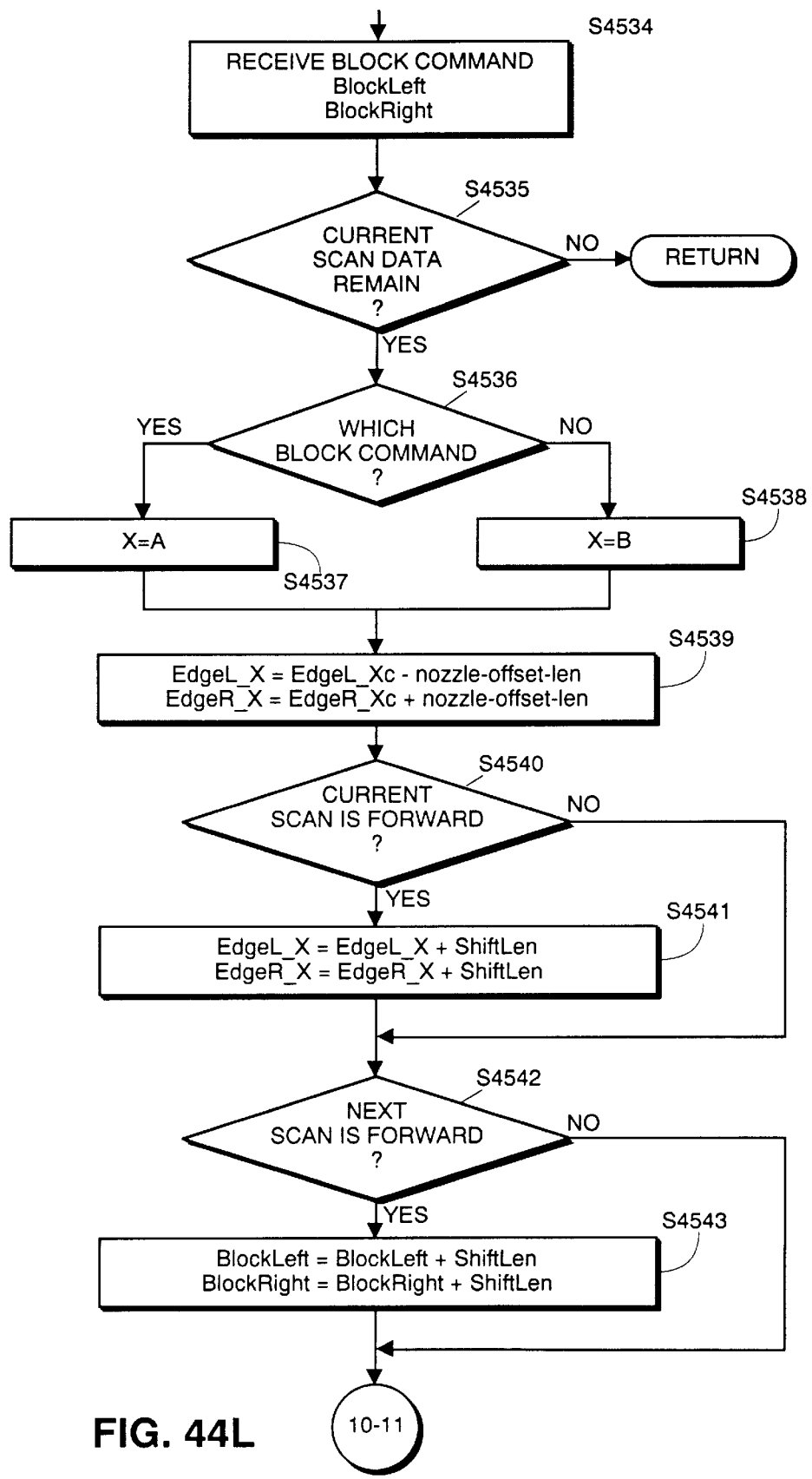
Figure 44M:
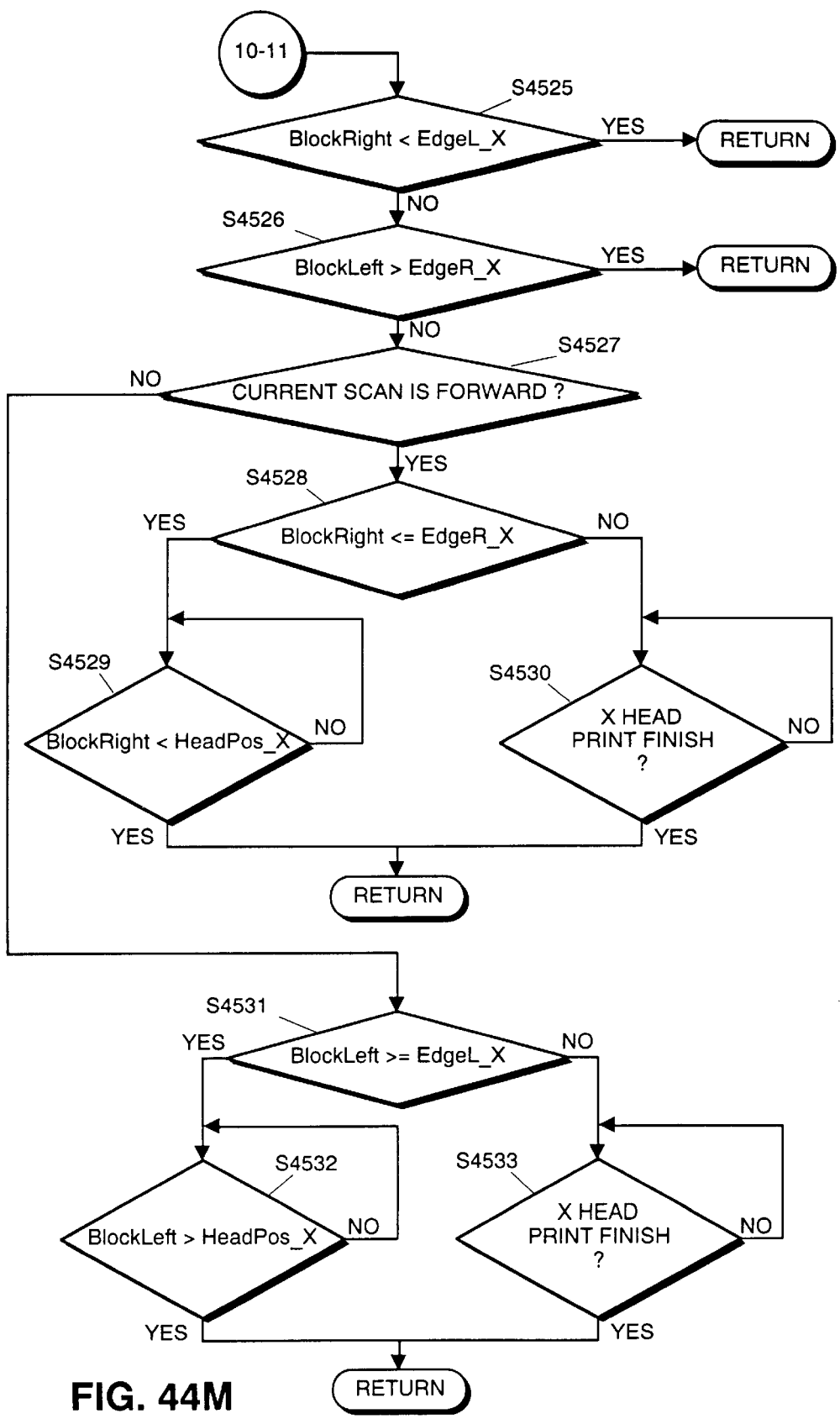

Likewise, the flowcharts of FIGS. 44K through 44M illustrate process steps performed by CPU 121 of printer 30, so as to effect print buffer control according to the invention. The process steps shown in these flowcharts are stored as computer executable process steps on a computer-readable medium such as ROM 122 or in RAM 129, for execution by CPU 121 so as to effect print control according to the invention.

In accordance with the process steps illustrated in these flow diagrams, print buffer control according to the invention defines a print buffer with a shift area prefixed to the print buffer, with the shift area corresponding to a ramp-up period in a forward direction of a print head. For reverse printing, the print buffer includes a shift area appended at the end thereof, with the shift buffer corresponding to the ramp-up period of the print head during reverse printing. The shift buffer for forward printing is part of the print buffer for reverse printing, and the shift buffer for reverse printing is part of the print buffer for forward printing.

By virtue of this arrangement, in which a shift buffer is appended or prefixed to a print buffer, a printer driver always has locations to transmit print data for a next scan line during a ramp-up period of the print head. Thus, efficiency of transmitting print data for a next scan line from a printer driver to a printer is increased.

Moreover, because the shift area corresponds to the ramp-up period, and because the shift buffer in the forward direction is part of the print buffer for printing in the reverse direction, and vice-versa, the increase in efficiency in print data transmission is obtained without the need to provide large amounts of additional print buffer locations, such as conventional double buffering arrangements.

Before explaining the flow diagrams of FIGS. 44C through 44J, and the flow diagrams of FIGS. 44K through 44M, FIGS. 44A and 44B will be used to give an explanation of certain variables used in those flow diagrams. These variables correspond to physical distances on printer 30, to storage locations within print buffers, and to the correspondence of storage locations within print buffers and their printout position on a recording medium.

FIG. 44A provides variable identifications for printing in the forward direction. Thus, for forward printing with print heads 4330A and 4330B using current print data in print buffers 4320A and 4320B, and with transmission of next scan print data from print data stores 4325A and 4325B, the following variables are defined: head gap 4340 defines the distance between heads 4330A and 4330B, head position A and head position B define the current carriage positions of heads A and B, respectively, BuffTop_F and BuffEnd_F define the top and the end of print buffers 4320A and 4320B for forward direction printing, EdgeL__Ac and EdgeR__Ac define the left and right edges of the current scan data for head 4330A, EdgeL__Bc and EdgeR__Bc define the left and right edges of the current print data for print head 4330B, ShiftLen defines the length of the shift area, reference numeral 1203 defines the nozzle offset length so as to compensate for the slant angle of the nozzles in the print heads, EdgeL__An and EdgeR__An refer to the left and right edges of next scan data for print head 4330A, EdgeL__Bn and EdgeR__Bn define the left and right edges of next print data for head 4330B, BlockLen defines the width of blocks into which printer driver 114 divides next scan print data for transmission block-by-block to print buffers 4320A and 4320B, and BlockLeft and BlockRight indicate the left and right addresses of an individual block currently being considered for transmission.

FIG. 44B identifies variables for printing by print heads 4330A and 4330B in a reverse (or "backward") direction. Thus, for backward printing with print heads 4330A and 4330B using current print data in print buffers 4320A and 4320B, and with transmission of next scan print data from print data stores 4325A and 4325B, the following variables are defined: head gap 4340 defines the distance between heads 4330A and 4330B, head position A and head position B define the current carriage positions of heads A and B, respectively, BuffTop_B and BuffEnd_B define the top and the end of print buffers 4320A and 4320B for backward direction printing, EdgeL__Ac and EdgeR__Ac define the left and right edges of the current scan data for head 4330A, EdgeL__Bc and EdgeR__Bc define the left and right edges of the current print data for print head 4330B, ShiftLen defines the length of the shift area, reference numeral 1203 defines the nozzle offset length so as to compensate for the slant angle of the nozzles in the print heads, EdgeL__An and EdgeR__An refer to the left and right edges of next scan data for print head 4330A, EdgeL__Bn and EdgeR__Bn define the left and right edges of next print data for head 4330B, BlockLen defines the width of blocks into which printer driver 114 divides next scan print data for transmission block-by-block to print buffers 4320A and 4320B, and BlockLeft and BlockRight indicate the left and right addresses of an individual block currently being considered for transmission.

Representative examples of suitable values of the above-noted variables are as follows: 8 inches as the length for print buffers A and B, ½ inch as the length as a small data block, 2½ inches as the gap between head A and head B, 752 columns as the shift buffer area, and 32 columns for the nozzle offset length. The length of the current scan area and the next scan area depend upon the actual data being printed. For example, in connection with the example given at FIG. 43-7, the length of current scan print data is approximately 3 inches, whereas the length of next scan print area is 8 inches.

Referring now to the flowchart of FIGS. 44C through 44J, a detailed description will now be given of processing undertaken by printer driver 114 in accordance with stored program instructions sequences executed by CPU 100 in host processor 23.

Initially in step S4401, a command from host processor 23 to printer 30 sets the next scan direction (forward or backward) and the edges of print data of the current scan are defined in step S4402. The left edge of the print data in print buffer A, EdgeL__A, is set to set to EdgeL__Ac (left edge of current scan print data)−nozzle-offset-length. The right edge of the print data in print buffer A, EdgeR__A, is set to EdgeR__Ac (right edge of print data in the current scan)+nozzle-offset-length. The left edge of the print data in print buffer B, EdgeL__B, is set to set to EdgeL__Bc (left edge of print data for the current scan)−nozzle-offset-length. The right edge of the print data in print buffer B, EdgeR__B, is set to EdgeR__Bc (right edge of current scan print data)+nozzle-offset-length. As aforementioned, the nozzle-offset-length corresponds to storage locations in a print buffer for an area corresponding to the slant of the nozzles on a print head.

In step S4404, printer driver 114 decides whether the current scan is forward or backward. For forward printing, flows advances to step S4405 which determines the printing direction of the next scan. If step S4405 determines that the print direction of the next scan is backwards, the edges EdgeL__A, EdgeL__B, EdgeR__A and EdgeR__B are adjusted in step S4406 by adding the length of the shift area corresponding to the storage locations of each print buffer to be filled during the ramp-up period.

Steps S4407 through S4416 determine, for each of heads 4330A and 4330B, whether the next scan's left edge is less than the current scants left edge (meaning that empty areas exist in the left edge of the print buffer), and if so, transmit print data for the next scan from print data stores 4335A and/or 4335B to print buffers 4320A and/or 4320B, so as to fill up the left side of the buffer including the shift area when current printing is in a forward direction. Print buffer 4320A is processed for left edge data transfer in steps S4407 through S4411. When it is determined that the left edge of print data for the next scan, EdgeL__An, is less than EdgeL__A corresponding to the current scan, a block select command [BLOCK] and a data command [DATA] are sent to printer 30. The block select command is sent with a block left edge address of EdgeL__An (i.e., next scan left edge) and a block right edge address of EdgeL__A−1 (i.e., current scan left edge−1). The left edge of the next scan EdgeL__An is thereafter reset to Edge_A (S4411). Flow then advances to process buffer 4320B for left edge data transmit availability.

It should be pointed out that the processing of all the steps in FIGS. 44C and 44D are designed so that printer driver 114 can determine which locations in printer 30's print buffer are empty, and transmit data to those empty locations. It is therefore unlikely that printer 30 will issue a busy signal, which would signify that printer 30 is not prepared to accept data. However, if printer 30 does issue a busy signal (it may, for example, be involved in non-printing operations such as head cleaning or the like), then printer driver 114 stops transmitting data until the busy signal clears and printer 30 is again ready to accept data.

Print buffer 4320B is then processed for left edge data transfer in steps S4412 through S4416. When it is determined that the left edge of print data for the next scan, EdgeL__Bn, is less than EdgeL__B set for the current scan, a block select command [BLOCK] and a data command [DATA] are sent to printer 30. The block select command is sent with a block left edge address of EdgeL__Bn (i.e., next scan left edge) and a block right edge address of EdgeL__B−1 (i.e., current scan left edge −1). The left edge of the next scan EdgeL__Bn is thereafter reset to EdgeL__B (S4416).

Steps S4417 through S4426 determine, for each of print heads 4330A and 4330B, whether the next scan's right edge is greater than the current scan's right edge (meaning that empty areas exist in the right edge of the print buffer), and if so, transmit print data for the next scan from print data stores 4325A and/or 4325B to print buffers 4320A and/or 4320B, so as to fill up the right side of the buffer when current printing is in a forward direction. Print buffer 4320A is processed for right edge data transfer in steps S4417 through S4421. When it is determined that the right edge of print data for the next scan, EdgeR_An, is greater than EdgeR_A, a block select command [BLOCK] and a data command [DATA] are sent to printer 30. The block select command is sent with a block left edge address of EdgeR_A+1 (i.e., current scan right edge +1) and a block right edge address of EdgeR_An (i.e., next scan right edge). The block right edge of the next scan EdgeR An is thereafter reset to EdgeR_A (S4421). Flow then advances to process buffer 4320B for right edge data transmit availability.

Print buffer 4320B is then processed for right edge data transfer in steps S4425 through S4426. When it is determined that the right edge of print data for the next scan, EdgeR_Bn, is greater than EdgeR_B set for the current scan, a block select command [BLOCK] and a data command [DATA] are sent to printer 30. The block select command is sent with a block left edge address of EdgeR_B+1 (i.e., current scan right edge) and a block right edge address of EdgeR_Bn (i.e., next scan right edge). The right edge of the next scan EdgeR_Bn is thereafter reset to EdgeR_B (S4426).

The foregoing operations of steps S4405 through S4426 are performed during and before the ramp-up period of the print heads 4330A and 4330B. In accordance with the invention, it is determined where there are vacant storage locations in the print buffers 4320A and 4320B and print data is sent from print data store 136 of host processor 23 to the respective print buffers prior to the current scan of print positions of the buffers.

Steps S4427 through S4435 illustrate print data transfer during the current scan after transfer of data according to steps S4405 to S4426. Depending on speed of print data transfer, portions of these steps might actually be performed during the ramp-up period, if data transfer in steps S4405 to S4426 is completed before the end of the ramp-up period. These steps determine whether there is overlapped data only in buffer 4320A, only in buffer 4320B, or in both buffers 4320A and 4320B. In a case where there is overlap in both of buffers 4320A and 4320B, these steps further determine whether data for buffer 4320A should precede that for buffer 4320B, or vice-versa.

The steps illustrated at FIGS. 44E and 44F are executed at a time when it is likely that there will be an overlap between data transmitted by the printer driver 114 and as-yet-unprinted data in printer buffer 139. Accordingly, transmission of data by printer driver 114 is conditional on the busy signal from printer 30. If there is a busy signal then printer driver 114 stops transmission of data until the busy signal clears and printer 30 is again ready to accept new print data.

Thus, in steps S4427 and S4429, printer driver 114 tests whether EdgeL_An for the next scan is less than EdgeR_An for the next scan but EdgeL_Bn for the next scan is not less than EdgeR_Bn for the next scan. If these conditions are met, there is overlapped data only in buffer 4320A. Consequently, one predetermined small block of print data for print buffer 4320A is sent from the left block to the right block addresses of the block to print buffer 4320A (step S4431; see FIG. 44G). Step S4427 is then reentered for transfer of the print data of the next small block transfer.

In steps S4427 and S4432, printer driver 114 tests whether EdgeL_An for the next scan is not less than EdgeR_An for the next scan but that EdgeL_Bn for the next scan is less than EdgeR_Bn for the next scan. If these conditions are met, there is overlapped data only in buffer 4320B. Consequently, one predetermined small block of print data for print buffer 4230B is sent from the left to the right addresses of the block to print buffer 4320B (step S4434; see FIG. 44H). Step S4427 is then reentered for transfer of the print data of the next small block transfer.

In steps S4427 and S4429, printer driver 114 also determines whether EdgeL_An for the next scan is less than EdgeR_An for the next scan and that EdgeL_Bn for the next scan is less than EdgeR_Bn for the next scan. If these conditions are met, there is overlapped data in both buffers 4320A and 4320B. Step S4430 then determines whether data for buffer 4320A precedes that for buffer 4320B or vice-versa.

Specifically, step S4430 decides whether EdgeL_Bn is greater than or equal to EdgeL_An+the gap between print heads 4330A and 4330B. If so, data for buffer 4320A precedes that for buffer 4320B. Consequently, a small predetermined print data block for print buffer 4320A is sent to print buffer 4320A from print data store 136 of host processor 23 (step S4431). On the other hand, a "NO" decision in step S4430 indicates that data for buffer 4320B precedes that for buffer 4320A. Consequently, a small predetermined print data block for print buffer 4320B is sent to print buffer 4320B from print data store 136 of host processor 23 (step S4434) and control is returned to step S4427.

When it is decided in steps S4427 and S4432 that EdgeL_An is not less than EdgeR_An and that EdgeL_Bn is not less than EdgeR_Bn, the data transfer is complete and a print command [PRINT] for the next scan line is sent to printer 30 in step S4435.

Referring again to FIG. 44C, when step S4404 decides that the current scan is backward, step S4445 determines the printing direction of the next scan. If step S4445 determines that the nest scan is forward, the edges EdgeL_A, EdgeL_B, EdgeR_A and EdgeR_B are adjusted in step S4446 by subtracting the length of the shift area for storage locations of each print buffer to be filled during the ramp-up period.

Steps S4447 through S4466 determine, for each print heads 4330A and 4330B, whether the next scan's right edge is greater than the current scan's right edge (meaning that empty areas exist in the right edge of the print buffer), and if so, transmit print data for the next scan from print data store 4325A and/or 4325B to print buffers 4320A and/or 4320B, so as to fill up the right side of buffers 4320A and/or 4320B including the shift area when the current printing is in a reverse direction. Print buffer 4320A is processed for right edge data transfer in steps S4447 through S4451. When it is determined that the right edge of print data for the next scan, EdgeR_An, is greater than EdgeR_A corresponding to the current scan (step S4447), a block select command [BLOCK] and a data command [DATA] are sent to printer 30. The block select command is sent with a block left edge address of EdgeR_A+1 (i.e., current scan right edge +1) and a block right edge address of EdgeR_An (i.e., next scan right edge). The right edge of the next scan EdgeR_An is then reset to EdgeR_A (step S4451).

Print buffer 4320B is then processed for right edge print data transfer in steps S4452 through S4456. When it is determined that the right edge of print data for the next scan, EdgeR_Bn, is greater than EdgeR_B corresponding to the current scan, a block select command [BLOCK] and a data command [DATA] are sent to printer 30. The block select command is sent with a block left edge address of EdgeR_B+l (i.e., current scan right edge +1) and a block right edge address of EdgeR_Bn (i.e., next scan right edge). The right edge of the next scan, EdgeR_Bn, is then reset to EdgeR_B (step S4456).

Steps S4459 through S4456 determine, for each of heads 4330A and 4330B, whether the next scan's left edge is less than the current scan's left edge (meaning that empty areas exist in the left edge of print data stores 4325A and/or 4325B to print buffers 4320A and/or 4320B), so as to fill up the left side of buffers 4320A and/or 4320B when current printing is in a reverse direction. Print buffer A is processed for left edge print data transfer in steps S4457 through S4461. When it is determined that the left edge of print data for the next scan, EdgeL_An, is less than EdgeL_A corresponding to the current scan (step S4457), a block select command [BLOCK] and a data command [DATA] are sent to printer 30. The block select command is sent with a block left edge address of EdgeL_An (i.e., next scan left edge) and a block right edge address of EdgeL_A−1 (i.e., current scan left edge−1). The left edge of the next scan, EdgeL_An, is then reset to EdgeL_A (step S4461).

Print buffer 4320B is then processed for left edge print data transfer in steps S4462 through S4466. When it is determined that the left edge of print data for the next scan, EdgeL_Bn, is less than EdgeL_B corresponding to the current scan, a block select command [BLOCK] and a data command [DATA] are sent to printer 30. The block select command is sent with a block left edge address of EdgeL_Bn (i.e., next scan left edge) and a block right edge address of EdgeL_B−1 (i.e., current scan left edge−1). The left edge of the next scan, EdgeL_Bn, is then reset to EdgeL_B (step S4466).

The foregoing steps are executed during and before ramp-up of heads 4330A and 4330B. Steps S4467 through S4475 illustrate data processing during the current scan after transfer of data according to steps S4445 to S4466. Depending on the speed of print data transfer, portions of these steps might actually be performed during the ramp-up period, if data transfer in steps S4445 to S4466 is completed before the end of the ramp-up period. These steps determine whether there is overlapped data only in buffer 4320A, only in buffer 4320B, or in both buffers 4320A and 4320B. In a case there is overlap in both of buffers 4320A and 4320B, these steps further determine whether data for buffer 4320A should precede that for buffer 4320B, or vice-versa.

Thus, in steps S4467 and S4469, printer driver 114 tests whether EdgeL_An for the next scan is less than EdgeR_An for the next scan but EdgeL_Bn for the next scan is not less than EdgeR_Bn for the next scan. If these conditions are met, there is overlapped data in buffer 4320A only. Consequently, one predetermined small block of print data for print buffer 4320A is sent from the left block to the right block addresses of the block to print buffer 4320A (step S4471, see FIG. 44I). Step S4467 is then reentered for transfer of the print data of the next small block transfer.

In steps S4467 and S4472, printer driver 114 tests whether EdgeL_An for the next scan is not less than EdgeR_An for the next scan but that EdgeL_Bn for the next scan is less than EdgeR_Bn for the next scan. If these conditions are met, there is overlapped data in buffer 4320B only. Consequently, one predetermined small block of print data for print buffer 4320B is sent from the left to the right addresses of the block to print buffer 4320B (step S4474; see FIG. 44J). S4467 is then reentered for transfer of the print data of the next small block transfer.

In steps S4467 and S4469, printer driver 114 also determines whether EdgeL_An for the next scan is less than EdgeR_An for the next scan and that EdgeL_Bn for the next scan is less than EdgeR_Bn for the next scan. If these conditions are met, there is overlapped data in both buffer 4320A and 4320B. Step S4470 then determines whether data for buffer 4320A precedes that for buffer 4320B, or vice-versa.

Specifically, step S4470 decides whether EdgeR_Bn minus the gap between print heads 4330A and 4330B is less than or equal to EdgeR_An. If so, data for buffer 4320A precedes that for buffer 4320B. Consequently, a small predetermined print data block for print buffer 4320A is sent to print buffer 4320A from print data store 136 of host processor 23(step S4471). If a "NO" decision is reached in step S4470, data for buffer 4320B precedes that for buffer 4320A. Consequently, a small predetermined print data block for print buffer 4320B is sent to print buffer 4320B from print data store 136 of host processor 23 (step S4474) and control is returned to step S4467.

When it is decided in steps S4467 and S4472 that EdgeL_An is not less than EdgeR_An and that EdgeL_Bn is not less than EdgeR_Bn, the data transfer is complete and a print command [PRINT] for the next scan line is sent to printer 30 in step S4475.

FIGS. 44G and 44H show detailed flowcharts of the steps S4431 and S4434 of FIG. 44E for a left block to right block addressed print data transfer for print buffers 4320A and 4320B. Referring to FIG. 44G with respect to print buffer 4320A, EdgeL_A is set to EdgeL_An for the next scan plus the predetermined small block length in step S4476. Step S4477 is then entered wherein it is decided whether EdgeR_An for the next scan is less than EdgeL_A. If "YES", a block command is sent to print buffer 4320A with a left block address of EdgeL_An and a right block address of EdgeR_An (step S4478), print data so addressed is sent to print buffer 4320A (S4479) and the left edge of the next scan print data, EdgeL_An, is set to EdgeR_An (S4480). If "NO" in step S4477, a block command is sent to print buffer 4320A with a left block address of EdgeL_An and a right block address of EdgeR_A−1 (step S4481), print data so addressed is sent to print buffer 4320A (S4482) and the left edge, EdgeL_An, of the next scan print data is set to EdgeL_A (step S4483).

FIG. 44H shows a detailed flowchart of step S4434 of FIG. 44E for a left block to right block addressed print data transfer for print buffer 4320B. Referring to FIG. 44H, EdgeL_B is set to EdgeL_Bn for the next scan plus the predetermined small block length in step S4486. Step S4487 is then entered wherein it is decided whether EdgeR_Bn for the next scan is less than EdgeL_B. If "YES", a block command is sent to print buffer 4320B with a left block address of EdgeL_Bn and a right block address of EdgeR_Bn (step S4488), print data so addressed is sent to print buffer 4320B (S4489) and the left edge of the next scan print data, EdgeL_Bn, is set to EdgeR_Bn (S4490). If "NO" in step S4487, a block command is sent to print buffer 4320B with a left block address of EdgeL_Bn and a right block address of EdgeL_B−1 (step S4491), print data so addressed is sent to print buffer 4320B (S4492) and the left edge, EdgeL_Bn, of the next scan print data is set to EdgeL_B (step S4493).

FIGS. 44I and 44J show detailed flowcharts of the steps S4471 and S4474 of FIG. 44F for a right block to left block addressed print data transfer for print buffer 4320A. Referring to FIG. 44I with respect to print buffer 4320A, EdgeR_A is set to EdgeR_An for the next scan minus the predetermined small block length in step S4506. Step S4507 is then entered wherein it is decided whether EdgeL_An for the next scan is less than EdgeR_A. If "YES", a block command is sent to print buffer 4320A with a left block address of EdgeL_An and a right block address of EdgeR_An (step S4508), print data so addressed is sent to print buffer 4320A (S4509) and the right edge of the next scan print data, EdgeR_An, is set to EdgeL_An (S4510). If "NO" in step S4507, a block command is sent to print buffer 4320A with a left block address of EdgeR_A+1 and a right block address of EdgeR_An (step S4511), print data so addressed is sent to print buffer 4320A (S4512) and the right edge of the next scan print data, EdgeR_An is set to EdgeR_A (step S4513).

FIG. 44J shows a detailed flowchart of step S4474 of FIG. 44F for a right block to left block addressed print data transfer for print buffer 4320B. Referring to FIG. 44J, EdgeR_B is set to EdgeR_Bn for the next scan minus the predetermined small block length in step S4516. Step S4517 is then entered wherein it is decided whether EdgeL_Bn for the next scan is less than EdgeR_B. If "YES", a block command is sent to print buffer 4320B with a left block address of EdgeL_Bn and a right block address of EdgeR_Bn (step S4518), print data so addressed is sent to print buffer 4320B (S4519) and the left edge of the next scan print data, EdgeR_Bn, is set to EdgeL_Bn (S4520). If "NO" in step S4517, a block command is sent to print buffer 4320B with a left block address of EdgeR_B+1 and a right block address of EdgeR_Bn (step S4521), print data so addressed is sent to print buffer 4320B (S4522) and the right edge of the next scan print data, EdgeR_Bn, is set to EdgeR_B (step S4523).

FIGS. 44K through 44M are flowcharts showing the processing in printer 30 for print data transfer which correspond to stored computer executable program codes residing in ROM 122 of printer 30. In general, these steps provide for printer operation as follows: (1) When the current scan's printing starts, the printer monitors the position of the carriage and of carriage movement; (2) If the right edge of a received block is smaller than the current scan's left edge, then put the data block into the printer buffer immediately. If the left edge of a received block is larger than the current scan's right edge, then put the data block into the printer buffer immediately; (3) If the block which is specified by the printer driver is overlapping on current scan's printer area, then issue a busy signal so as to cause the printer driver to wait until the specified block become vacant entirely. If the block which is specified by the printer driver becomes vacant entirely, then put the data block into the printer buffer and release any busy signal so as to signify to the printer driver that the printer is ready to accept data; and (4) If the current scan is forward direction, then the printer prints shifted buffer. If the current scan is backward direction, then printer prints the non-shifted buffer. Referring to FIG. 44K, decision steps S4545, S4548, S4550, S4553 and others, indicated by a dashed line, are sequentially performed when a command from printer driver 114 is received in step S4544. If the received command is determined to be a direction command in step S4545, the next scan direction (i.e., forward or backward) is received (step S4546), the current scan and next scan directions are set (step S4547) and control is passed to step S4548. When the command received in step S4544 is detected as a block command in step S4548, the block address processing of step S4549 is performed. The block address processing will be described in greater detail with respect to FIGS. 44L and 44M.

When the received command in step S4544 is decided to be a data command in step S4550, print data received in step S4551 is put into the designated print buffer (step S4552) and control is passed to step S4553 wherein whether the received command in step S4554 is a print command is determined. If "YES" in step S4553, it is then determined in step S4554 whether the current scan has been set to the forward direction. When the set current scan direction is the forward direction, printing is executed from the top of the designated print buffer which corresponds to the first print position of a print head after the shift area to the opposite end of the designated print buffer (step S4555). For a backward direction scan, printing is executed from the other end of the print buffer which corresponds to the last print position of the print head to the top of the designated buffer. Control is then returned to step S4544 to await another command from printer driver 114.

FIGS. 44L and 44M show the block address processing of step S4549 of FIG. 44K is greater detail. Referring to FIG. 44L, the block left and block right addresses in the block command are received in step S4534 and it is decided in step S4535 whether print data of the current scan remains in the designated print buffer. If the print buffer does not have remaining current scan print data in step S4535, control is passed to step S4550 in FIG. 44K to determine if a data command has been received. Otherwise, it is determined in step S4536 whether the designated print buffer is print buffer A or print buffer B, a variable X is appropriately set to A or B in one of steps S4537 and S4538, and control is passed to step S4539. In step S4539, the left edge of the designated print buffer X, Edge_X, is set to the EdgeL_Xc (i.e., the left edge of print data for the current scan in the designated buffer) minus the nozzle offset length, where no printing can occur. The right edge of the designated buffer, EdgeR_X is set to EdgeR_Xc (i.e., right edge of print data for the current scan in the designated buffer) plus the nozzle offset length, where no printing can occur. Control is then passed to step S4540 in which the current scan direction is checked.

When the current scan direction in step S4540 is the forward direction, the left and right edges of the designated print buffer are set to provide shifting of the print data of the next scan. Accordingly, in step S4541 the left edge EdgeL_X is set to EdgeL_X plus the shift area length and the right edge EdgeR_X is set to EdgeR_X plus the shift area length. When the current scan direction is the backward direction, no adjustment is needed since there are no pre-defined shift areas at the bottom ends of the print buffers. The next scan direction is checked in step S4542. If the scan direction is the forward direction in Step S4542, step S4543 is executed wherein the block left and block right addresses, BlockLeft and BlockRight, are set to BlockLeft plus the shift area length and BlockRight plus the shift area length, respectively, to account for shifting of the next scan print data when inserted into the designated print buffer X.

Step S4525 of FIG. 44M is then entered from step S4543 through connection 10–11. In decision steps S4525 and S4526, it is determined if the BlockRight address is less than EdgeL_X (i.e., the left edge of print data in the print buffer X) or if the BlockLeft address is greater than EdgeR_X (i.e., the right edge of print data in the print buffer X). If either of these conditions is true, the block of print data of the next scan to be transferred to the print buffer is outside the area of the print buffer X containing print data so that an immediate transfer can be performed and control is returned to step S4550 of FIG. 44K for data command processing.

When there are "NO" decisions in both steps S4525 and S4526, there is overlap of next scan print data and the current scan print data in the print buffer X and step S4527 is entered wherein it is determined if the current scan direction is the forward direction. If there is a "YES"

decision in step S4527, it is determined whether the BlockRight address is less than or equal to EdgeR_X (S4528). Responsive to a "YES" decision in step S4528, the return to step S4550 of FIG. 44K for data command is delayed until the BlockRight address is less than HeadPos_X (step S4529) which is the position of the print head associated with print buffer X, so as to assure inserting the block print data into a vacated area of the print buffer X. Responsive to a "NO" decision in step S4528, return to step S4550 of FIG. 44K is delayed until the print head for the print buffer X is finished printing the current print position (step S4530).

Responsive to a backward direction current scan in step S4527, step S4531 is entered in which it is determined whether the BlockLeft address is greater than or equal to EdgeL_X (S4531).

Responsive to a "YES" decision in step S4531, the return to step S4550 of FIG. 44K for data command is delayed until the BlockLeft address is greater than HeadPos_X (step S4532) so as to assure inserting the block print data into a vacated area of the print buffer X. Responsive to a "NO" decision in step S4531, return to step S4550 of FIG. 44K is delayed until the print head for the print buffer X is finished printing the current print position (step S4533).

In accordance with the invention, the transfer of print data for a next scan from host processor 23 to print buffer 139 during the current scan obviates the need for a separate receiving buffer of the same size as print buffer 139 and increases the efficiency of print data transfer. Further, the size of the shift area is not fixed but is set by the [DEFINE_BUF] command for each printing task so that the shift area size may be selected according to the storage capacity of printer 30.

Figure 44N:
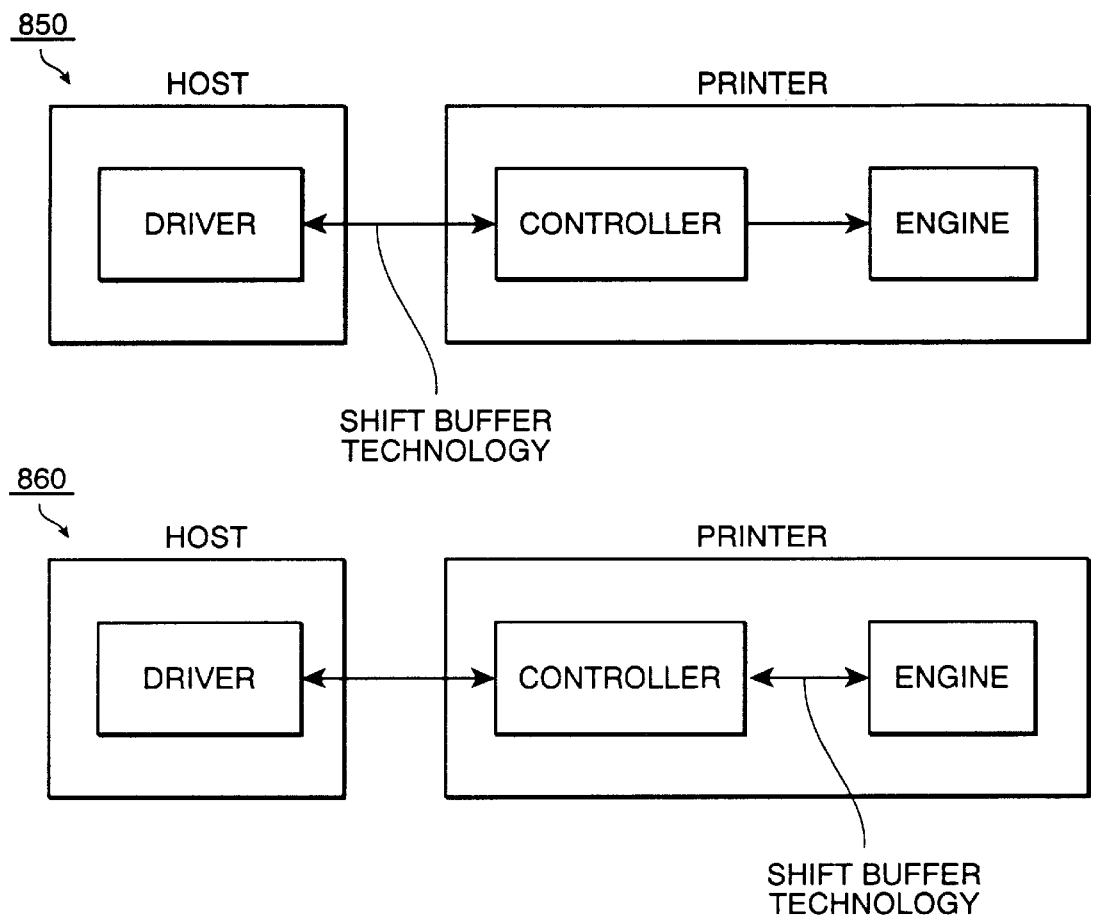
FIG. 44N shows two block diagrams illustrating possible applications of a shift buffer technology within a printing system.

Moreover, printer buffer shift area technology can be applied in the transfer of any data between any top processors. FIG. 44N illustrates at 850 the embodiment described here in which shift buffer technology is applied to transfer print data between a printer driver and a printer controller. 860 illustrates that shift buffer technology can also be applied to transfer print data between a print controller and a print engine.

10.0 Multi-Head Printing With Differing Resolutions

Because printer 30 has multiple print heads, and because of software architecture in which commands affecting resolution are sent to each print head independently, printer 30 can print and can be controlled to print with differing resolutions for each print head so as to increase overall print efficiency in situations where print data for one page includes print information for which a higher resolution is desired mixed with print data for which a lower resolution is adequate.

Generally speaking, this section describes control over a printer having at least first and second print heads such that the resolution of the first and second print heads is controlled independently of each other. As described above in section 1.0, printer 30 includes two ink jet print heads A and B, designated 130a and 130b, respectively; and as described in section 3.0, the software architecture includes commands sent from host processor 23 that affects print resolution. Printing is effected by transmission of image data from host processor 23 to print buffer 139 in printer 30 (using the [DATA] command), and subsequent transmission of the [PRINT] print execution command. Control over print resolution is effected by transmission of commands which change ink droplet size (the [DROP] command), commands which select print speed (the [SPEED] command), commands which select nozzle firing order (the [SELECT_PULSE] command), and commands that select the readout order for reading out image data from printer buffer 139 (the [SELECT_CONTROL] command).

The resolution with which each print head prints may be determined manually by user input, or automatically based, for example, on relative head configuration for print heads 130a and 130b, content of print data, and type of recording (or print) media. A user interface in printer driver 114 is provided for this purpose.

From the perspective of the printer, printer 30 receives commands to set resolution for each of print heads 130a and 130b independently, and effects printout at the selected resolution.

Figure 45:
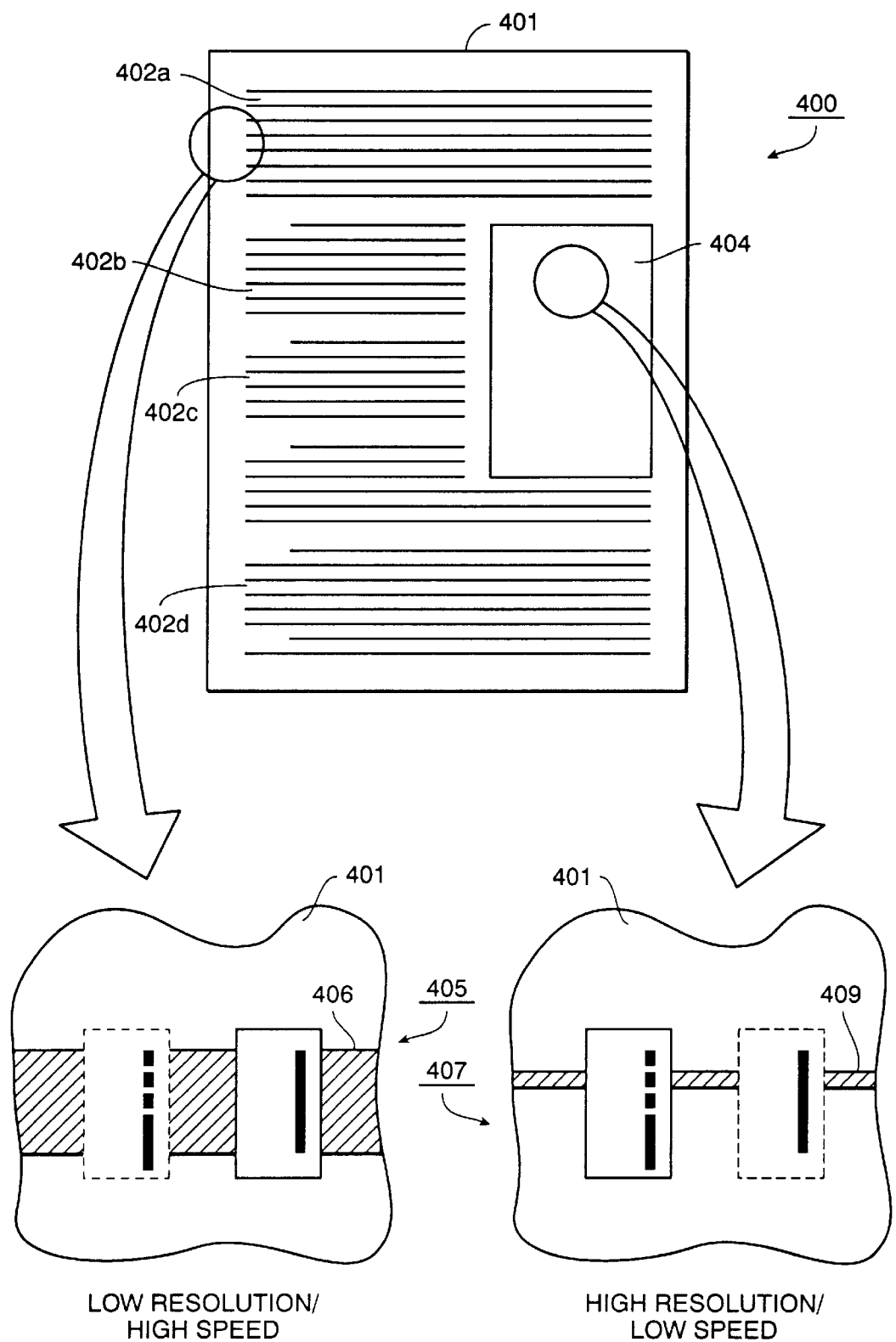
FIG. 45 is a representational view for explaining the benefits of printout with different resolutions for each of different heads.

FIG. 45 is a representational view for explaining the benefits of printout with different resolutions for each of different heads. In FIG. 45, 400 depicts a printed sheet on recording media 401 which contains mixed print information of different types. Areas 402a, 402b, 402c and 402d are text areas consisting of primarily black and white areas, for which a low resolution is adequate. Area 404, on the other hand, represents a non-text area, such as a color image or graphic or line drawing, for which a high resolution is desired. Thus, as can be seen in FIG. 45, printout 400 consists of mixed print information, some of which is desired to be printed at high resolution, whereas others of which low resolution is adequate. The print information is mixed on a single recording medium 401, and in some cases, such as area 404 and 402b, is mixed across a horizontal print band in the scan direction of printer 30.

405 is an enlarged view of a portion of area 402a. Enlarged view 405 depicts print heads 130a and 130b which differ in configuration. Specifically, print head 130a includes yellow, magenta, cyan and black print nozzles arranged vertically with 24 nozzles for yellow, 24 nozzles for magenta, 24 nozzles for cyan and 64 nozzles for black. Print head 130b includes 128 print nozzles for black ink only. Thus, print heads 130a and 130b differ in configuration, with print head 130a being adapted to print high resolution color images, whereas print head 130b is adapted to print black and white images only. Of course, other configurations for heads 130a and 130b are possible so as to result in a situation in which one print head is adapted to print high resolution images whereas the other is adapted to print lower resolution images.

Because area 402a is a text area for which low resolution is adequate, printing of area 402 is effected by print head 130b. This arrangement is shown at 405 in which one band 406 from print head 130b is depicted in cross-hatched emphasis. To print at this resolution, printer 30 is commanded to put print head 130b into a large droplet ejection mode, and print data readout order from print buffer 139 is selected in accordance with the head configuration of print head 130b and in accordance with the selected resolution. These steps are described more fully below in connection with the flowchart of FIG. 45A.

In contrast to area 402a, area 404 is an area for which high-resolution printout is desired. This situation is depicted in the enlarged area at 407 which shows printout by print head 130a only at band 409. As described more fully below in connection with the flowchart of FIG. 45A, to effect printout in the band shown at 409, print head 130a is commanded to eject ink in small droplets, and the data readout order from print buffer 139 is selected in accordance with the head configuration of print head 130a and the selected resolution.

To print areas like 402b, which are mixed laterally in the direction of a scan of print heads 130a and 130b across recording media 401, a two-step procedure is employed. In one step, sequential bands like 409 are printed by print head 130a. The number of sequential bands printed corresponds to the ratio between the number of print nozzles in a band for print head 130a and the number of nozzles in a band for print head 130b. In the other step, a single pass from print head 130b is effected in area 402b. By virtue of this two-step process, recording media 401 can be advanced in a single direction continuously, without requiring reverse feed, so as to effect printout of area 402b.

Figure 45A:
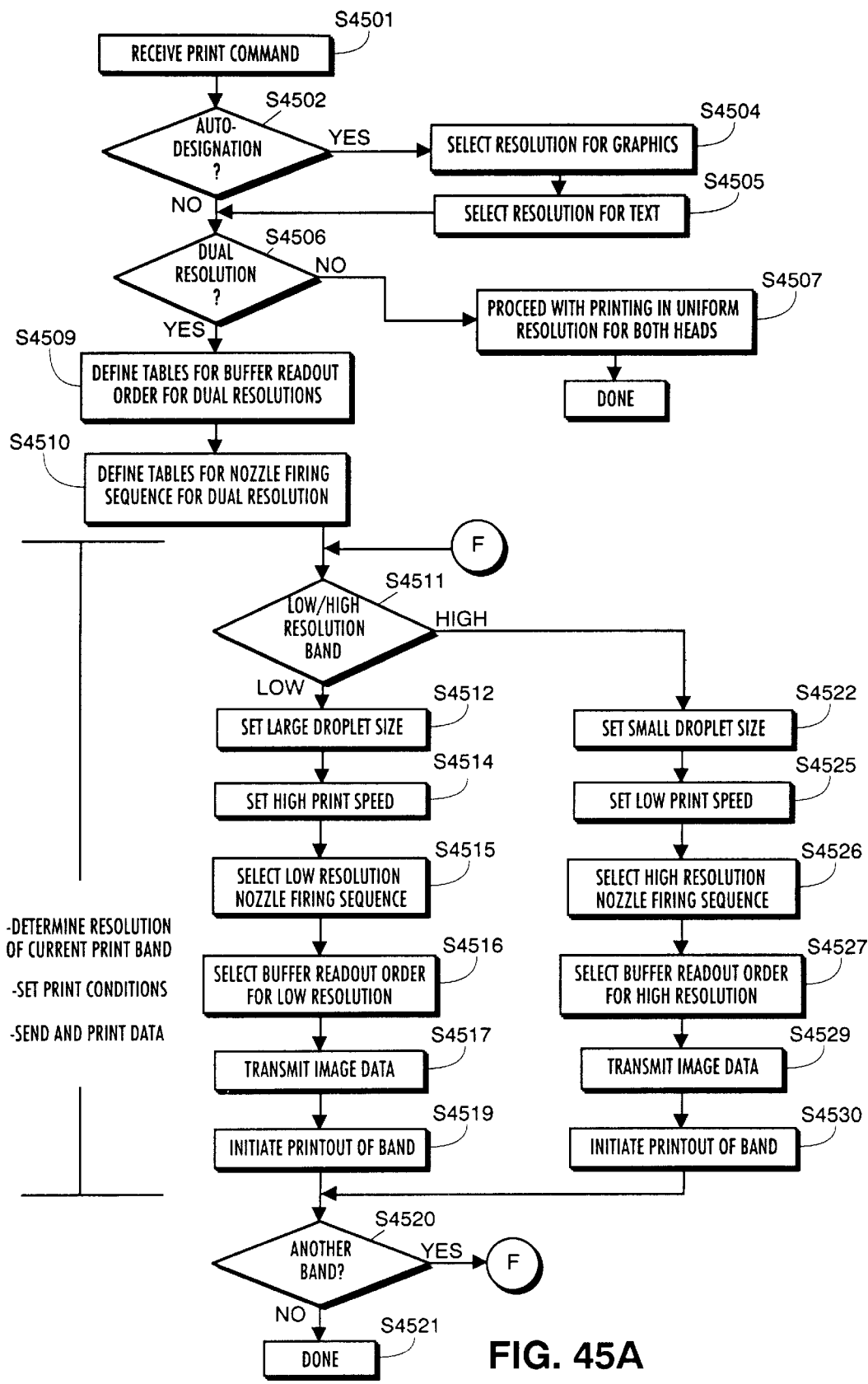
FIG. 45A is a flow diagram showing process steps executed by a print driver in the host processor so as to control print resolution for each print head independently, and to command printout to be effectuated thereby.

FIG. 45A is a flow diagram showing process steps executed by printer driver 114 in host processor 23 so as to control print resolution for each print head independently, and to command printout to be effectuated thereby. Generally speaking, the process steps shown in FIG. 45A are stored program instruction sequences that set print resolution by controlling ink droplet size for each head independently, and by controlling readout order from print buffer 139 for each print head independently.

Figure 46:
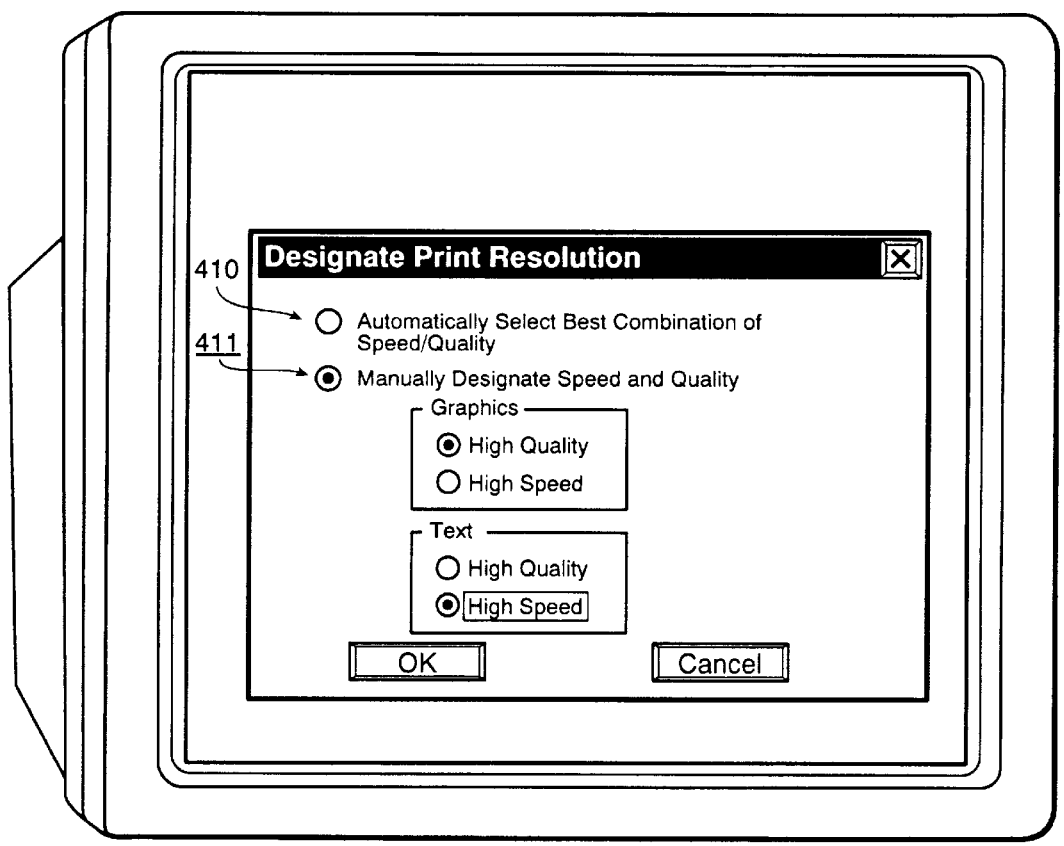
FIG. 46 shows a user interface associated with the printer of the present invention.

More specifically, in step S4501, a user of host processor 23 issues a command from an application to print print data, thereby actuating printer driver 114. Printer driver 114 actually performs many more functions than indicated in the remainder of FIG. 45, but only those functions having some bearing on setting of print resolution independently are described. Thus, in step S4502, printer driver 114 determines whether print resolution should be designated automatically by printer driver 114, or whether the print resolution should be designated manually by the user. In step S4502, a user interface is displayed to the user, such as the representative user interface shown in FIG. 46. As seen there, section 410, when selected by the user, provides for automatic designation of print resolution. On the other hand, when 411 is selected, the user manually designates print resolution. Separate resolutions may be specified for non-text graphics as well as for text, with the user being able to designate manually either high speed (i.e., low resolution) or high quality (i.e., high resolution) for each of text and non-text regions.

Reverting to FIG. 45, if automatic designation has been selected, then flow branches to step S4504 in which printer driver 114 automatically selects resolution for graphics, and then to step S4505 in which printer driver 114 automatically selects resolution for text. Selection of resolution for graphics and for text is based on continuous-tone print data, and is made in accordance with the presence of graphics and other non-text information, the presence of text information, the type of recording media selected for printout, and the relative print head configurations of print head 130a and print head 130b.

Flow next advances to step S4506 in which the printer driver determines whether dual resolutions have been specified, either manually or automatically. If no dual resolutions have been specified, then flow branches to step S4507 to proceed with printing in a uniform resolution for both heads. On the other hand, if dual resolutions have been specified, then flow advances to step S4509 so as to control print resolution of each print head independently and to effect printout thereby.

Thus, step S4509 defines buffer control tables, one of which is selectable for each head and by which each print head can determine readout order for readout of print data from its respective print buffer. Actual selection of which buffer control table to use is not effectuated until later in the procedure, but step S4509 merely defines suitable buffer control tables for each resolution and for each direction of printout. Preferably, the define buffer control table command [DEFINE_CONTROL] described above in section 3.6 is used.

Likewise, step S4510 defines suitable heat pulse tables by which the firing sequence for each nozzle in print heads 130a and 130b is controlled. The actual heat pulse tables used by print heads 130a and 130b are not selected at this point, but rather suitable tables are defined for later selection. Preferably, the define heat pulse table command [DEFINE_PULSE] described above in section 3.6 is used.

Flow then proceeds to steps S4511 through S4530 which (with the exception of steps S4520 and S4521) determine the resolution of a current print band, set print control conditions such as ink ejection drop size and buffer readout order, send print data, and command printout of the transmitted print data.

In more detail, step S4511 determines whether printout for a particular band or a portion of a band is a high resolution printout or a low resolution printout. If the band or portion of the band is a low resolution printout, flow advances to step S4512 which sets appropriate ink ejection droplet sizes for each of heads 130a and 130b. Using the example from FIG. 45, the droplet size for head 130b is set to large and the droplet size for head 130a is set to small. Preferably, the droplet size command [DROP] defined above in section 3.6 is used.

In Step S4514, printer driver 114 selects high print speed, corresponding to low resolution printout. Preferably, the select speed command [SPEED] defined above in section 3.6 is used.

Step S4516 selects offsets for readout order of print buffer 139 in accordance with the selected low resolution. Specifically, step S4516 selects one of the buffer control tables set above in step S4509. Preferably, the select buffer control table command [SELECT_CONTROL] defined above in section 3.6 is used.

Step S4517 transmits image data, block-by-block as discussed in section 3.6 from printer driver 114 to printer 30 over a bi-directional interface. Once an entire band of print data has been transmitted to printer 30, printer driver 114 initiates printout of the band in step S4519 by transmission of the print execution command [PRINT]. Step S4520 then determines whether further bands need to be printed in accordance with which flow either returns to step S4511 or flow terminates at step S4521.

Reverting to step S4511, if a high resolution band of print information is to be transmitted and printed, then steps S4522 through S4530 execute in the printer driver 114 so as to perform complementary steps to the low resolution steps of S4512 through S4519. Thus, step S4522 sets small drop sizes, step S4525 sets a low print speed corresponding to high resolution, step S4526 selects a high resolution nozzle firing sequence, step S4527 selects readout order from print buffer 139 by selecting one of the pre-defined buffer control offset tables, step S4529 transmits high resolution image data band by band to printer 30, and step S4530 initiates printout of a fully-transmitted band.

According to a second embodiment, a print head prints pixels of a horizontal print band in the scan direction of printer 30 in differing resolutions without requiring reverse sheet feed, thereby increasing overall printing efficiency.

Although this embodiment: is described below with reference to a printer having multiple print heads, it will be noted that the below-described embodiment also provides significant benefits when used in conjunction with single print head printing.

As described above, the resolution with which a print head prints may be determined manually by user input, or automatically based, for example, on content of print data, type of recording medium, or, in the case of a multiple print head system, a relative head configuration of print heads 130*a* and 130*b*.

Advantageously, printer 30 therefore receives commands to set resolution for each of print heads 130*a* and 130*b* independently, and effects printout at the set resolutions.

Figure 46A:
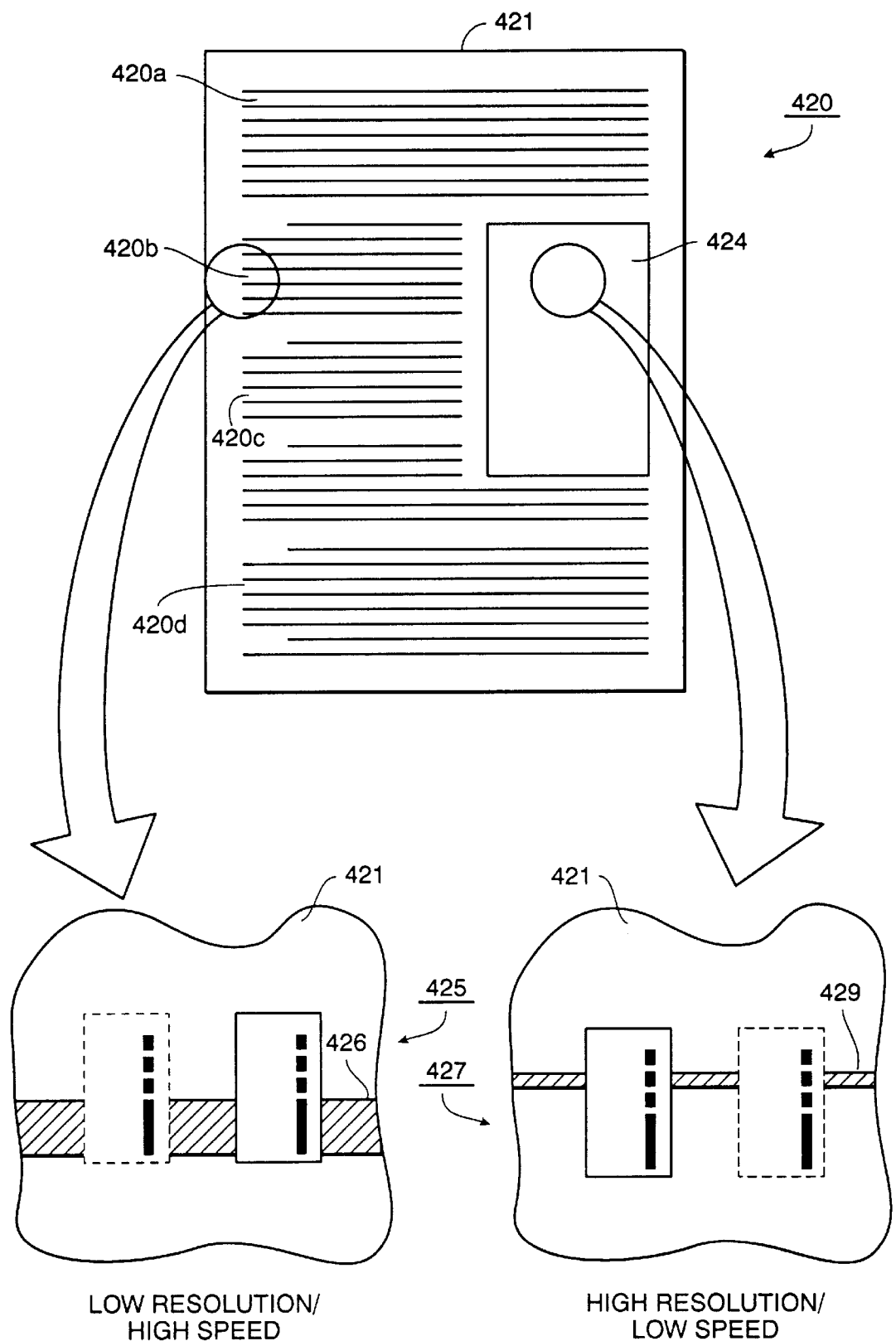
FIG. 46A is a representational view for explaining the benefits of printing with different resolutions for a print head.

FIG. 46A is a representational view for explaining the benefits of controlling a print head to print out at multiple resolutions. In FIG. 46A, 420 indicates a printed sheet on recording medium 421 having various types of print information. Area 420*a*, 420*b*, 420*c*, and 420*d* are text areas consisting primarily of black and white areas. Accordingly, information contained in these text areas is satisfactorily printed in a low resolution. In contrast, area 424 is a non-text area, such as a color image or graphic or line drawing, for which a high resolution is preferred. It should be noted that areas 420*b* and 424 are located on a common horizontal print band in the scan direction of printer 30.

425 is an enlarged view of a portion of area 420*b*. Enlarged view 425 depicts print heads 130*a* and 130*b*. Each of print heads 130*a* and 130*b* include yellow, magenta, cyan and black print nozzles arranged vertically, with 24 nozzles for yellow, 24 nozzles for magenta, 24 nozzles for cyan and 64 nozzles for black. Of course, other configurations for heads 130*a* and 130*b* are possible.

Because area 420*b* is a text area for which low resolution is adequate, printing of area 420*b* is performed in a low resolution/high speed mode, as shown at 425. In area 425, one low resolution band 426 is printed by print heads 130*a* and 130*b* and depicted in cross-hatched emphasis. To print at this resolution, printer 30 is commanded to put print heads 130*a* and 130*b* into a large droplet ejection mode, and print data read out from print buffer 139 is selected in accordance with the selected resolution. These steps are described more fully below in connection with the flowchart of FIG. 46B.

In contrast to area 420*b*, area 424 is an area for which high resolution print out is desired. This situation is depicted in the enlarged area at 427 which shows printout by print heads 130*a* and 130*b* only at band 429. As described more fully below in connection with the flow chart of FIG. 46B, to effect printout in the band shown at 429, print heads 130*a* and 130*b* are commanded to eject ink in small droplets, and the data read out from print buffer 139 is selected in accordance with the selected resolution.

To print areas such as 420*b* and 424 which are mixed in a lateral direction in the direction of a scan of print heads 130*a* and 130*b* across recording medium 421, a two-step procedure is employed. In one step, sequential bands such as band 429 are printed by print heads 130*a* and 130*b*. The number of sequential bands such as 429 which are printed corresponds to the ratio between the number of print nozzles for each of cyan, magenta and yellow inks, in this case 24, and the number of nozzles used for black color, in this case 64. In the second step, a single pass from print heads 130*a* and 130*b* is effected, thereby printing a band of area 420*b*. During the second pass, ink is ejected in a low resolution from the black nozzles of print heads 130*a* and 130*b*. By virtue of this; two step process, recording medium 420 can be advanced in a single direction, without requiring reverse feed, so as to effect a varied-resolution printout of area 402*b* and 424.

Figure 46B:
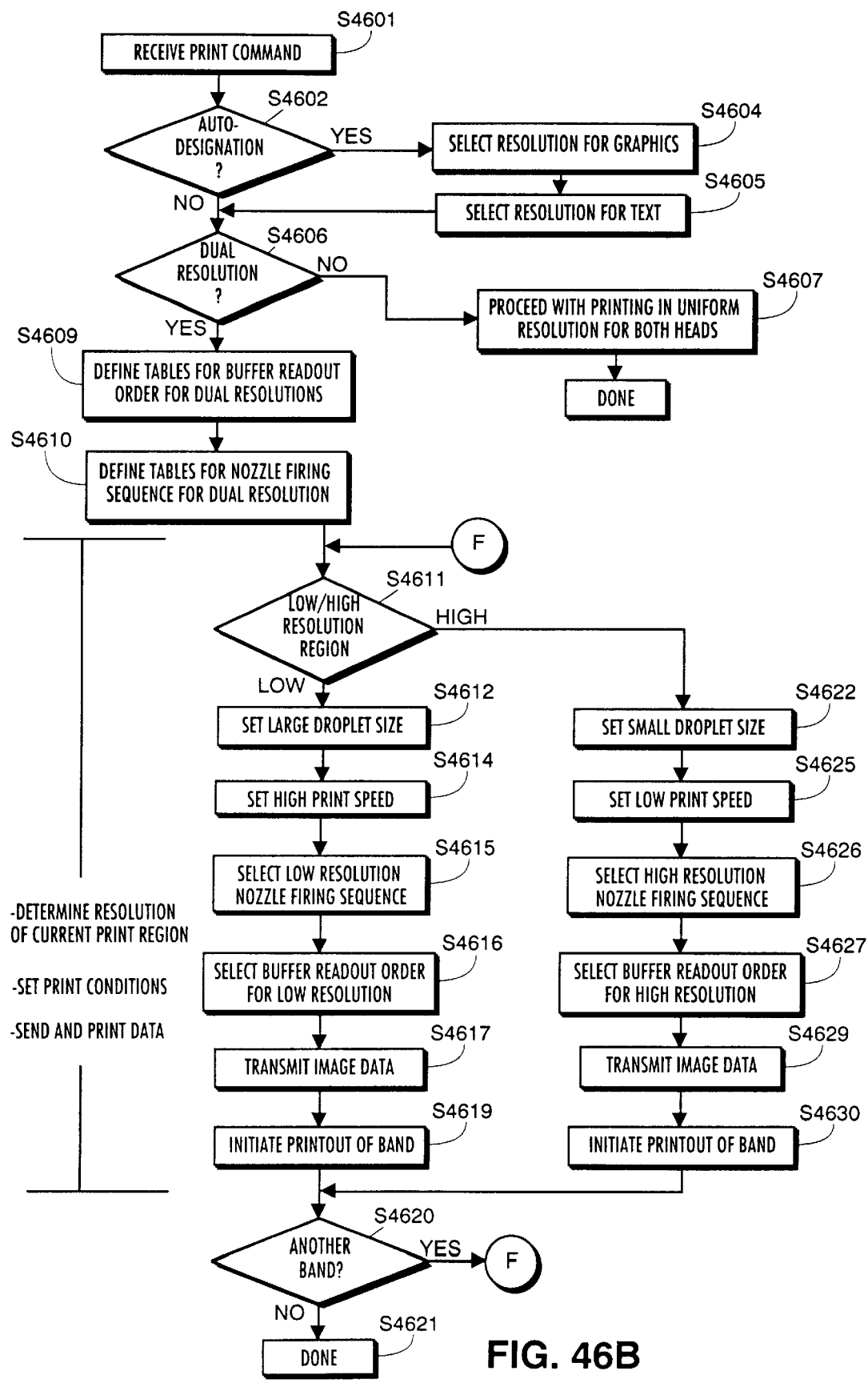
FIG. 46B is a flow diagram showing process steps executed by a print driver in the host processor so as to control print resolution for a print head, and to command printout to be effectuated thereby.

FIG. 46B is a flow diagram showing process steps executed by printer driver 114 in host processor 23 so as to control print resolution for each print head, and to command printout to be effectuated thereby. Generally speaking, the process steps shown in FIG. 46B are stored program instruction sequences that set print resolution by controlling ink droplet size for each head, and by controlling readout order from print buffer 139 for each print head.

More specifically, in step S4601, a user of host processor 23 issues a command from an application to print print data, thereby actuating printer driver 114. Printer driver 114 actually performs many more functions than indicated in the remainder of FIG. 46, but only those functions having some bearing on setting of print resolution are described. Thus, in step S4602, printer driver 114 determines whether print resolution should be designated automatically by printer driver 114, or whether the print resolution should be designated manually by the user. In step S4602, a user interface is displayed to the user, such as the representative user interface shown in FIG. 46. As seen there, section 410, when selected by the user, provides for automatic designation of print resolution. On the other hand, when 411 is selected, the user manually designates print resolution. Separate resolutions may be specified for non-text graphics as well as for text, with the user being able to designate manually either high speed (i.e., low resolution) or high quality (i.e., high resolution) for each of text and non-text regions.

Reverting to FIG. 46B, if automatic designation has been selected, then flow branches to step S4604 in which printer driver 114 automatically selects resolution for graphics, and then to step S4605 in which printer driver 114 automatically selects resolution for text. Selection of resolution for graphics and for text is based on continuous-tone print data, and is made in accordance with the presence of graphics and other non-text information, the presence of text information, the type of recording media selected for printout, and, in the case of a multiple printed system such as that described herein, the relative print head configurations of print head 130*a* and print head 130*b*.

Flow next advances to step S4606 in which printer driver 114 determines whether dual resolutions have been specified, either manually or automatically. If no dual resolutions have been specified, then flow branches to step S4607 to proceed with printing in a uniform resolution for both heads. On the other hand, if dual resolutions have been specified, then flow advances to step S4609 so as to control print resolution of each print head and to effect printout thereby.

Thus, step S4609 defines buffer control tables, one of which is selectable for each head and by which each print head can determine readout order for readout of print data from its respective print buffer. Actual selection of which buffer control table to use is not effectuated until later in the procedure, but step S4609 merely defines suitable buffer control tables for each resolution and for each direction of printout. Preferably, the define buffer control table command [DEFINE_CONTROL] described above in section 3.6 is used.

Likewise, step S4610 defines suitable heat pulse tables by which the firing sequence for each nozzle in print heads 130*a* and 130*b* is controlled. The actual heat pulse tables used by print heads 130*a* and 130*b* are not selected at this point, but rather suitable tables are defined for later selection. Preferably, the define heat pulse table command [DEFINE_PULSE] described above in section 3.6 is used.

Flow then proceeds to steps S4611 through S4630 which (with the exception of steps S4620 and S4621) the resolution of a current print band is determined, print control conditions such as ink ejection drop size and buffer readout order are set, print data is sent, and printout of the transmitted print data is commanded.

In more detail, step S4611 determines whether printout for a particular band or a portion of a band is a high resolution printout or a low resolution printout. If the band or portion of the band is a low resolution printout, flow advances to step S4612 which sets appropriate ink ejection droplet sizes for each of heads 130*a* and 130*b*. Using the example from FIG. 44, the droplet size for heads 130*a* and 130*b* is set to large. Preferably, the droplet size command [DROP] defined above in section 3.6 is used.

In Step S4614, printer driver 114 selects the high print speed, corresponding to low resolution printout. Preferably, the select speed command [SPEED] defined above in section 3.6 is used.

Step S4616 selects offsets for readout order of print buffer 139 in accordance with the selected low resolution. Specifically, step S4616 selects one of the buffer control tables set above in step S4609. Preferably, the select buffer control table command [SELECT_CONTROL] defined above in section 3.6 is used.

Step S4617 transmits image data, block-by-block as discussed in section 3.6, from printer driver 114 to printer 30 over a bi-directional interface. Once an entire band of print data has been transmitted to printer 30, printer driver 114 initiates printout of the band in step S4619 by transmission of the print execution command [PRINT]. Step S4620 then determines whether further bands need to be printed in accordance with which flow either returns to step S4611 or flow terminates at step S4621.

Reverting to step S4611, if a high resolution band of print information is to be transmitted and printed, then steps S4622 through S4630 execute in the printer driver 114 so as to perform complementary steps to the low resolution steps of S4612 through S4619. Thus, step S4622 sets small drop sizes, step S4624 sets appropriately large buffer sizes, step S4625 sets a low print speed corresponding to high resolution, step S4626 selects a high resolution nozzle firing sequence, step S4627 selects readout order from print buffer 139 by selecting one of the pre-defined buffer control offset tables, step S4629 transmits high resolution image data band by band to printer 30, and step S4630 initiates printout of a fully-transmitted band.

Figure 47:
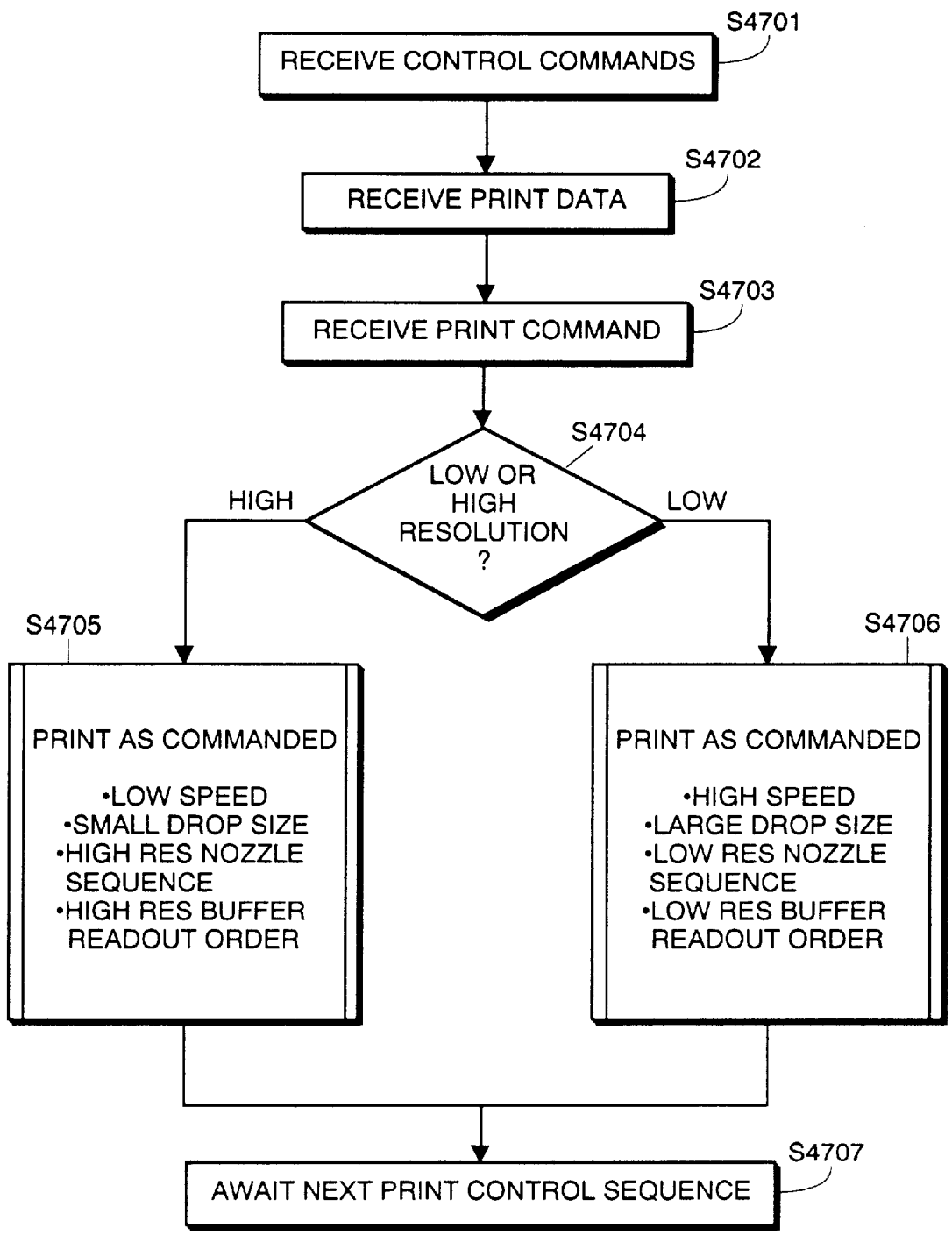
FIG. 47 is a flow diagram illustrating process steps performed by a printer for independent print resolution setting.

From the perspective of printer 30, FIG. 47 is a flow diagram illustrating the process steps performed by printer 30 for independent print resolution setting. Thus, in step S4701, printer 30 receives control commands so as to prepare printer 30 for high or low print resolution for each print head. As discussed above, these control commands include commands to set the speed of printing, the size of the ejected nozzle, the nozzle firing sequence, and the print buffer readout order.

In step S4702, print data is received from printer driver 114, followed in step S4703 by a print command. Thereafter, in step S4704, depending on whether a high or a low print resolution has been commanded, the print data received in step S4702 is printed as commanded in step S4701. Thus, as shown in step S4705, for a high print resolution, print data is printed at a low speed, with small droplet size, with a high resolution nozzle pulse sequence table, and with a high resolution buffer control readout order. Likewise, at step S4706, for a low resolution printout, printout is effected at a high speed, with a large droplet size, with a low resolution nozzle pulse sequence table, and with a low resolution buffer offset readout sequence. In either event, flow proceeds to step S4707 to await the next print command sequence.

As described with respect to FIGS. 46A and 46B, a single print head may be controlled to print print data on a single print band in a scanning direction using both sets of printing characteristics set forth in step S4705 and step S4706.

11.0 Selection of Alternative Inks

As described above, printer 30 can be configured to output several types of ink onto a single recording media. Advantageously, this feature allows printer 30 to print an image using both dye-based black ink and pigment-based black ink.

In a preferred embodiment, dye-based black ink is used in conjunction with differently-colored inks to facilitate color printing. As a result, when used to print black pixels within a color image, dye-based black ink allows the color image to maintain a substantially uniform optical density.

In contrast, pigment-based black ink, when used to print black pixels within a color image, contrasts sharply with other regions of the color image, thereby disturbing uniformity of the color image. However, many cases exist in which it is desirable to maintain significant contrast between a black printed region and a differently-colored region. Most notable among these cases is the printing of black text upon a white recording medium. Therefore, pigment-based black ink is preferably used to print text data.

Therefore, in the above-described embodiment, selection of dye-based black ink or pigment-based black ink to print a black target pixel is based upon content of image data surrounding the black target pixel. More specifically, in a case that a black target pixel is judged to correspond to a differently-colored region of image data, the target pixel is printed using a dye-based black ink. If not, the target pixel is printed using a pigment-based black ink. One method of judging whether a black pixel corresponds to a differently-colored region of image data is described below with respect to FIG. 49. Preferably, such judging is performed based on multi-level image data so that accurate characterization of image content can be achieved.

Since the above-described visual properties of various inks depend upon degrees of ink penetration into a recording medium, recording media type plays a significant role in determining whether dye-based, or other high-penetration black inks, or low-penetration black inks such as pigment-based inks are more appropriate for a particular print job.

Plain paper, for example, has been shown to exhibit poor ink absorption qualities and therefore is not desirable for use with high-penetration black inks because the inks do not effectively combine within the recording media so as to produce consistently-reproducible colors. On the other hand, specially-coated paper is available which provides for a more uniform combination of variously-colored high-penetration inks deposited thereon. Unfortunately, such specially-coated paper is unsuitable for use with low-penetration inks.

In view of the foregoing, a type of ink used to print pixels on a recording medium preferably depends on both the type of image containing the pixel data and the recording medium upon which the ink is to be placed.

Figure 48:
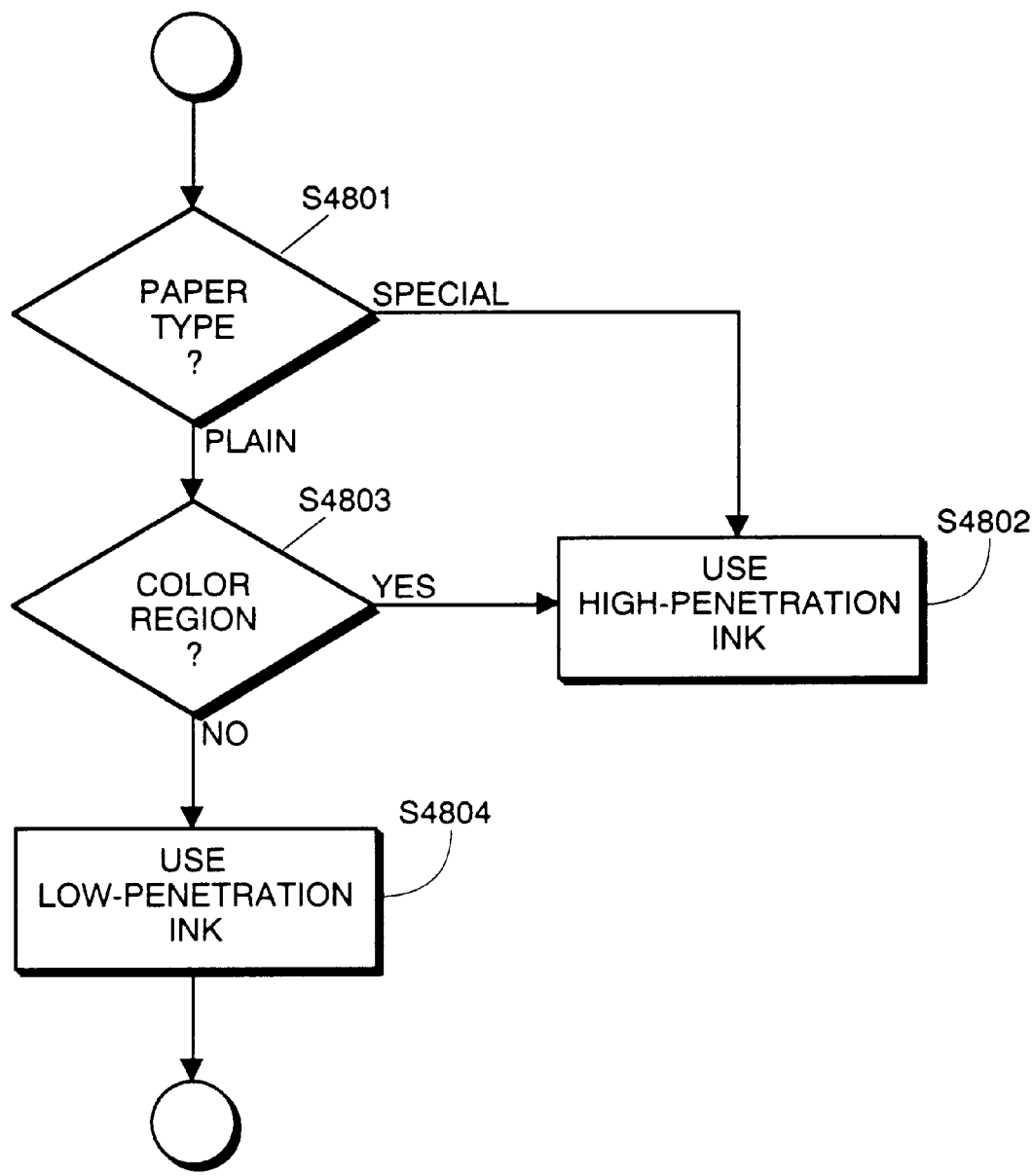
FIG. 48 is a flow diagram for describing a method of ink selection.

FIG. 48 is a flow diagram for describing a method of ink selection based on recording medium type and image content. Generally, in order to control an ink jet printer to print pixels corresponding to multi-level image data upon a recording medium using either a first ink or a second ink, it is determined whether the recording medium is plain paper or specially-coated paper, and, in a case that the recording media is determine to be specially-coated paper, the printer is commanded to print a target pixel using the first ink. On the other hand, in a case that the recording media is determined to be plain paper, it is determined whether or not the target pixel corresponds to a differently-colored region. In a case that the target pixel corresponds to a differently-colored region, the printer is instructed to print the target pixel using the first ink. Conversely, in a case that the target pixel does not correspond to a differently-colored region, the printer is instructed to print the target pixel using the second ink.

In more detail, flow begins at step S4801, wherein a paper type is determined. As shown in the Figure, the preferred embodiment contemplates the use of either plain paper or specially-coated paper. Preferably, the specially-coated paper is "high resolution" paper HR-101, as described in section 1.0.

In a case that the paper type is determined to be specially-coated paper, flow proceeds to step S4802, wherein it is determined that a high-penetration ink should be used for printing black pixel data. This determination is based on an assumption that high-penetration black ink is always more suitable for printing black pixel data upon a specially-coated recording medium, regardless of image type.

If, in step S4801, the paper type is determined to be plain, flow proceeds to step S4803, in which it is determined whether a black target pixel exists within a color region of the image to be printed. If so, flow proceeds to step S4802, as described above. If not, flow proceeds to step S4804, wherein it is determined to print the target pixel using low-penetration black ink.

Figure 49:
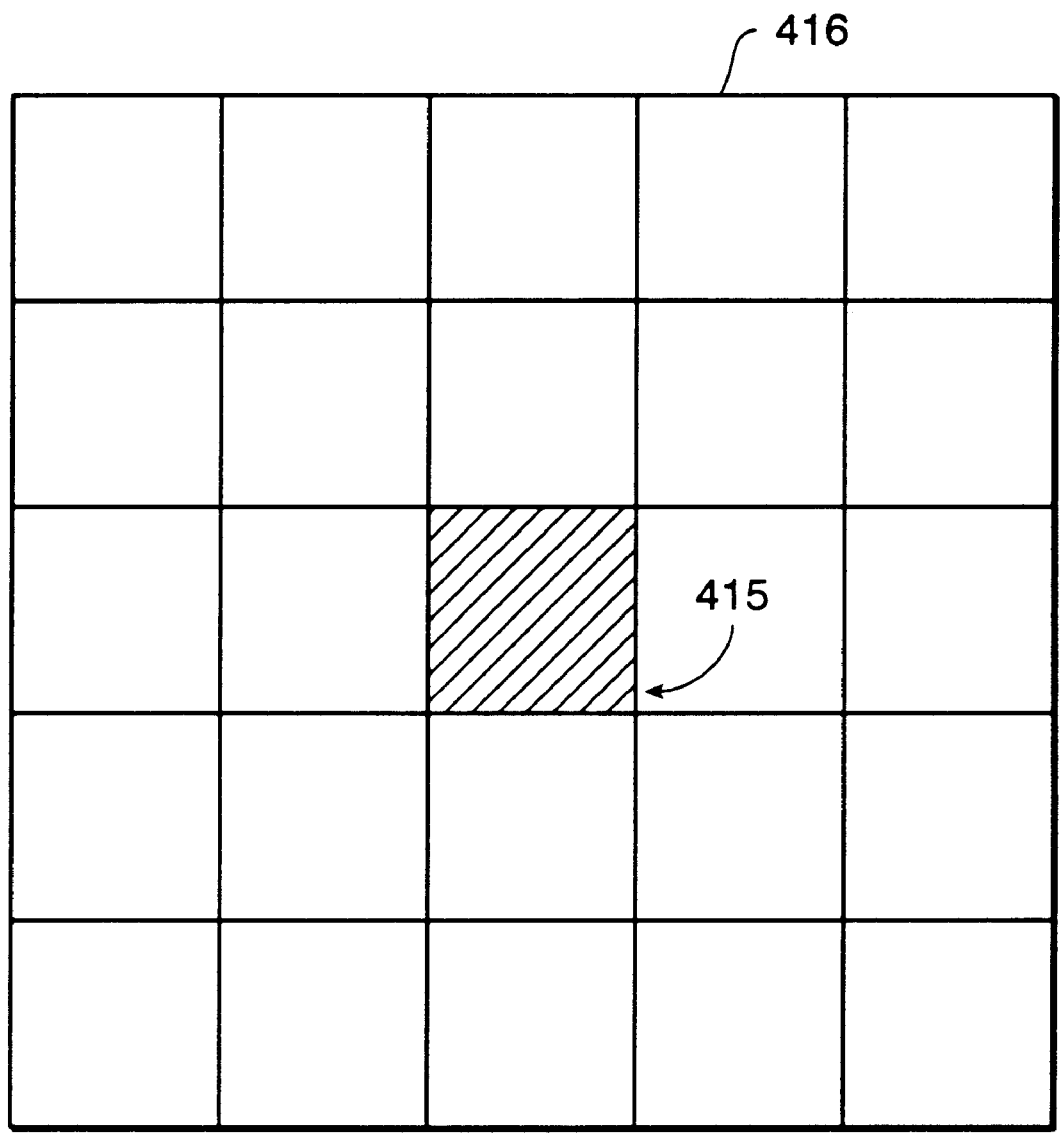
FIG. 49 illustrates a region used for determining whether a black target pixel lies within a differently-colored region.

According to a preferred embodiment, the determination of step S4803 is made by examining image pixels surrounding the target pixel. FIG. 49 is a diagram for describing this particular embodiment.

FIG. 49 shows black target pixel 415 within 5×5 grid of image data 416. Each subdivision of grid 416 represents a single image pixel. Preferably, each image pixel is represented by three 8-bit values, each 8-bit value representing red, green, and blue components of the image pixel. In order to determine whether black target pixel 415 is located within a differently-colored region, the red, green, and blue components of each pixel in grid 416 are compared using the following equations:

$$|R-B|<\alpha; |B-G|<\beta; \text{ and } |G-R|<\gamma,$$

wherein $\alpha, \beta$, and $\gamma$ are relatively small values.

If each equation is satisfied for each pixel within grid 416, black target pixel 415 is determined not to exist within a differently-colored region. Alternatively, step S4803 may require that the red, green, and blue components of each pixel in grid 416 satisfy the equation R=G=B in order to determine that the target pixel does not exist within a differently-colored region. However, this alternative method is susceptible to errors in image data caused by noise, poor scanning, or the like. Accordingly, $\alpha, \beta$, and $\gamma$ are used as shown above to provide a small tolerance for data errors. Of course, other methods may be used in step S4803 for determining whether black target pixel 415 is within a differently-colored region.

Advantageously, multi-level data is used to determine differently-colored regions in the above-described embodiment. In contrast, a system utilizing binarized data to determine differently-colored regions may mistakenly interpret a 50% gray region of original image data to consist of alternate regions of black and white pixels. As a result, inappropriate inks might be used to print the "black" regions.

It should be understood that, although the above description of selection of alternative inks specifically focuses on high-penetration black ink and low-penetration black ink, it is contemplated to utilize the foregoing in conjunction with any first ink and second ink differing from one another in color, penetration characteristic, or other characteristic, such as viscosity or density.

Furthermore, although plain and specially-coated high-resolution papers are discussed above, a determination of appropriate ink may be based upon any media type. Additional contemplated media include transparencies, glossy paper, glossy film, back print film, fabric sheets, T-shirt transfers, Bubble Jet paper, greeting card stock, and brochure paper, among others. In this regard, paper type can be detected by a paper sensor located within printer 30, or input through a user interface displayed on display screen 22, or input via a button located on printer 30.

It should also be noted that, in the preferred embodiment, printer driver 114 contains computer-executable steps to execute the flow of FIG. 48. Of course, these steps could be wholly contained within ROM 122 of printer 30 or could be stored jointly within computer-readable memories of host computer 23 and printer 30.

11.1 Selection of CMYK Black or Pigment Black

It has been noted that PCBk may be utilized to print black pixels upon a recording medium. Alternatively, pigment-based black inks and dye-based black inks have also been used to print such pixels. Printer 30 provides additional functionality by providing selectable printing of black pixels using either pigment-based black ink or a combination of cyan, magenta, yellow, and black dye-based inks.

In order to do so, it is initially determined whether a black target pixel corresponds to a differently-colored region. In a case that it is determined that the black target pixel does not correspond to a differently-colored region, a printer is instructed to print the black target pixel using a pigment-based black ink. Otherwise, the printer is instructed to print the black target pixel using a dye-based black ink and dye-based ink of each of subtractive primary colors.

Figure 49A:
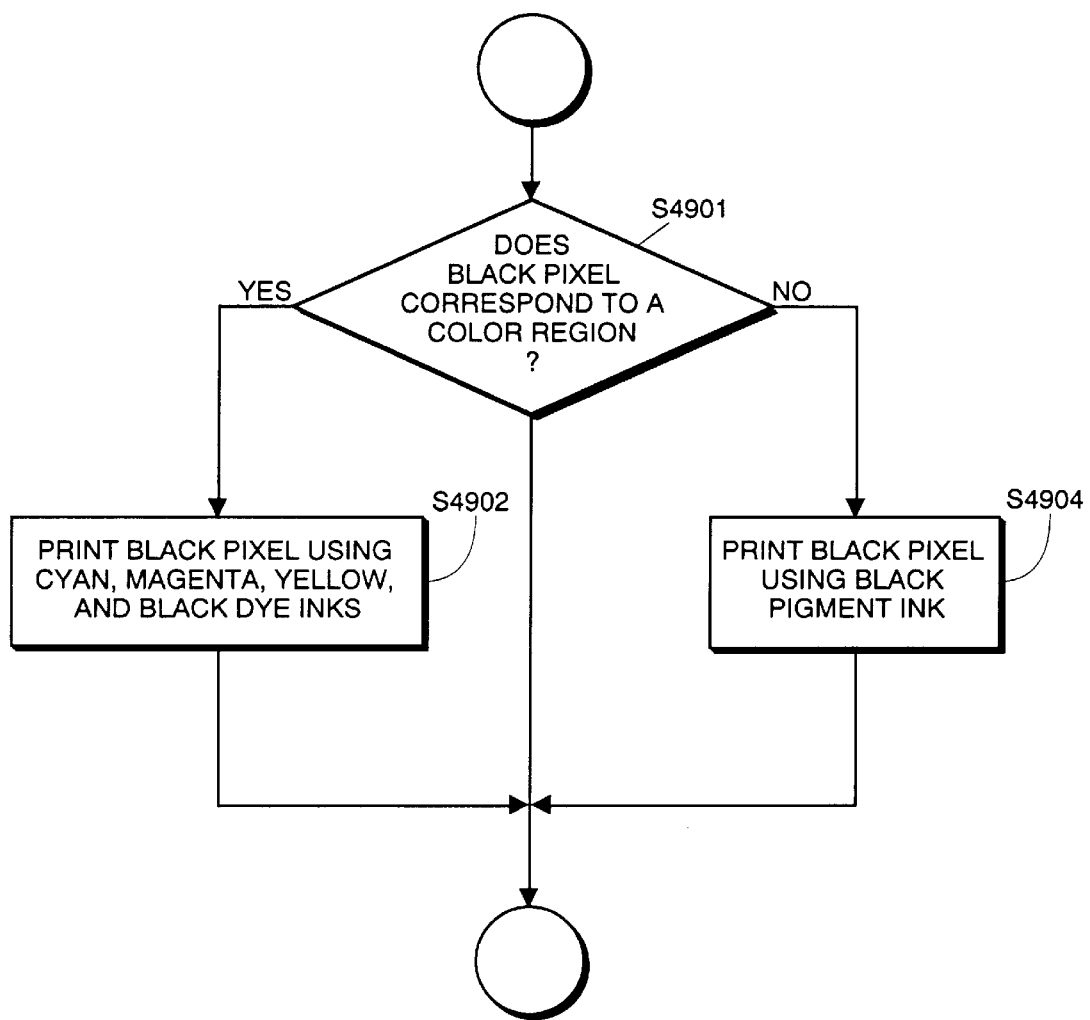
FIG. 49A is a flow diagram describing selection of CMYK black ink or pigment-based black ink.

FIG. 49A is a flow diagram for specifically describing the foregoing features. In step S4901, it is determined whether a black target pixel corresponds to a color region. Preferably, this determination is based upon multi-level data representing a region adjacent to the black target pixel. Such a method is described in detail above with respect to FIG. 49, and is therefore omitted at this point.

In a case that the target pixel is determined to exist within a color region, flow proceeds to step S4902, in which the target pixel is printed using a combination of dye-based black ink and dye-based cyan, magenta, and yellow inks. Upon reaching step S4904, the target pixel has been determined not to exist within a color region. As a result, the target pixel is printed using a pigment-based black ink.

Notably, the foregoing features allow black pixels within color areas of an image to exhibit a truer black color than that achieved using PCBk, while utilizing blending of various dye-based inks in order to maintain a relatively uniform output density within the color area. In addition, the foregoing selectability allows isolated black pixels to be printed using pigment-based black ink, thereby allowing more accurate reproduction of such black image data.

As stated with respect to previous embodiments, printer driver 114 contains computer-executable steps to execute the flow of FIG. 49A. Of course, these steps could be wholly contained within ROM 122 of printer 30 or could be stored jointly within computer-readable memories of host computer 23 and printer 30.

11.2 Boundary Region Printing

As mentioned above, conventionally-printed black/color boundary regions suffer from several deficiencies. First, such regions are often identified based on binarized data of an original multi-level image. However, binarized image data often does not accurately approximate actual multi-level image data. As a result, a boundary region may be "identified" at a position where no such region exists within the original image.

Figure 50A:
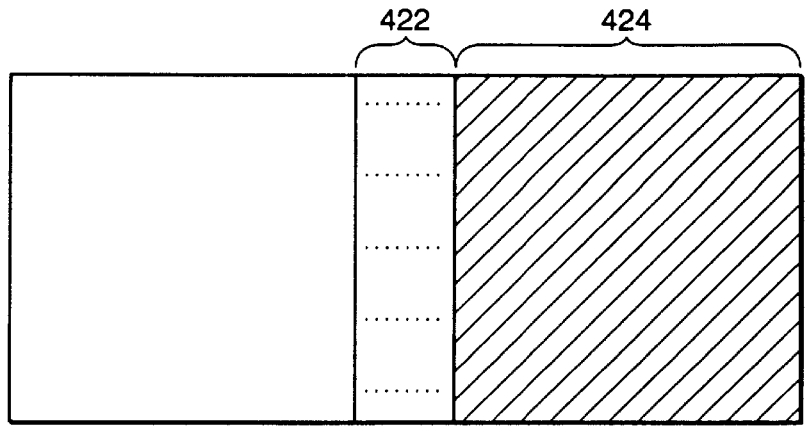
FIGS. 50A, 50B and 50C illustrate printing a region adjacent to a boundary between a black region and a differently-colored region.

Second, low-penetration black inks used to print a black region tend to bleed into adjacent color regions printed using high-penetration ink. PCBk has been proposed as a buffer between such a color region and a region of low-penetration black ink. However, as shown in FIG. 50A, such a buffer is unsatisfactory because the different optical densities of PCBk region 422 and low-penetration black ink region 424 cause an abrupt visual discontinuity.

Figure 50B:
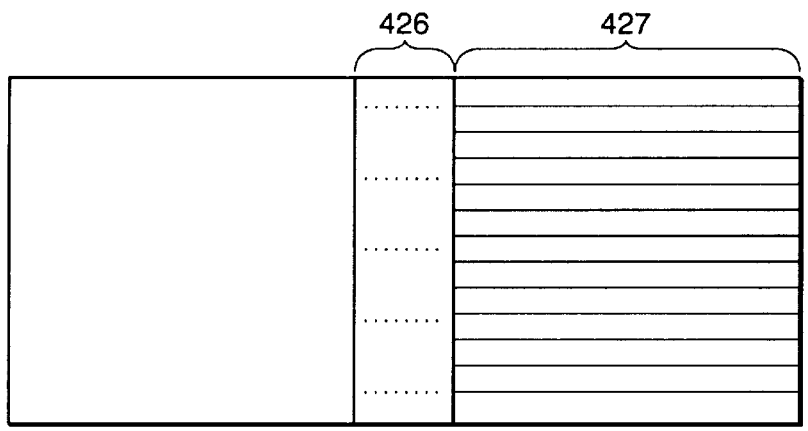

It has also been proposed to print black/color boundary regions using high-penetration black ink and a PCBk "buffer". As shown in FIG. 50B, although optical densities of PCBk region 426 and high-penetration black ink region 427 are more similar than shown in FIG. 50A, the black color produced by high-penetration black ink is unsuitable for producing high-quality solid black regions.

Figure 51:
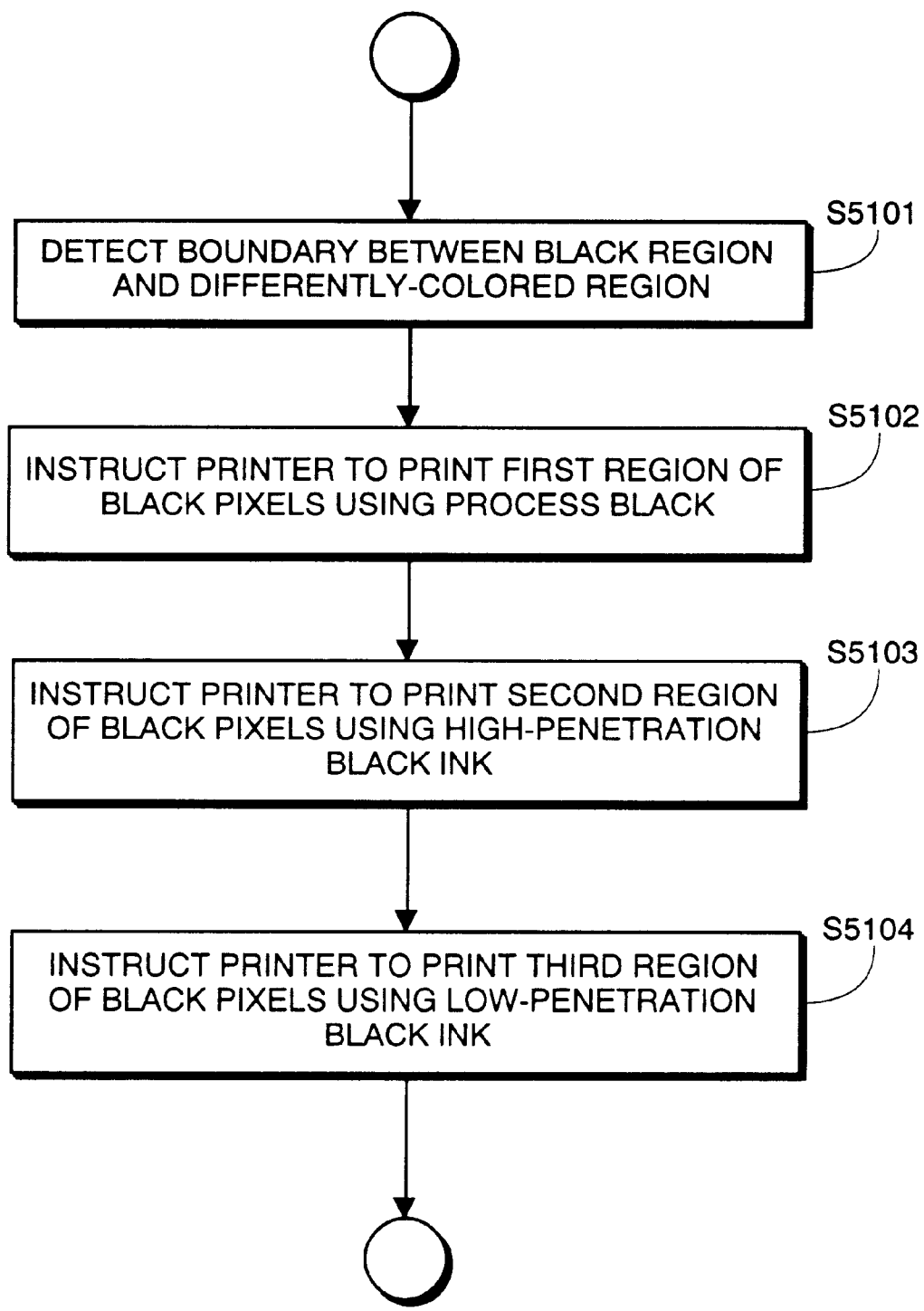
FIG. 51 is a flow diagram for describing a method for printing a region adjacent to a boundary between a black region and a differently-colored region.

FIG. 51 is a flow diagram describing a method for printing a boundary region. Generally, the method includes detecting a boundary between a black region of an image and a differently-colored. region of the image, instructing a printer to print a first region of black pixels within the black region and adjacent to the boundary using process black, instructing the printer to print a second region of black pixels within the black region and adjacent to the first region using high-penetration black ink, and instructing the printer to print a third region of black pixels within the black region and adjacent to the second region using low-penetration black ink.

Figure 50C:
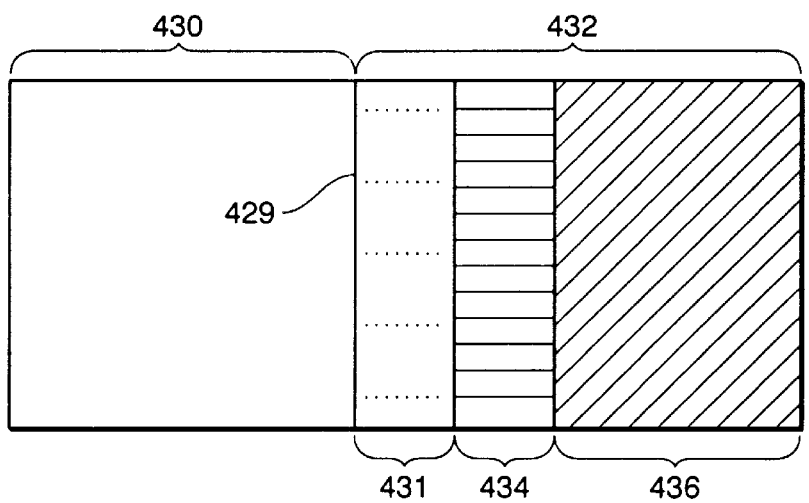

In particular, flow begins at step S5101, in which a boundary between a black region of an image and a differently-colored region of the image is detected. With reference to FIG. 50C, step S5101 results in detection of boundary 429 between differently-colored region 430 and black region 432. As described above, boundary detection is preferably based on multi-level image data so as to detect black/differently-colored boundaries more accurately than systems which perform boundary detection using binarized image data.

Flow proceeds to step S5102, in which a printer is instructed to print a first region of black pixels using PCBk. As shown in FIG. 50C, first region 431 is within black region 432 and adjacent to boundary 429.

Next, in step S5103, the printer is instructed to print a second region of black pixels using a high-penetration black ink. The second region is depicted in FIG. 50C as region 434. Advantageously, second region 434 is adjacent to first region 431 and within black region 432.

Lastly, the printer is instructed, in step S5104, to print a third region of black pixels using a low-penetration black ink. As shown in FIG. 50C, third region 436 is adjacent to second region 434 and within black region 432.

It should be understood that sizes of the first, second, and third regions may be adjusted based on a number of PCBk pixels desired and on a number of high-penetration black ink pixels desired in a boundary region between a black region and a differently-colored region.

As a result of the FIG. 51 flow, optical density changes gradually across a boundary between a black region and a differently-colored region, bleeding between the black region and the color region is reduced, and a high-quality black region is obtained.

Printer driver 114 may contain computer-executable steps to execute the flow of FIG. 51. These steps may also be contained within ROM 122 of printer 30 or may be stored jointly within computer-readable memories of host processor 23 and printer 30.

Figure 52:
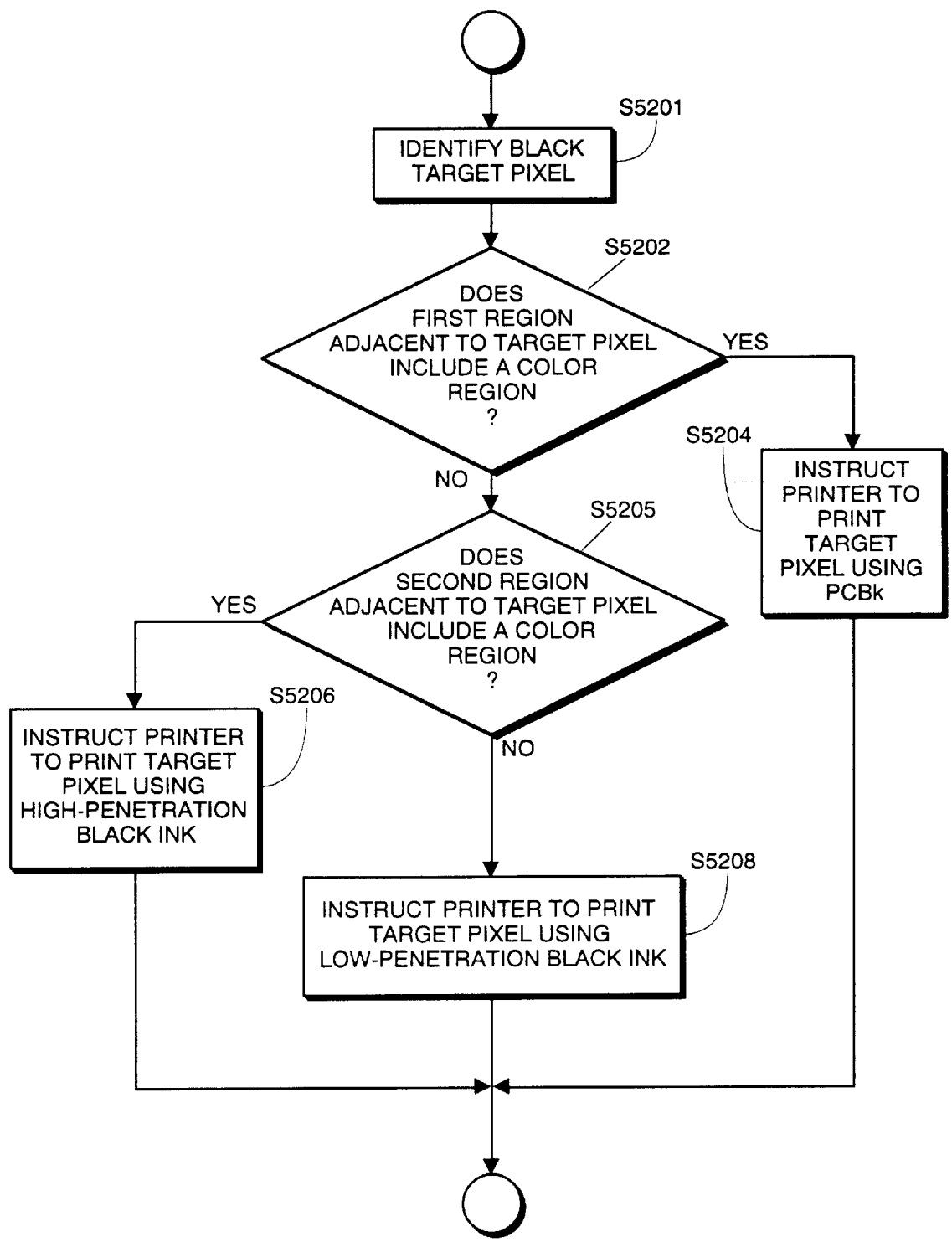
FIG. 52 is a flow diagram for describing a method for printing a region adjacent to a boundary between a black region and a differently-colored region.

FIG. 52 illustrates a more detailed method for printing a boundary region between a black region and a differently-colored region.

In general, FIG. 52 describes a system to control printing of pixels corresponding to image data using an ink jet printer which includes a reservoir of a high-penetration black ink, a reservoir of ink of a low-penetration black ink, and a reservoir of ink to create process black. According to the system, it is determined, based on the image data, whether or not a first region of a first predetermined size adjacent to a black target pixel includes a differently-colored region. In a case that it is determined that the first region includes a differently-colored region, the printer is instructed to print the target pixel using process black. In a case that it is determined that the first region does not include a differently-colored region, it is determined, based on the image data, whether or not a second region of a second predetermined size adjacent to the target pixel includes a differently-colored region, the second region being larger than the first region. Finally, in a case that it is determined that the second region includes a differently-colored region the printer is instructed to print the target pixel using the high-penetration black ink, otherwise the printer is instructed to print the target pixel using the low-penetration black ink.

More specifically, flow begins at step S5201, in which a black target pixel is identified within original image data. Flow proceeds to step S5202, in which it is determined whether a first region adjacent to the target pixel includes a differently-colored region. If so, flow proceeds to step S5204, wherein printer 30 is instructed to print the target pixel using PCBk. If not, flow proceeds to step S5205.

It is determined, in step S5205, whether a second region adjacent to the target pixel identified in step S5201 includes a differently-colored region. Notably, the second region is larger than the first region analyzed in step S5202. Accordingly, step S5205 confirms whether the target pixel is located near to a differently-colored region. If so, flow proceeds to step S5206, in which printer 30 is instructed to print the target pixel using high-penetration black ink. If not, flow continues to step S5208, at which printer 30 is instructed to print the target pixel using low-penetration black ink.

Figure 53A:
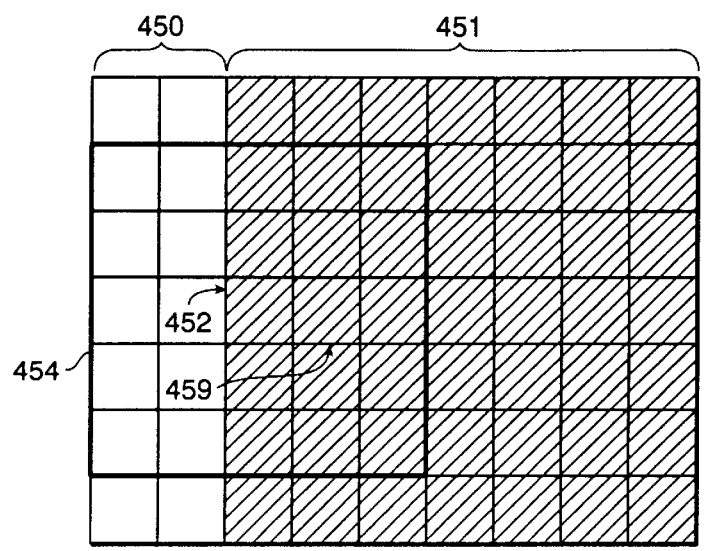
FIGS. 53A, 53B and 53C illustrate a method for printing data based on print data of a region adjacent to a boundary between a black region and a differently-colored region.

FIG. 53A illustrates detection of a first differently-colored region according to a preferred embodiment of step S5202. FIG. 53A shows a region of differently-colored multi-level image data 450 and a region of black multi-level image data 451. For the foregoing explanation, the target pixel identified in step S5201 is represented by pixel data location 452. In addition, 5×5 region 454 is the first region analyzed in step S5202.

In order to determine whether region 454 includes a differently-colored region, the algorithm described above with respect to FIG. 49 is applied to the pixel values within region 454. Preferably, multi-level pixel values are used in order to accurately detect black pixels and differently-colored pixels within region 454. Since region 454 contains color values from region 450, printer 30 is instructed, in step S5204, to print target pixel 452 using PCBk.

Figure 53B:
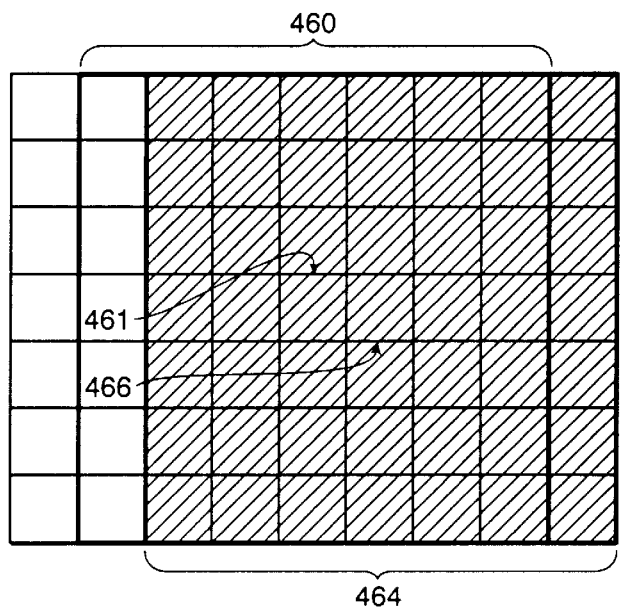
Figure 53C:
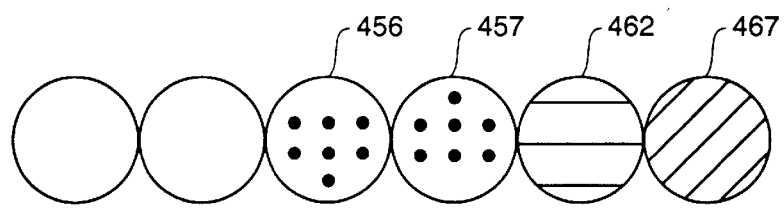

This instruction is reflected in FIG. 53C, which is a representation of printed pixels corresponding to the image data of FIG. 53A. As shown in FIG. 53C, printed pixel 456, representing pixel location 452, is printed using PCBk. In this regard, it should be understood that printed pixel 457, representing pixel location 459, is also printed using PCBk.

Steps S5205 to S5208 are described in more detail below with respect to FIGS. 53B and 53C. In particular, second region 460, adjacent to pixel data location 461 and larger than first region 454, is analyzed to determine whether it includes a differently-colored region. Accordingly, printer 30 is instructed to print pixel 462, which corresponds to pixel data location 461, using high-penetration black ink.

As can be seen from FIG. 53B, second region 464 adjacent to pixel data location 466 does not contain a differently-colored region. Therefore, in accordance with step S5208, printer 30 is instructed to print pixel 467, which corresponds to pixel data location 466, using low-penetration black ink.

As a result of the FIG. 52 flow, a boundary region such as that shown in FIG. 50C is obtained. Specifically, optical density changes gradually across the boundary region, bleeding between the black region and the differently-colored region is reduced, and the black region is printed using low-penetration black ink.

Of course, sizes of the first region and of the second region may be adjusted based on a number of PCBk pixels desired and on a number of high-penetration black ink pixels desired in a boundary region between a black region and a differently-colored region.

As discussed with respect to the previous embodiments, printer driver 114 may contain computer-executable steps to execute the flow of FIG. 52. These steps may also be contained within ROM 122 of printer 30 or may be stored jointly within computer-readable memories of host processor 23 and printer 30.

11.3 Printing With Different Inks at Different Resolutions

FIG. 54 is a flow diagram which depicts processing according to another embodiment. As shown in FIG. 54, upon input of pixel data such as 5×5 pixel region 416, it is determined, in steps S5402 to S5408, whether a target pixel in the input pixel data is within a color region. This process is the same as that described above with respect to FIG. 49. Accordingly, a detailed description thereof is omitted here for the sake of brevity.

Steps S5409 to S5412 set forth color correction, i.e., black correction, which is performed in accordance with the present invention. Specifically, in step S5409, color correction is performed on the target pixel so as to change the pixel from RGB data into CMYK data. Next, step S5410 determines if the target pixel is within a color region. If the pixel is not within a color region, processing proceeds to step S5411. In a case that the target pixel is not within a color region, pigment ink (i.e., K1 ink) is set to form the pixel. In contrast, in a case that step S5410 determines that the pixel is in a color region, black is formed from process black, i.e., cyan, magenta, and yellow ink and dye-based (i.e., K2) black ink.

Next, step S5413 performs output color correction on the pixel data. For example, gamma correction or the like can be performed in this step. Thereafter, processing proceeds to steps S5414 to S5419. These steps set forth binarization in accordance with the present invention.

More specifically, step S5414 determines whether the target pixel is within a color region. In a case that the target pixel is within a color region, processing proceeds to step S5418, in which the target pixel is binarized with a 2×2 index, and to step S5419 in which the pixel is printed in 720×720 resolution with dye-based black pigment ink (see FIG. 54A). On the other hand, in a case that step S5414 determines that the target pixel is not within a color region, processing proceeds to step S5415, in which the pixel is binarized with a 1×1 index, and to steps S5417 in which the pixel is printed in 360×360 dpi with pigment-based black ink (see FIG. 54B). Thereafter, processing ends.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A print driver stored on a computer-readable medium and executable in a host computer to control printing of pixels corresponding to multi-level image data, comprising:

code to determine, based on multi-level image data for a target pixel and multi-level image data for pixels adjacent to the target pixel, whether the target pixel should be printed using a dye-based ink or whether the target pixel should be printed using a pigment-based ink;

code to instruct a printer to print the target pixel using the dye-based ink in a case that it is determined that the target pixel should be printed using the dye-based ink; and code to instruct the printer to print the target pixel using the pigment-based ink in a case that it is determined that the target pixel should be printed using the pigment-based ink.

2. A method for controlling printing of pixels corresponding to multi-level image data, comprising:

determining, based on multi-level image data for a target pixel and multi-level image data for pixels adjacent to the target pixel, whether the target pixel should be printed using a dye-based ink or whether the target pixel should be printed using a pigment-based ink;

instructing a printer to print the target pixel using the dye-based ink in a case that it is determined that the target pixel should be printed using the dye-based ink; and instructing the printer to print the target pixel using the pigment-based ink in a case that it is determined that the target pixel should be printed using the pigment-based ink.

3. A print driver stored on a computer-readable medium and executable in a host computer to control a printer to print a pixel upon a recording medium using either a first ink or a second ink, the print driver comprising:

code to detect a material type of the recording medium; and code to determine, based on the detected material type, whether the pixel should be printed using the first ink or whether the pixel should be printed using the second ink;

wherein the first ink is a high-penetration ink, and wherein the second ink is a lower-penetration ink whose penetration is lower than the high-penetration ink.

4. A print driver according to claim 3, wherein the first ink is a dye-based ink, and wherein the second ink is a pigment-based ink.

5. A print driver according to claim 3, wherein the first ink is a high-penetration black ink, and wherein the second ink is a lower-penetration black ink.

6. A print driver according to claim 3, wherein the detected material type is either plain paper or specially-coated paper.

7. A print driver according to claim 3, further comprising:
code to instruct the printer to print the pixel using the first ink in a case that it is determined that the pixel should be printed using the first ink; and
code to instruct the printer to print the pixel using the second ink in a case that it is determined that the pixel should be printed using the second ink.

8. A method for controlling a printer to print a pixel upon a recording medium using either a first ink or a second ink, the method comprising:
detecting a material type of the recording medium; and
determining, based on the detected material type, whether the pixel should be printed using the first ink or whether the pixel should be printed using the second ink;
wherein the first ink is a high-penetration ink, and wherein the second ink is a lower-penetration ink whose penetration is lower than the high-penetration ink.

9. A method according to claim 8, wherein the first ink is a dye-based ink, and wherein the second ink is a pigment-based ink.

10. A method according to claim 8, wherein the first ink is a high-penetration black ink, and wherein the second ink is a lower-penetration black ink.

11. A method according to claim 8, wherein the detected material type is either plain paper or specially-coated paper.

12. A method according to claim 8, further comprising:
instructing the printer to print the pixel using the first ink in a case that it is determined that the pixel should be printed using the first ink; and
instructing the printer to print the pixel using the second ink in a case that it is determined that the pixel should be printed using the second ink.

13. A print driver stored on a computer-readable medium and executable in a host computer to control an ink jet printer to print pixels upon a recording medium using either a first ink or a second ink, the print driver comprising:
code to determine whether the recording medium is plain paper or specially-coated paper;
code to instruct the printer to print a target pixel using the first ink in a case that the recording medium is specially-coated paper;
code to determine, in a case that the recording medium is plain paper, whether or not the target pixel corresponds to a differently-colored region;
code to instruct the printer to print the target pixel using the first ink in a case that it is determined that the target pixel corresponds to a differently-colored region; and
code to instruct the printer to print the target pixel using the second ink in a case that it is determined that the target pixel does not correspond to a differently-colored region.

14. A print driver according to claim 13, wherein the code to determine whether or not the target pixel corresponds to a differently-colored region comprises:
code to calculate, for each pixel in a region adjacent to the target pixel, a relationship between primary color values assigned to the pixel in the region adjacent to the target pixel; and
code to determine whether each of the calculated relationships satisfies a predetermined relationship.

15. A print driver according to claim 14, wherein the first ink is a high-penetration ink, and wherein the second ink is a lower-penetration ink whose penetration is lower than the high-penetration ink.

16. A print driver according to claim 15, wherein the first ink is a dye-based ink, and wherein the second ink is a pigment-based ink.

17. A print driver according to claim 15, wherein the first ink is a high-penetration black ink, and wherein the second ink is a lower-penetration black ink.

18. A method for controlling an ink jet printer to print pixels upon a recording medium using either a first ink or a second ink, the method comprising:
determining whether the recording medium is plain paper or specially-coated paper;
instructing the printer to print a target pixel using the first ink in a case that it is determined that the recording medium is specially-coated paper;
determining, in a case that the recording medium is plain paper, whether or not the target pixel corresponds to a differently-colored region;
instructing the printer to print the target pixel using the first ink in a case that it is determined that the target pixel corresponds to a differently-colored region; and
instructing the printer to print the target pixel using the second ink in a case that it is determined that the target pixel does not correspond to a differently-colored region.

19. A method according to claim 18, wherein the step of determining whether or not the target pixel corresponds to a differently-colored region comprises:
calculating, for each pixel in a region adjacent to the target pixel, a relationship between primary color values assigned to the pixel in the region adjacent to the target pixel; and
determining whether each of the calculated relationships satisfies a predetermined relationship.

20. A method according to claim 19, wherein the first ink is a high-penetration ink, and wherein the second ink is a lower-penetration ink whose penetration is lower than the high-penetration ink.

21. A method according to claim 20, wherein the first ink is a dye-based ink, and wherein the second ink is a pigment-based ink.

22. A method according to claim 20, wherein the first ink is a high-penetration black ink, and wherein the second ink is a lower-penetration black ink.

23. A print driver stored on a computer-readable medium and executable in a host computer so as to print an image using an ink jet printer comprising a reservoir of a high-penetration black ink, a reservoir of ink of a lower-penetration black ink whose penetration is lower than the high-penetration black ink, and a reservoir of ink to create process black, the print driver comprising:
code to detect a boundary between a black region of the image and a differently-colored region of the image;
code to instruct the printer to print a first region of black pixels within the black region and adjacent to the boundary using process black;
code to instruct the printer to print a second region of black pixels within the black region and adjacent to the first region using the high-penetration black ink; and
code to instruct the printer to print a third region of black pixels within the black region and adjacent to the second region using the lower-penetration ink.

24. A print driver according to claim 23, wherein the boundary is detected based on multi-level image data.

25. A print driver according to claim 24, wherein the high-penetration black ink is a dye-based ink, wherein the lower-penetration black ink is a pigment-based ink, and wherein the reservoir of ink to create process black is a reservoir of subtractive primary colors.

26. A method for printing an image using an ink jet printer comprising a reservoir of a high-penetration black ink, a reservoir of ink of a lower-penetration black ink whose penetration is lower than the high-penetration black ink, and a reservoir of ink to create process black, the method comprising:

detecting a boundary between a black region of the image and a differently-colored region of the image;

instructing the printer to print a first region of black pixels within the black region and adjacent to the boundary using process black;

instructing the printer to print a second region of black pixels within the black region and adjacent to the first region using the high-penetration black ink; and instructing the printer to print a third region of black pixels within the black region and adjacent to the second region using the lower-penetration black ink.

27. A method according to claim 26, wherein the boundary is detected based on multi-level image data.

28. A method according to claim 27, wherein the high-penetration black ink is a dye-based ink, wherein the lower-penetration black ink is a pigment-based ink, and wherein the reservoir of ink to create process black is a reservoir of subtractive primary colors.

29. A print driver stored on a computer-readable medium and executable in a host computer so as to print pixels corresponding to image data using an ink jet printer comprising a reservoir of a high-penetration black ink, a reservoir of ink of a lower-penetration black ink whose penetration is lower than the high-penetration black ink, and a reservoir of ink to create process black, the print driver comprising:

code to determine, based on the image data, whether or not a first region of a first predetermined size adjacent to a black target pixel includes a differently-colored region;

code to instruct the printer to print the target pixel using process black in a case that it is determined that the first region includes a differently-colored region;

code to determine, based on the image data, and in a case that it is determined that the first region does not include a differently-colored region, whether or not a second region of a second predetermined size adjacent to the target pixel includes a differently-colored region, the second region being larger than the first region;

code to instruct the printer to print the target pixel using the high-penetration black ink in a case that it is determined that the second region includes a differently-colored region; and code to instruct the printer to print the target pixel using the lower-penetration black ink in a case that it is determined that the second region does not include a differently-colored region.

30. A print driver according to claim 29, wherein the image data is multi-level image data.

31. A print driver according to claim 30, wherein the high-penetration black ink is a dye-based ink, wherein the lower-penetration black ink is a pigment-based ink, and wherein the reservoir of ink to create process black is a reservoir of subtractive primary colors.

32. A method for printing pixels corresponding to image data using an ink jet printer comprising a reservoir of a high-penetration black ink, a reservoir of ink of a lower-penetration black ink whose penetration is lower than the high-penetration black ink, and a reservoir of ink to create process black, the method comprising:

determining, based on the image data, whether or not a first region of a first predetermined size adjacent to a black target pixel includes a differently-colored region;

instructing the printer to print the target pixel using process black in a case that it is determined that the first region includes a differently-colored region;

determining, based on the image data, and in a case that it is determined that the first region does not include a differently-colored region, whether or not a second region of a second predetermined size adjacent to the target pixel includes a differently-colored region, the second region being larger than the first region;

instructing the printer to print the target pixel using the high-penetration black ink in a case that it is determined that the second region includes a differently-colored region; and instructing the printer to print the target pixel using the lower-penetration black ink in a case that it is determined that the second region does not include a differently-colored region.

33. A method according to claim 32, wherein the image data is multi-level image data.

34. A method according to claim 33, wherein the high-penetration black ink is a dye-based ink, wherein the lower-penetration black ink is a pigment-based ink, and wherein the reservoir of ink to create process black is a reservoir of subtractive primary colors.

35. A print driver stored on a computer-readable medium and executable in a host computer to control printing of black pixels upon a recording medium, the print driver comprising:

code to determine whether a black target pixel corresponds to a differently-colored region;

code to instruct a printer to print the black target pixel using a pigment-based black ink in a case that it is determined that the black target pixel does not correspond to a differently-colored region; and code to instruct the printer to print the black target pixel using a dye-based black ink and dye-based ink of each of subtractive primary colors in a case that it is determined that the black target pixel corresponds to a differently-colored region.

36. A print driver according to claim 35, wherein the code to determine whether a black target pixel corresponds to a differently-colored region comprises:

code to calculate, for each pixel in a region adjacent to the target pixel, a relationship between primary color values assigned to the pixel in the region adjacent to the target pixel; and code to determine whether each of the calculated relationships satisfies a predetermined relationship.

37. A method for controlling printing of black pixels upon a recording medium, the method comprising:

determining whether a black target pixel corresponds to a differently-colored region;

instructing a printer to print the black target pixel using a pigment-based black ink in a case that it is determined that the black target pixel does not correspond to a differently-colored region; and instructing the printer to print the black target pixel using a dye-based black ink and dye-based ink of each of subtractive primary colors in a case that it is determined that the black target pixel corresponds to a differently-colored region.

38. A method according to claim 37, wherein the step of determining whether a black target pixel corresponds to a differently-colored region comprises:
   calculating, for each pixel in a region adjacent to the target pixel, a relationship between primary color values assigned to the pixel in the region adjacent to the target pixel; and
   determining whether each of the calculated relationships satisfies a predetermined relationship.

39. A printing system for printing pixels corresponding to multi-level image data, the system comprising:
   a host processor comprising:
      a memory for storing processor-executable process steps; and
      a processor for executing the stored processor-executable process steps; and
   a printer comprising:
      a reservoir of a dye-based ink;
      a reservoir of a pigment-based ink;
      a first print head for printing pixels using said reservoir of the dye-based ink; and
      a second print head for printing pixels using said reservoir of the pigment-based ink,
   wherein said processor executes the stored process steps 1) to determine, based on multi-level image data for a target pixel and multi-level image data for pixels adjacent to the target pixel, whether the target pixel should be printed using a dye-based ink or whether the target pixel should be printed using a pigment-based ink, 2) to instruct a printer to print the target pixel using the dye-based ink in a case that it is determined that the target pixel should be printed using the dye-based ink, and 3) to instruct the printer to print the target pixel using the pigment-based ink in a case that it is determined that the target pixel should be printed using the pigment-based ink.

40. A printing system to print a pixel upon a recording medium using either a first ink or a second ink, the system comprising:
   a host processor comprising:
      a memory for storing processor-executable process steps; and
      a processor for executing the stored processor-executable process steps; and
   a printer comprising:
      a reservoir of a first ink;
      a reservoir of a second ink;
      a first print head for printing pixels using said reservoir of the first ink; and
      a second print head for printing pixels using said reservoir of the second ink,
   wherein said processor executes the stored process steps 1) to detect a material type of the recording medium, and 2) to determine, based on the detected material type, whether the pixel should be printed using the first ink or whether the pixel should be printed using the second ink.

41. A printing system to print pixels upon a recording medium using either a first ink or a second ink, the system comprising:
   a host processor comprising:
      a memory for storing processor-executable process steps; and
      a processor for executing the stored processor-executable process steps; and
   a printer comprising:
      a reservoir of a first ink;
      a reservoir of a second ink;
      a first print head for printing pixels using said reservoir of the first ink; and
      a second print head for printing pixels using said reservoir of the second ink,
   wherein said processor executes the stored process steps 1) to determine whether the recording medium is plain paper or specially-coated paper, 2) to instruct the printer to print a target pixel using the first ink in a case that the recording medium is specially-coated paper, 3) to determine, in a case that it is determined that the recording medium is plain paper, whether or not the target pixel corresponds to a differently-colored region, 4) to instruct the printer to print the target pixel using the first ink in a case that it is determined that the target pixel corresponds to a differently-colored region, and 5) to instruct the printer to print the target pixel using the second ink in a case that it is determined that the target pixel does not correspond to a differently-colored region.

42. A printing system according to claim 41, wherein said processor executes the steps to determine whether or not the target pixel corresponds to a differently-colored region by executing process steps 1) to calculate, for each pixel in a region adjacent to the target pixel, a relationship between primary color values assigned to the pixel in the region adjacent to the target pixel, and 2) to determine whether each of the calculated relationships satisfies a predetermined relationship.

43. A printing system for printing an image comprising:
   a host processor comprising:
      a memory for storing processor-executable process steps; and
      a processor for executing the stored processor-executable process steps; and
   a printer comprising:
      a reservoir of a first ink;
      a reservoir of a second ink; and
      a reservoir of ink to print process black,
   wherein said processor executes the stored process steps 1) to detect a boundary between a black region of the image and a differently-colored region of the image, 2) to instruct the printer to print a first region of black pixels within the black region and adjacent to the boundary using process black, 3) to instruct the printer to print a second region of black pixels within the black region and adjacent to the first region using the first ink, and 4) to instruct the printer to print a third region of black pixels within the black region and adjacent to the second region using the second ink.

44. A printing system for printing pixels corresponding to image data upon a recording medium, the system comprising:
   a host processor comprising:
      a memory for storing processor-executable process steps; and
      a processor for executing the stored processor-executable process steps; and
   a printer comprising:
      a reservoir of a high-penetration black ink;
      a reservoir of a lower-penetration black ink whose penetration is lower than the high-penetration black ink; and
      a reservoir of ink to print process black, wherein said processor executes the stored process steps 1) to determine, based on the image data, whether or not a first region of a first predetermined size adjacent to a black target pixel includes a differently-colored region, 2) to instruct the printer to print the target pixel using process black in a case that it is determined that the first region includes a differently-colored region, 3) to determine, based on the image data, and in a case that it is determined that the first region does not include a differently-colored region, whether or not a second region of a second predetermined size adjacent to the target pixel includes a differently-colored region, the second region being larger than the first region, 4) to instruct the printer to print the target pixel using the high-penetration black ink in a case that it is determined that the second region includes a differently-colored region, and 5) to instruct the printer to print the target pixel using the lower-penetration black ink in a case that it is determined that the second region does not include a differently-colored region.

45. A printing system for controlling printing of black pixels upon a recording medium, the print driver comprising:

a host processor comprising:
  a memory for storing processor-executable process steps; and
  a processor for executing the stored processor-executable process steps; and a printer comprising:
  a reservoir of a high-penetration black ink;
  a reservoir of a lower-penetration black ink whose penetration is lower than the high-penetration black ink; and
  a reservoir of dye-based ink of each of subtractive primary colors, wherein the processor executes the stored process steps 1) to determine whether a black target pixel corresponds to a differently-colored region, 2) to instruct a printer to print the black target pixel using a pigment-based black ink in a case that it is determined that the black target pixel does not correspond to a differently-colored region, and 3) to instruct the printer to print the black target pixel using a dye-based black ink and dye-based ink of each of subtractive primary colors in a case that it is determined that the black target pixel corresponds to a differently-colored region.

46. A printing system according to claim 45, wherein said processor executes the process steps to determine whether a black target pixel corresponds to a differently-colored region by executing process steps 1) to calculate, for each pixel in a region adjacent to the target pixel, a relationship between primary color values assigned to the pixel in the region adjacent to the target pixel, and 2) to determine whether each of the calculated relationships satisfies a predetermined relationship.

47. A printer for printing pixels corresponding to multi-level image data, comprising:

means for determining, based on multi-level image data for a target pixel and multi-level image data for pixels adjacent to the target pixel, whether the target pixel should be printed using a dye-based ink or whether the target pixel should be printed using a pigment-based ink;

means for printing the target pixel using the dye-based ink in a case that it is determined that the target pixel should be printed using the dye-based ink; and means for printing the target pixel using the pigment-based ink in a case that it is determined that the target pixel should be printed using the pigment-based ink.

48. A printer for printing a pixel upon a recording medium using either a first ink or a second ink, comprising:

means for detecting a material type of the recording medium;

means for determining, based on the detected material type, whether the pixel should be printed using the first ink or whether the pixel should be printed using the second ink;

means for printing the pixel using the first ink in a case that it is determined that the pixel should be printed using the first ink; and means for printing the pixel using the second ink in a case that it is determined that the pixel should be printed using the second ink, wherein the first ink is a high-penetration ink, and wherein the second ink is a lower-penetration ink whose penetration is lower than the high-penetration ink.

49. A printer for printing pixels upon a recording medium using either a first ink or a second ink, comprising:

means for determining whether the recording medium is plain paper or specially-coated paper;

means for printing a target pixel using the first ink in a case that it is determined that the recording medium is specially-coated paper;

means for determining, in a case that the recording medium is plain paper, whether or not the target pixel corresponds to a differently-colored region;

means for printing the target pixel using the first ink in a case that it is determined that the target pixel corresponds to a differently-colored region; and means for printing the target pixel using the second ink in a case that it is determined that the target pixel does not correspond to a differently-colored region.

50. A printer, comprising:

a reservoir of a high-penetration black ink;

a reservoir of ink of a lower-penetration black ink whose penetration is lower than the high-penetration black ink;

a reservoir of ink to create process black;

means for detecting a boundary between a black region of the image and a differently-colored region of the image;

means for printing a first region of black pixels within the black region and adjacent to the boundary using process black;

means for printing a second region of black pixels within the black region and adjacent to the first region using the high-penetration black ink; and means for printing a third region of black pixels within the black region and adjacent to the second region using the lower-penetration black ink.

51. A printer for printing pixels corresponding to image data, comprising:

a reservoir of a high-penetration black ink;

a reservoir of ink of a lower-penetration black ink whose penetration is lower than the high-penetration black ink;

a reservoir of ink to create process black;

means for determining, based on the image data, whether or not a first region of a first predetermined size adjacent to a black target pixel includes a differently-colored region;

means for printing the target pixel using process black in a case that it is determined that the first region includes a differently-colored region;

means for determining, based on the image data, and in a case that it is determined that the first region does not include a differently-colored region, whether or not a second region of a second predetermined size adjacent to the target pixel includes a differently-colored region, the second region being larger than the first region;

means for printing the target pixel using the high-penetration black ink in a case that it is determined that the second region includes a differently-colored region; and means for printing the target pixel using the lower-penetration black ink in a case that it is determined that the second region does not include a differently-colored region.

52. A printer for printing black pixels upon a recording medium, comprising:

means for determining whether a black target pixel corresponds to a differently-colored region;

means for printing the black target pixel using a pigment-based black ink in a case that it is determined that the black target pixel does not correspond to a differently-colored region; and means for printing the black target pixel using a dye-based black ink and dye-based ink of each of subtractive primary colors in a case that it is determined that the black target pixel corresponds to a differently-colored region.

53. A print driver stored on a computer-readable medium and executable in a host processor to print pixels corresponding to multi-level image data, comprising:

code to determine whether a black target pixel corresponds to a differently-colored region;

code to indicate that the black target pixel should be printed using pigment-based ink in a case that it is determined that the black target pixel does not correspond to a differently-colored region;

code to indicate that the black target pixel should be printed using dye-based ink in a case that it is determined that the black target pixel corresponds to a differently-colored region;

code to indicate that the black target pixel should be printed in a low resolution in a case that it is determined that the black target pixel does not correspond to a differently-colored region; and code to indicate that the black target pixel should be printed in a high resolution in a case that it is determined that the black target pixel corresponds to a differently-colored region.

54. A method for printing pixels corresponding to multi-level image data, comprising:

determining whether a black target pixel corresponds to a differently-colored region;

indicating that the black target pixel should be printed using pigment-based ink in a case that it is determined that the black target pixel does not correspond to a differently-colored region;

indicating that the black target pixel should be printed using dye-based ink in a case that it is determined that the black target pixel corresponds to a differently-colored region;

indicating that the black target pixel should be printed in a low resolution in a case that it is determined that the black target pixel does not correspond to a differently-colored region; and indicating that the black target pixel should be printed in a high resolution in a case that it is determined that the black target pixel corresponds to a differently-colored region.

55. A printing system for printing pixels corresponding to multi-level image data, comprising:

a host processor comprising:
a memory for storing processor-executable process steps; and
a processor for executing the stored process steps; and a printer, wherein the processor executes the process steps to 1) determine whether a black target pixel corresponds to a differently-colored region, 2) indicate that the black target pixel should be printed using pigment-based ink in a case that it is determined that the black target pixel does not correspond to a differently-colored region, 3) indicate that the black target pixel should be printed using dye-based ink in a case that it is determined that the black target pixel corresponds to a differently-colored region, 4) indicate that the black target pixel should be printed in a low resolution in a case that it is determined that the black target pixel does not correspond to a differently-colored region, and 5) indicate that the black target pixel should be printed in a high resolution in a case that it is determined that the black target pixel corresponds to a differently-colored region.

56. A printer for printing pixels corresponding to multi-level image data, comprising:

means for determining whether a black target pixel corresponds to a differently-colored region;

means for indicating that the black target pixel should be printed using a pigment-based ink in a case that it is determined that the black target pixel does not correspond to a differently-colored region;

means for indicating that the black target pixel should be printed using a dye-based ink in a case that it is determined that the black target pixel corresponds to a differently-colored region;

means for indicating that the black target pixel should be printed in a low resolution in a case that it is determined that the black target pixel does not correspond to a differently-colored region;

means for indicating that the black target pixel should be printed in a high resolution in a case that it is determined that the black target pixel corresponds to a differently-colored region;

means for printing the black target pixel in a high resolution using the dye-based ink; and means for printing the black target pixel in a low resolution using the pigment-based ink.

* * * * *

UNITED STATES PATENT AND TRADEMARK OFFICE
CERTIFICATE OF CORRECTION

PATENT NO.   : 6,178,009 B1
DATED        : January 23, 2002
INVENTOR(S)  : Akitoshi Yamada et al.

It is certified that error appears in the above-identified patent and that said Letters Patent is hereby corrected as shown below:

Title page,
Under FOREIGN PATENT DOCUMENTS,
"8156288     should read     -- 8-156288
10202920"                    10202920 --.

Column 21,
Line 7, "see" should read -- (see --.

Column 23,
Line 17, "movement" should read -- movement of --.

Column 32,
Line 47, "flap 24*b*" should read -- flap 241*b* --.

Column 45,
Line 4, "A_B" should read -- T_B --.
Line 5, "FlagRealTime Active" should read -- FlagRealTimeActive --.

Column 50,
Line 24, "download" should read -- downloaded --.

Column 53,
Line 44, "read" should read -- head --.

Column 56,
Line 53, "in." should read -- ink. --.
Line 59, "the cause" should read -- because --.

Column 57,
Line 48, "nozzle" should read -- nozzles --.

Column 59,
Line 33, "360" should read -- 360 dpi --.
Line 34, "720" should read -- 720 dpi --.

Column 66,
Line 30, "is" should read -- are --.

UNITED STATES PATENT AND TRADEMARK OFFICE
CERTIFICATE OF CORRECTION

PATENT NO.     : 6,178,009 B1
DATED          : January 23, 2002
INVENTOR(S)    : Akitoshi Yamada et al.

It is certified that error appears in the above-identified patent and that said Letters Patent is hereby corrected as shown below:

Column 68,
Line 1, "print." should read -- print --.
Line 61, "the printer" should read -- The printer --.
Line 63, "-unprinted" should read -- be unprinted --.
Line 63, "would is" should read -- is --.

Column 69,
Line 42, "the" should read -- The --.

Column 72,
Line 27, "scants" should read -- scan's --.

Column 74,
Line 39, "nest" should read -- next --.

Column 83,
Line 64, "this;" should read -- this --.

Column 87,
Line 3, "determine" should read -- determined --.

Signed and Sealed this

Nineteenth Day of March, 2002

Attest:

JAMES E. ROGAN
Attesting Officer     Director of the United States Patent and Trademark Office